(12) United States Patent
Tippery et al.

(10) Patent No.: US 10,721,857 B2
(45) Date of Patent: *Jul. 28, 2020

(54) AUTONOMOUS INTEGRATED FARMING SYSTEM

(71) Applicant: REALMFIVE, Inc., Lincoln, NE (US)

(72) Inventors: Steve R. Tippery, Gretna, NE (US); Brant Burkey, Denton, NE (US); Kyle Gerber, Senoia, GA (US); Heath Roehr, Lincoln, NE (US); Tim Adkins, Plattsmouth, NE (US)

(73) Assignee: REALMFIVE, INC., Lincoln, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/215,008

(22) Filed: Dec. 10, 2018

(65) Prior Publication Data

US 2019/0274241 A1 Sep. 12, 2019

Related U.S. Application Data

(63) Continuation of application No. 15/384,132, filed on Dec. 19, 2016, now Pat. No. 10,149,422.

(Continued)

(51) Int. Cl.
*A01B 69/04* (2006.01)
*A01B 3/50* (2006.01)
(Continued)

(52) U.S. Cl.
CPC ............. *A01B 69/008* (2013.01); *A01B 3/50* (2013.01); *A01B 5/16* (2013.01); *A01B 35/32* (2013.01);
(Continued)

(58) Field of Classification Search
CPC .......... A01B 69/008; A01B 3/50; A01B 5/16; A01B 35/32; A01B 39/06; A01B 51/02;
(Continued)

(56) References Cited

U.S. PATENT DOCUMENTS

| | | |
|---|---|---|
| 3,186,493 A | 6/1965 | Barry |
| 3,841,717 A | 10/1974 | Parisotto et al. |

(Continued)

FOREIGN PATENT DOCUMENTS

| | | |
|---|---|---|
| FR | 3016675 A1 | 7/2015 |
| GB | 1052808 A | 12/1966 |
| WO | 2014134218 A1 | 9/2014 |

OTHER PUBLICATIONS

Partial EP Search Report dated Nov. 7, 2019 for EP Application No. 16876939.6.

*Primary Examiner* — Mussa A Shaawat
(74) *Attorney, Agent, or Firm* — Suiter Swantz pc llo

(57) ABSTRACT

A farming system includes a field engagement unit. The field engagement unit includes a support assembly. The support assembly includes one or more work tool rail assemblies. The field engagement unit additionally includes one or more propulsion units which provide omnidirectional control of the field engagement unit. The field engagement unit additionally includes one or more work tool assemblies. The one or more work tool assemblies are actuatable along the one or more work tool rail assemblies. The farming system additionally includes a local controller. The local controller includes one or more processors configured to execute a set of program instructions stored in memory. The program instructions are configured to cause the one or more processors to control one or more components of the field engagement unit.

27 Claims, 107 Drawing Sheets

Related U.S. Application Data

(60) Provisional application No. 62/368,080, filed on Jul. 28, 2016, provisional application No. 62/335,260, filed on May 12, 2016, provisional application No. 62/319,861, filed on Apr. 8, 2016, provisional application No. 62/269,770, filed on Dec. 18, 2015, provisional application No. 62/269,800, filed on Dec. 18, 2015.

(51) Int. Cl.
| | | |
|---|---|---|
| *A01B 35/32* | (2006.01) | |
| *A01B 39/06* | (2006.01) | |
| *A01B 5/16* | (2006.01) | |
| *A01B 51/02* | (2006.01) | |
| *A01B 69/00* | (2006.01) | |
| *A01B 71/02* | (2006.01) | |
| *A01B 79/02* | (2006.01) | |
| *A01G 22/00* | (2018.01) | |
| *A01B 76/00* | (2006.01) | |
| *A01C 21/00* | (2006.01) | |
| *A01G 25/09* | (2006.01) | |

(52) U.S. Cl.
CPC .............. *A01B 39/06* (2013.01); *A01B 51/02* (2013.01); *A01B 69/00* (2013.01); *A01B 71/02* (2013.01); *A01B 76/00* (2013.01); *A01B 79/02* (2013.01); *A01C 21/005* (2013.01); *A01G 22/00* (2018.02); *A01G 25/09* (2013.01)

(58) Field of Classification Search
CPC ......... A01B 69/00; A01B 71/02; A01B 76/00; A01B 79/02; A01G 22/00; A01G 25/09; A01C 21/005
See application file for complete search history.

(56) References Cited

U.S. PATENT DOCUMENTS

| | | | |
|---|---|---|---|
| 4,683,969 A | | 8/1987 | Littau |
| 4,696,349 A | * | 9/1987 | Harwood ............... A01B 63/22 172/323 |
| 4,704,851 A | | 11/1987 | Manor |
| 4,735,365 A | | 4/1988 | Smeller et al. |
| 5,348,226 A | | 9/1994 | Heiniger et al. |
| 6,041,582 A | * | 3/2000 | Tiede ................... A01B 79/005 56/10.2 A |
| 2005/0135912 A1 | * | 6/2005 | Schempf ................ A01G 9/088 414/618 |
| 2006/0062662 A1 | * | 3/2006 | Curl ....................... E02F 3/388 414/680 |
| 2006/0243465 A1 | * | 11/2006 | Kallevig .................. B66F 9/12 172/378 |
| 2008/0046130 A1 | | 2/2008 | Faivre et al. |
| 2008/0206026 A1 | * | 8/2008 | Jones .................... A01B 51/026 414/349 |
| 2008/0279629 A1 | * | 11/2008 | Nasby .................. E01C 19/006 404/118 |
| 2009/0277049 A1 | * | 11/2009 | Black ........................ E02F 3/12 37/352 |
| 2011/0283673 A1 | * | 11/2011 | Moersch ............... A01D 41/141 56/14.9 |
| 2012/0095652 A1 | | 4/2012 | Anderson |
| 2013/0076101 A1 | * | 3/2013 | Simon ................... E01C 23/088 299/39.2 |
| 2015/0053436 A1 | | 2/2015 | Thompson |
| 2015/0237791 A1 | | 8/2015 | Bassett et al. |
| 2015/0275466 A1 | * | 10/2015 | Behr ..................... E02F 3/3663 403/34 |
| 2015/0351309 A1 | | 12/2015 | Gaus |
| 2017/0089138 A1 | * | 3/2017 | Pollock ................... E21B 7/027 |
| 2017/0145657 A1 | * | 5/2017 | Erhardt .................... E02F 9/00 |

\* cited by examiner

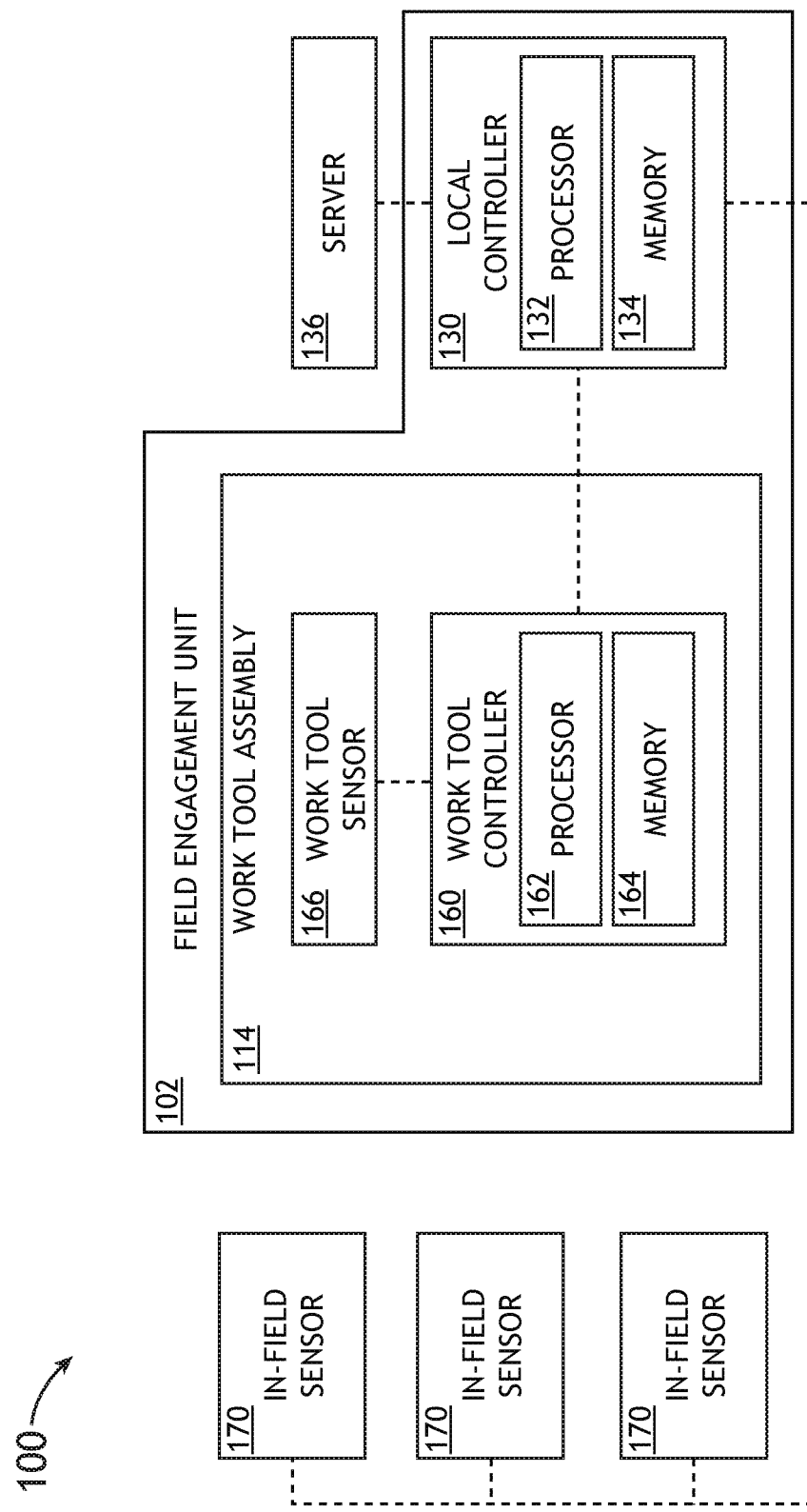

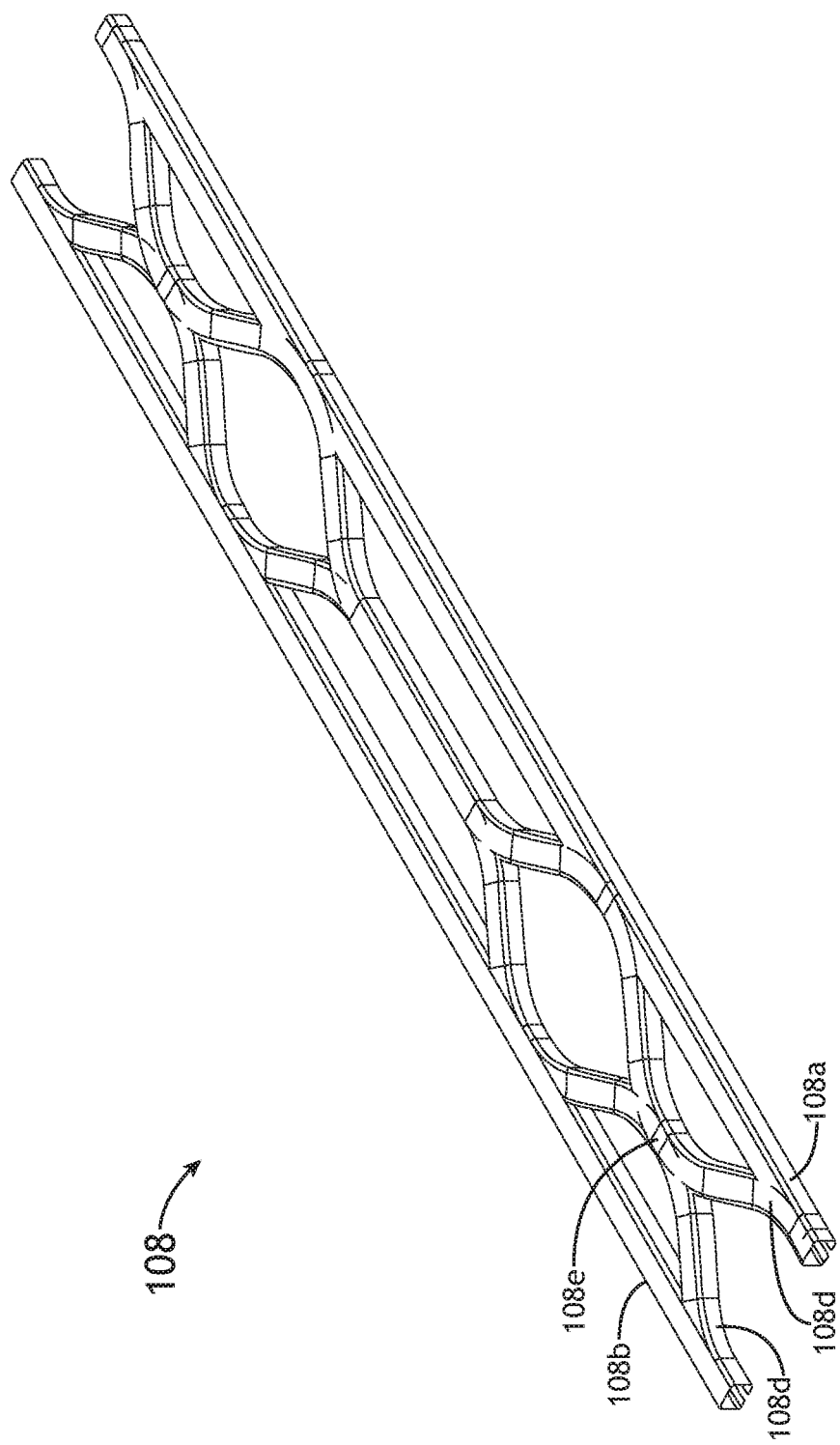

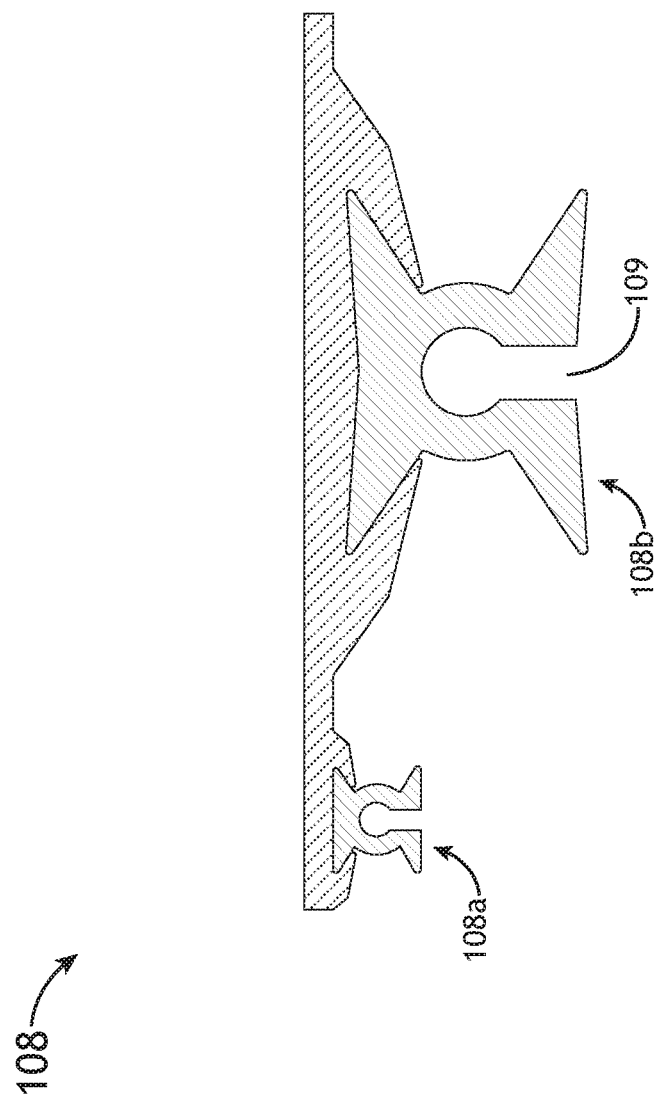

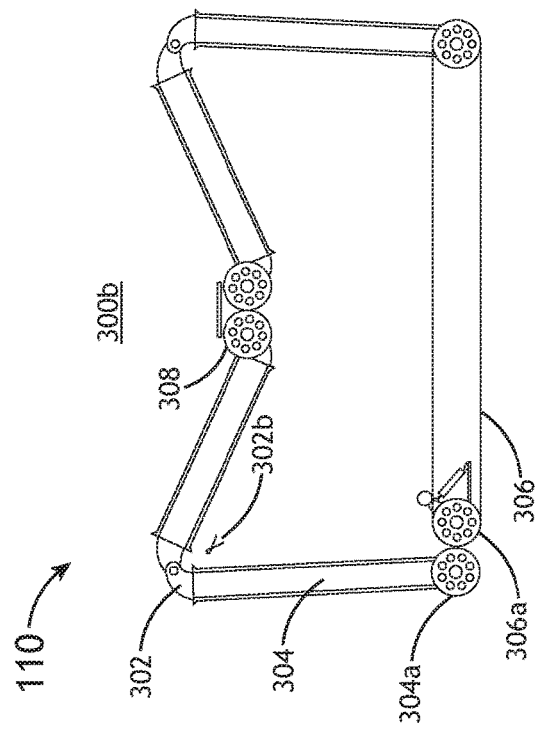
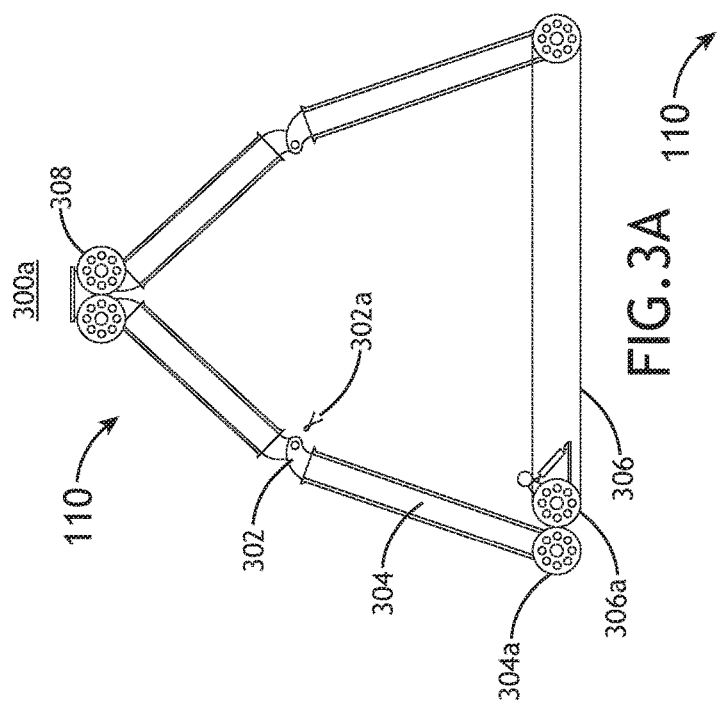
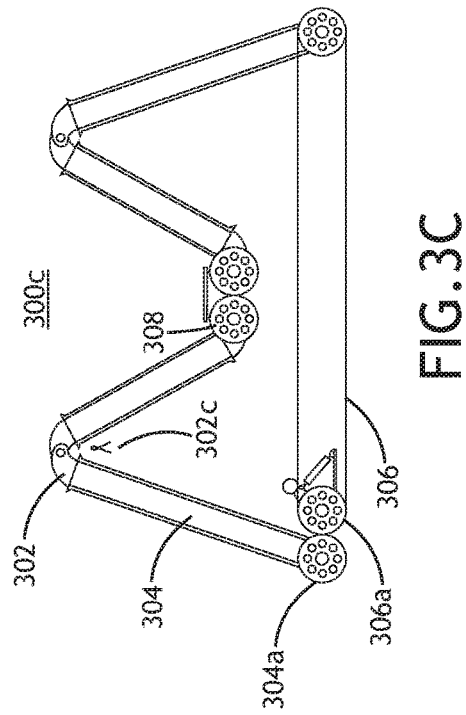
FIG.3A
FIG.3B
FIG.3C

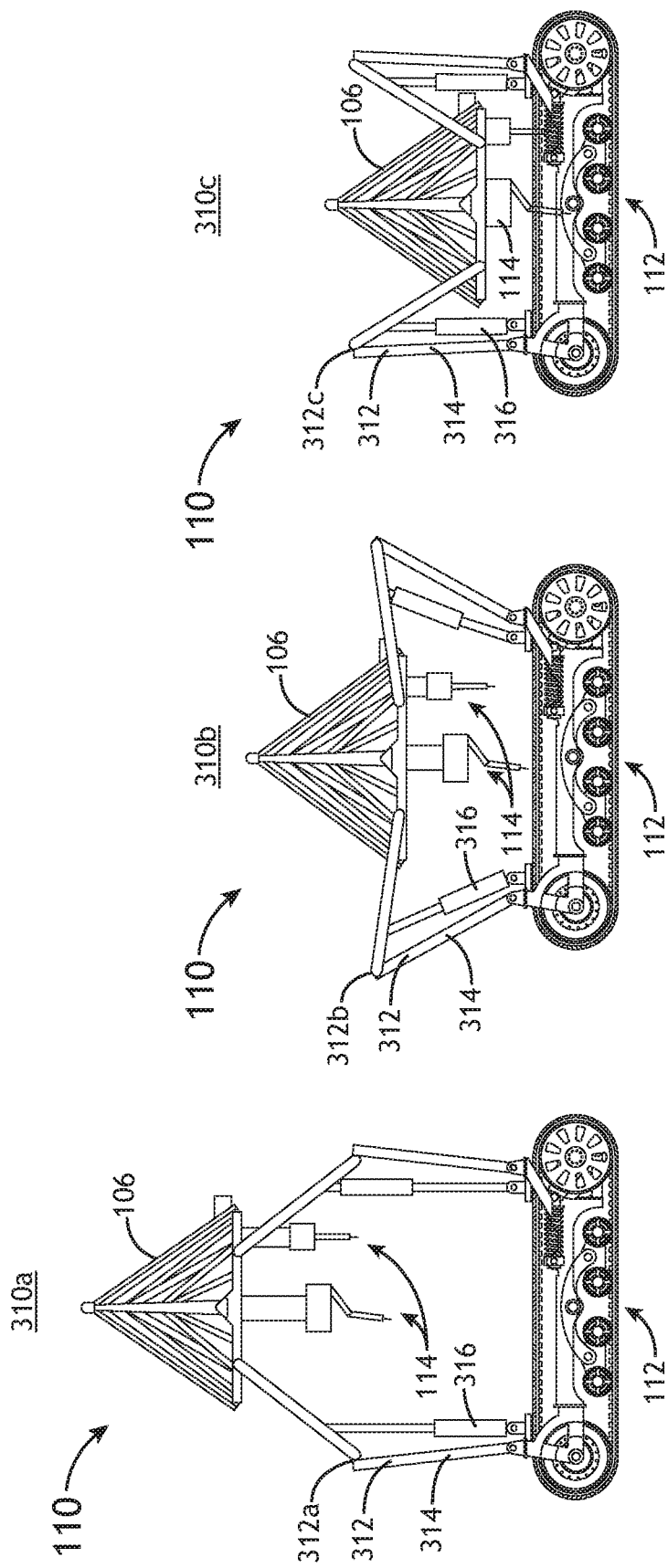

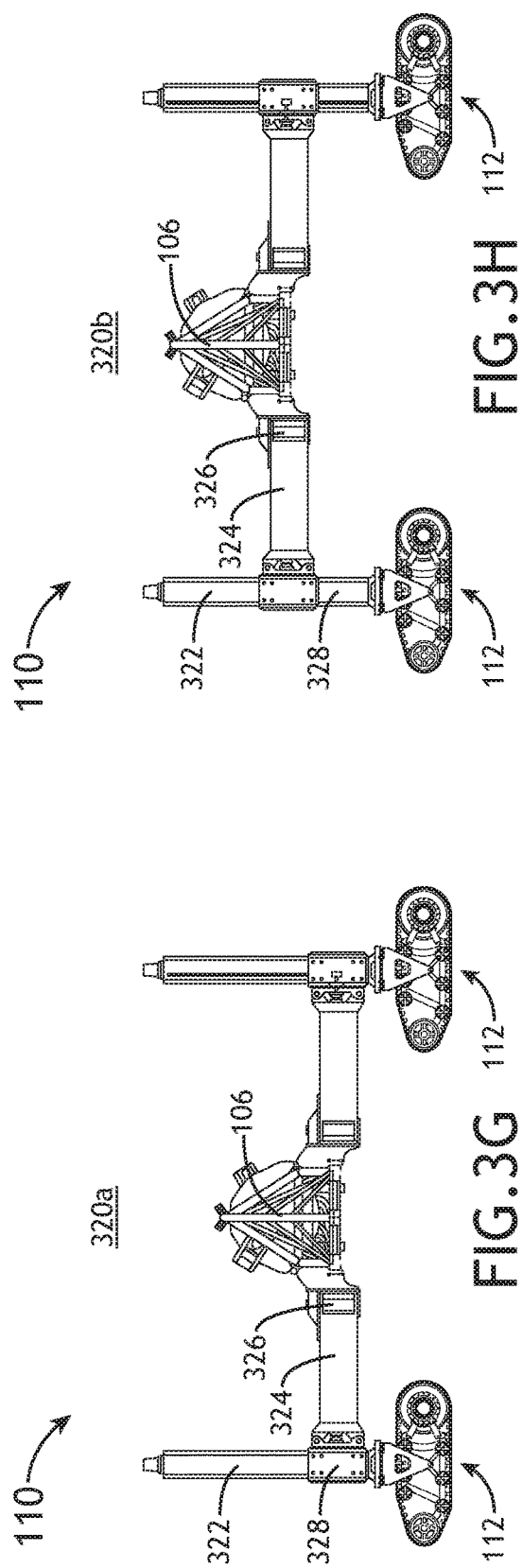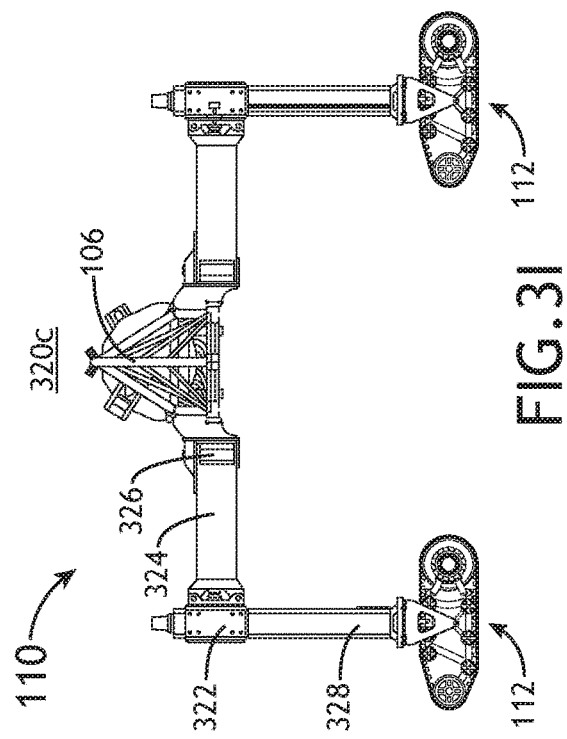

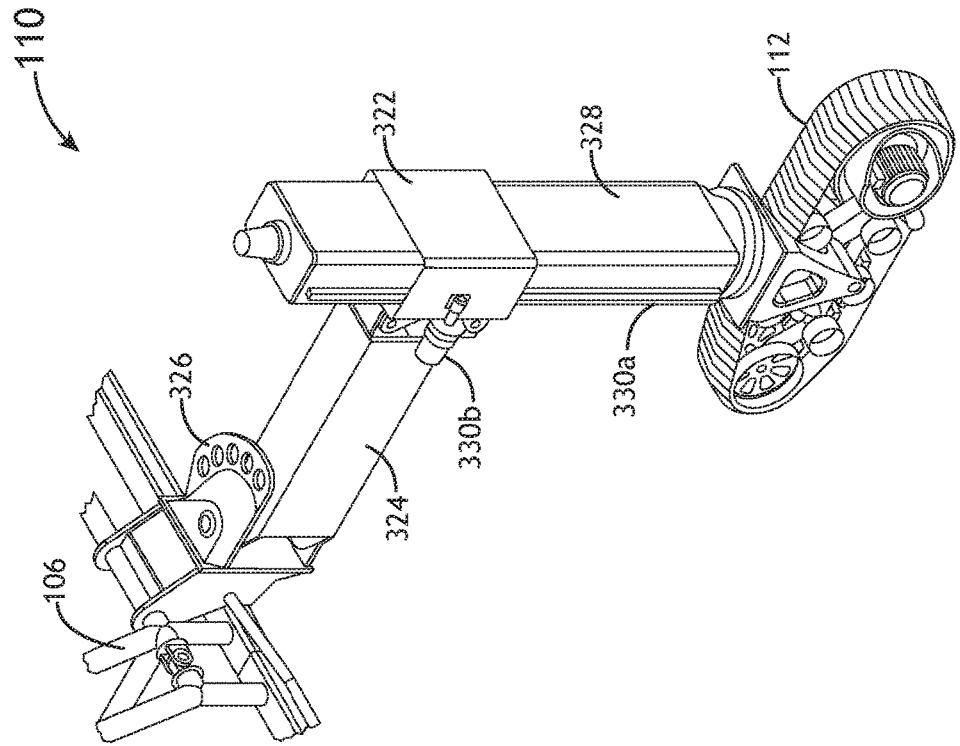

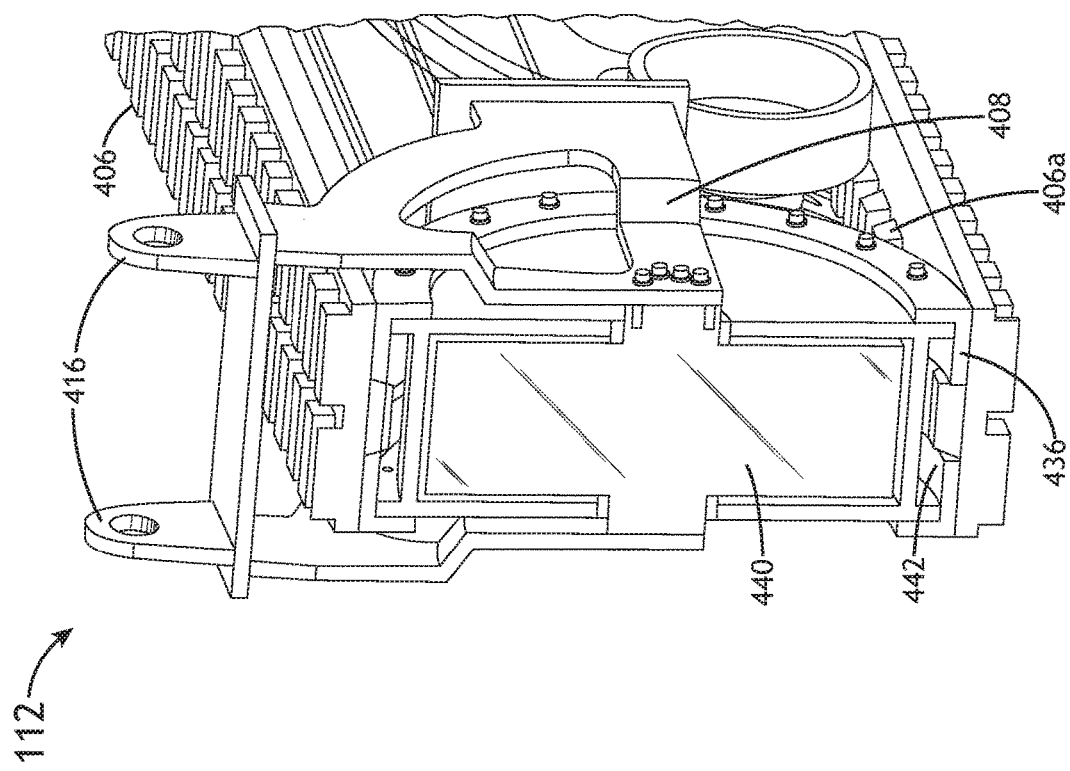

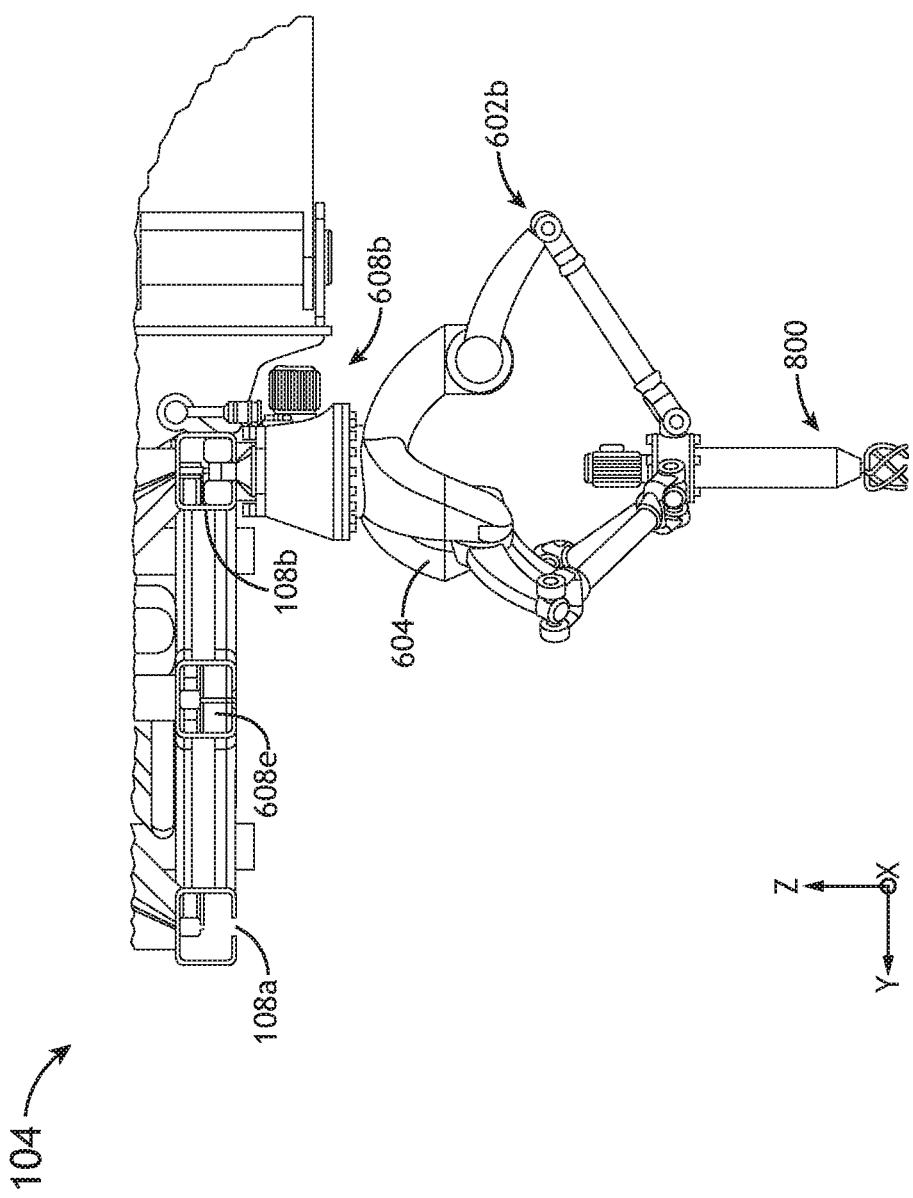

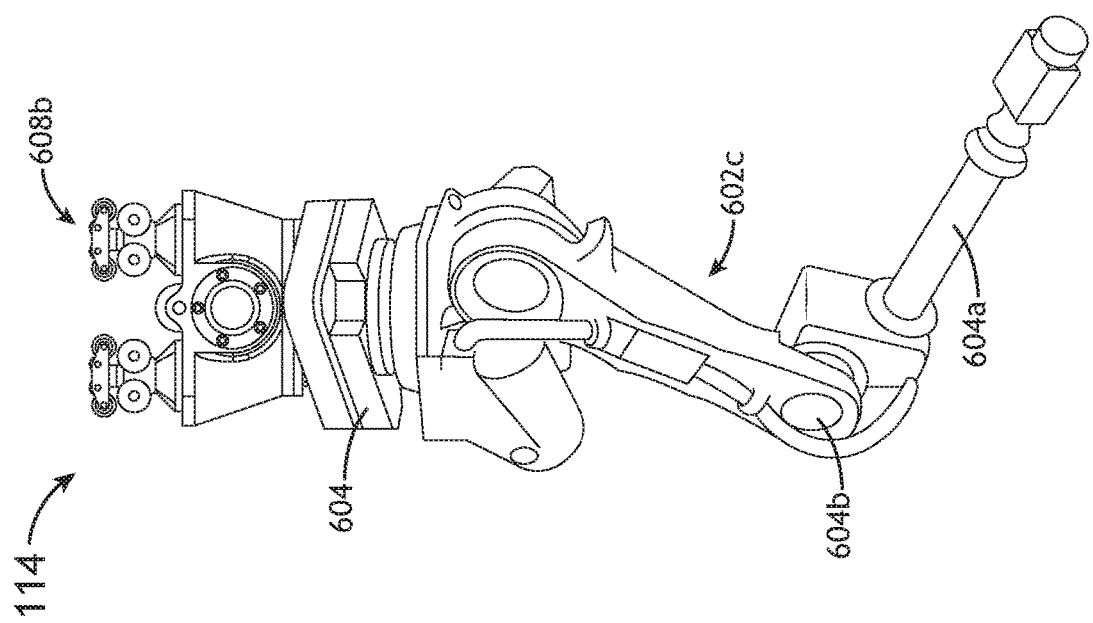

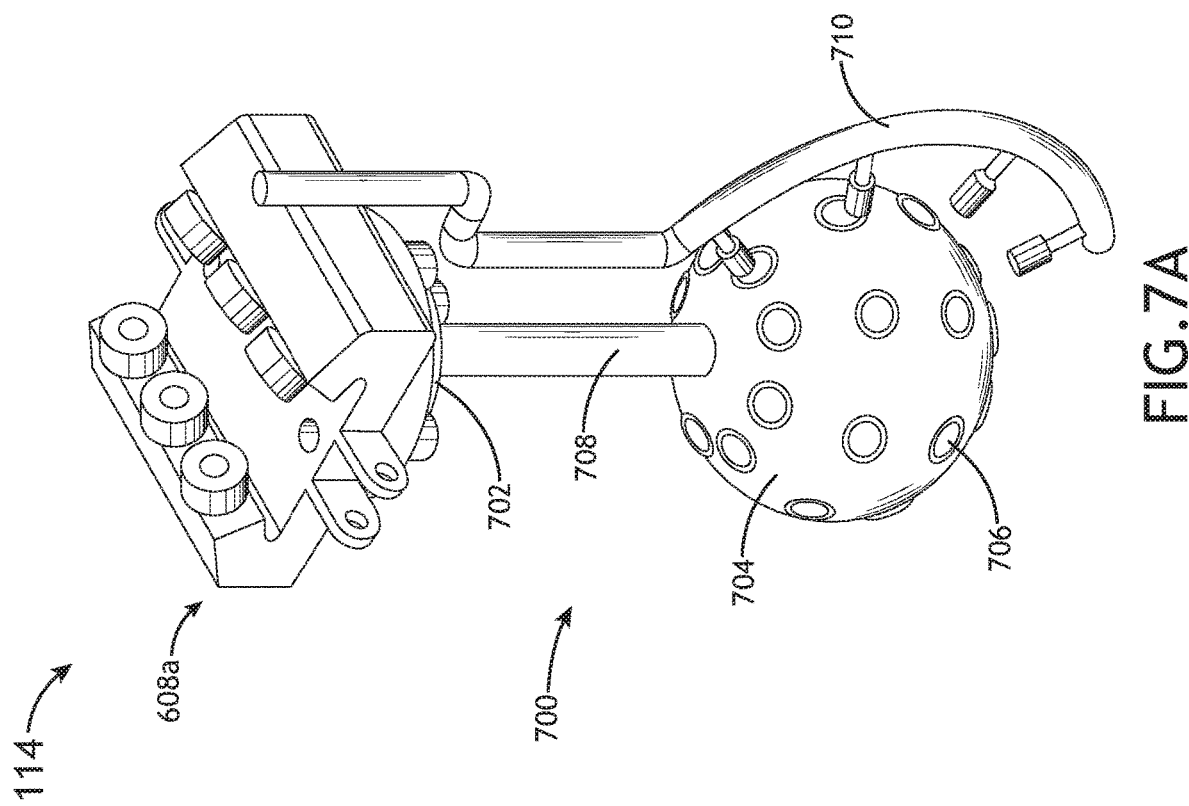

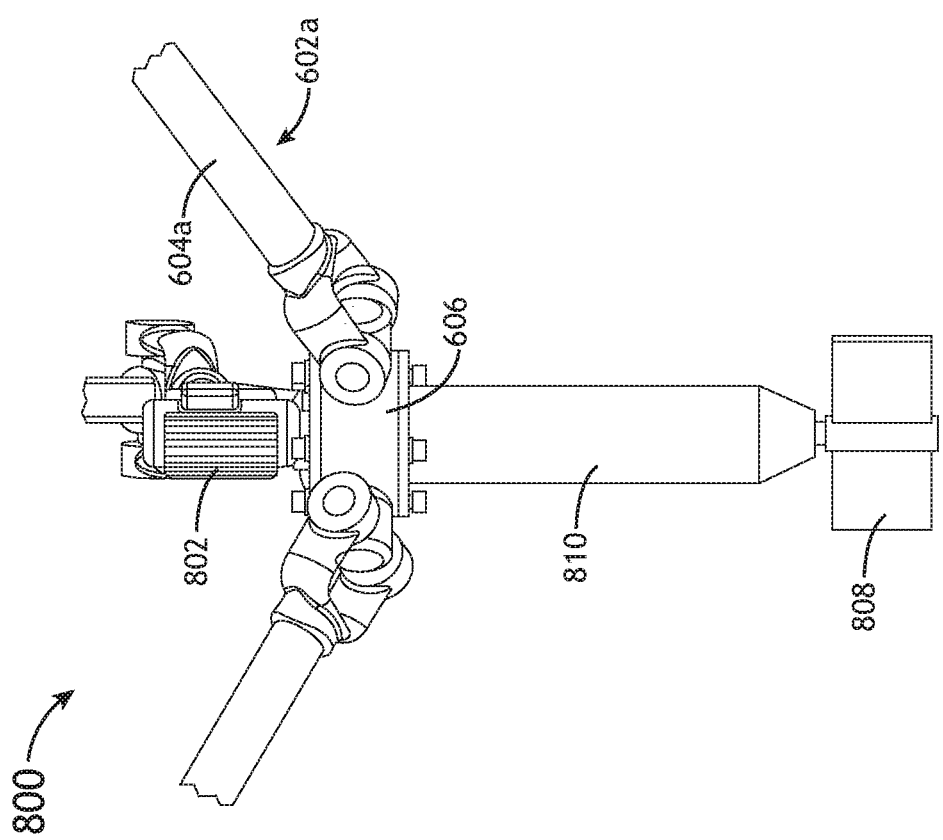

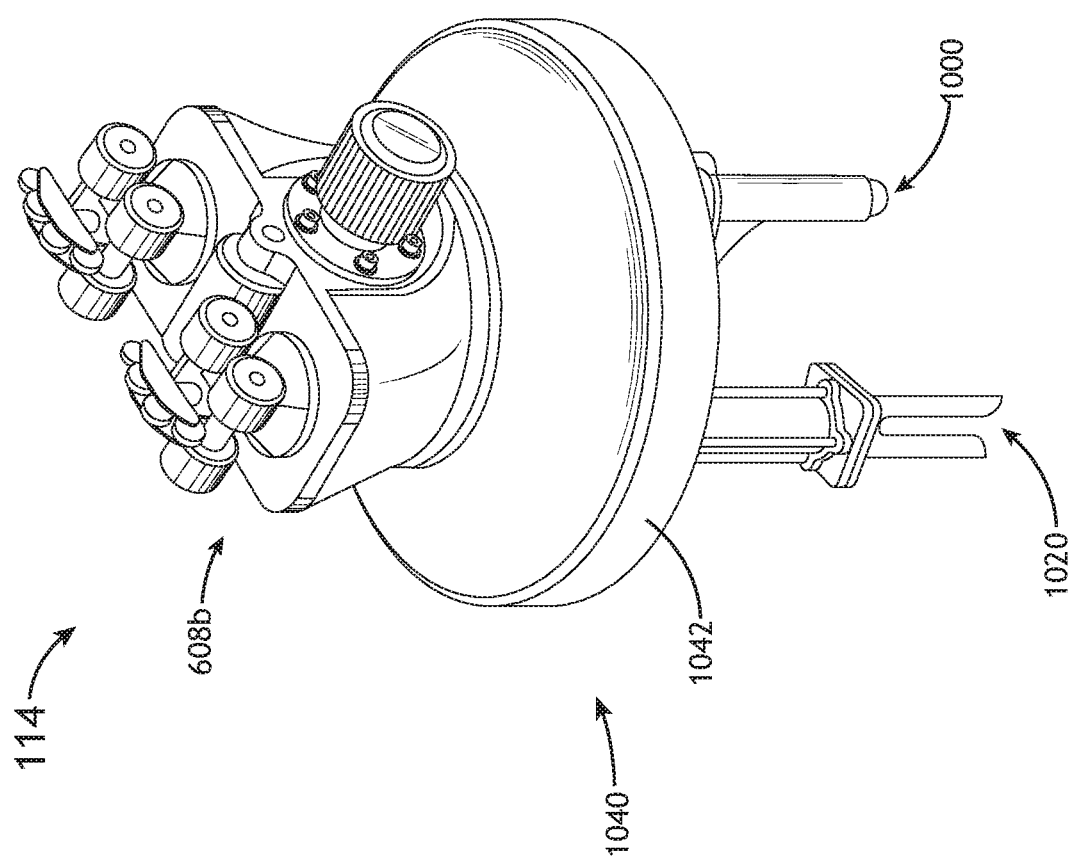

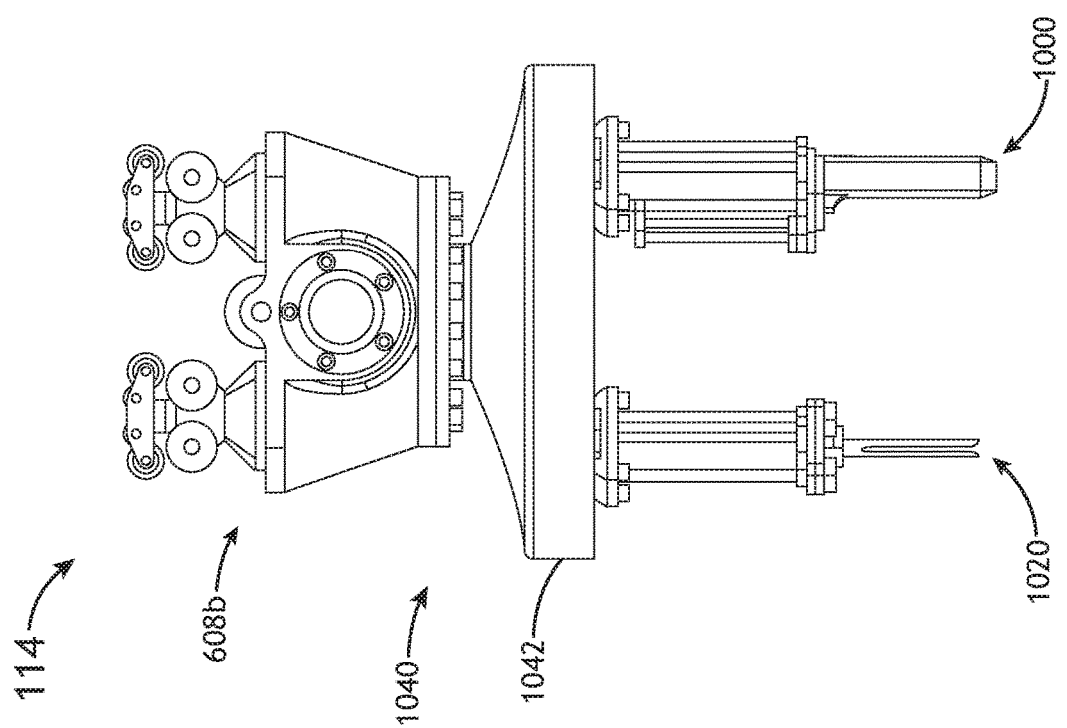

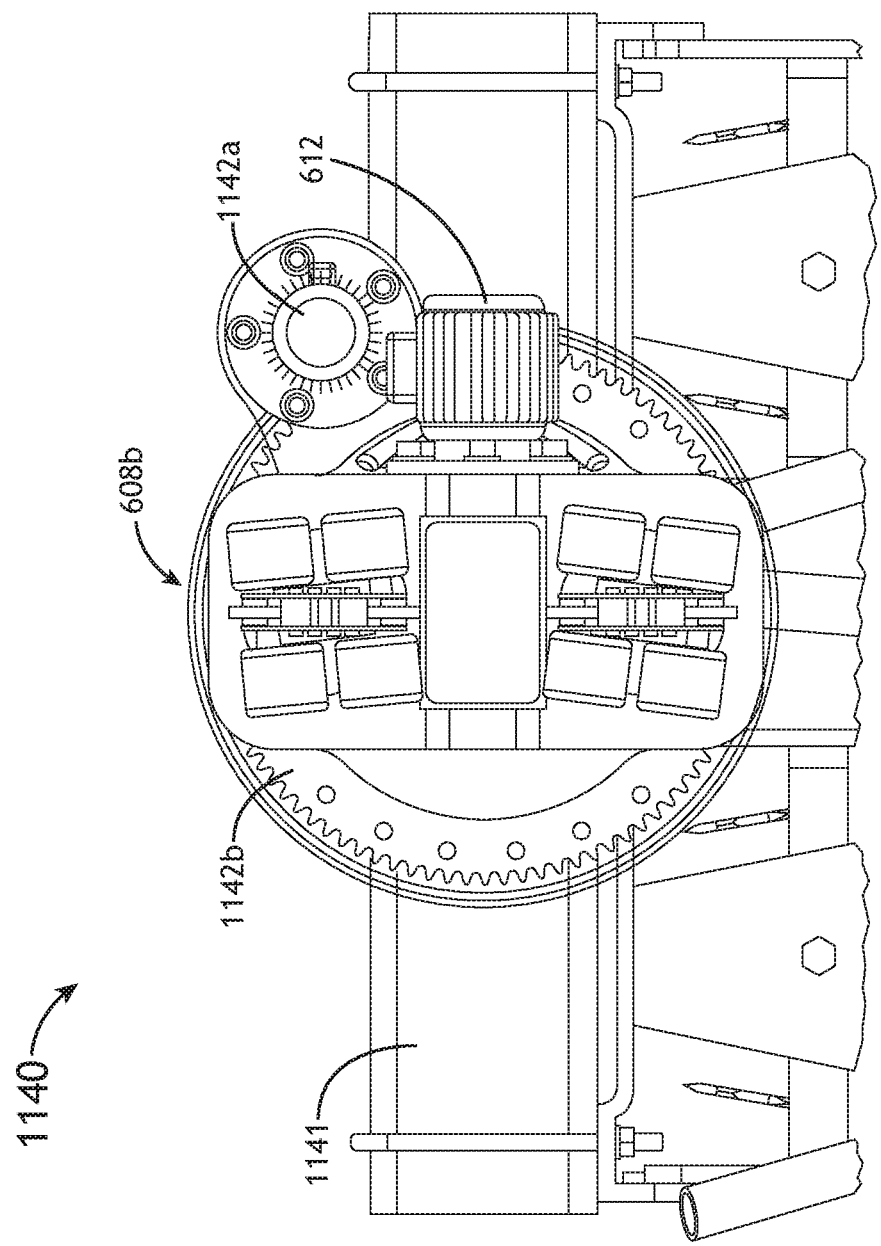

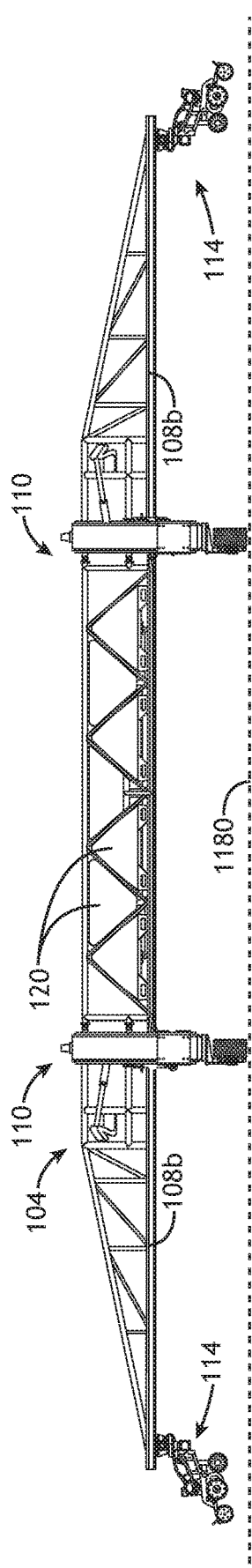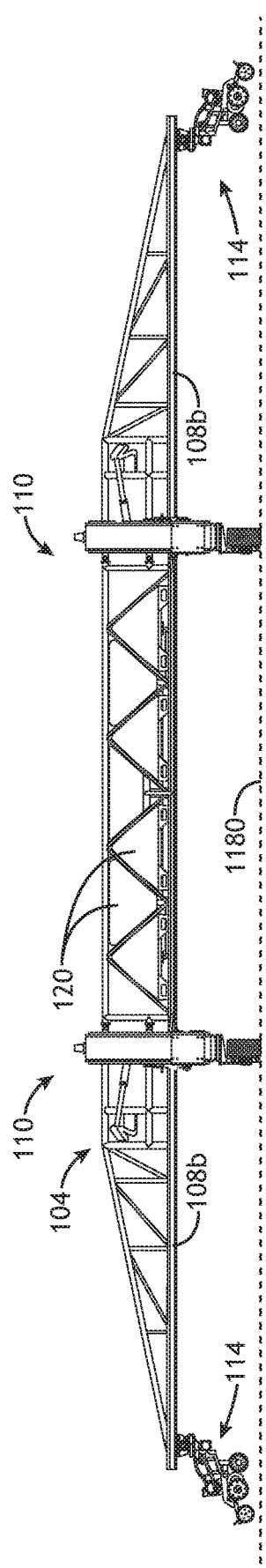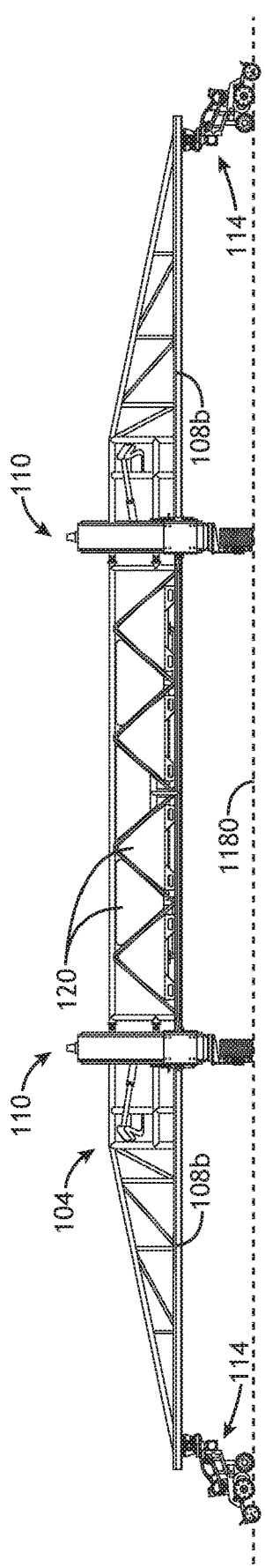

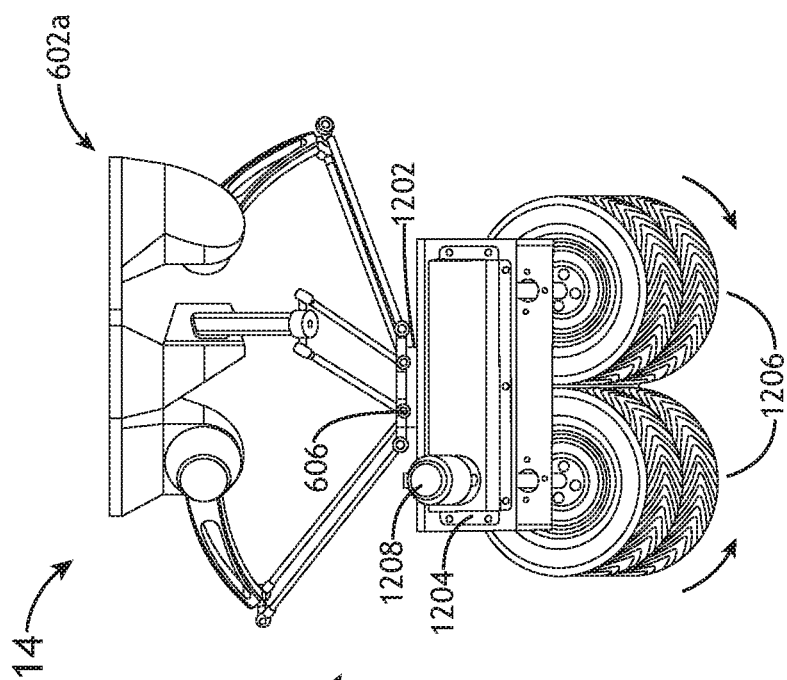
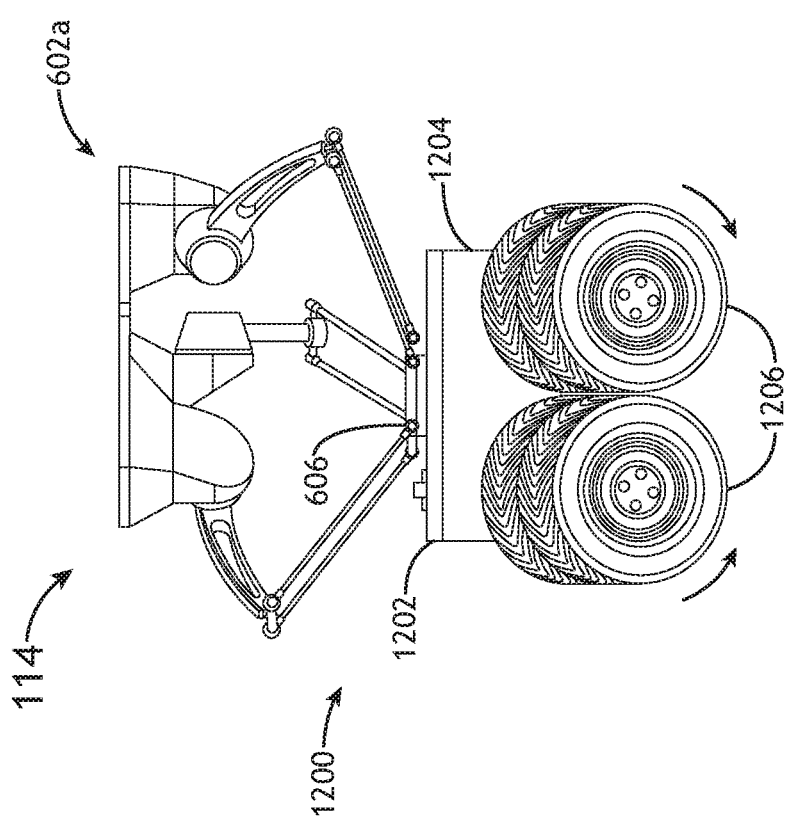

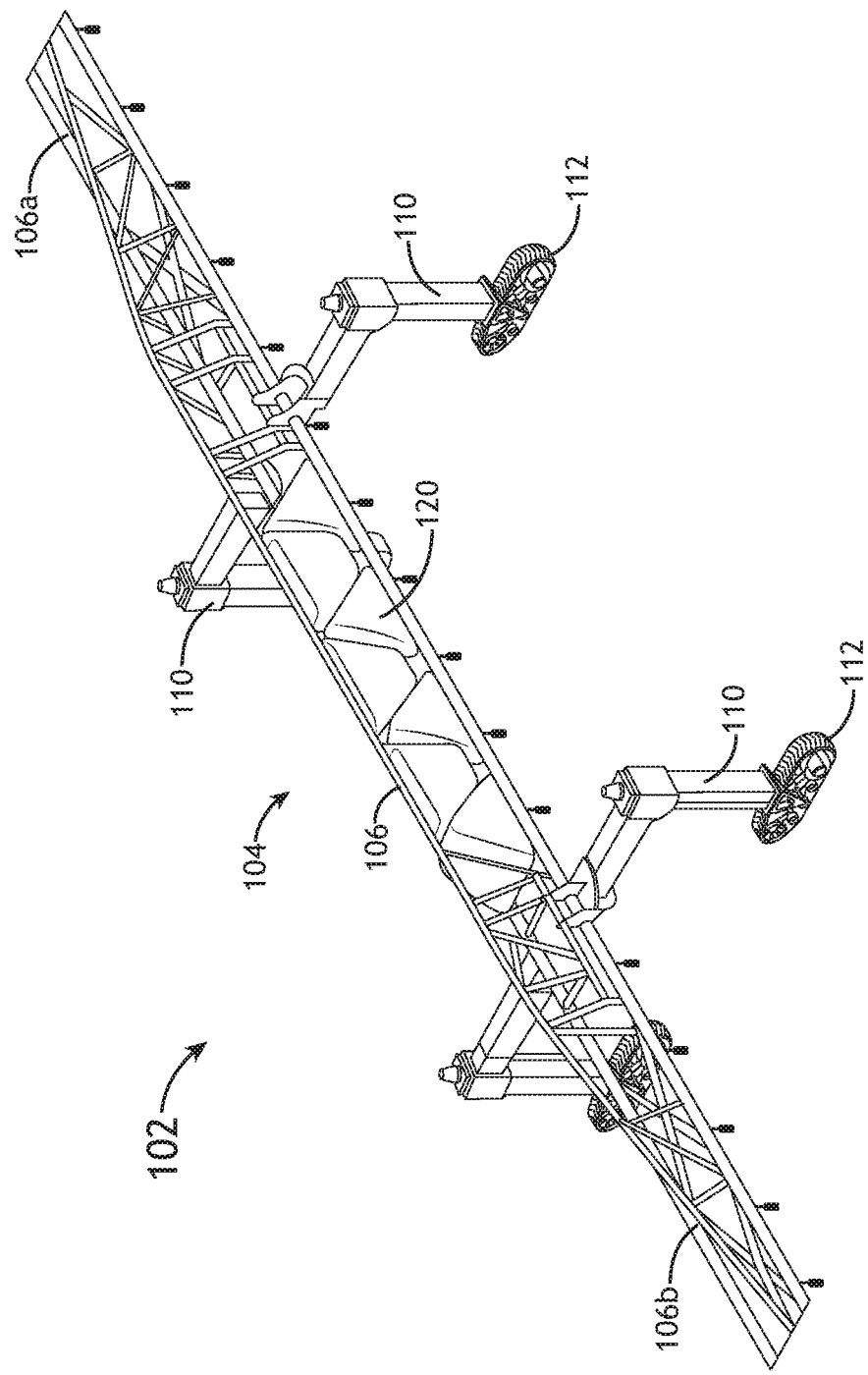

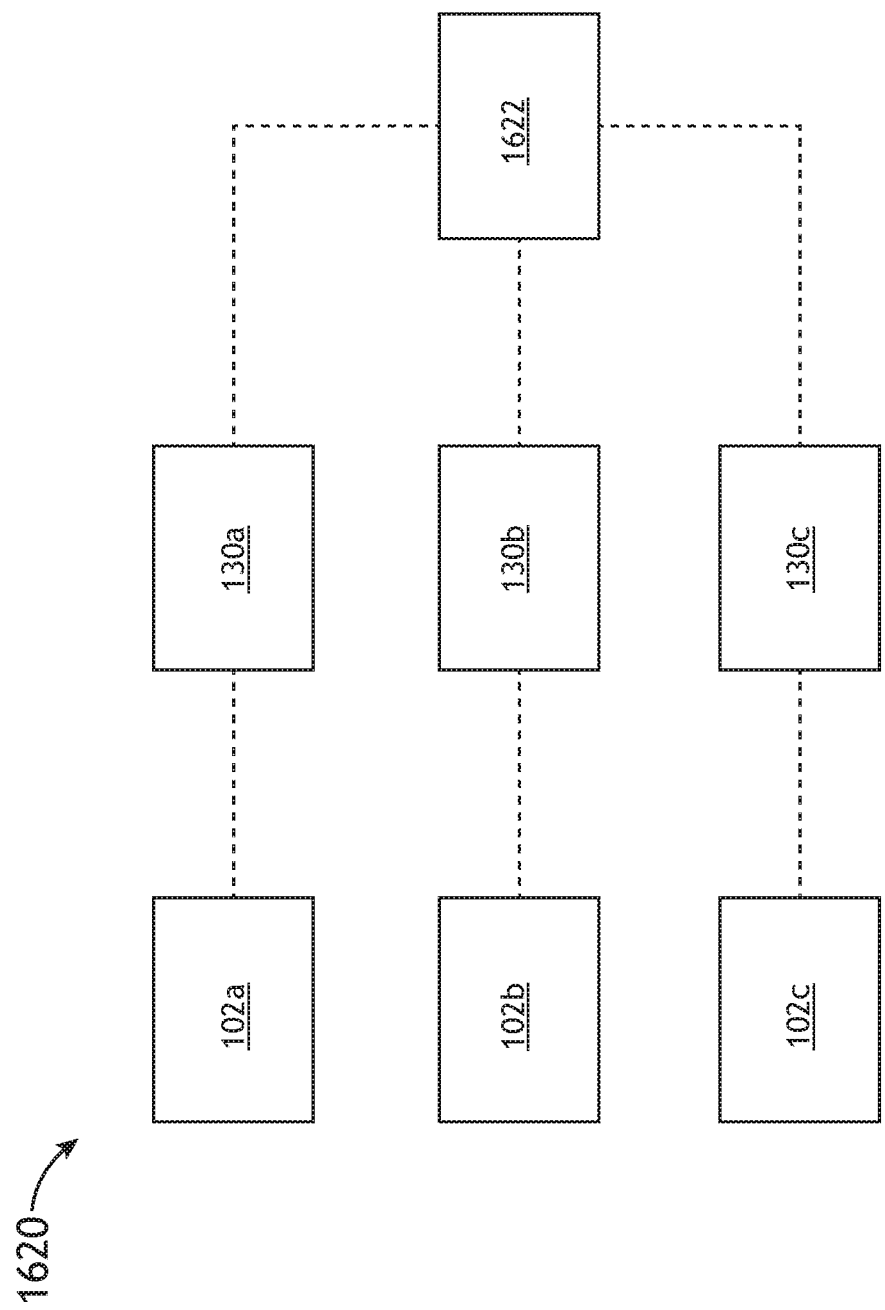

AUTONOMOUS INTEGRATED FARMING SYSTEM

CROSS-REFERENCE TO RELATED APPLICATIONS

The present application is related to and claims benefit of the earliest available effective filing date from the following applications. The present application constitutes a continuation patent application of U.S. Non-Provisional patent application Ser. No. 15/384,132, filed Dec. 19, 2016, entitled AUTONOMOUS INTEGRATED FARMING SYSTEM, naming Steve R. Tippery, Brant Burkey, Kyle Gerber, Heath Roehr, and Tim Adkins as inventors, which claims priority to the following provisional patent applications: U.S. Provisional Patent Application Ser. No. 62/269,770, filed Dec. 18, 2015, entitled METHOD AND SYSTEM FOR CLOUD-BASED CROP YIELD PREDICTION, naming Jayme Dick-Burkey, Steve R. Tippery and Brant Burkey as inventors; U.S. Provisional Patent Application Ser. No. 62/269,800, filed Dec. 18, 2015, entitled SELF-PROPELLED INTEGRATED FARMING SYSTEM, naming Steve Tippery, Brant Burkey, and Kyle Gerber as inventors; U.S. Provisional Patent Application Ser. No. 62/319,861, filed Apr. 8, 2016, entitled SELF-PROPELLED AUTONOMOUS INTEGRATED FARMING SYSTEM, naming Steve Tippery, Brant Burkey, and Kyle Gerber as inventors; U.S. Provisional Patent Application Ser. No. 62/335,260, filed May 12, 2016, entitled SELF-PROPELLED AUTONOMOUS INTEGRATED FARMING SYSTEM CONTROL SYSTEM, naming Steve Tippery, Brant Burkey, Heath Roehr, Tim Adkins, and Kyle Gerber as inventors; U.S. Provisional Patent Application Ser. No. 62/368,080, filed Jul. 28, 2016, entitled SELF-PROPELLED INTEGRATED FARMING SYSTEM, naming Steve Tippery, Brant Burkey, and Kyle Gerber as inventors. U.S. patent application Ser. No. 15/384,132, 62/269,770, 62/269,800, 62/319,861, 62/335,260, and 62/368,080 are each incorporated herein by reference in the entirety.

TECHNICAL FIELD

The present invention generally relates to a self-propelled farming system, and, in particular, to an autonomous farming system capable of carrying out various farming activities.

BACKGROUND

Self-propelled irrigation systems, including center-pivot and lateral-move systems, have irrigation towers wheels that are driven by drive motors mechanically coupled to gearboxes and/or drivelines. While cost effective, these propulsion systems are complex, utilizing a large number of components that result in low reliability. The large number of components add weight to the propulsion system, and thus to the self-propelled irrigation system, which cause the irrigation system to use more energy to propel the irrigation system than necessary. Additionally, a heavy irrigation system often creates deep ruts in the ground along each path traveled by the irrigation tower wheels. When these ruts form on hills, the ruts form channels for water to move, facilitating erosion processes. Additionally, ruts also cause damage to agricultural equipment that drive over them during field operation.

Further, the technology in the self-propelled propulsion systems is generally suitable only for use in irrigation applications. For example, the self-propelled irrigation system propulsion systems are designed to move at a speed usable only for irrigation. By way of another example, the guidance technology of the propulsion systems implements a set of limit switches. The limit switches are designed to allow one irrigation system span to be propelled ahead of another span to the extent allowed by the span-specific limit switch, at which point the span-specific limit switch is switched off until the remainder of the spans catch up. The propulsion system of a specific span may only be utilized when the limit switch for that particular span is engaged, meaning spans are continually stopping and starting motion while travelling the field. In this fashion, significant structural fatigue may be witnessed in the spans. The frequent number of starts and stops is hard on an irrigation system's structure and respective drive systems. In the case of a center pivot, the furthest irrigation tower's drive system from the center point operates more of the time in an ON position than the innermost irrigation tower's drive system.

The irrigation towers are constructed as A-frames of a fixed height and a fixed angle relative to the ground. This fixed height makes it difficult for the propulsion systems to drive the irrigation system on any ground that is not flat. For example, when the irrigation system is climbing a hill, the fixed height results in the irrigation system spraying a field at uneven heights, resulting in non-uniform coverage.

Additionally, the irrigation system is constructed from a reverse bow truss assembly. The truss assembly provides support for an irrigation fluid pipe running the length of the irrigation system. The truss assembly is designed only to be coupled to one or more irrigation nozzles, making the irrigation system largely unusable for other applications.

As such it would be desirable to provide a system and method that cures the shortcomings of the previous approaches as identified above.

SUMMARY

A farming system is disclosed, in accordance with one or more embodiments of the present disclosure. In one illustrative embodiment, a farming system includes a field engagement unit. In another illustrative embodiment, the field engagement unit includes a support assembly. In another illustrative embodiment, the support assembly includes one or more work tool rail assemblies. In another illustrative embodiment, the field engagement unit includes one or more propulsion units. In another illustrative embodiment, the one or more propulsion units provide omnidirectional control of the field engagement unit. In another illustrative embodiment, the field engagement unit includes one or more work tool assemblies. In another illustrative embodiment, one or more work tool assemblies are actuatable along the one or more work tool rail assemblies. In another illustrative embodiment, the farming system includes a local controller. In another illustrative embodiment, the local controller includes one or more processors configured to execute a set of program instructions stored in memory. In another illustrative embodiment, the program instructions are configured to cause the one or more processors to control one or more components of the field engagement unit.

In another embodiment, the farming system includes one or more material storage containers.

A farming system is disclosed, in accordance with one or more embodiments of the present disclosure. In one illustrative embodiment, the farming system includes a field engagement unit. In another illustrative embodiment, the field engagement unit includes a support assembly. In another illustrative embodiment, the support assembly includes a support frame. In another illustrative embodiment, the support assembly includes one or more work tool rail assemblies. In another illustrative embodiment, the support assembly includes one or more support structures. In another illustrative embodiment, the one or more support structures are actuatable. In another illustrative embodiment, the field engagement unit includes one or more propulsion units coupled to the one or more support structures of the support assembly via one or more steering assemblies. In another illustrative embodiment, the one or more propulsion units provide omnidirectional control of the field engagement unit. In another illustrative embodiment the field engagement unit includes one or more work tool assemblies. In another illustrative embodiment, the one or more work tool assemblies are actuatable along the one or more work tool rail assemblies. In another illustrative embodiment, the field engagement unit includes one or more material storage containers. In another illustrative embodiment, the farming system includes a local controller. In another illustrative embodiment, the local controller includes one or more processors configured to execute a set of program instructions stored in memory. In another illustrative embodiment, the program instructions are configured to cause the one or more processors to control one or more components of the field engagement unit.

A farming system is disclosed, in accordance with one or more embodiments of the present disclosure. In one illustrative embodiment, the farming system includes a plurality of field engagement units. In another illustrative embodiment, the plurality of field engagement units includes a support assembly. In another illustrative embodiment, the support assembly includes one or more work tool rail assemblies. In another illustrative embodiment, the support assembly includes one or more propulsion units. In another illustrative embodiment, the support assembly includes one or more work tool assemblies. In another illustrative embodiment, the one or more work tools are actuatable along the one or more work tool rail assemblies. In another illustrative embodiment, the plurality of field engagement units includes one or more material storage containers. In another illustrative embodiment, the plurality of field engagement units includes a local controller. In another illustrative embodiment, the local controller includes one or more local processors configured to execute a set of program instructions stored in local memory. In another illustrative embodiment, the program instructions are configured to cause the one or more local processors to control one or more components of the plurality of field engagement units. In another illustrative embodiment, the farming system includes a central controller. In another illustrative embodiment, the central controller includes one or more processors configured to execute a set of program instructions stored in memory. In another illustrative embodiment, the central controller is communicatively coupled to each of the local controllers of the plurality of field engagement units. In another illustrative embodiment, the program instructions are configured to cause the one or more processors to coordinate one or more actions of two or more of the plurality of field engagement units.

An agricultural processing system is disclosed, in accordance with one or more embodiments of the present disclosure. In one illustrative embodiment, the agricultural processing system includes an engagement unit. In another illustrative embodiment, the engagement unit includes a support assembly. In another illustrative embodiment, the support assembly includes one or more work tool rail assemblies. In another illustrative embodiment, the support assembly includes one or more propulsion units. In another illustrative embodiment, the one or more propulsion units provide omnidirectional control of the engagement unit. In another illustrative embodiment, the support assembly includes one or more work tool assemblies. In another illustrative embodiment, the one or more work tool assemblies are actuatable along the one or more work tool rail assemblies. In another illustrative embodiment, the one or more work tool assemblies are configured for engaging at least one of a livestock yard or a livestock enclosure. In another illustrative embodiment, the engagement unit includes one or more material storage containers. In another illustrative embodiment, the agricultural processing system includes a local controller. In another illustrative embodiment, the local controller includes one or more processors configured to execute a set of program instructions stored in memory. In another illustrative embodiment, the program instructions are configured to cause the one or more processors to control one or more components of the engagement unit.

A support assembly is disclosed, in accordance with one or more embodiments of the present disclosure. In one illustrative embodiment, the support assembly includes one or more work tool rail assemblies. In another illustrative embodiment, the support assembly includes one or more work tool assemblies. In another illustrative embodiment, the one or more work tool assemblies are actuatable along the one or more work tool rail assemblies. In another illustrative embodiment, the one or more work tool assemblies include a carrier. In another illustrative embodiment, the one or more work tool assemblies include a chassis. In another illustrative embodiment, the one or more work tool assemblies include a work tool attachment.

A farming system is disclosed, in accordance with one or more embodiments of the present disclosure. In one illustrative embodiment, the farming system includes a field engagement unit includes a support assembly. In one illustrative embodiment, the support assembly includes one or more work tool rail assemblies. In one illustrative embodiment, the support assembly further includes one or more support structures. In one illustrative embodiment, the support assembly is comprised of a support frame. In one illustrative embodiment, the support frame is comprised of a main support frame section and one or more support frame arms. In one illustrative embodiment, the field engagement unit includes one or more propulsion units. In one illustrative embodiment, the one or more propulsion units provide omnidirectional control of the field engagement unit. In one illustrative embodiment, the field engagement unit includes one or more work tool assemblies. In one illustrative embodiment, the one or more work tool assemblies are actuatable along the one or more work tool rail assemblies. In one illustrative embodiment, the field engagement unit includes one or more material storage containers. In one illustrative embodiment, the farming system includes a local controller. In one illustrative embodiment, the local controller includes one or more processors configured to execute a set of program instructions stored in memory. In one illustrative embodiment, the program instructions are configured to cause the one or more processors to control one or more components of the field engagement unit.

A farming system is disclosed, in accordance with one or more embodiments of the present disclosure. In one illustrative embodiment, the farming system includes a center pivot engagement unit. In another illustrative embodiment, the center pivot engagement unit includes a support assembly. In another illustrative embodiment, the support assembly includes one or more work tool rail assemblies. In another illustrative embodiment, the support assembly further includes one or more support structures. In another illustrative embodiment, the center pivot engagement unit includes one or more propulsion units. In another illustrative embodiment, the center pivot engagement unit includes one or more work tool assemblies. In another illustrative embodiment, the one or more work tool assemblies are actuatable along the one or more work tool rail assemblies. In another embodiment, the center pivot engagement unit includes one or more material storage containers. In another illustrative embodiment, the farming system includes a center pivot drive system configured to drive the one or more propulsion units of the center pivot field engagement unit. In another illustrative embodiment, the one or more propulsion units provide rotational control of the center pivot field engagement unit. In another illustrative embodiment, the farming system includes a local controller. In another illustrative embodiment, the local controller includes one or more processors configured to execute a set of program instructions stored in memory. In another illustrative embodiment, the program instructions are configured to cause the one or more processors to control one or more components of the center pivot field engagement unit.

It is to be understood that both the foregoing general description and the following detailed description are exemplary and explanatory only and are not necessarily restrictive of the present disclosure. The accompanying drawings, which are incorporated in and constitute a part of the characteristic, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 3A illustrates a support structure of a field engagement unit, in accordance with one or more embodiments of the present disclosure.

FIG. 3B illustrates a support structure of a field engagement unit, in accordance with one or more embodiments of the present disclosure.

FIG. 3C illustrates a support structure of a field engagement unit, in accordance with one or more embodiments of the present disclosure.

FIG. 3D illustrates a support structure of a field engagement unit, in accordance with one or more embodiments of the present disclosure.

FIG. 3E illustrates a support structure of a field engagement unit, in accordance with one or more embodiments of the present disclosure.

FIG. 3F illustrates a support structure of a field engagement unit, in accordance with one or more embodiments of the present disclosure.

FIG. 3G illustrates a support structure of a field engagement unit, in accordance with one or more embodiments of the present disclosure.

FIG. 3H illustrates a support structure of a field engagement unit, in accordance with one or more embodiments of the present disclosure.

FIG. 3I illustrates a support structure of a field engagement unit, in accordance with one or more embodiments of the present disclosure.

FIG. 3J illustrates a support structure of a field engagement unit, in accordance with one or more embodiments of the present disclosure.

FIG. 4G illustrates a propulsion unit of a field engagement unit, in accordance with one or more embodiments of the present disclosure.

FIG. 4I illustrates a propulsion unit of a field engagement unit, in accordance with one or more embodiments of the present disclosure.

FIG. 5I illustrates a support structure of a field engagement unit, in accordance with one or more embodiments of the present disclosure.

FIG. 6E illustrates a support assembly of a field engagement unit, in accordance with one or more embodiments of the present disclosure.

FIG. 6G illustrates a work tool assembly of a field engagement unit, in accordance with one or more embodiments of the present disclosure.

FIG. 7A illustrates a work tool assembly of a field engagement unit, in accordance with one or more embodiments of the present disclosure.

FIG. 8D illustrates a weeding attachment of a field engagement unit, in accordance with one or more embodiments of the present disclosure.

FIG. 10G illustrates a work tool assembly of a field engagement unit, in accordance with one or more embodiments of the present disclosure.

FIG. 10H illustrates a work tool assembly of a field engagement unit, in accordance with one or more embodiments of the present disclosure.

FIG. 11H illustrates a planting attachment of a work tool assembly, in accordance with one or more embodiments of the present disclosure.

FIG. 11I illustrates a field engagement unit, in accordance with one or more embodiments of the present disclosure.

FIG. 11J illustrates of a field engagement unit, in accordance with one or more embodiments of the present disclosure.

FIG. 11K illustrates a field engagement unit, in accordance with one or more embodiments of the present disclosure.

FIG. 11L illustrates a field engagement unit, in accordance with one or more embodiments of the present disclosure.

FIG. 12A illustrates a work tool assembly of a field engagement unit, in accordance with one or more embodiments of the present disclosure.

FIG. 12B illustrates a work tool assembly of a field engagement unit, in accordance with one or more embodiments of the present disclosure.

FIG. 16G illustrates a field engagement unit, in accordance with one or more embodiments of the present disclosure.

FIG. 16I illustrates a block diagram for controlling one or more field engagement units, in accordance with one or more embodiments of the present disclosure.

FIG. 17B illustrates a center pivot farming system, in accordance with one or more embodiments of the present disclosure.

FIG. 17C illustrates a center pivot farming system, in accordance with one or more embodiments of the present disclosure.

FIG. 17D illustrates a center pivot farming system, in accordance with one or more embodiments of the present disclosure.

FIG. 18A illustrates a livestock yard, in accordance with one or more embodiments of the present disclosure.

FIG. 18B illustrates a livestock enclosure, in accordance with one or more embodiments of the present disclosure.

DETAILED DESCRIPTION OF THE INVENTION

Figure 1A:
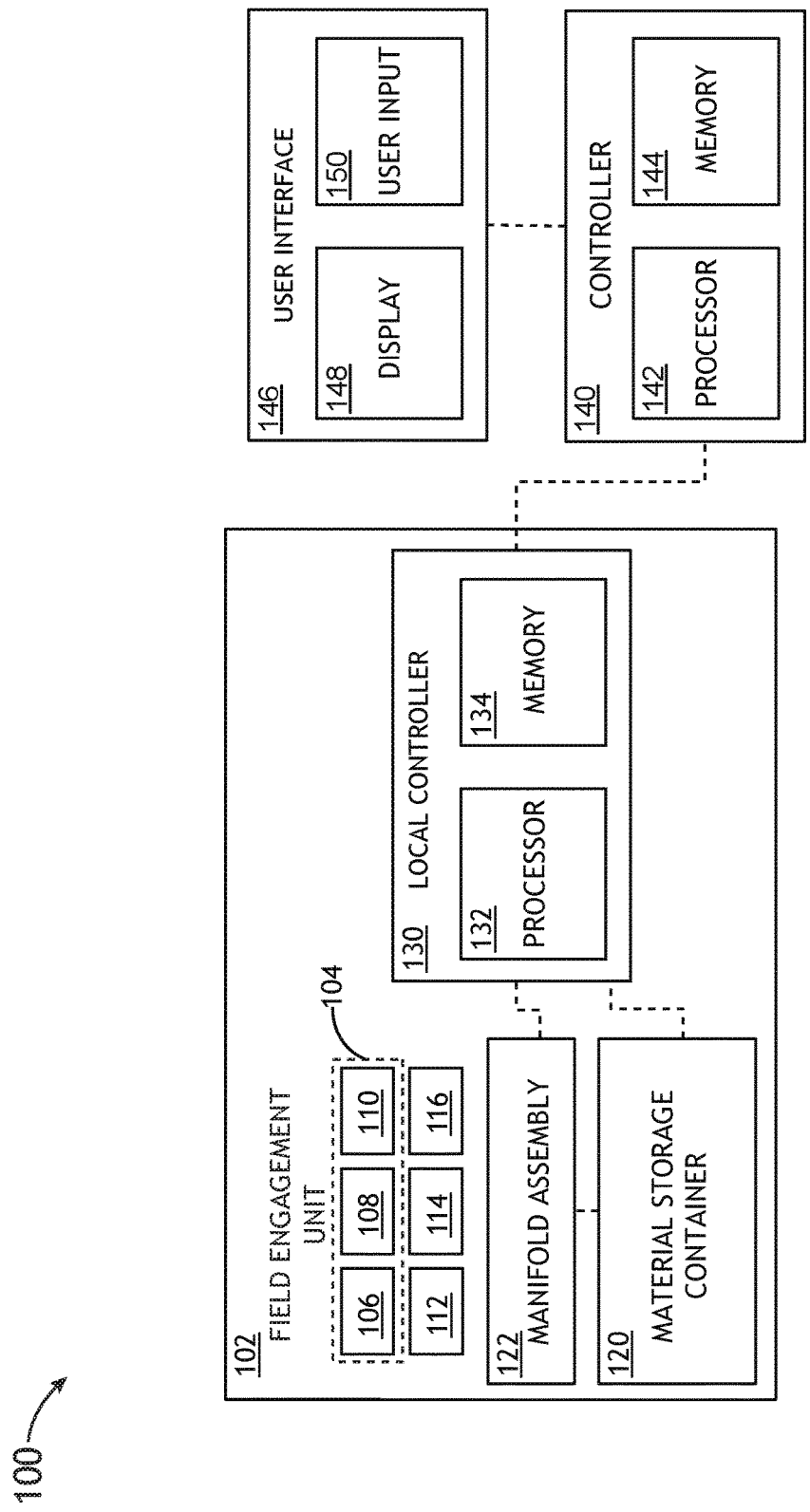
FIG. 1A illustrates a block diagram of a farming system, in accordance with one or more embodiments of the present disclosure.

Reference will now be made in detail to the subject matter disclosed, which is illustrated in the accompanying drawings.

Referring generally to FIGS. 1A through 18B, an integrated autonomous farming system and a related method are described in accordance with one or more embodiments of the present disclosure. For the purposes of the present disclosure, the term "integrated autonomous farming system" may be used interchangeably with the terms "farming system" and "full farming system (FFS)."

Embodiments of the present disclosure are directed to a farming system capable of performing one or more agricultural functions (i.e. farming and/or ranching functions) in an agricultural setting (e.g., crop field, livestock enclosure, etc.). Embodiments of the present disclosure are also directed to the farming system being coupled to a center pivot or capable of omnidirectional functionality. Embodiments of the present disclosure are also directed to a support assembly of the farming system. Embodiments of the present disclosure are directed to a support frame of the support assembly. Embodiments of the present disclosure are also directed to one or more fixed- or adjustable-height leg assemblies of the support assembly. Embodiments of the present disclosure are also directed to one or more wheel- or track-driven propulsion units.

Embodiments of the present disclosure are also directed to one or more work tools on one or more work tool rails coupled to the support assembly, where the work tools perform one or more functions in a field. Embodiments of the present disclosure are also directed to one or more material storage containers. Embodiments of the present disclosure are also directed to one or more transfer components to move product from at least one of the material storage containers and irrigation liquid to the work tools.

Embodiments of the present disclosure are also directed to one or more processes for receiving and transmitting one or more sets of information between the one or more components of the farming system. Embodiments of the present disclosure are also directed to one or more processes for simultaneously actuating the one or more components of the farming system based on one or more sets of information from one or more onboard or in-field sensors. Embodiments of the present disclosure are also directed to transporting the farming system.

Precision farming methods and systems, which may be incorporated into the system 100 of the present disclosure, are described in U.S. Patent Publication No. 2016/0255778, published on Sep. 8, 2016, which is incorporated herein by reference in the entirety. Plant treatment methods and system, which may be incorporated into system 100 of the present disclosure, are described in U.S. Patent Publication No. 2015/0027044, published on Jan. 29, 2015, which is incorporated herein by reference in the entirety.

FIGS. 1A through 1F illustrate a block diagram view of an integrated autonomous farming system 100, in accordance with one or more embodiments of the present disclosure.

In one embodiment, the farming system 100 includes a field engagement unit 102. The field engagement unit 102 is configured for engaging with a selected field or area of agricultural interest in one or more modes. For example, the field engagement unit 102 allows for the farming system 100 to autonomously or semi-autonomously carry out one or more farming functions such as, but not limited to, planting, fertilizing, weeding, applying herbicide, harvesting and the like. By way of another example, the field engagement unit 102 allows for the farming system 100 to autonomously or semi-autonomously carry out one or more ranching functions such as, but not limited to, livestock and poultry management. It is noted that the field engagement unit 102 may include any number and type of components and sub-systems to carry out the various modes of the field engagement unit 102, which are described in detail further herein.

In one embodiment, the field engagement unit 102 includes one or more support assemblies 104. For the purposes of the present disclosure, a single field engagement unit 102 is generally described in the context of a single support assembly 104 for reasons of clarity. It is noted, however, that such a configuration is not a limitation on the scope of the present disclosure as it is noted that the farming system 100 may include any number of field engagement units 102 (e.g., one, two, three, etc.), which each may include any number of support assemblies 104 (e.g., one, two, three, etc.). In another embodiment, a support assembly 104 of the field engagement unit 102 includes one or more support frames 106, one or more work tool rail assemblies 108 and one or more support structures 110.

In another embodiment, the field engagement unit 102 includes one or more propulsion units 112. In another embodiment, the field engagement unit 102 includes one or more work tool assemblies 114. For example, as discussed further herein, the one or more work tool assemblies 114 are coupled to the one or more work tool rail assemblies 108. By way of another example, the one or more work tool assemblies 114 include one or more components, discussed in detail further herein. In another embodiment, the field engagement unit 102 includes one or more power sources/supplies 116.

In another embodiment, the field engagement unit 102 includes one or more material storage containers 120. For example, as discussed further herein, the one or more material storage containers 120 may include one or more material (e.g., liquid or solid) storage containers disposed onboard of the support assembly 104. By way of another example, as discussed further herein, the one or more material storage containers 120 may include one or more material storage containers disposed proximate to, but off-board, the support assembly 104.

In another embodiment, the field engagement unit 102 includes a manifold assembly 122. For example, as discussed further herein, the manifold assembly 122 may be configured to transport material (e.g., liquid, grain, and the like) throughout the various portions of the support assembly 104.

It is noted herein the one or more material storage containers 120 may be detached from the field engagement unit 102. It is further noted herein the manifold assembly may include one or more portions detached from the field engagement unit 102. Therefore, the above description should not be interpreted as a limitation on the present invention but merely an illustration.

For purposes of the present disclosure, the phrase "one or more components of the field engagement unit 102" is interpreted to extend to at least, but is not limited to, the following: a portion of the one or more support assemblies 104; the one or more support frames 106; the one or more work tool rail assemblies 108; the one or more support structures 110; the one or more propulsion units 112; the one or more work tool assemblies 114; the one or more components of the work tool assemblies 114 including, but not limited to, a carrier, a chassis, and a work tool attachment; the one or more power sources 116; the one or more material storage containers 120; and/or the manifold assembly 122.

In another embodiment, the farming system 100 includes one or more local controllers 130. The one or more local controllers 130 are configured to control any of the various functions of the portions of the farming system 100 located locally with respect to the one or more fields or agricultural areas of interest. For example, the one or more local controllers 130 may be programmed to control one or more functions of the field engagement unit 102. For instance, the one or more local controllers 130 may be programmed to transmit one or more sets of information to control one or more functions of any of the one or more components of the field engagement 102. The one or more local controllers 130 may include one or more processors 132 and memory 134. The one or more processors 132 may be configured to execute program instructions stored in memory 134 configured for causing the one or more processors 132 to execute one or more of the various steps described throughout the present disclosure.

In another embodiment, the farming system 100 includes (or is configured to interact with) one or more user controllers 140. The one or more user controllers 140 may be configured to allow a user to remotely access and/or control the field engagement unit 102, the manifold assembly 122 and/or the material storage container 120 (or any other portion of system 100) via the onboard local controller 130. The one or more user controllers 140 may include one or more processors 142 and memory 144. The one or more processors 144 may be configured to execute program instructions stored in memory 144 configured for causing the one or more processors 142 to execute one or more of the various steps described throughout the present disclosure.

In another embodiment, as illustrated in FIGS. 1C through 1F, the one or more work tool assemblies 114 include one or more work tool controllers 160. The one or more work tool controllers 160 are configured to control any of the one or more work tool assemblies 114. For example, the one or more work tool controllers 160 may be programmed to control one or more functions of the work tool assemblies 114. In another embodiment, the one or more work tool controllers 160 may include one or more processors 162 and memory 164. The one or more processors 162 may be configured to execute program instructions stored in memory 164 configured for causing the one or more processors 162 to execute one or more of the various steps described throughout the present disclosure.

The one or more processors of the local controller 130, the user controller 140, and/or the work tool controller 160 may include any one or more processing elements known in the art. In general, the term "processor" may be broadly defined to encompass any device having one or more processing elements, which execute program instructions from a non-transitory memory medium. In one embodiment, the one or more processors 132 and/or 142 may include any microprocessor-type computational device configured to execute software algorithms and/or instructions. The one or more processors 132 and/or 142 may be embodied in, or consist of, a personal computer system, a mobile device (e.g., tablet, smart phone, laptop, etc.), mainframe computer system, workstation, image computer, parallel processor, a networked computer, or any other computational device known in the art. In general, the term "computational device" may be broadly defined to encompass any device having data processing or logic capabilities. It should be recognized that the steps described throughout the present disclosure may be carried out by a single controller or, alternatively, multiple controllers.

The memory 134, 144, and/or 164 may include any storage medium known in the art suitable for storing program instructions executable by the associated one or more processors and/or for storing one or more sets of results, one or more sets of information, and/or one or more databases acquired from the various components and sub-systems of system 100. For example, the memory may include, but is not limited to, random access memory (RAM), read-only memory (ROM), or a persistent store, such as a mass storage device, hard drives, CDROM, DVDROM, tape, erasable programmable read-only memory (EPROM or flash memory), any magnetic, electromagnetic, solid state, infrared, optical, or electrical system, apparatus or device for storing information, or any other type of media suitable for storing electronic data. By way of another example, the one or more sets of information may include, but are not limited to, one or more operational conditions of a component (e.g. on, standby, completing assigned task, off, and the like), one or more operational parameters for the one or more operational conditions of the component (e.g. amount of power consumption, amount of power generation, rotational speed of a motor, rotational capability of a motor, volume of stored material, position coordinates of a component location on the field engagement unit 102, position coordinates of a component location relative to other components on the field engagement unit 102, position coordinates of a component location relative to surrounding environment locations (e.g. a weed or rock in a field) and the like), a distance measurement between two or more components, one or more images from a component (e.g., phenotyping attachment 700); or one or more images from one or more environment sensors.

In one embodiment, as illustrated in FIG. 1A, the one or more user controllers 140 may be configured to communicate with the one or more local controllers 130 of the system 100. For example, the user controller 140 and the local controller 130 may be communicatively coupled via one or more wireline connections (e.g., direct fiber optic cable, direct copper wire, DSL-based interconnection, Cable-based interconnection, T9-based interconnection, and the like etc.). By way of another example, the user controller 140 and the local controller 130 may be communicatively coupled via one or more wireless connections (e.g., GSM, GPRS, CDMA, EV-DO, EDGE, WiMAX, LTE, WiFi, RF, LoRa, Bluetooth, a customized wireless protocol and the like).

Figure 1B:
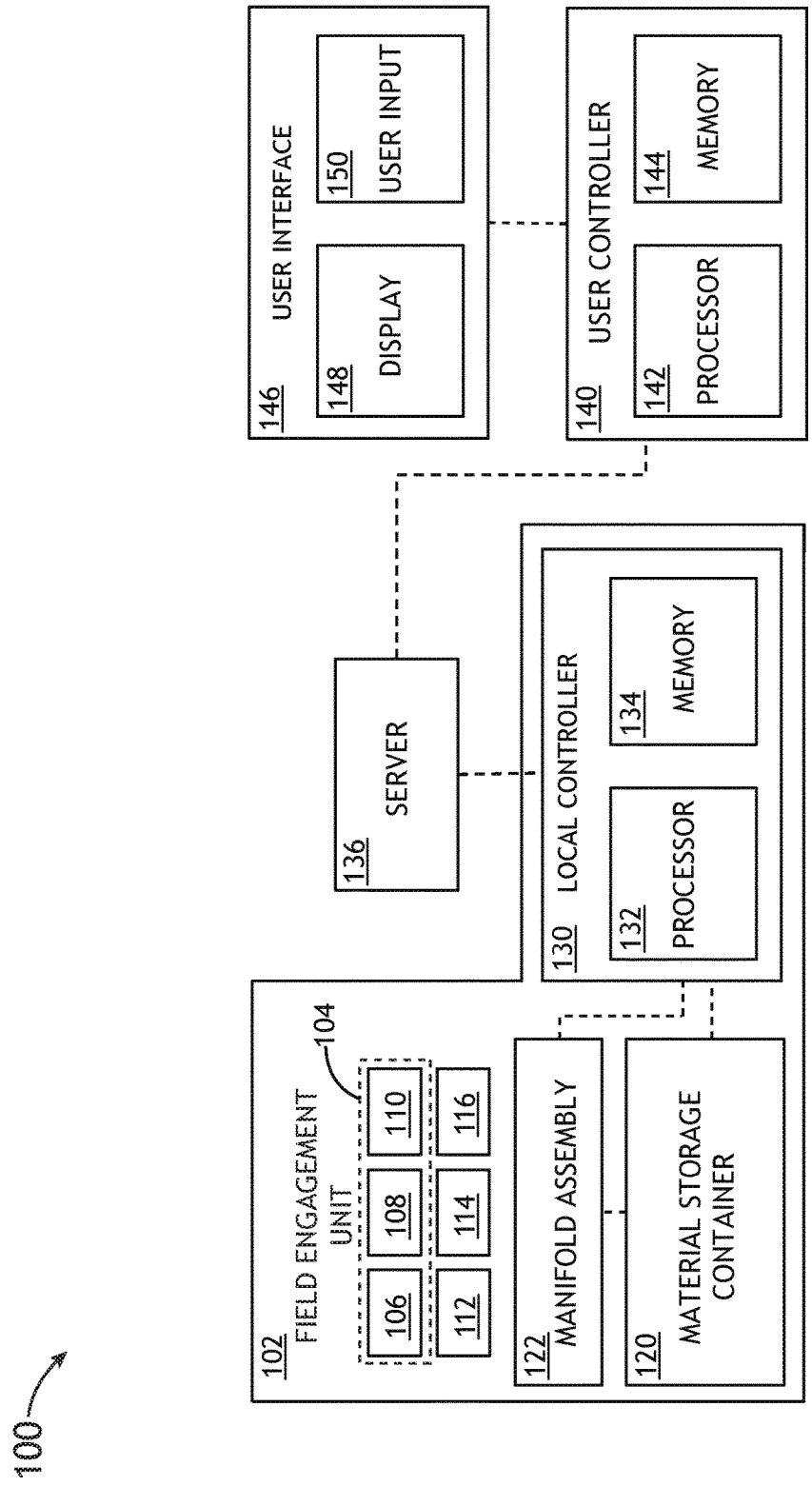
FIG. 1B illustrates a block diagram of a farming system, in accordance with one or more embodiments of the present disclosure.

In one embodiment, as illustrated in FIG. 1B, the one or more local controllers 130 and the one or more user controllers 140 may be configured to indirectly communicate with each other via one or more servers 136. For example, the local controller 130, the user controller 140 and the one or more servers 136 may each include network interface circuitry (not shown) for connecting to a network (not shown). The network interface circuitry of the local controller 130, the user controller 140 and/or the one or more servers 136 may include any network interface circuitry known in the art. For instance, the network interface circuitry may include wireline-based interface devices (e.g., DSL-based interconnection, Cable-based interconnection, T9-based interconnection, and the like). In another instance, the network interface circuitry may include a wireless-based interface device employing GSM, GPRS, CDMA, EV-DO, EDGE, WiMAX, LTE, WiFi protocols, RF, LoRa, and the like.

In another embodiment, as illustrated in FIG. 1C through 1F, the one or more work tool controllers 160 may be configured to directly communicate with the one or more local controllers 130. In another embodiment, the one or more work tools controllers 160, the one or more servers 136, and/or the user controller 140 (not shown) may be configured to indirectly communicate with each other via the local controller 130 via network interface circuitry.

In another embodiment, the one or more servers 136 function as a cloud-based architecture for one or more of storage, analysis, and computation of data received from and transmitted to the one or more local controllers 130, the one or more user controllers 140, and/or the one or more work tool controllers 160.

In another embodiment, the one or more user controllers 140 are communicatively coupled to a user interface 146. For example, the user interface 146 includes a display 148 and/or a user input device 150.

In another embodiment, the display 148 includes any display device known in the art. For example, the display device may include, but is not limited to, a liquid crystal display (LCD). By way of another example, the display device may include, but is not limited to, an organic light-emitting diode (OLED) based display. By way of another example, the display device may include, but is not limited to a CRT display. Those skilled in the art should recognize that a variety of display devices may be suitable for implementation in the present disclosure and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present disclosure.

In one embodiment, the user input device 150 includes any user input device known in the art. For example, user input device 150 may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device or the like. In the case of a touchscreen interface, those skilled in the art should recognize that a large number of touchscreen interfaces may be suitable for implementation in the present disclosure. For instance, the display device 148 may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present disclosure. In another embodiment, the user input device 150 may include, but is not limited to, a bezel mounted interface.

In another embodiment (although not shown), the farming system 100 includes a local user interface communicatively coupled to the local controller 130. For example, the local user interface may include a display and/or a user input device. It is noted herein the display and/or the user input device of the local user interface may include any display and/or user input device known in the art.

Figure 1C:
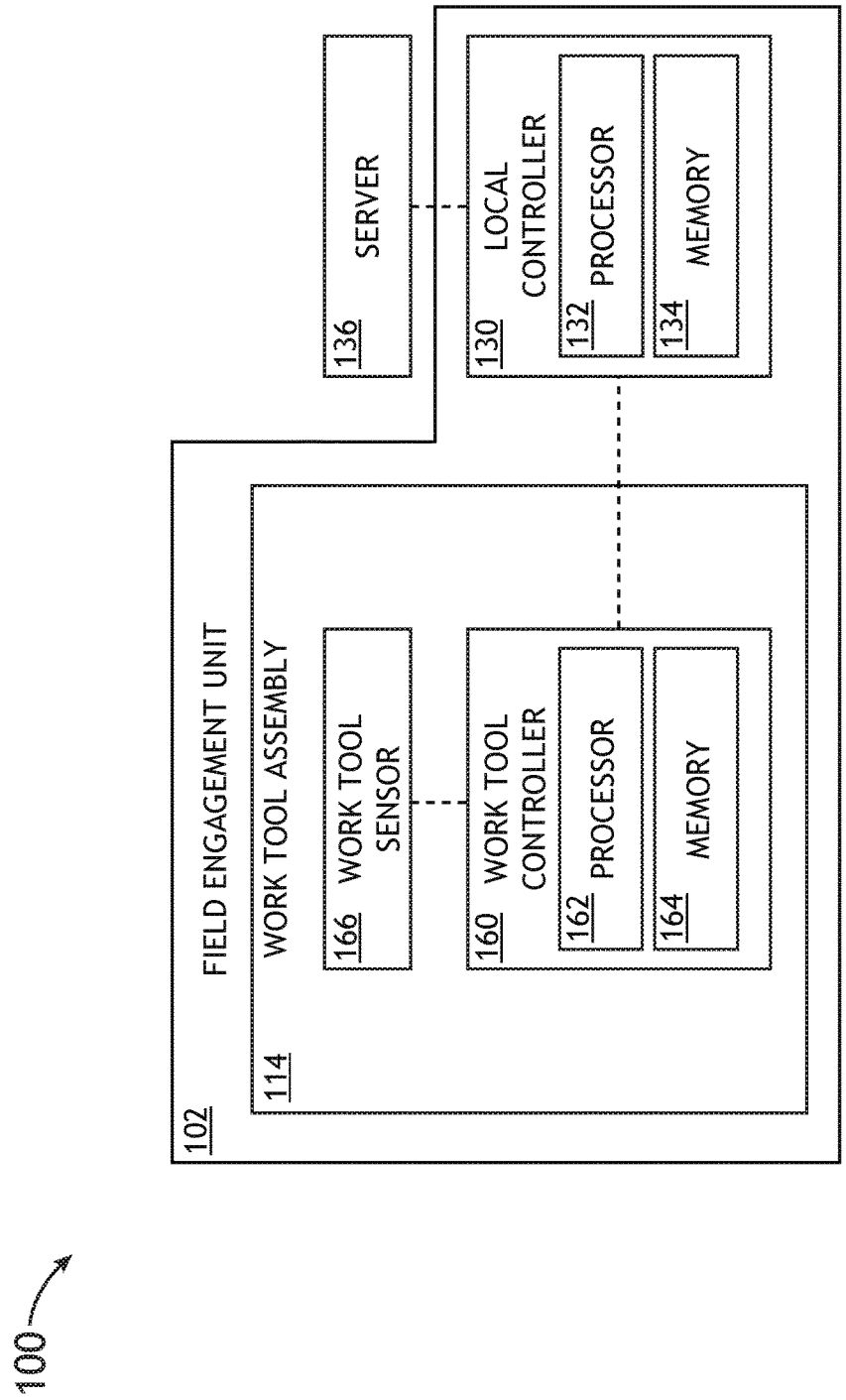
FIG. 1C illustrates a block diagram of a farming system, in accordance with one or more embodiments of the present disclosure.
Figure 1D:
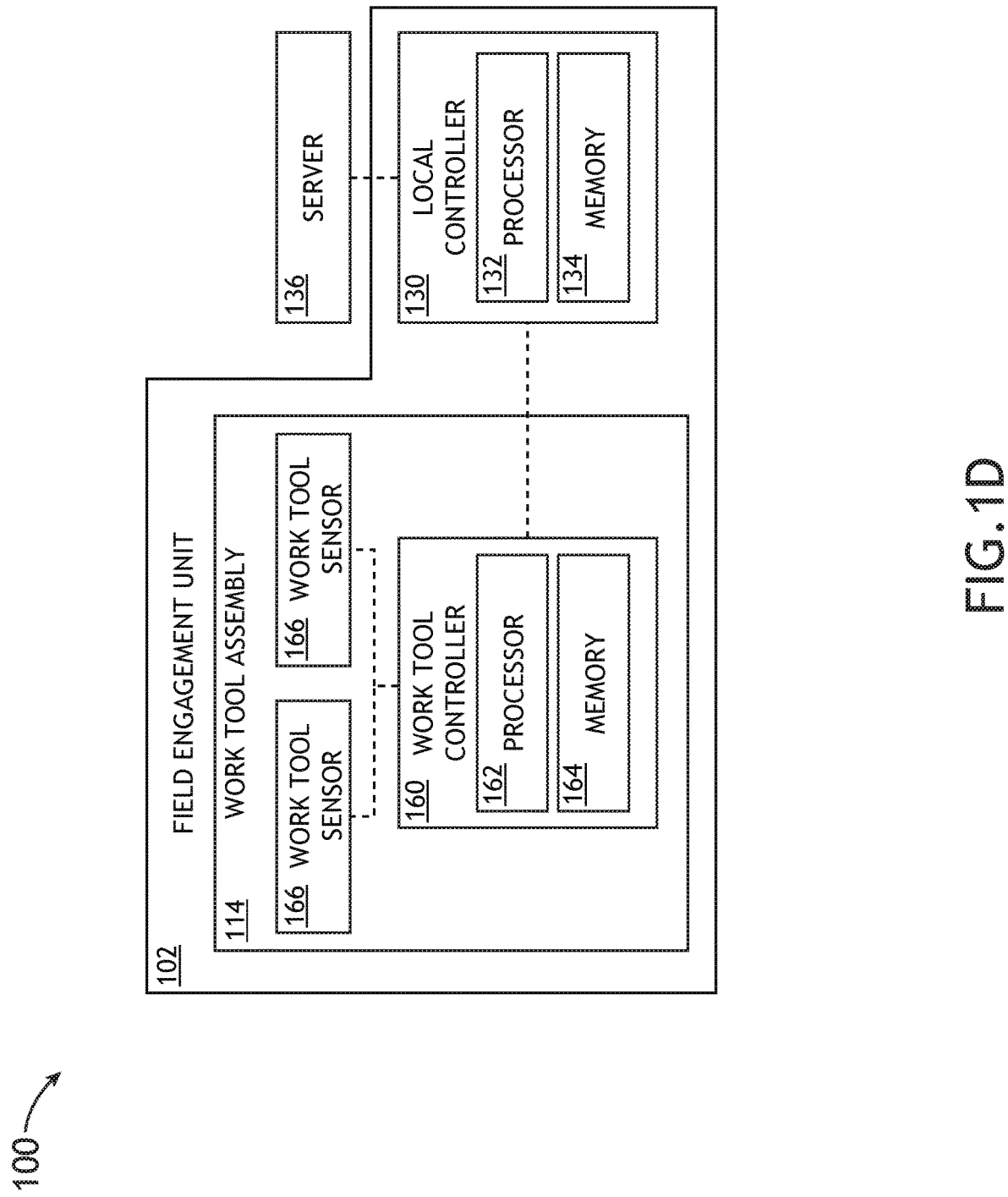
FIG. 1D illustrates a block diagram of a farming system, in accordance with one or more embodiments of the present disclosure.
Figure 1E:
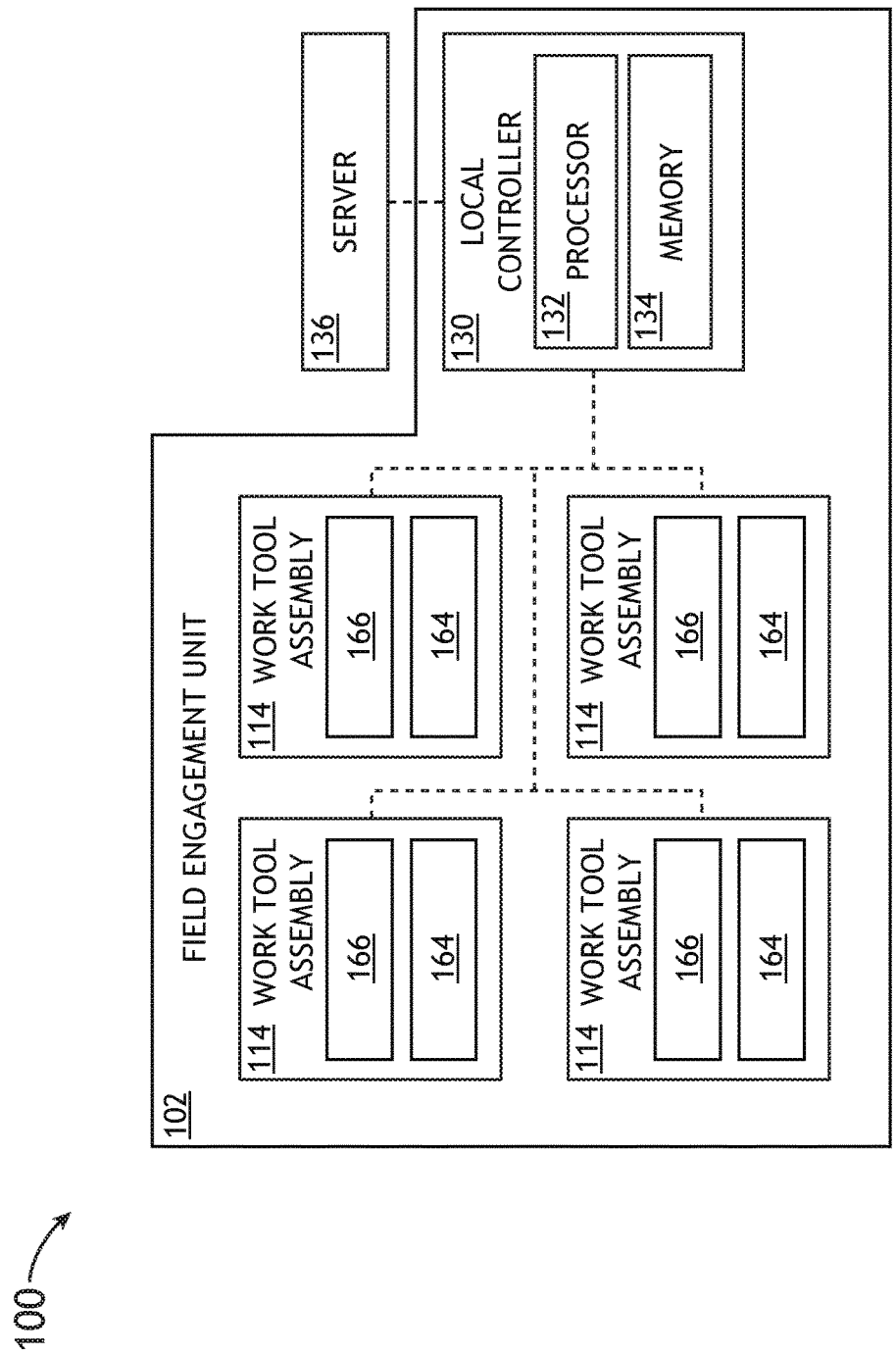
FIG. 1E illustrates a block diagram of a farming system, in accordance with one or more embodiments of the present disclosure.

In one embodiment, as illustrated in FIGS. 1C through 1E, the one or more work tool assemblies 114 include one or more work tool sensors 166. In another embodiment, the one or more work tool sensors 166 are configured to communicate with the one or more work tool controllers 160. In another embodiment, the one or more work tool sensors 166 are configured to communicate indirectly with the local controller 130. In another embodiment, the one or more work tool sensors 166 are further configured to communicate indirectly with the user controller 140 via the one or more servers 136. In another embodiment, the one or more work tool sensors 166 assist in maintaining the height and overall position of the work tool assembly 144 relative to the instructions given.

In another embodiment, the one or more work tool sensors 166 are configured to transmit one or more sets of information to the work tool controller 160. For example, the one or more sets of information may include one or more operational parameters of the work tool assembly 114 such as, but are not limited to, power consumption, rotational speed of actuators, rotational capability of actuators, level of loaded material in a coupled material storage container 120, position coordinates of the work tool assembly 114 location on the field engagement unit 102, position coordinates of the work tool assembly 114 relative to other work tool assemblies 114, position coordinates of the work tool assembly 114 relative to surrounding environment locations (e.g. a weed or rock in a field), distance coordinates to/from other work tool assemblies 114, and the like.

It is noted herein the one or more components of field engagement unit 102 may include one or more sensors. For example, the one or more sensors may include one or more linear encoders, one or more level measurement devices, one or more actuation sensors, and the like.

In another embodiment, as illustrated in FIG. 1F, the local controller 130 is configured to communicate with one or more in-field sensors 170. In one embodiment, the one or more in-field sensors 170 include one or more vision sensors disposed near one or more sets of plants. In another embodiment, the one or more in-field sensors 170 include one or more sensors buried/protruding from the soil, where the one or more sensors measure water content, nutrient contents, nutrient constituents, and similar soil conditions. In another embodiment, the one or more in-field sensors 170 include one or more proximity sensors disposed on one or more obstructions in a field (e.g., buildings, farm implement units, rocks, above-ground pipes, valves, gates, and the like). In another embodiment, the one or more in-field sensors 170 include one or more proximity sensors disposed on buried pipes or cables. In another embodiment, the one or more in-field sensors include one or more health and/or identification sensors disposed on one or more livestock such as, but not limited to, livestock. In another embodiment, the local controller is configured to communicate directly with the in-field sensors 170. In another embodiment, the local controller 130 is configured to communicate indirectly with the in-field sensors 170 via the one or more servers 136. It is noted herein the user controller 140 may be configured to communicate directly or indirectly with the in-field sensors 170. It is further noted herein the work tool controllers 160 may be configured to communicate directly or indirectly with the in-field sensors 170.

Figure 1G:
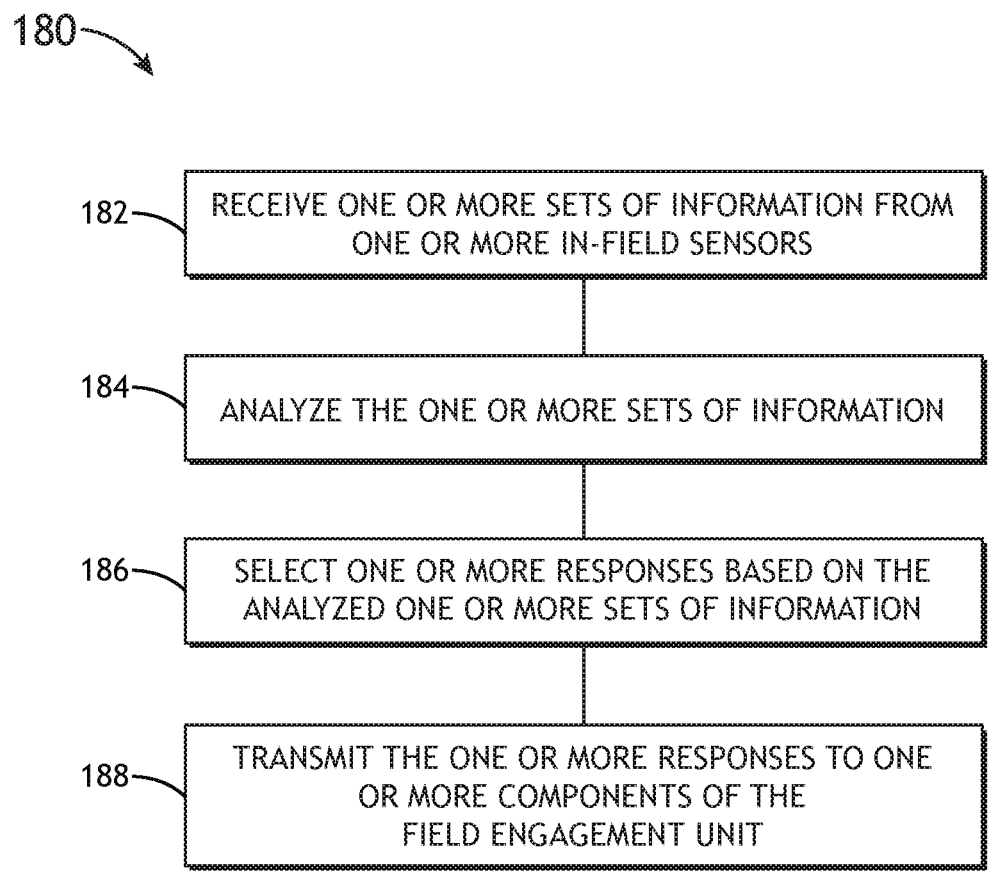
FIG. 1G illustrates a process flow diagram for controlling one or more components of a farming system, in accordance with one or more embodiments of the present disclosure.

FIG. 1G illustrates a process flow diagram depicting a method 180 for controlling one or more components of the field engagement unit 102. It is noted herein that the steps of method 180 may be implemented all or in part by the field engagement unit 102. It is further recognized, however, that the method 180 is not limited to the field engagement unit 102 in that additional or alternative system-level embodiments may carry out all or part of the steps of method 180.

In step 182, one or more sets of information are received by the local controller 130 from the in-field sensors 170. For example, the one or more sets of information may include, but are not limited to, soil condition (e.g., water content or nutrient content) at a sensor-monitored location in a field, position coordinates of a weed observed by a vision system sensor 170, position coordinates of a proximity sensor 170 on an obstruction or a buried/protruding soil sensing device and the field engagement unit 102, and the like.

In step 184, the local controller 130 analyzes the one or more sets of information received from the in-field sensors 170. For example, the one or more sets of information are analyzed to determine an amount the monitored soil location is deficient of water or nutrients, a distance measurement between a weed observed by a vision system sensor 170 and the field engagement unit 102 based on respective position coordinates, a distance measurement between a proximity sensor 170 on an obstruction or buried/protruding soil sensing device and the field engagement unit 102 based on respective position coordinates, and the like.

In step 186, one or more responses to the one or more sets of information are selected by the local controller 130 based on the analyzed one or more sets of information. In one embodiment, the one or more responses includes one or more actions or steps to be taken by one or more components of the field engagement unit 102. For example, the one or more actions may include, but are not limited to, increase water or nutrients at a monitored soil location, remove the identified weed, or avoid the obstruction/follow the buried/protruding soil sensing device. In another embodiment, the local controller 130 selects the one or more responses from one or more potential responses stored in memory 134. In another embodiment, the local controller 130 selects the one or more responses from one or more responses requested from (and received from) the one or more servers 136 or the user controller 140.

In step 188, the one or more responses are transmitted to one or more components of the field engagement unit 102. For example, the one or more responses may adjust the movement of the field engagement unit 102, and are transmitted to one or more components including, but not limited to, the support structures 110 (e.g., raise or lower the support assembly 104), the propulsion unit 112 (e.g., increase or decrease speed), or the steering assembly 500 (e.g., rotate the propulsion unit 112). By way of another example, the one or more responses re-position and/or engage one or more work tool assemblies 114 (e.g., position work tool assembly 114 with nutrient applicator attachment 900 on the work tool rail assembly 108 based on the analyzed position coordinates of a soil spot requiring nutrients and apply the nutrient to the soil spot, position work tool assembly 114 with weeding attachment 800 on the work tool rail assembly 108 based on the analyzed position coordinates of a weed and actuate the weeding attachment 800 to remove the weed, and the like).

In one example, the in-field sensors 170 first measure the nutrient content of monitored soil location to be low. The in-field sensors then transmit this information to the local controller 130 or to a controller in the cloud. The local controller 130 then analyzes the information to calculate the amount the soil is nutrient-deficient, and determines that additional nutrients should be applied. The local controller 130 then transmits the actions of "re-position" to a set of coordinates on the work tool rail assembly 108 to the work tool assembly 114 including the nutrient applicator attachment 900 and a "lower" command, an "apply X volume of nutrients", and a "raise" command to the nutrient applicator attachment 900.

It is noted herein the one or more sets of information may alternatively or additionally be received by the one or more servers 136 or the user controller 140 from the in-field sensors 170. In this case, the servers 136 or the user controller 140 analyze the one or more sets of information. The servers 136 or the user controller 140 then determines one or more responses including one or more actions or steps to be taken by one or more components of the field engagement unit 102. The servers 136 or the user controller 140 then transmit the one or more responses to the local controller 130, which subsequently transmits the one or more responses to the one or more components of the field engagement unit 102.

Figure 1H:
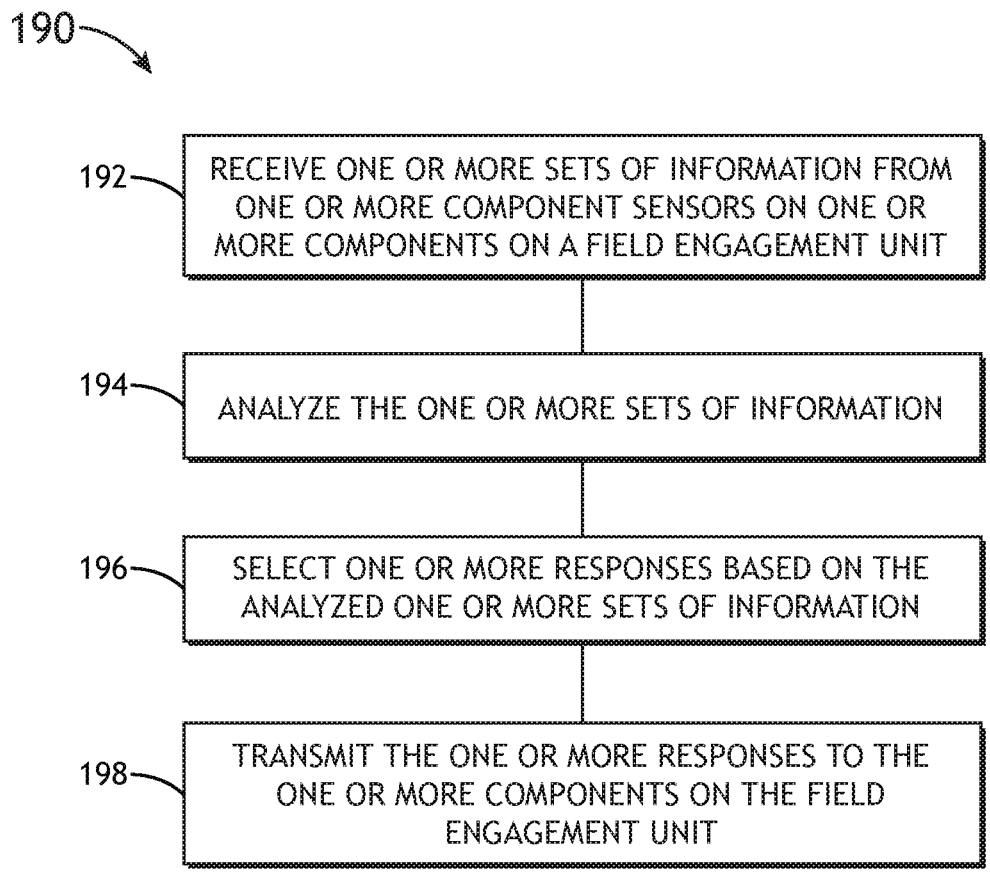
FIG. 1H illustrates a process flow diagram for controlling one or more components of a farming system, in accordance with one or more embodiments of the present disclosure.
Figure 1:
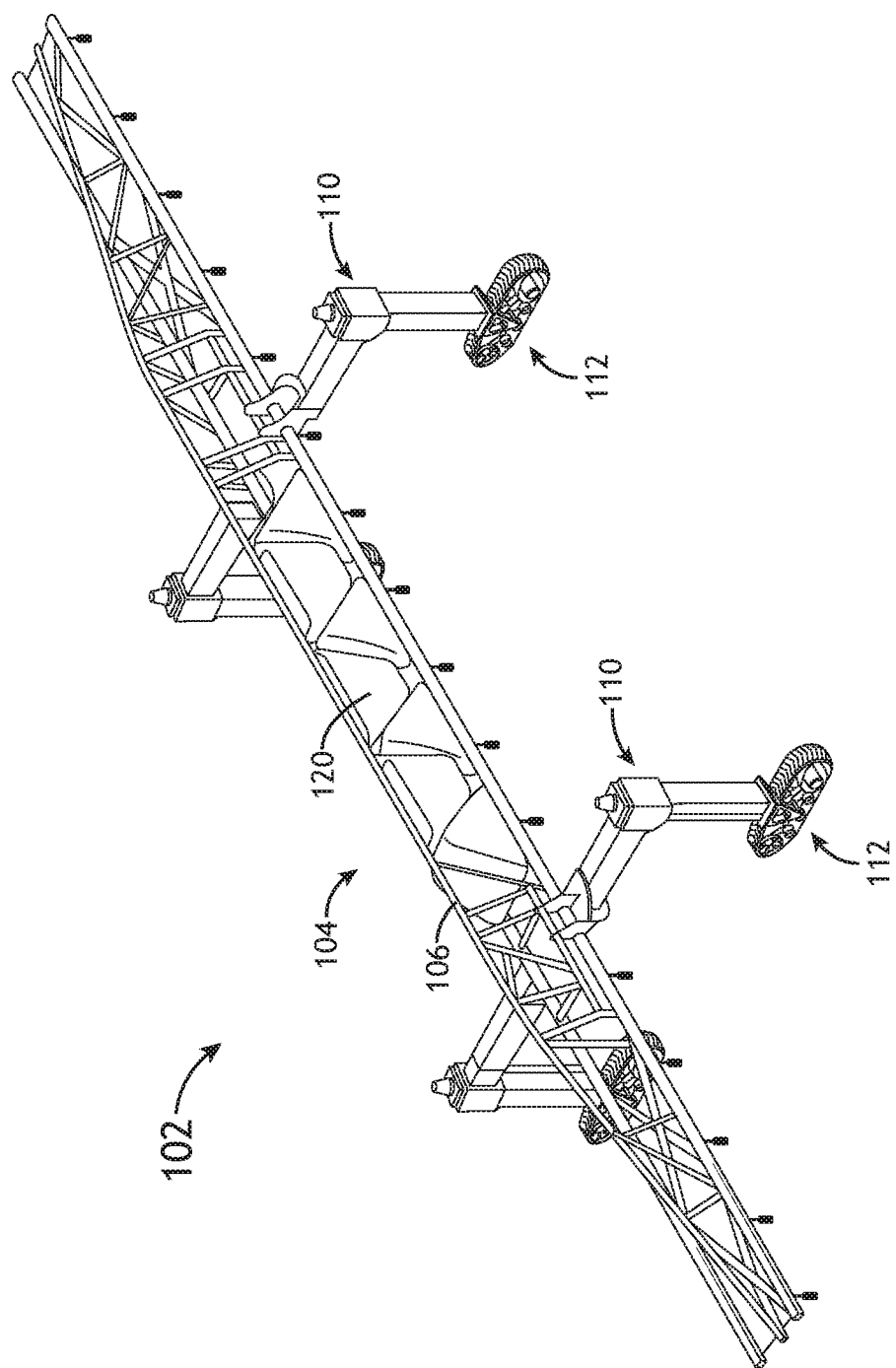
FIG. 1F illustrates a block diagram of a farming system, in accordance with one or more embodiments of the present disclosure.
FIG. 1I illustrates a field engagement unit of a farming system, in accordance with one or more embodiments of the present disclosure.
FIG. 1J illustrates a field engagement unit of a farming system, in accordance with one or more embodiments of the present disclosure.
FIG. 1K illustrates a field engagement unit of a farming system, in accordance with one or more embodiments of the present disclosure.

FIG. 1H illustrates a process flow diagram depicting a method 190 for controlling one or more components of the field engagement units 102. It is noted herein that the steps of method 190 may be implemented all or in part by the field engagement unit 102. It is further recognized, however, that the method 190 is not limited to the field engagement unit 100 in that additional or alternative system-level embodiments may carry out all or part of the steps of method 190.

In step 192, one or more sets of information are received by the local controller 130 from one or more component sensors on the one or more components of the field engagement unit 102. For example, the one or more sets of information may include, but are not limited to, rotational speed of a propulsion unit 102, position coordinates of a work tool assembly 114, amount of material volume in a material storage container on a work tool assembly 114, and the like.

In step 194, the local controller 130 analyzes the one or more sets of information received from the one or more component sensors. For example, the one or more sets of information are analyzed to determine a distance measurement between a current position and intended position of a work tool assembly 114 on the work tool rail assembly 108, a level that the storage container 120 on the work tool assembly 114 is deficient of product, and the like.

In step 196, one or more responses to the one or more sets of information are selected by the local controller 130 based on the analyzed one or more sets of information. In one embodiment, the one or more responses include one or more actions or steps to be taken by one or more components of the field engagement unit 102. For example, the one or more actions may include, but are not limited to, re-position the work tool assembly 114, fill the material storage container 120 on the work tool assembly 114, and the like. In another embodiment, the local controller 130 selects the one or more responses from one or more potential responses stored in memory 134. In another embodiment, the local controller 130 selects the one or more responses from one or more responses requested from (and received from) the one or more servers 136 or the user controller 140.

In step 198, the one or more responses are transmitted to one or more components of the field engagement unit 102. For example, the one or more responses may adjust the movement of the field engagement unit 102, and are transmitted to one or more components including, but not limited to, the support structures 110 (e.g., raise or lower the support assembly 104), the propulsion unit 112 (e.g., increase or decrease speed), or the steering assembly 500 (e.g., rotate the propulsion unit 112). By way of another example, the one or more responses re-position and/or engage one or more work tool assemblies 114 (e.g., re-position work tool assembly 114 on the work tool rail assembly 108, position the work tool assembly 114 with the material storage container 120 under the manifold assembly 122, and the like).

In one example, position sensors 166 on the work tool assembly 114 map the current location of the assembly 114 on the work tool rail assembly 108. The position sensors 166 then transmit this information to the local controller 130. The local controller 130 then analyzes the information to determine the distance the work tool assembly 114 needs to be re-positioned. The local controller 130 then transmits the action of "re-position to X set of coordinates" on the work tool rail assembly 108 to the work tool assembly 114.

It is noted herein the one or more sets of information may alternatively or additionally be received by the one or more servers 136 or the user controller 140 from the in-field sensors 170. In this case, the servers 136 or the user controller 140 analyze the one or more sets of information. The servers 136 or the user controller 140 then determines one or more responses including one or more actions or steps to be taken by one or more components of the field engagement unit 102. The servers 136 or the user controller 140 then transmit the one or more responses to the local controller 130, which subsequently transmits the one or more responses to the one or more components of the field engagement unit 102.

In one embodiment, the one or more sets of information are received by servers 136 and/or controller 140 from a component of the field engagement unit 102.

It is noted herein that one or more sets of information may be separately or simultaneously received and/or transmitted between the one or more local controllers 130, the one or more servers 136 and/or the user controller 140.

Referring again to FIGS. 1A-1F, the system 100 may utilize one or more image detectors or cameras to acquire imagery data of crops, in accordance with one or more embodiments of the present disclosure. In one embodiment, the system 100 includes one or more cameras communicatively coupled to a local controller 130, a user controller 140, a server 136 and/or a work tool controller 160. For example, the one or more cameras may include one or more cameras disposed on a portion of one or more field engagement units 102, such as, but not limited to, a work tool or work tool attachment. By way of another example, the one or more cameras may include one or more cameras positioned in the field of interest and configured to transmit imagery data (e.g., transmit via wireless link) to a local controller 130, a user controller 140, a server 136 and/or a work tool controller 160. By way of another example, the one or more cameras may include one or more cameras contained in a user device (e.g., smartphone, tablet, laptop, PDA wirelessly enabled camera, customized image acquisition device, and the like) and is configured to transmit imagery data (e.g., transmit via wireless link) to a local controller 130, a user controller 140, a server 136 and/or a work tool controller 160. In this example, a user may manually acquire image data of one or more crop plants and, then, the system 100 may aggregate the imagery data from the user devices.

In one embodiment, the local controller 130, user controller 140, server 136 and/or work tool controller 160 may execute program instructions to assess the growth of one or more plants or plant parts of a given crop in the field of interest. In this embodiment, the system 100 may take the place of an agronomist, farmer, or crop scout, which would have to enter a field to manually count assess a plant/crop (e.g., counting the number of kernels on a corn ear, in the case of corn). In this case of corn, the system 100 may acquire imagery data of the corn and then program instructions running on the local controller 130, user controller 140, server 136 and/or work tool controller 160 may assess the maturity and/or health of the corn. In the case where the user device acquires imagery data, a user may break an ear of corn in two and the user may acquire an additional image of the cross-section of the ear of corn, which may further aid in assessing the maturity and/or health of the individual corn ear and the overall field yield.

Each image may be captured so as to include an item of known relative size. The item of relative size allows the mobile smart device to automatically calculate the size of the ear and automatically calculate the number of kernels using object recognition software. It is conceived that such a methodology will provide a quicker and more accurate method of calculating crop yield.

In another embodiment, at the time of capture, each image is tagged with a GPS (Global Positioning System) position and/or time stamp. In this manner, as each picture is uploaded to a given server or controller (e.g., via a network), each image maintains global reference to where the image was taken. This feature is conceived to allow for traceability of the image in comparison to other images taken in other fields for mapping purposes (e.g., Google Maps). It is also conceived that this functionality may be used as an audit tool, to ensure that adequate and statistically-significant field sampling locations are being utilized by the crop scouts who are typically the providers of such information. It can also be used to prove that the crop scout was actually present in that field at the time shown.

In some embodiments, the images may be taken of crops at different growth stages. The images may then be measured using some common reference item (e.g., ruler or object of known length). In the case of corn, the ear may be shucked to expose the kernels and to obtain an accurate kernel count. The same may be accomplished by breaking the ear in half to measure the diameter. In another embodiment, the image processing algorithm executed by a server and/or controller of the present disclosure may deduce crop kernel or crop fruit count and/or size to eliminate the need for the physical size reference object. In additional embodiments, the system may capture images of whole plants such as corn, wheat, soybeans, sorghum and the like in order to predict crop yield. This embodiment may eliminate the need for a human to be in the field at the time of image capture. The captured image(s) could be used for the same purpose of predictive yield (e.g., number of ears, berries, fruits, etc.) for specialized crops such as, but not limited to, apples, grapes, tomatoes, pumpkins, grapefruit, blueberries, raspberries, etc. The captured images may be used to i) predict optimal harvest times using size and color of the plant/fruit; ii) utilize weather forecasting to recommend harvest times; and/or iii) Associate size of kernel/fruit with storage requirements after harvest.

In additional embodiments, one or more hyperspectral cameras may be used to obtain predictive yield information. By utilizing hyperspectral or other ranging technology, which allows the filtering of specific material densities, embodiments of the present disclosure may "see" the crop through the unharvested crop canopy. In some embodiments, using object recognition algorithms, yield is calculated proactively throughout the crop growing season for the same purposes as listed previously herein for a variety of crops (e.g. soybean seeds through the soybean bush, corn kernels through the ear and stalk, apples through the woody tree constituents, tomatoes through the stem and plant material, etc.).

This image capture methodology eliminates the need for a human being present to perform the crop scouting yield prediction step. This data may be used to proactively affect crop yields during the season when inputs such as fertilizer, herbicides to control weeds, and insecticides to control pests could actually still affect plant yields for the given season.

It is conceived that due to the spatial nature of the image processing, automatic fertilizer, irrigation, herbicide, and insecticide variable rate maps could be generated from the processed images.

Such predictive hyperspectral or other ranging technology could be mounted to an aerial drone, plane, attached to a portion of the field engagement unit 102 (e.g., work tool) or mounted to another piece of agricultural equipment for the purpose of capturing images throughout the crop growing season.

In another embodiment, the yield prediction calculation of the present disclosure includes the collection of row spacing and plant population which can also be obtained utilizing an image capture methodology as follows: i) image capturing at least 2 crop rows (including an object of known size in order to obtain size-relativity) with a mobile device and uploading to the information to a server and/or controller; ii) the program instructions executed by the server and/or controller would execute a prediction algorithm to predict crop yields using this information; and/or iii) plant type, soil type, current and past weather data, etc. may also be uploaded to the server and/or controller along with the images in order to form a more complete data set. For accuracy purposes, an audit entity might be employed that randomly checks images to ensure the algorithm correctly and consistently processes the images. Such software would ensure accurate yield prediction as well as provide the ability to predict optimal harvest time.

It is further noted that any image recognition procedure known in the art may be used in conjunction with system 100. For example, real-time plant selection is described in U.S. Pat. No. 9,064,173 to Redden, issued on Jun. 23, 2015; and U.S. Pat. No. 9,030,549 to Redden, issued on May 12, 2015, which are incorporated by reference in their entirety.

Figure 1J:
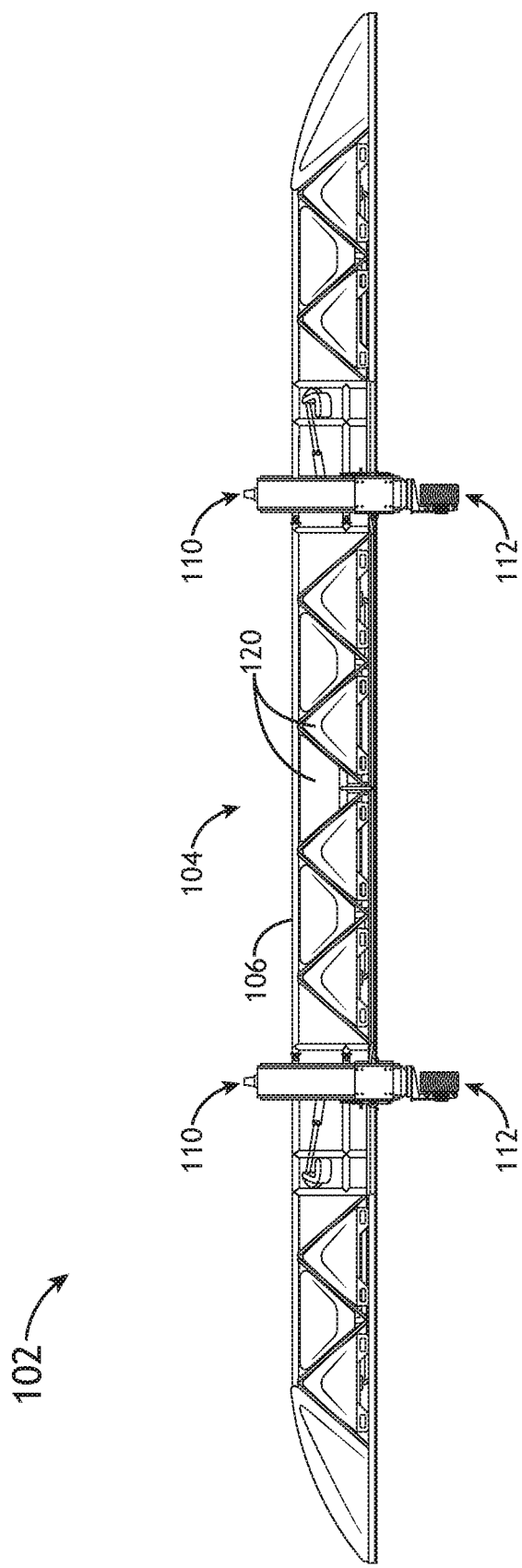
Figure 1K:
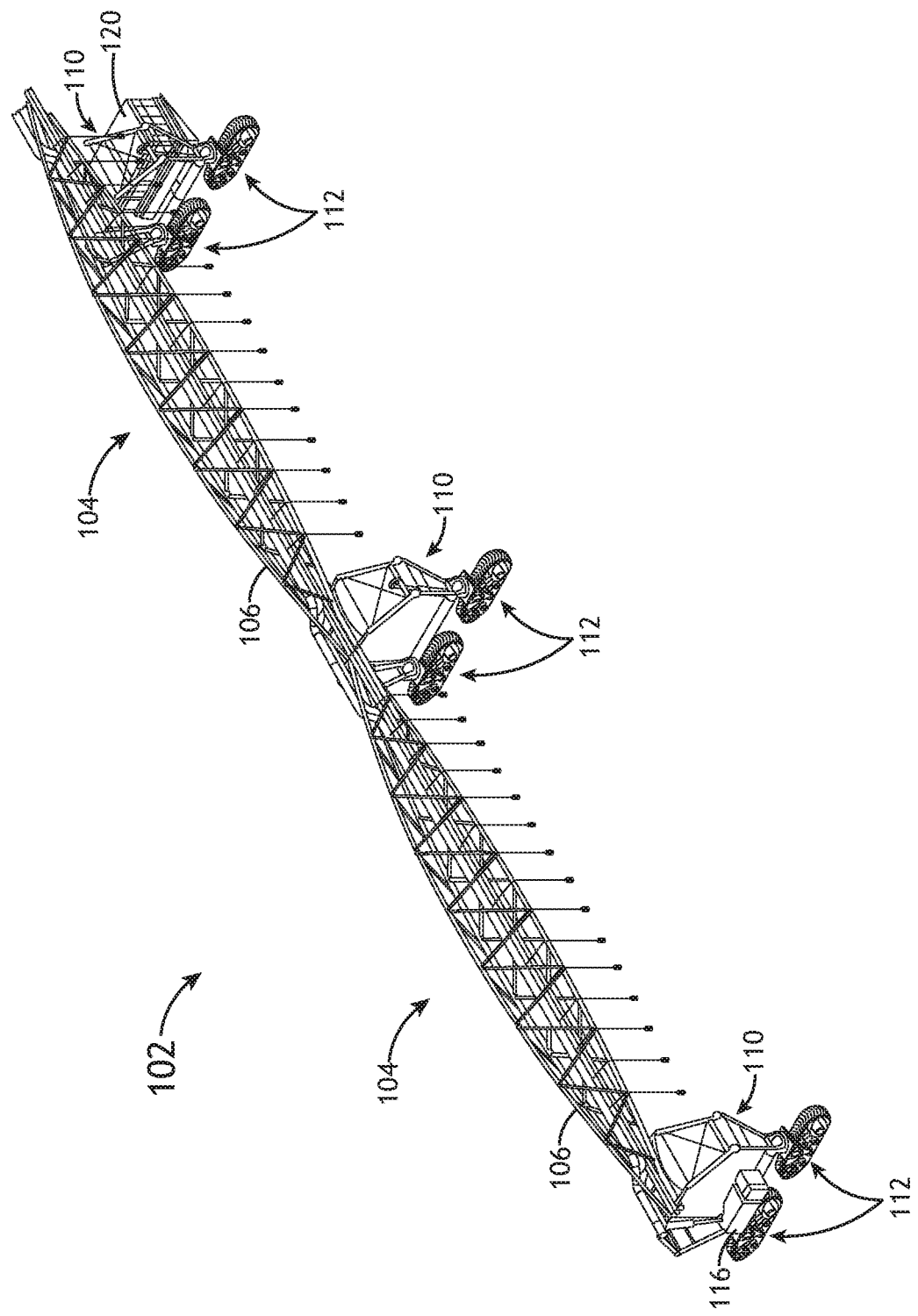

FIGS. 1I and 1K illustrate an isometric view of a field engagement unit 102 of the farming system 100, in accordance with one or more embodiments of the present disclosure. As shown, the field engagement unit 102 includes support assembly 104, which includes the support frame 106. The propulsion units 112 are configured to propel the field engagement unit 102 along any direction and are coupled to the field engagement unit 102 via the support structures 110. In this embodiment, the material storage containers 120 are stored onboard the field engagement unit 102. For example, the material storage containers 120 may include wedge-shaped containers that are sized and shaped to be reversibly fitted within the support frame 106 of the support assembly 104 of the field engagement unit 102. By way of another example, the material storage containers 120 may include containers of any shape and size known in the art.

FIG. 1J illustrates a side view of the field engagement unit 102 of the farming system 100, in accordance with one or more embodiments of the present disclosure. In this example, it is noted that material storage containers 120 may additionally be placed along the center portion of the support frame 106 or coupled to the end portions of the support frame 106. It is noted the material storage containers 120 are discussed in detail further herein.

While much of the present disclosure focuses on the description of the field engagement unit 102 of farming system 100 in the context of a single support assembly (as illustrated in FIGS. 1C and 1D), such a configuration should not be interpreted as a limitation on the scope of the present disclosure. Rather, a single field engagement unit 102 may include any number of support assemblies 104 and support frames 106. For example, as illustrated in FIG. 1K, the field engagement unit 102 may include, but is not limited to, two support assemblies 104 and two corresponding support frames 106 (with each support assembly 104 including a single support frame 106).

FIGS. 2A-3F illustrate the support assembly 104 of a field engagement unit 102 of system 100, in accordance with one or more embodiments of the present disclosure. It is noted herein that the various system embodiments, components and architecture described previously herein should be interpreted to extend to the support assembly 104 of FIGS. 2A-2F.

Figure 2A:
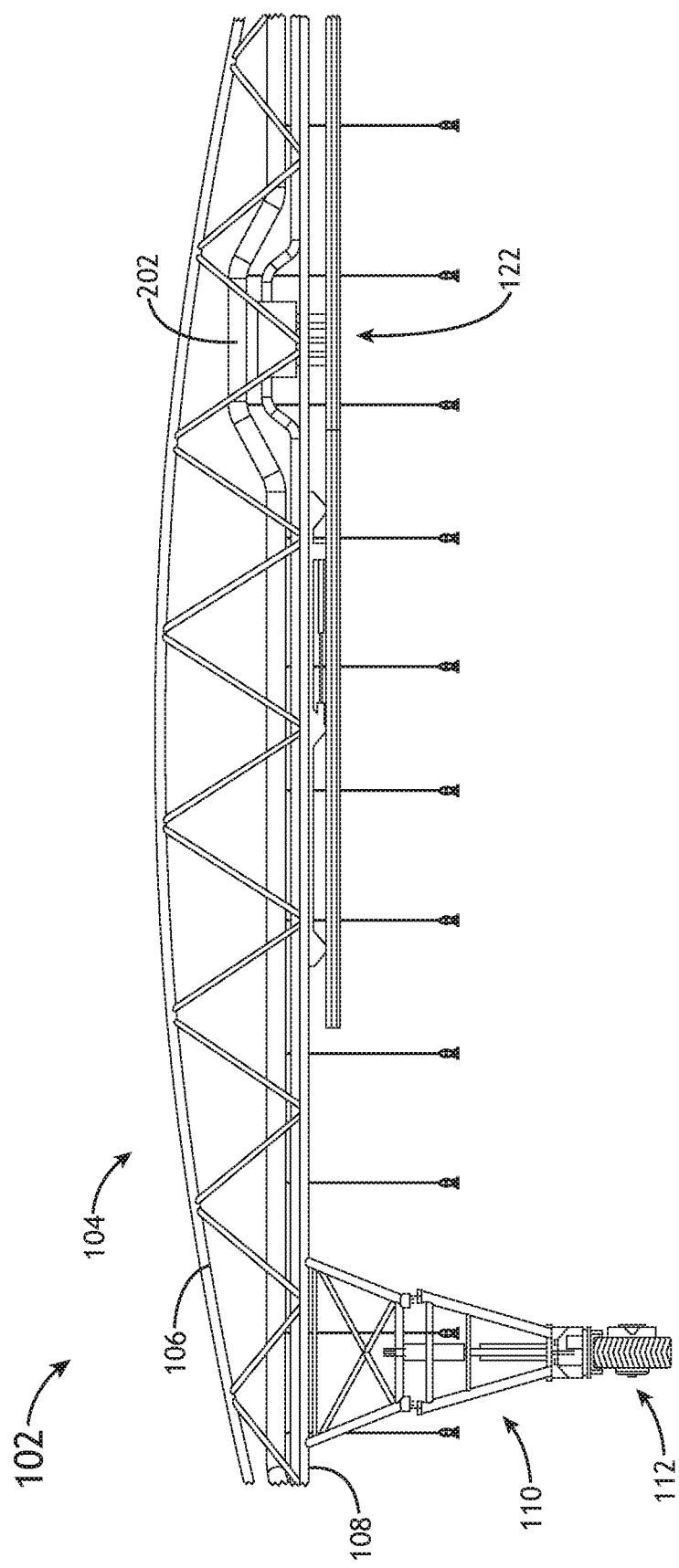
FIG. 2A illustrates a field engagement unit of a farming system, in accordance with one or more embodiments of the present disclosure.

FIG. 2A illustrates a schematic view of the support assembly 104 including a support frame 106, in accordance with one or more embodiments of the present disclosure. For example, the support frame 106 may include, but is not limited to, one or more trusses (e.g., a bow truss). The truss may take on any shape known in the art. For example, the truss may have, but is not limited to, a triangular prism shape (i.e., the truss has a triangle cross-section when viewed from the end of the support frame 106. By way of another example, the truss may have, but is not limited to, a rectangular prism shape (e.g., the truss has a square or rectangular cross-section when viewed from the end of the support frame 106). It is noted the truss may have up to an N-sided cross-section (e.g., the truss has an N-side cross-section when viewed from the end of the support frame 106). By way of another example, the support frame 106 may be constructed from one or more curved structures. For instance, at least a portion of the one or more curved structures (i.e., parabolic structures or bow structures) may be arranged in a substantially vertical direction (i.e., 90 degrees from ground). Additionally, at least a portion of the one or more parabolic structures may be arranged in a substantially horizontal direction (e.g. 0 degrees from ground). Additionally, at least a portion of the one or more parabolic structures may be arranged at a selected angle from the ground (e.g., angle ranging from 0.1-90 degrees from ground). It is noted that constructing the support frame 106 with one or more parabolic structures in this fashion will provide additional support for one or more work tool rail assemblies 108, which are described in additional detail further herein.

In another embodiment, as illustrated in FIG. 2A, the support assembly 104 includes one or more support structures 110 coupled to and configured to support the support frame 106. For example, the support frame 106 may be coupled to the top portion of the one or more support structures 110. In this regard, as the support assembly 104 traverses a given crop, the support frame 106 will travel above the height of the crop. In another embodiment, the one or more support structures are configured to adjust the elevation of the support frame 106. The one or more support structures 110 are described in detail further herein.

One or more components of the support assembly 104 may be formed from any lightweight material known in the art. For example, one or more components of the support assembly 104 may be constructed from, but are not limited to, carbon fiber, a carbon fiber-reinforced plastic, or graphene. By way of another, one or more components of the support assembly 104 may be constructed from, but are not limited to, one or more plastic and/or composite materials.

By way of another example, one or more components of the support assembly 104 may be constructed from, but are not limited to, one or more lightweight metals (e.g., aluminum). It is noted that the construction of the support assembly 104 is not limited to one or more lightweight materials. For example, one or more components of the support assembly 104 may be formed from one or more non-lightweight materials, such as, but not limited to, steel, iron, and the like.

Figure 2B:
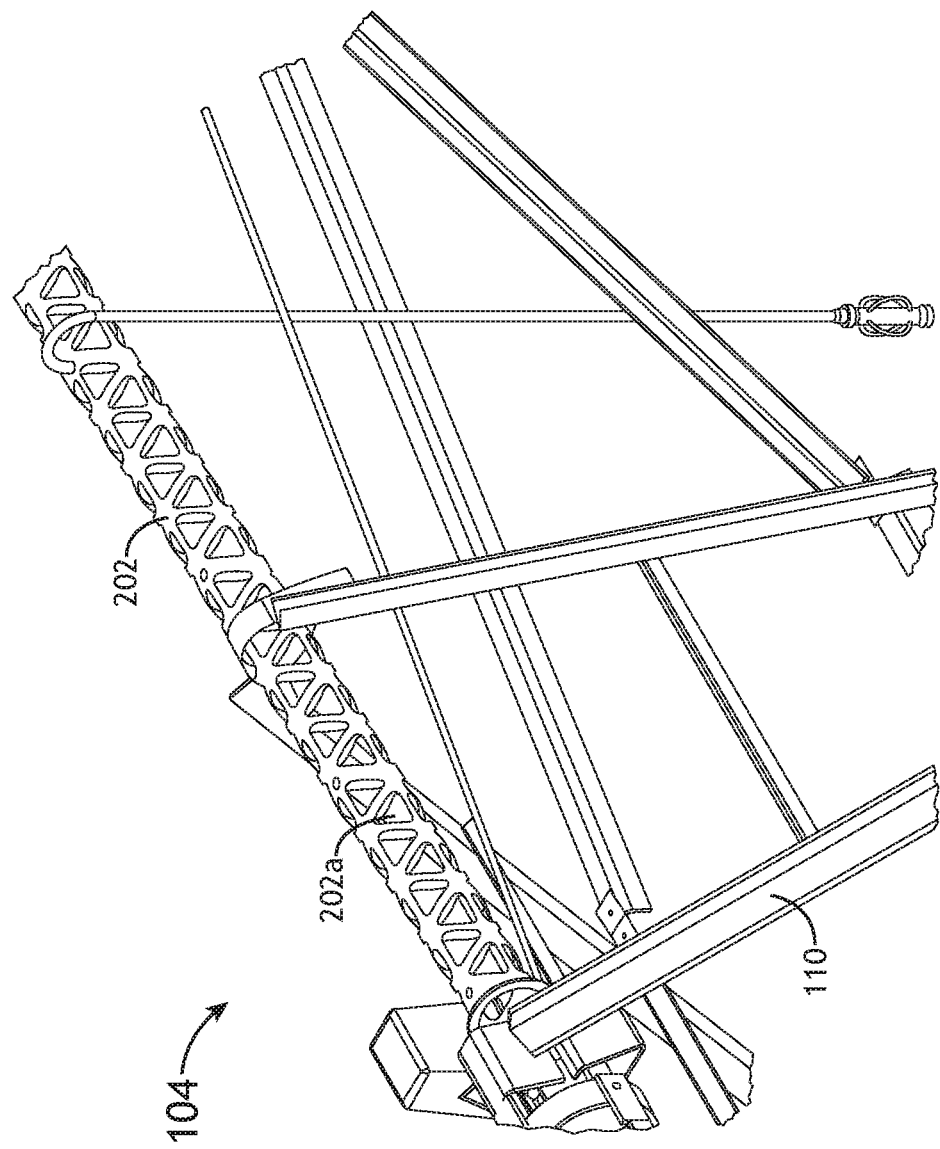
FIG. 2B illustrates a support assembly of a field engagement unit, in accordance with one or more embodiments of the present disclosure.

In another embodiment, the support assembly 104 includes one or more main tubes 202. In one embodiment, the main tube 202 is configured to carry a volume of a liquid, such as, but not limited to, water. For example, the main tube 202 may carry irrigation water. By way of another example, the main tube 202 may carry agricultural material including, but not limited to, fertilizer, insecticide, seed, harvested product, and the like. In another embodiment, the main tube 202 is manufactured with a reduced weight profile. For example, as illustrated in FIG. 2B, the tube 202 may be a tube (e.g., metal tube) with one or more cut-outs 202a for reducing the weight of the tube 202. Additionally, and/or alternatively, the tube may also include a plastic or other non-metallic layer, where the plastic layer is configured to line the interior of the tube, line the exterior of the tube and/or fill the one or more cut-outs 202a. In this example, the main tube 202 may be manufactured such that it has a weight that is approximately 20-50% (e.g., 35%) lighter than conventional irrigation water tubes constructed from a solid material (e.g., solid metal).

Figure 2D:
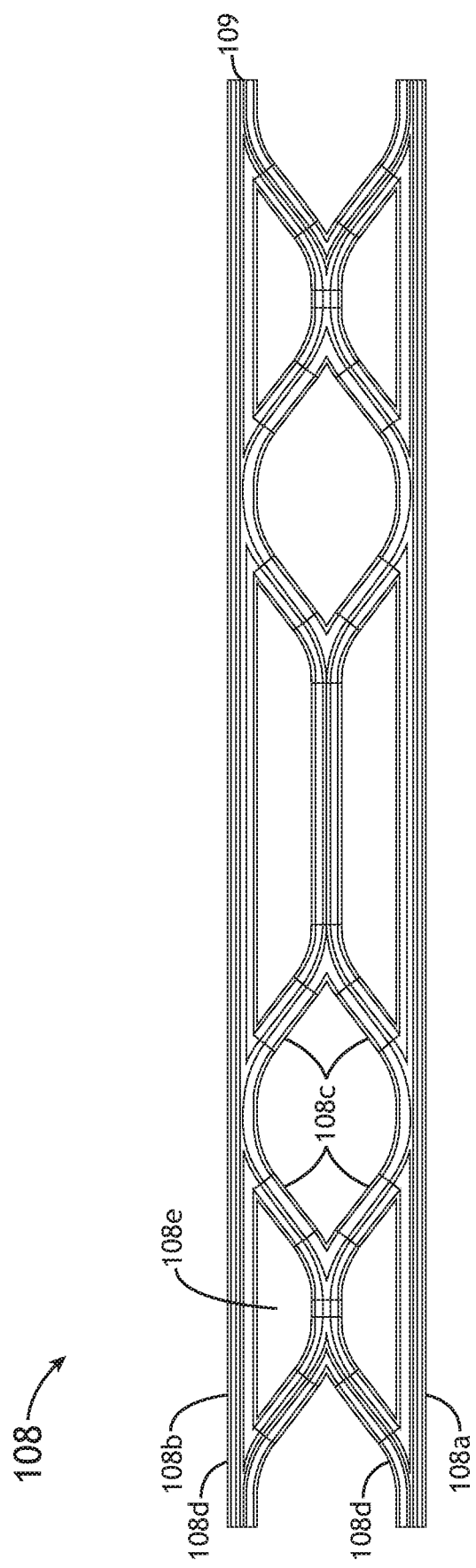
FIG. 2D illustrates a work tool rail assembly of a field engagement, in accordance with one or more embodiments of the present disclosure.
Figure 2E:
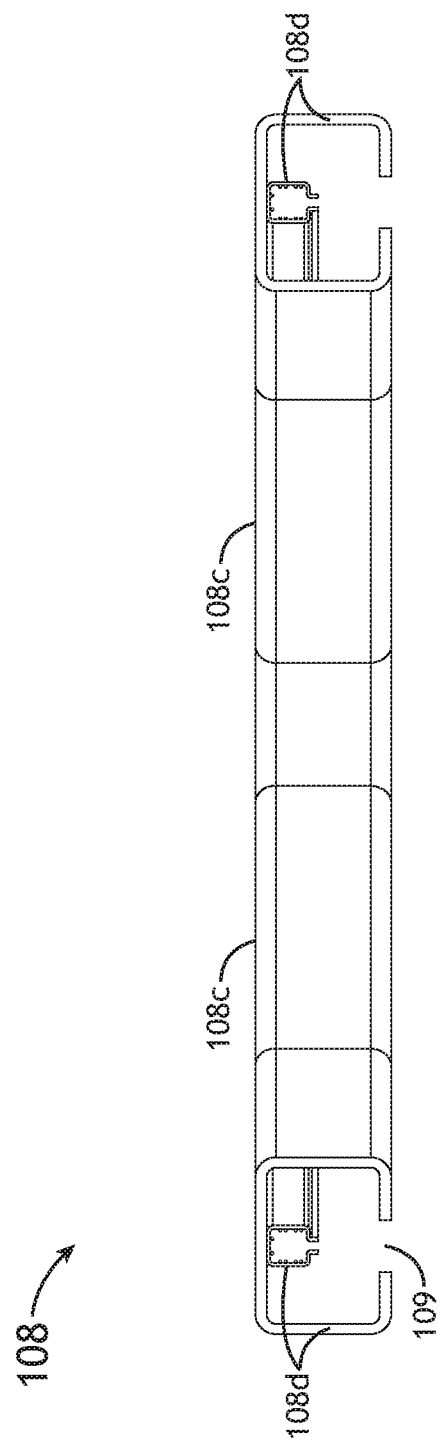
FIG. 2E illustrates a support assembly of a field engagement unit, in accordance with one or more embodiments of the present disclosure.

In another embodiment, the support assembly 104 includes the one or more work tool rail assemblies 108. For example, as illustrated in FIG. 2C-2E, the support assembly 104 includes a work tool rail 108a and a work tool rail 108b. In another embodiment, the support assembly 104 includes one or more transfer rails 108c coupling the one or more work tool rails 108a or 108b together. In another embodiment, one or more junctions 108d may couple one or more work tool rails 108a and 108b and or more transfer rails 108c together. In another embodiment, one or more junctions 108e may couple one or more transfer rails 108c together.

It is noted herein the support assembly 104 may include any number of work tool rails beyond 108a and 108b. It is further noted herein the support assembly 104 may include any number of transfer rails 108c. It is further noted herein the support assembly 104 may include any number of junctions 108d and 108e.

Figure 2F:
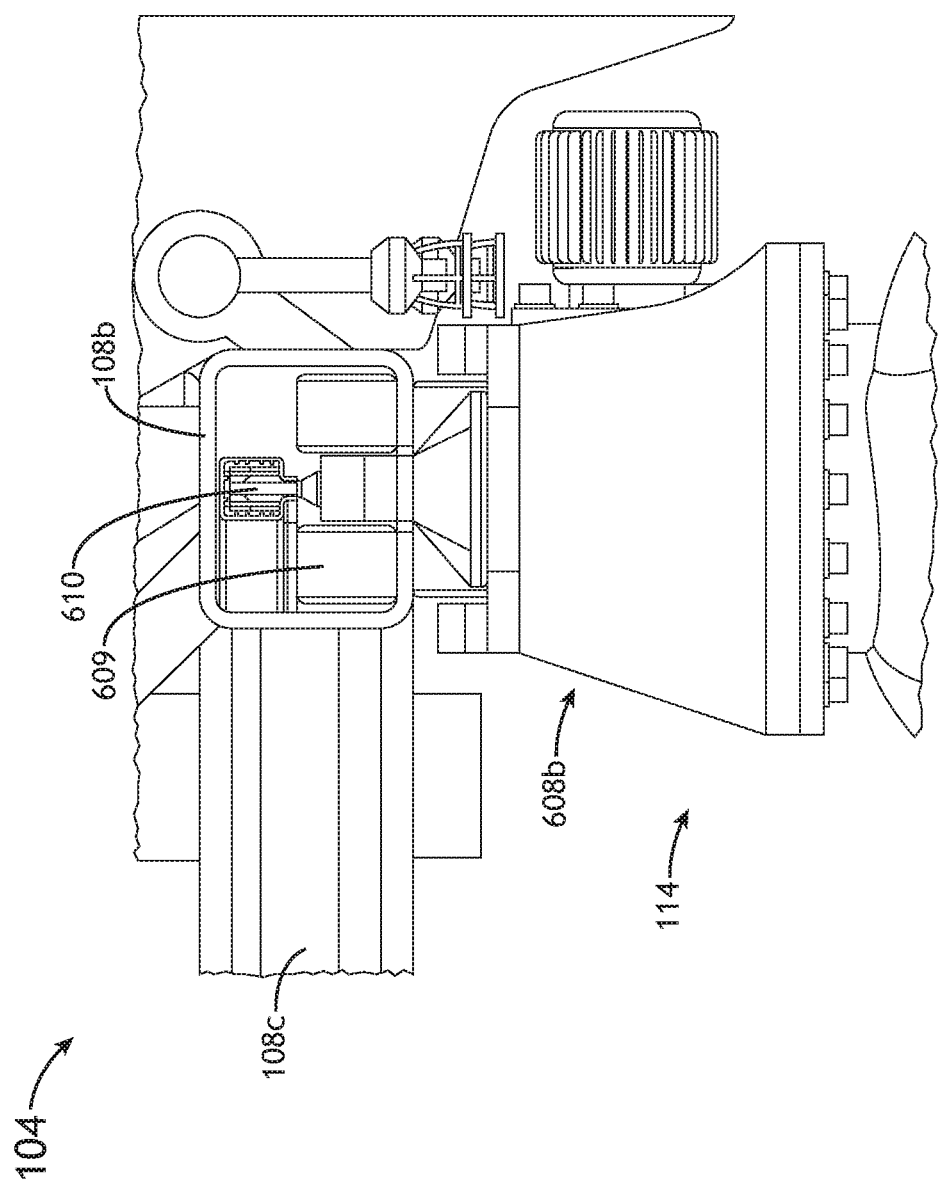
FIG. 2F illustrates a support assembly of a field engagement unit, in accordance with one or more embodiments of the present disclosure.
Figure 2G:
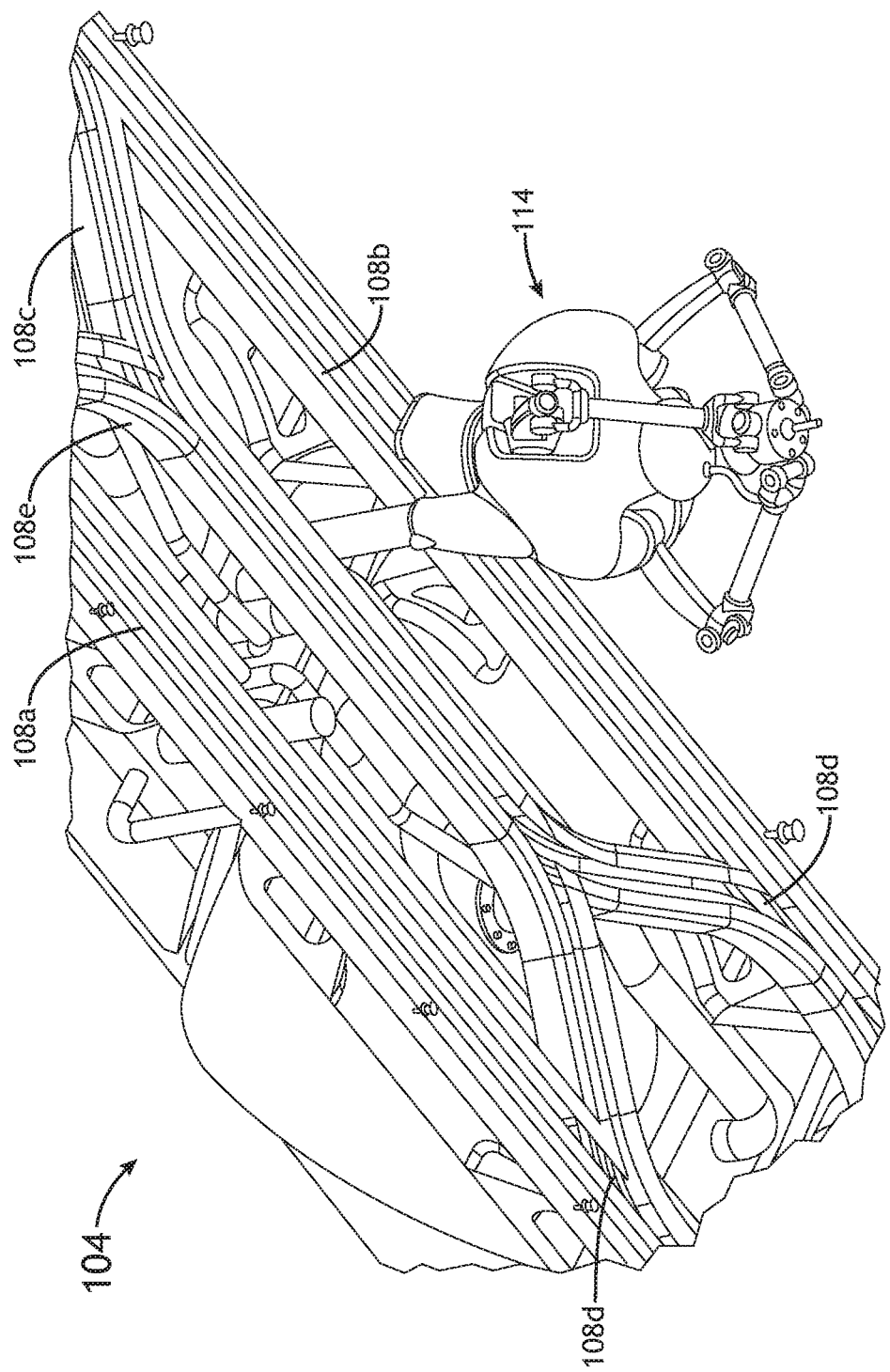
FIG. 2G illustrates a support assembly of a field engagement unit, in accordance with one or more embodiments of the present disclosure.
Figure 2:
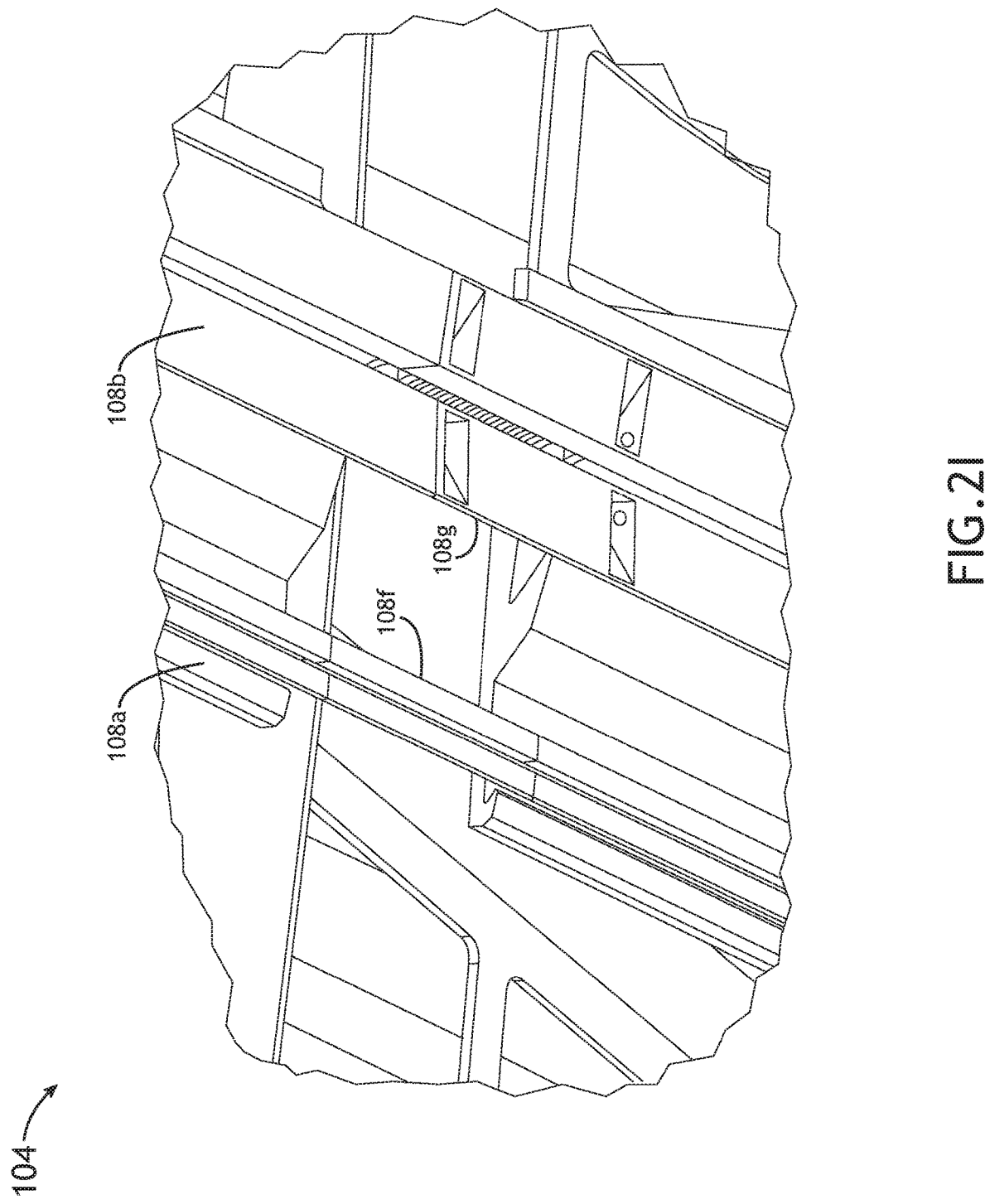
FIG. 2C illustrates a work tool rail assembly of a field engagement unit, in accordance with one or more embodiments of the present disclosure.
FIG. 2H illustrates a work tool rail assembly of a field engagement unit, in accordance with one or more embodiments of the present disclosure.
FIG. 2I illustrates a support assembly of a field engagement unit, in accordance with one or more embodiments of the present disclosure.
FIG. 2J illustrates a support assembly of a field engagement unit, in accordance with one or more embodiments of the present disclosure.
FIG. 2K illustrates a support assembly of a field engagement unit, in accordance with one or more embodiments of the present disclosure.

In another embodiment, as illustrated in FIGS. 2F and 2G, the one or more work tool assemblies 114 are coupled to the work tool rail assembly 108. In another embodiment, the work tool assembly 114 includes a work tool attachment (although not shown). For example, the work tool assembly 114 may include an attachment for an application such as, but not limited to, planting, spraying, fertilizer spreading, and combining. In another embodiment, the one or more work tool assemblies 114 include an identical work tool attachment. In another embodiment, the one or more work tool assemblies 114 include a different work tool attachment. It is noted that having one or more work tool assemblies 108 that includes a work tool attachment for separate functions coupled to the field engagement unit 102 may remove the need to have a separate agricultural implement traverse the field to perform the separate functions. In this regard, traffic flow is lessened and soil compaction is reduced. The one or more work tool attachments of the work tool assembly 114 are described in detail further herein.

For example, the one or more work tool assemblies 114 are coupled to the work tool rail assembly 108 via a slot 109. For example, the slot 109 may include conductor plates for the carrier 608 of the work tool assembly 114, described in detail further herein. In another embodiment, the slot 109 may be keyhole-shaped to prevent water from entering the slot 109. It is noted herein the slot 109 is also designed as a keyhole for the safety of the user (e.g., prevents the user from accidentally sticking a hand into the slot 109 and coming into contact with electrical or mechanical components).

It is noted herein that although one or more embodiments are directed to equal-sized work tool rails in the work tool rail assembly 108, that the work tool rails may instead be of different sizes. For example, these work tool rails of different sizes may be configured for different uses. In one embodiment, as illustrated in FIGS. 2H and 2I, the work tool rail assembly 108 may include a work tool rail (e.g., 108b) configured for "heavy-duty" use. For example, one or more work tool assemblies 114 with large work tool attachments (e.g., planter attachments) may be coupled to the one or more "heavy-duty" work tool rails 108b. By way of another example, the work tool rail assembly 108 may include a work tool rail (e.g., 108a) configured for "light-duty" use. For instance, one or more work tool assemblies 114 with small- or medium-sized work tool attachments (e.g., phenotyping, weeding, or nutrient-applying attachments) may be coupled to the one or more "light-duty work tools rails 108a.

In the case of the work tool rail assembly 108 including "light-duty" rails 108a, the "light-duty" rails 108a may be configured to temporarily accept the one or more work tool assemblies 114 coupled to large work tool attachments for purposes of rearranging those work tool assemblies, even though the one or more "light-duty" rails 108a may not be otherwise configured to accommodate the one or more work tool assemblies 114 coupled to large work tool attachments when those one or more work tool assemblies 114 are in use.

In another embodiment, the work tool rail assembly 108 may include one or more work tool rails configured for auxiliary use. In another embodiment, one or more work tool assemblies 114 are attached to the work tool rail assembly 108 throughout the growing season. In this embodiment, the work tool assemblies 114 (e.g., one or more work tool assemblies 114 with plant phenotyping attachments, soil analysis attachments, or nutrient/fertilizer attachments) are stored on the auxiliary work tool rails when not in use by the field engagement unit 102 when not in use. In another embodiment, work tool assemblies 114 may be parked on the auxiliary rails when broken. It is noted herein that the field engagement unit 102 may continue to function when a work tool assembly 114 may continue functioning after a tool breaks, albeit at a slower pace.

In another embodiment, as illustrated in FIG. 2I, the work tools rails 108a and 108b are constructed from one or more sections. In another embodiment, the one or more work tool sections of are coupled together with mechanical couplers 108f and 108g, respectively.

Figure 2J:
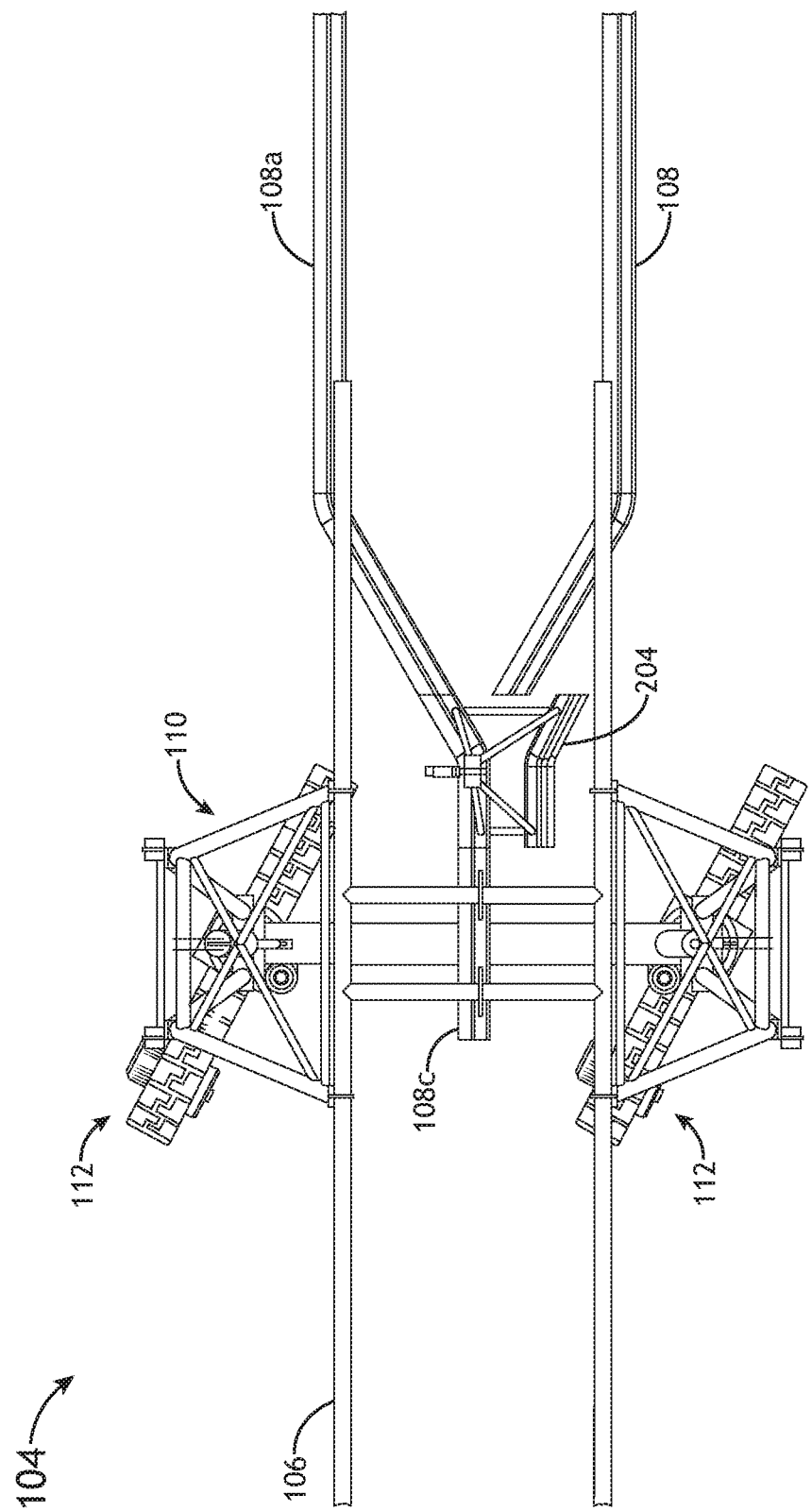
Figure 2K:
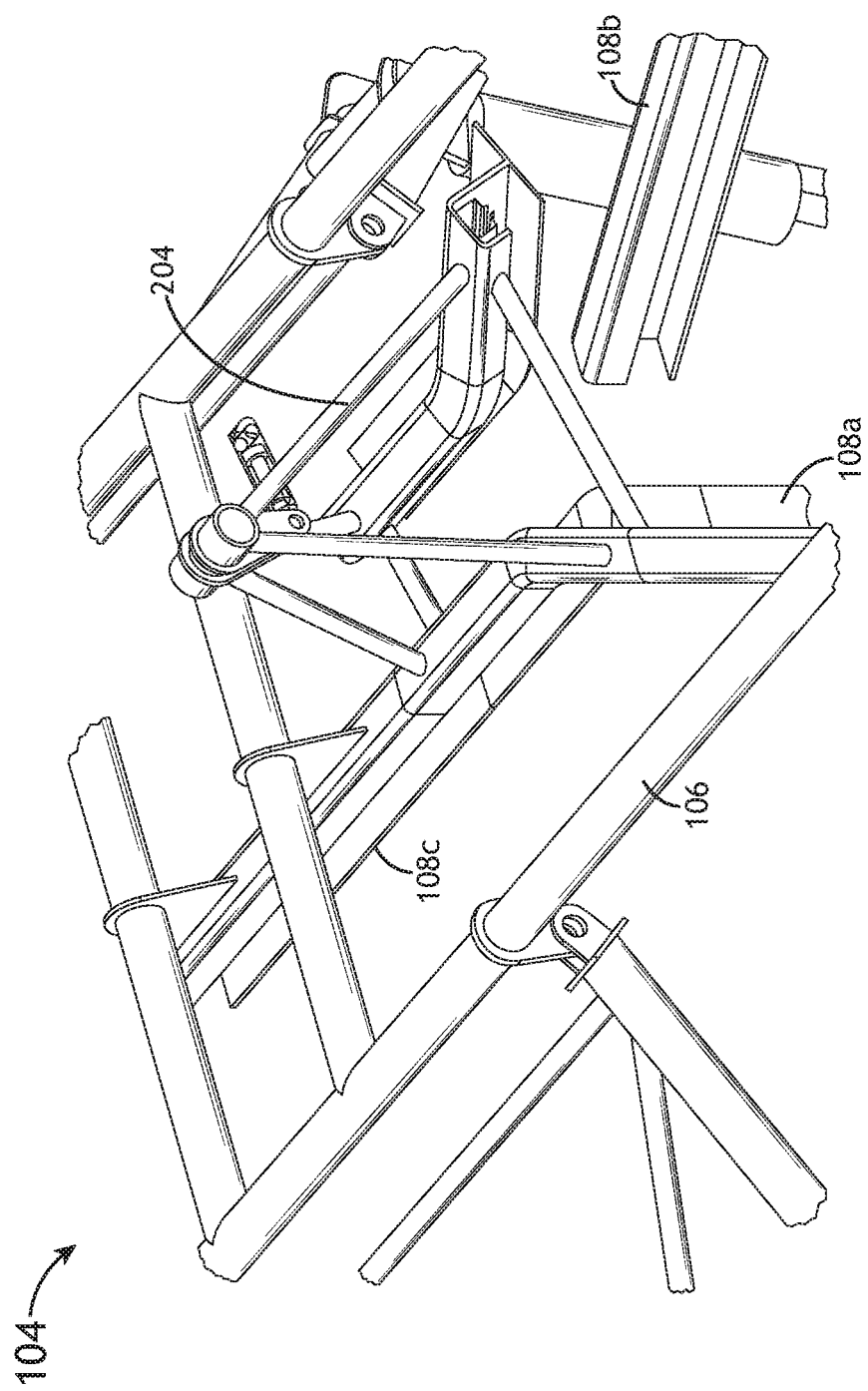

In another embodiment, as illustrated in FIGS. 2J and 2K, the support assembly 104 includes one or more rail-switch assemblies 204. In another embodiment, the rail-switch assembly 204 is configured to be couplable and/or uncouplable to the work tool rails 108a and 108b.

It is noted herein the field engagement unit 102 includes one or more control system components to actuate the rail-switch assembly 204. For example, the one or more control system components to actuate the rail-switch assembly 204 may include a sensor to determine when one or more work tool assemblies 114 are in the proximity of the rail-switch assembly 204. In this example, the field engagement units may be configured to actuate the rail-switch assembly 204 when one or more work tool assemblies 114 are in the proximity of the rail-switch assembly 204, thus transferring the one or more proximate work tool assemblies 114 between work tool rails 108a and 108b. Such a rail-switch assembly 204 is necessary to move a work tool assembly 114 from one work tool rail to another so as to allow another work tool assembly 114 to pass across the joint from one work tool rail span to another.

In another embodiment, the one or more work tool assemblies 114 are attached to the work tool rail assembly 108 during a specific phase of the growing season. For example, work tool assemblies 114 with row-planting attachments may be coupled to the work tool rail assembly 108 only during the phase of the seed-planting phase of the season. In this embodiment, (although not shown), the field engagement unit 102 of system 100 is configured to have one or more work tool assemblies 114 loaded and/or unloaded onto the work tool rail assembly 108. For example, the system 100 may include a docking system, where the docking system includes one or more components to load and/or unload the work tool assemblies 114. For instance, the docking station may be at a fixed location (e.g. a docking station at a home base) or may be mobile (e.g. semi-trailer, truck, or other transport vehicle). In this regard, the work tool assemblies 114 may be removed when not in use and/or as a precautionary measure against theft during the off-season. Additionally, unloading the work tool assemblies 114 allows for maintenance of the work tool assemblies 114 at a location other than in the field.

FIGS. 3A-3I illustrate the support structure 110 of the field engagement unit 102 of system 100, in accordance with one or more embodiments of the present disclosure. It is noted herein that the various system embodiments, components and architecture described previously herein should be interpreted to extend to the support structure 110 of FIGS. 3A-3I.

In one embodiment, the support structure 110 may be a rigid structure. In another embodiment, the support structure 110 is configured to be an articulating support structure.

In another embodiment, as illustrated in FIGS. 3A-3C, the support structure 110 includes a set of hinges 302 (e.g. set of six hinges). For example, the set of hinges 302 are necessary to allow the height of the support frame 106 to be adjusted. In another embodiment, the set of hinges 302 couple together one or more support structure sections 304. In another embodiment, the support structure 110 is adjustable from a high (e.g., elevated) position 300a through a mid-position 300b to a low (e.g., collapsed) position 300c. In this embodiment, a hinge angle 302a decreases through a hinge angle 302b to a hinge angle 302c. In another embodiment, the support structure 110 includes a wheel assembly 306. In another embodiment, the wheel assembly 306 is configured to utilize a cogged belt or chain assembly 306a. In another embodiment, the support structure 110 includes a cogged belt or chain assembly 308. In this embodiment, the assemblies 306a and 308 are configured to act as a counter to when the support structure 110 adjusts from elevated position 300a to collapsed position 300c by maintaining a select distance between one or more ground-contact points 304a of the one or more support structure sections 304. Additionally, the assemblies 306a and 308 allow for alignment to be kept without slipping being observed. In this regard, the kinematic stability of the support structure 110 is maintained, as the support structure 110 would be under-constrained without the assemblies 306a and 308. It is noted herein the process of collapsing may be reversed to return the support structure 110 to its extended position 300a.

In another embodiment (although not shown), the wheel assembly 306 includes a telescoping horizontal member instead of the belt or chain assembly 306a. In this embodiment, the elevation of the support frame 106 is adjustable relative to the ground as the horizontal member telescopes horizontally.

In another embodiment, as illustrated in FIGS. 3D-3F, embodiment, the support structure 110 includes a set of hinges 312 (e.g. set of six hinges). For example, the set of hinges 312 are necessary to allow the height of the support frame 106 to be adjusted. In another embodiment, the set of hinges 312 couple together one or more support structure sections 314. In another embodiment, the support structure 110 is adjustable from a high (e.g., elevated) position 310a through a mid-position 310b to a low (e.g., collapsed) position 310c. In this embodiment, a hinge angle 312a decreases through a hinge angle 312b to a hinge angle 312c. In another embodiment, the support structure 110 includes a set of hydraulic units 316. In another embodiment, the support structure 110 includes a set of pneumatic units 316. In this embodiment, the set of hydraulic units or electric actuators 316 are configured to actuate the articulating support structure 110 to adjust the support frame 106 vertically. It is noted herein the set of units 308 are synchronized so as to function in a way to keep the support frame 106 stable while being raised or lowered. In another embodiment, the support structure 110 is coupled to a single propulsion unit 112 of a fixed length, described in detail further herein. In this embodiment, the fixed length of the propulsion unit 112 is configured to act as a counter when the support structure 110 adjusts from the elevated position 310a to the collapsed position 310c.

It is noted that the field engagement unit 102 may be configured to lock in the collapsed position 310c via a lock pin during field operations including, but not limited to, planting, tilling, cultivation, and mechanical weed removal. Locking the field engagement unit 102 in position 310c transfers force into the lock pin from the support structure sections 314. In this regard, the moment of inertia on the support structure 106 caused by the ground/work tool assembly interaction might be minimized. Without the lock pin, the support structures 312 would be larger to handle the entire load when performing field operations such as those listed above, subsequently increasing the weight of the field engagement unit 102.

It is further noted that, in the case of high winds, the field engagement unit 102 may be configured to lower so as to minimize damage to the structure from the high winds. It is contemplated the field engagement unit 102 would often not be running at the time of a storm, so there is no power available for lowering such a unit for its protection. One perceived benefit of using hydraulics for vertically moving the support structure 106 is that it would be possible to release hydraulic oil from the hydraulic cylinders directly to a hydraulic reservoir. Through the use of remote commands or an on-board user interface, it is possible to open the respective hydraulic valve on each support tower, thus lowering such a unit for its protection. A small battery on one or more vertical support structure members may additionally be used to temporarily to allow the release of hydraulic fluid. It is noted herein the above description may be adjusted to apply to pneumatic systems as well.

In another embodiment, as illustrated in FIGS. 3G-3J, the support structure 110 includes one or more vertical support structure members 322. In another embodiment, one or more propulsion units 112 are coupled to the one or more vertical support structure members 322. In another embodiment, one or more horizontal support structure members 324 are coupled to the support frame 106 via a set of hinges 326. For example, the set of hinges are actuatable about an axis approximately perpendicular to the ground (e.g., the z-axis), and are configured to be utilized during transportation of the field engagement unit 102, as described in detail further herein. In another embodiment, the one or more horizontal support structure members 324 are coupled to the one or more vertical support structure members 322 via one or more sliding collar devices 328.

In another embodiment, as illustrated in FIG. 3J, a rack strip 330a runs the vertical length of the vertical support structure members 322. In another embodiment, a motor and pinion gear assembly 330b is coupled to the exterior of the sliding collar devices 328. In another embodiment, the pinion gear portion of the assembly 330b mechanically couples to the rack strip 330a through a hole in the sliding collar device 328. In another embodiment, the mechanically coupled rack strip 330a and assembly 330b are configured to actuate the support frame 106 to adjust the support frame 106 vertically. In another embodiment, the support frame 106 is adjusted from a low (e.g., collapsed) position 320a through a mid-position 320b to a high (e.g., elevated) position 320c. For instance, the support frame 106 is adjusted from the mid-position 330b to a high position 330c. It is noted this process may be reversed to return the support frame 106 to the low position 330a.

In another embodiment, the support structures 110 are configured to be independently actuatable. In another embodiment, the support frames 106 may be adjusted to different elevations from the other one or more support frames 106 of the field engagement unit 102. In another embodiment, the support structures 110 as illustrated in FIGS. 3G-3J are configured to actuate one side of the support structure 110 a different amount from the other side. In one example, where the field engagement unit 102 is situated on a hill face, the field engagement unit 102 may be configured to actuate the up-hill side of support structures 110 higher than the down-hill side to maintain the levelness of the support frame 106. In another embodiment, the support structures 110 are configured to raise or lower to keep the sides of the support frame 106 in a pre-determined best position relative to the ground or targeted working surface.

In another embodiment (although not shown), the support structures 110 include one or more nested sections. In this embodiment, the support structures 110 are configured to be telescopic. For example, the support structures 110 may be comprised of two or more nested sections, wherein a lowest section is configured to telescope into one or more higher sections. In another embodiment, the support frame 106 is coupled to a highest section, such that the elevation of the support frame 106 is adjusted by one or more lower sections being configured to telescope into the highest section.

It is noted herein the field engagement unit 102 includes one or more control system components to control any electrical height adjustment systems, any hydraulic height adjustment systems, any pneumatic height adjustment systems, or any mechanical height adjustment systems within the support structure 110.

It is further noted herein that one or more inclinometers may be used to level the support frame 106 relative to the propulsion units 112. It is further noted herein the field engagement unit 102 includes one or more ground-scanning sensor system components to measure the elevation of the support frame 106. For example, the support structures 110 may include the one or more ground-scanning sensor system components to measure the elevation of the support frame 106 including, but not limited to, ground-contacting wheels, skids, and arms; biomass-penetrating RADAR; LIDAR; ultrasonic waves; or laser beams.

The above systems to measure and control the height adjustment of the support frame 106 by adjusting the support structure 110, may be utilized in a redundant manner to minimize faults or damage to the system. For example, a ground-scanning sensor system such as LIDAR may be utilized in combination with an elevation measurement of the support frame 106 relative to the field engagement unit system's geometry, where the geometry measurement is skewed due to the field engagement unit being partially sunk below ground. By way of another example, the actual height measurement of the ground surface may be measured through the utilization of one or more work tools that are ground-contacting. By way of another example, the actual height measurement of the ground surface may be measured through the utilization of technologies for measuring the ground through any biomass that might be covering the ground. In this example, the biomass-penetrating technology is rigidly fixed to or actuatable on the support structure 106 or work tool rail assembly 108. The biomass-penetrating technology may be targeted to constantly scan or measure the surface of the ground in order to provide the proper instructions to the variety of work tools for their most efficient and productive operations.

It is noted herein that the field engagement support 102 may be configured to adjust the elevation of the support frame 106 so as to operate one or more work tool assemblies 114 at various crop heights. For example, the field engagement unit 102 may be configured to adjust its elevation to irrigate closer to an immature crop. It is noted that irrigation water drift due to the effects of wind is reduced by lowering the water-carrying nozzles closer to the ground surface. By way of another example, the field engagement unit 102 configured to vertically adjust the support frame 106 may operate one or more onboard work tool assemblies 114 at various soil depths. It is further noted that the field engagement unit 102 may be configured to adjust the elevation of the support frame 106 so as to load or unload one or more work tool assemblies 114.

It is further noted that a field engagement unit 102 is more stable when the support frame 106 is situated at a lower elevation. For example, the amount of cross-sectional area exposed to wind is lessened when the support frame 106 is situated at a lower elevation, thus reducing the possibility of the field engagement unit 102 being damaged by high winds.

It is noted herein that although the above embodiments are directed to an adjustable support assembly with a variable height, the support assembly may instead have a fixed height. Therefore, the above description should not be interpreted as a limitation on the present invention but merely an illustration.

FIGS. 4A-4I illustrate the one or more propulsion units 112 of the field engagement unit 102 of system 100, in accordance with one or more embodiments of the present disclosure. It is noted herein that the various system embodiments, components and architecture described previously herein should be interpreted to extend to the propulsion unit 112 of FIGS. 4A-4I.

Figure 4A:
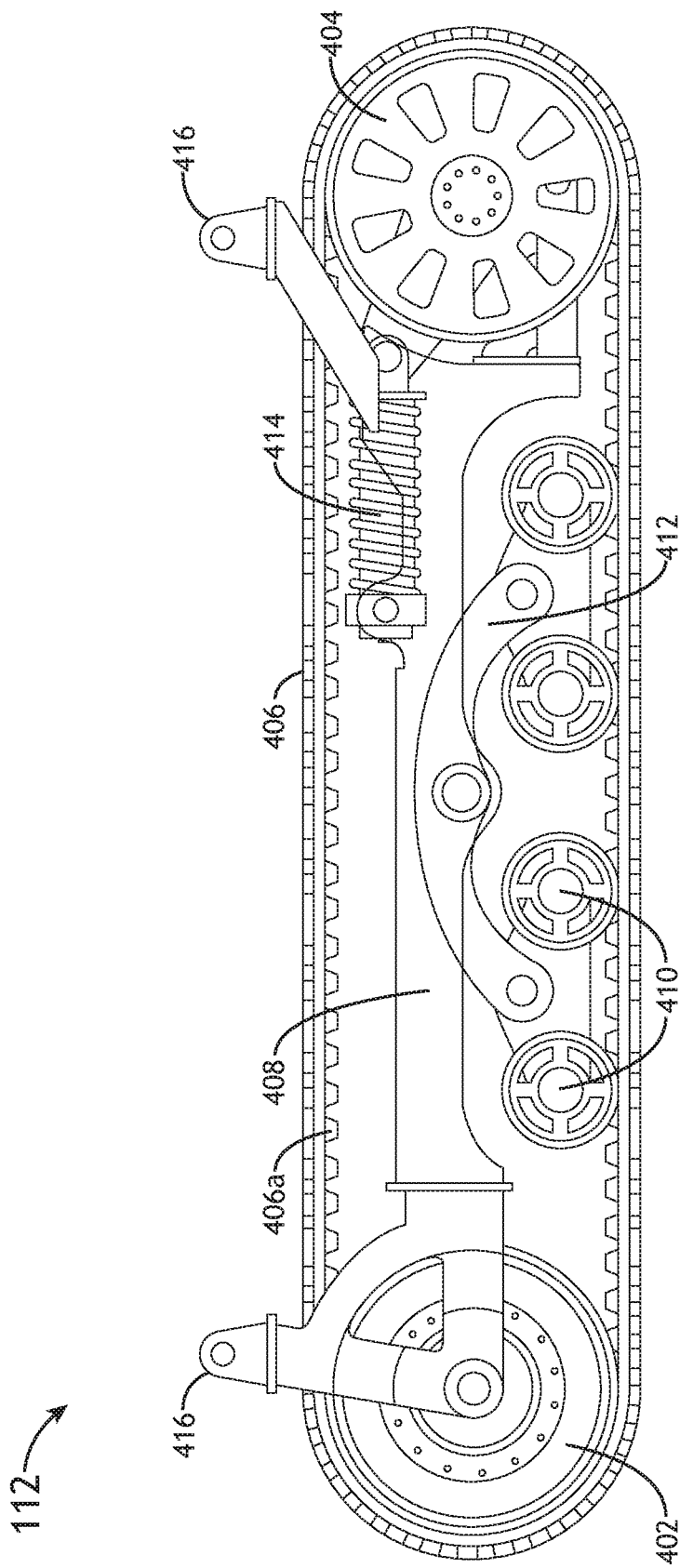
FIG. 4A illustrates a propulsion unit of a field engagement unit, in accordance with one or more embodiments of the present disclosure.
Figure 4B:
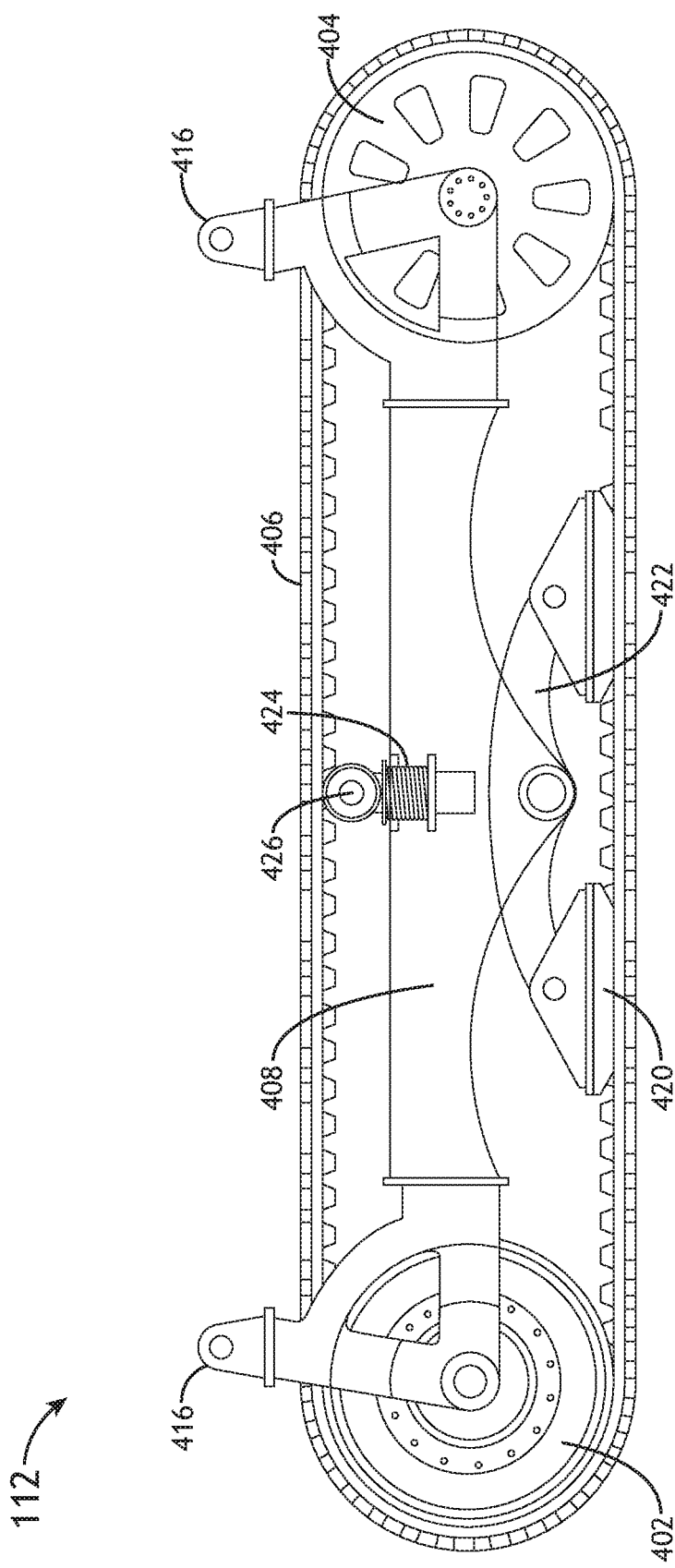
FIG. 4B illustrates a propulsion unit of a field engagement unit, in accordance with one or more embodiments of the present disclosure.

In one embodiment, as illustrated in FIGS. 4A and 4B, the propulsion unit 112 includes one or more drive wheels 402. In another embodiment, the propulsion unit 112 includes one or more idler wheels 404. In another embodiment, the propulsion unit 112 includes one or more tracks 406. For example, the tracks 406 may be constructed from rubber. For instance, the tracks 406 may be constructed from vulcanized rubber. By way of another embodiment, the tracks 406 may be constructed from steel. In another embodiment, where the propulsion unit 112 is configured to utilize a positive track belt system, the tracks 406 include one or more protrusions 406a.

In another embodiment, the propulsion unit 112 includes one or more propulsion unit frames 408. In another embodiment, the drive wheel 402 and the idler wheel 404 are coupled to the propulsion unit frame 408. For example, the drive wheel 402 and the idler wheel 404 may be coupled to the propulsion unit frame 408 at opposite ends. In another embodiment, the propulsion unit 112 has one or more support structure coupling points 416.

In another embodiment, as illustrated in FIG. 4A, the propulsion unit 112 includes one or more intermediate rollers 410. It is noted the intermediate rollers 410 are configured to provide support for the track 406, such that the track 406 maintains even soil contact between the drive wheel 402 and the idler wheel 404 while the propulsion unit 112 traverses over uneven ground. In another embodiment, the intermediate rollers 410 are coupled to a roller linkage 412, the roller linkage 412 being coupled to the propulsion unit frame 408. It is noted the roller linkage 412 and the intermediate rollers 410 are configured to provide a suspension-dampening effect to the propulsion unit 112 through a pinned connection to the propulsion unit frame 408. In another embodiment, the propulsion unit 112 includes a spring assembly 414. It is noted herein the spring 414 is configured to provide a belt-tensioning effect to the track 406 as it travels around the drive wheel 402, the idler wheel 404, and the intermediate rollers 410. It is further noted herein the spring assembly 414 is configured to provide constant tensioning to the track 406.

In another embodiment, as illustrated in FIG. 4B, the propulsion unit 112 includes one or more sliders 420. It is noted the sliders 420 is configured to provide support for the track 406, allowing the track 406 to maintain even soil contact between the drive wheel 402 and the idler wheel 404 while allowing the propulsion unit 112 to move over uneven ground. In another embodiment, the sliders 420 are coupled to a slider linkage 422, the slider linkage 422 being coupled to the propulsion unit frame 408. It is noted the slider linkage 422 and the one or more sliders 420 are configured to provide a suspension-dampening effect to the propulsion unit 112 through a pinned connection to the propulsion unit frame 408. In another embodiment, the propulsion unit 112 includes a spring assembly 424. In another embodiment, the spring assembly 424 includes a roller 426. It is noted herein the spring assembly 424 is configured to provide a belt-tensioning effect to the track 406 as it travels around the drive wheel 402 and the idler wheel 404.

It is noted herein configuring the propulsion unit 112 with tracks removes the possibility of flat tires observed in a pneumatic tire assembly. Additionally, a track-configured propulsion unit 112 has an improved ability to climb hills due to better soil contact. However, the propulsion unit 112 may be configured with a tire assembly including one or more tires. For example, each tire may be hard rubber. By way of another example, each tire may be pneumatic. Therefore, the above description should not be interpreted as a limitation on the present invention but merely an illustration.

Figure 4C:
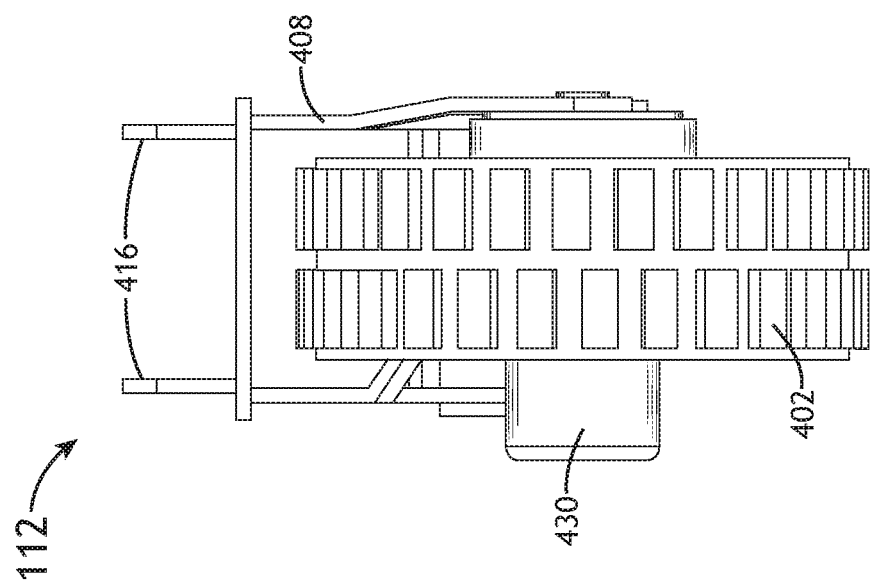
FIG. 4C illustrates a propulsion unit of a field engagement unit, in accordance with one or more embodiments of the present disclosure.
Figure 4D:
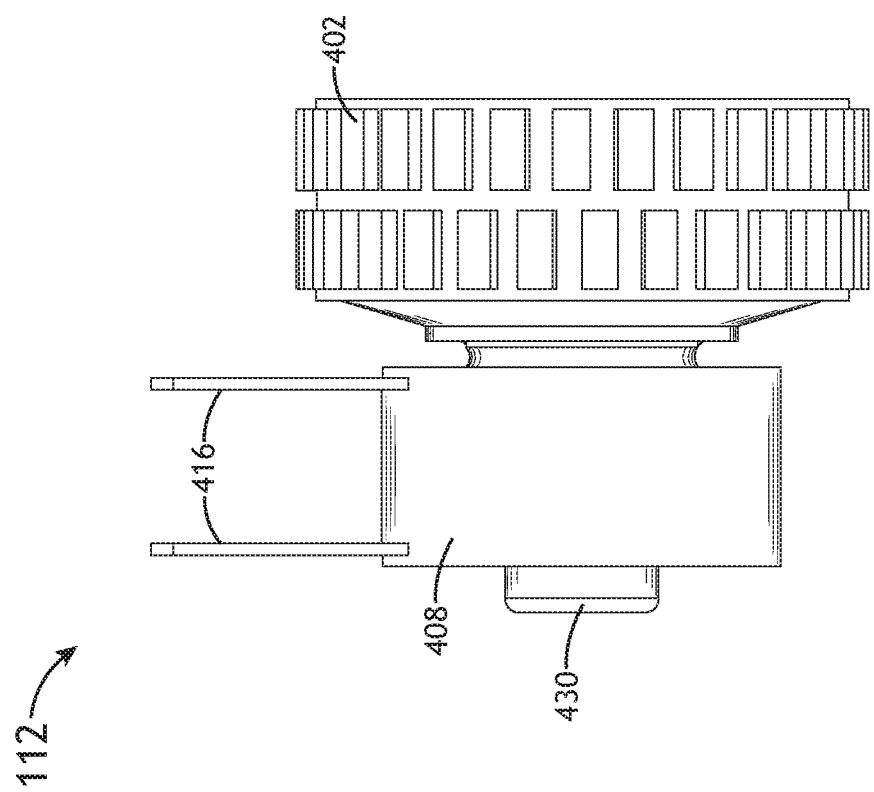
FIG. 4D illustrates a propulsion unit of a field engagement unit, in accordance with one or more embodiments of the present disclosure.

In another embodiment, as illustrated in FIG. 4C, one or more of the drive wheel 402 and the idler wheel 404 are mounted within the propulsion unit frame 408. It is noted herein mounting the wheels 402 and/or 404 within the propulsion unit frame 408 is a "clevis-style mounting" for purposes of the present disclosure. In another embodiment, as illustrated in FIG. 4D, one or more of the drive wheel 402 and the idler wheel 404 are mounted outside the propulsion unit frame 408. It is noted herein mounting the wheels 402 and/or 404 outside the propulsion unit frame 408 is called a "cantilever-style mounting" for purposes of the present disclosure.

Figure 4E:
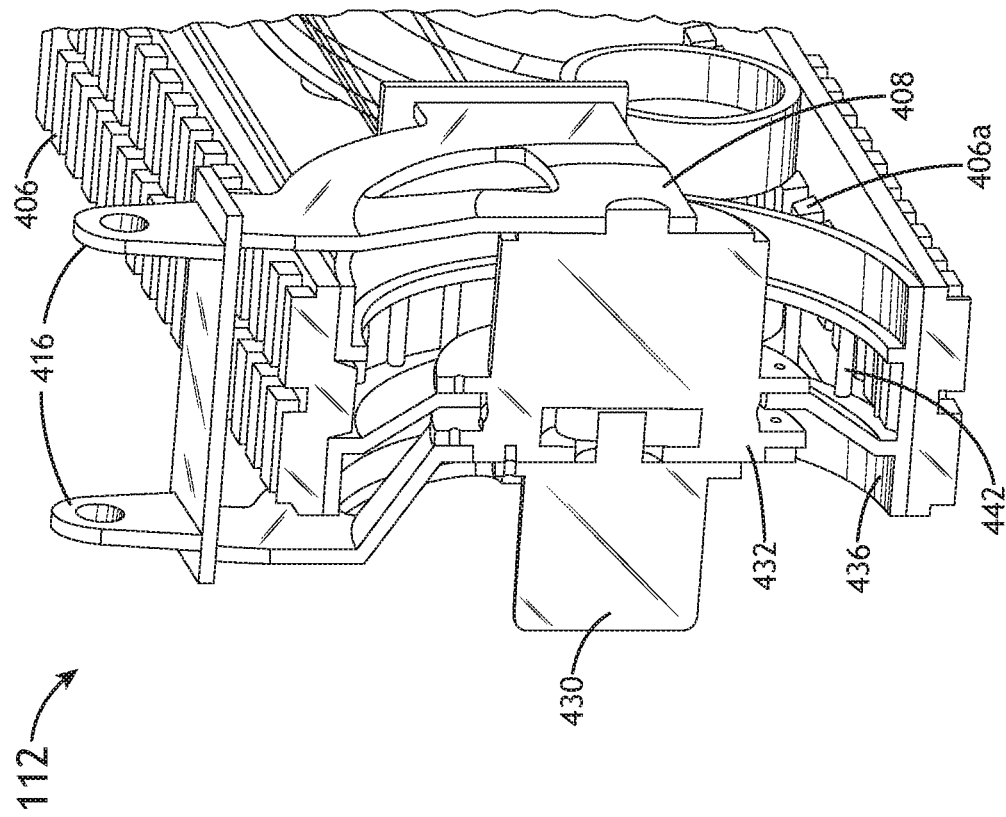
FIG. 4E illustrates a propulsion unit of a field engagement unit, in accordance with one or more embodiments of the present disclosure.
Figure 4F:
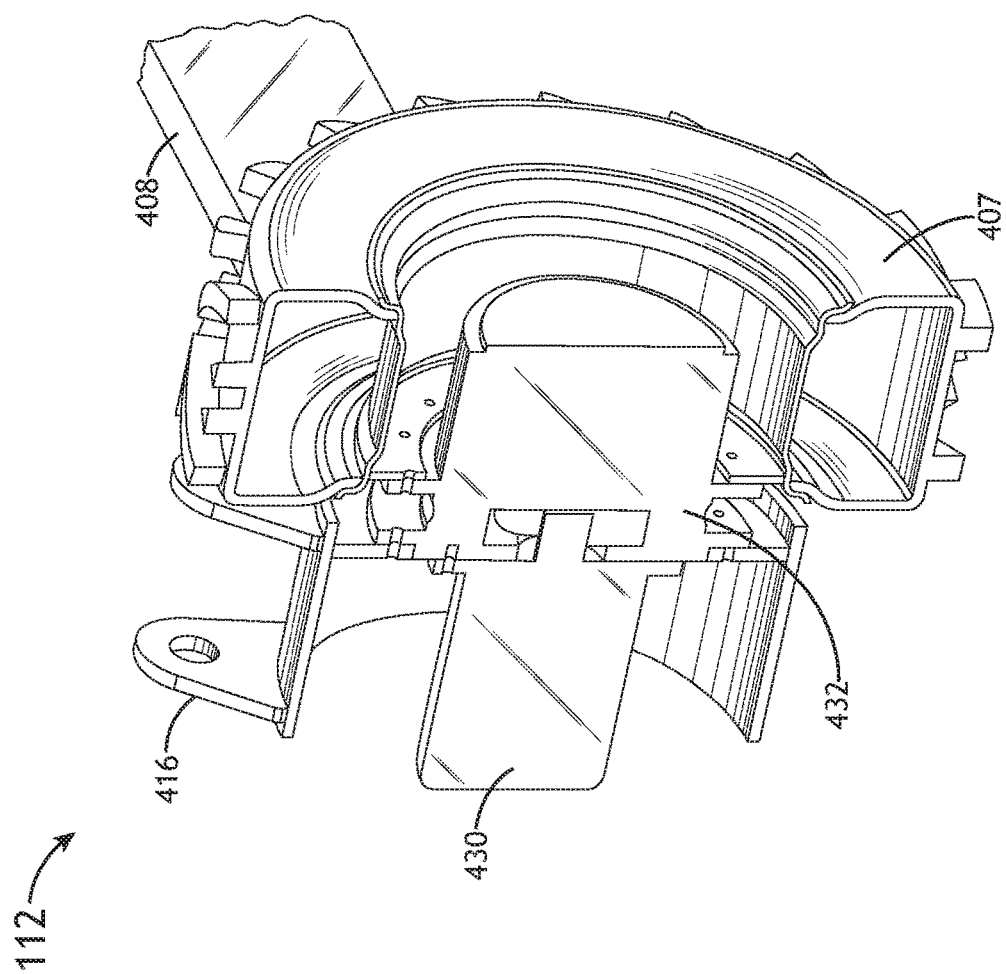
FIG. 4F illustrates a propulsion unit of a field engagement unit, in accordance with one or more embodiments of the present disclosure.

In another embodiment, as illustrated in FIG. 4E as a clevis-style mounting and FIG. 4F as a cantilever-style mounting, the drive wheel 402 of the propulsion unit 112 is configured to be actuated by an inset motor 430. In another embodiment, the inset motor 430 is coupled to a planetary reducer, where the planetary reducer is coupled to the propulsion unit frame 408. In another embodiment, the inset motor 430 is mechanically coupled to a planetary gearbox 432. In another embodiment, the planetary gearbox 432 is configured to rotate about a bearing assembly. In another embodiment, the planetary gearbox drives the drive wheel 404, which comes into contact with the track 406 or a wheel 407 at the outside rim 436.

Figure 4H:
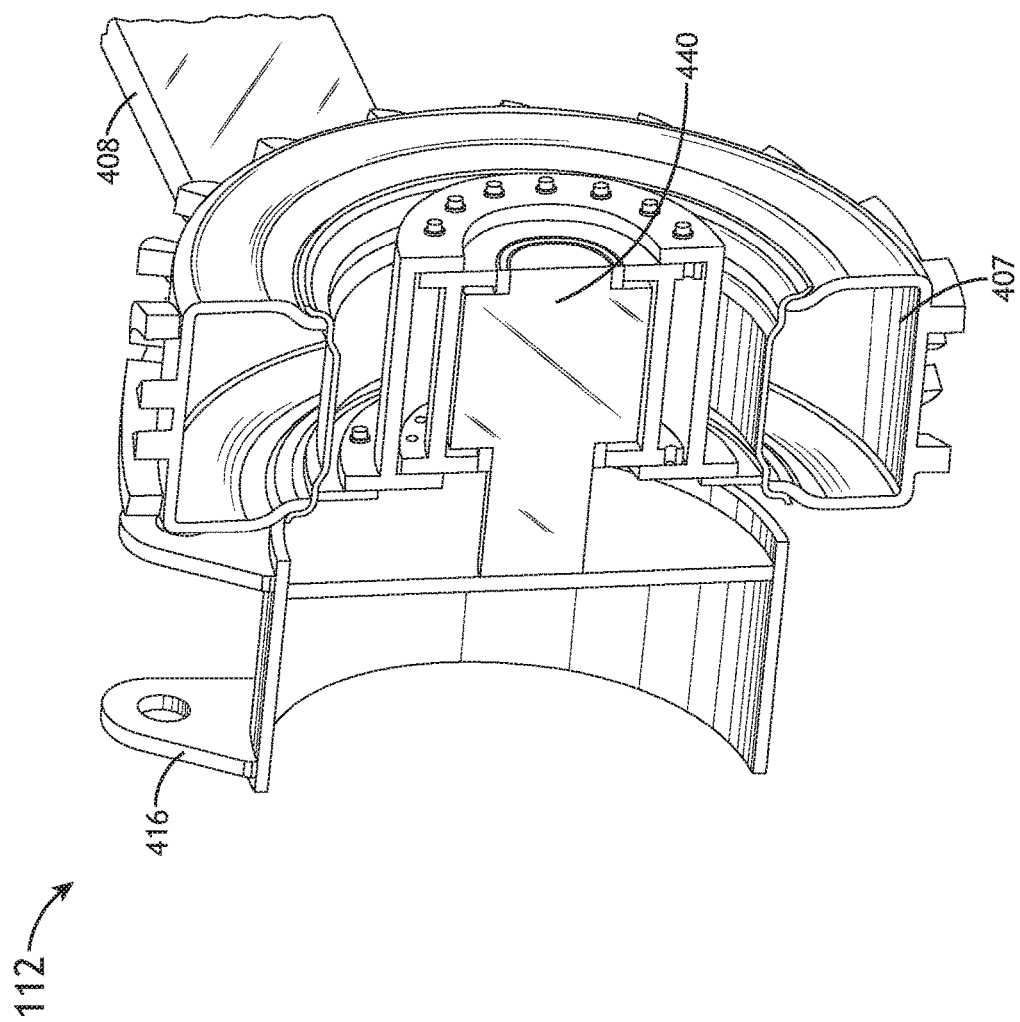
FIG. 4H illustrates a propulsion unit of a field engagement unit, in accordance with one or more embodiments of the present disclosure.
Figure 41:
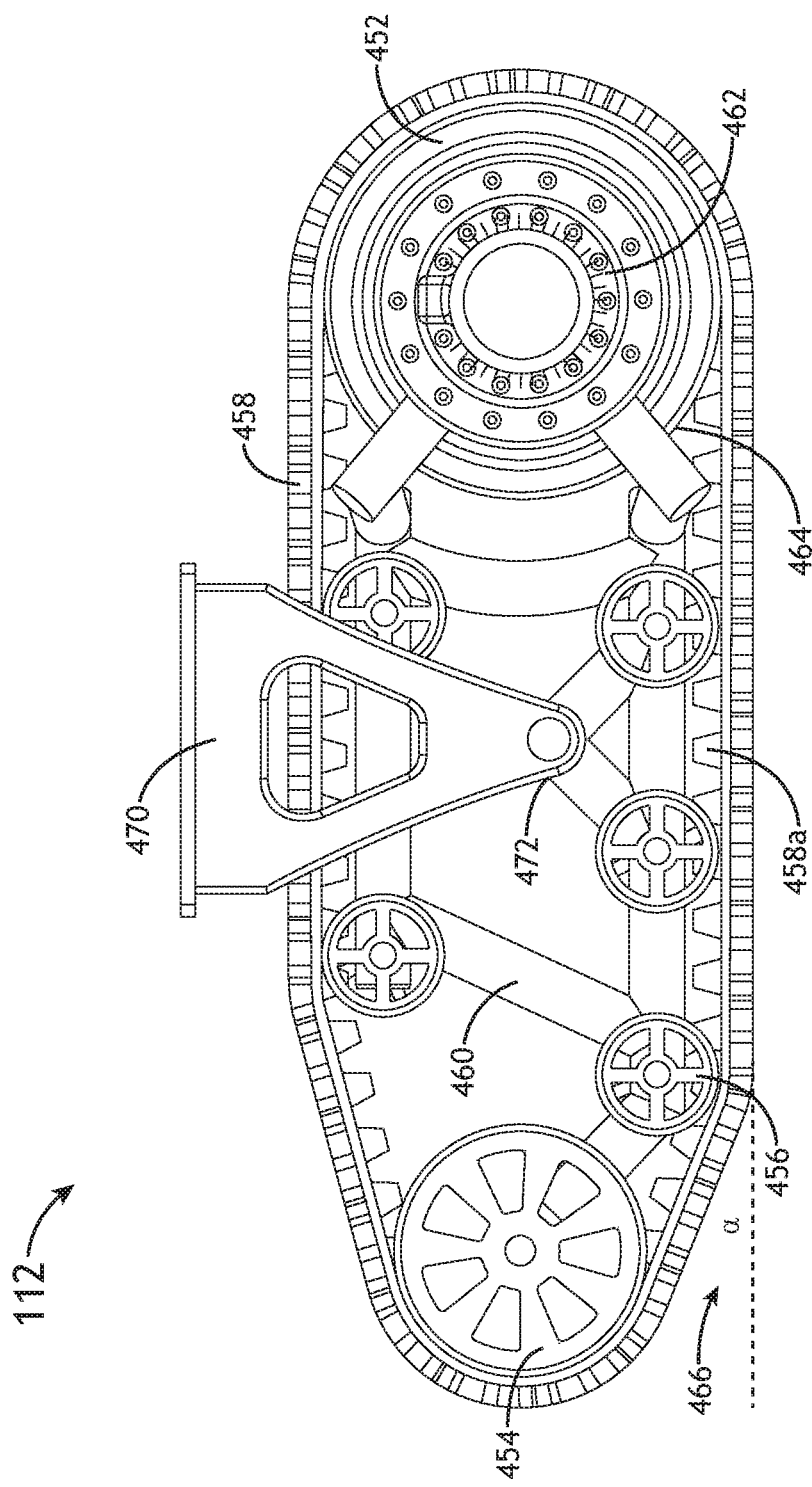

In another embodiment, as illustrated in FIG. 4G as a clevis-style mounting and FIG. 4H as a cantilever-style mounting, the drive wheel 402 of the propulsion unit 112 is configured to be actuated by an inset hub motor 440. In another embodiment, the inset hub motor 440 is configured with a permanent magnet motor direct drive. It is noted the permanent magnet motor direct drive configuration would be able to maintain a high-torque-at-low-speed setting. It is further noted the permanent magnet motor direct drive configuration would be in a fully-sealed system with fewer moving parts, reducing part complexity and minimizing footprint width of the one or more propulsion units 112. It is believed a minimized footprint width is important, as it allows the field engagement unit 102 to traverse a field with a minimum overall track, resulting in more farmable land being available.

In another embodiment, the outside hub 436 includes one or more notches 442, the one or more notches 442 configured to receive one or more protrusions 406a of the track belt 406. In this regard, the one or more notches 442 would apply some amount of braking force to the one or more propulsion units 112, including when the hub motor 440 is in a de-energized, non-movable state. Additionally, the one or more notches 442 would assist the field engagement unit 102 in retaining its position when the propulsion unit 112 is de-energized, functioning in a capacity similar to a parking brake (i.e. when the field engagement unit 102 is parked on uneven ground like a side hill). Although this embodiment is directed to FIGS. 4G and 4H, it is noted herein the embodiment is also applicable to FIGS. 4E and 4F.

FIG. 4I illustrates a propulsion unit 112, in accordance with one or more embodiments of the present disclosure. In one embodiment, the propulsion unit 112 includes a drive wheel 452. In another embodiment, the propulsion unit 112 includes a guide roller 454. It is noted that although the guide roller 454 is illustrated in FIG. 4I to be smaller in diameter than drive wheel 452, guide roller 454 may be any diameter including, but not limited to, the diameter of drive wheel 452. In another embodiment, the propulsion unit 112 includes one or more rollers 456. In another embodiment, the propulsion unit 112 includes a track 458. For example, the track 458 may be constructed from rubber. For instance, the track 458 may be constructed from vulcanized rubber. By way of another example, the track 458 may be constructed from steel. In another embodiment, where the propulsion unit 112 is configured to utilize a positive track belt system, the tracks 458 include one or more protrusions 458a.

In another embodiment, the propulsion unit 112 includes a propulsion unit frame 460. In another embodiment, the drive wheel 452, the guide roller 454, and the rollers 456 are coupled to the propulsion frame 460. For example, the drive wheel 452 and the guide roller 454 are coupled at opposite ends of the propulsion unit 112. By way of another example, the rollers 456 are coupled to the propulsion unit frame 460 between the drive wheel 452 and the guide roller 454. It is noted the one or more rollers 456 are configured to provide support for the track 458, such that the track 458 maintains even soil contact between the drive wheel 452 and the guide roller 454 while the propulsion unit 112 traverses over uneven ground. In another embodiment, the propulsion unit frame 460 includes one or more components configured to provide a belt-tensioning effect to the track 458. For example, the one or more components may include a compression spring. By way of another example, the one or more components may include a rear cantilevered tube, which allows a mating tube (e.g. the tube of propulsion unit frame 460 coupled to the roller 454) to telescope. In this regard, constant belt tension may be maintained. By way of another example, the one or more components may include a coil spring and a hydraulic cylinder or a pneumatic cylinder with an accumulator.

In another embodiment, the drive wheel 452 is driven by a hub motor 462. In one embodiment, the propulsion unit 112 includes a positive drive-style track drive, where the hub motor 462 has one or more notches 464 that correspond to the protrusions 458a of the track 458. In another embodiment, the propulsion unit 112 includes a friction rack drive system, where belt tension maintains friction between the drive wheel 452, the idler wheel 454, the one or more rollers 456, and a track 458 with no protrusions 458a (e.g. is smooth with no positive drive protrusions).

In another embodiment, the propulsion unit 112 includes one or more components configured to allow articulation of the propulsion unit 112 mid-assembly. For example, the one or more components may include an articulation joint 472. For instance, as illustrated in FIG. 4I, the articulation joint 472 may be configured to rotate the entire propulsion unit 112 about a pivoting axis underneath the support structure 110. In this regard, the propulsion unit 112 may conform to changes in the slope of the ground with less impact than if the propulsion unit 112 were rigidly fixed at a select angle underneath the support structure 110. Additionally, the articulation joint 472 may be configured to provide tension to the track 458 when the propulsion unit 112 flexes mid-assembly. In another embodiment, a length of the bottom track face is set at an angle 466 offset from ground. In this regard, the propulsion unit 112 is capable of actuation in scenarios beyond those possible with only a fully flat bottom track face, including those scenarios where the propulsion unit 112 is required to climb an abrupt obstruction.

In another embodiment, the propulsion unit 112 includes a steering assembly platform 470. For example, the propulsion unit 112 may be coupled to the steering assembly platform 470 via the articulation joint 472. In another embodiment, the propulsion unit 112 is coupled to a steering assembly 500 via the steering assembly platform 470, the steering assembly 500 being coupled to the support structure 110. The steering assembly 500 is described in detail further herein.

It is noted herein that a single drive wheel 402 and 452 is illustrated in FIGS. 4A-4I, as a single drive roller design is believed to be the lowest cost solution for the propulsion unit 112. However, any number of drive wheels 402 may be implemented in the propulsion unit 112. For example, the propulsion unit 112 may include a two-wheel-drive system. In the case of FIGS. 4A and 4B, the idler wheel 404 would instead be a drive wheel 402. In the case of FIG. 4I, the guide roller 454 would instead be a drive wheel 452. It is noted such a two-wheel-drive system would be advantageous. For example, the two-wheel-drive system could be utilized in a powered wheel design in situations where the field engagement unit 102 traverses both forwards and backwards equally. It is noted having multiple drive wheels 402 or 452 allows for a reduction in the size of motors and gearboxes of the drive wheels 402 or 452. Therefore, the above description should not be interpreted as a limitation on the present invention but merely an illustration.

It is further noted herein the inset motor 430 and hub motor 440 illustrated in FIGS. 4A-4I may be electric-powered. For example, measured electric-powered system components include, but are not limited to, roller/track speed, rotational position of the track based on voltage input or output fluctuations, slip between drive and idler wheels, and calculated slip (i.e., the comparison of theoretical GPS location to travel speed). As such, it is recognized the embodiments illustrated in FIGS. 4A-4I include one or more control system components to control one or more electrical propulsion drive systems within the one or more propulsion units 112. However, the inset motor 430 and hub motor 440 may alternatively be powered by any suitable power source including, but not limited to, gasoline, diesel, hydraulic, or pneumatic power solutions. In the case of hydraulic power solutions, it is recognized the propulsion unit 112 includes one or more components to measure hydraulic system component performance. For example, measured hydraulic system components include, but are not limited to hydraulic pressure and flow within the system. Therefore, the above description should not be interpreted as a limitation on the present invention but merely an illustration.

In other embodiments, the idler wheel 404 is mechanically coupled to the drive wheel 402 via a chain or belt drive assembly, where both the idler wheel 404 and the drive wheel 402 have a spur gear or pulley that mate with the chain or belt drive, respectively. In this embodiment, the drive wheel 402 actuates both the drive wheel 402 and the idler wheel 404. In another embodiment, a protective cover may be installed over the chain, gears, and motor.

It is noted herein embodiments for the propulsion units 112 are directed to reducing the numbers of components of the propulsion system such that the overall weight and/or cost of the propulsion system is reduced and reliability is improved. In this regard, at least some of the soil compaction observed in propulsion systems is negated, the depth of field ruts is reduced, and the possibility of the field engagement unit 102 getting stuck while in the field is lessened.

It is further noted embodiments for the propulsion units 112 are directed to a new electric drive solution. For example, the electric drive solution may be configured to be continuously-moving while utilizing variable speeds. By way of another example, the electric drive solution may provide more precise position control than the start and stop technology in self-propelled irrigation systems. Additional embodiments are directed to a wide range of torque and speed control including, but not limited to, high-speed, low-torque capabilities; low-torque, high-speed capabilities; variable speed capabilities; and the capability to switch from a start-stop mode to a continuous actuation. In this regard, fatigue on the structural components of the field engagement unit 102 is reduced. Additionally, continuous-move propulsion units are believed to be more energy efficient than continually starting/stopping of an electric motor.

It is noted herein propulsion units 112 on a field engagement unit 102 may be actuated together or independent of each other.

In one example, the speed of the field engagement unit 102 may be increased. In this example, the local controller 130 may receive one or more sets of information such as, but not limited to, voltage input/output, rotational speed of the motor, and the like from the propulsion unit 112. The local controller 130 may then determine what response is necessary based on the one or more sets of information (increase voltage to increase rotational speed of the motor to a selectable value). The local controller 130 may then transmit the response to the one or more propulsion units 112.

FIGS. 5A-5H illustrate a steering assembly 500 for the field engagement unit 102 of system 100. It is noted herein that the various system embodiments, components and architecture described previously herein should be interpreted to extend to the steering assembly 500 of FIGS. 5A-5H.

Figure 5A:
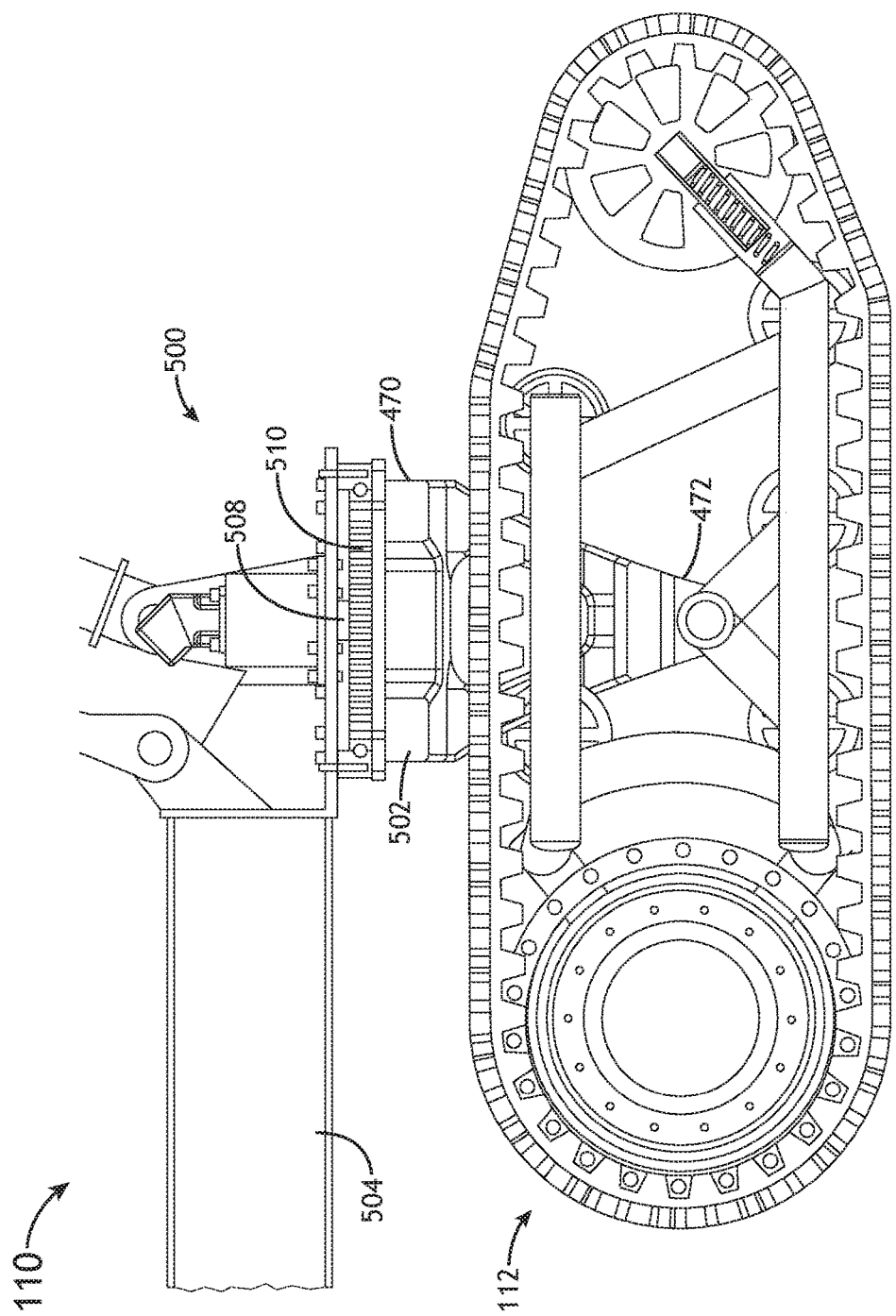
FIG. 5A illustrates a support structure of a field engagement unit, in accordance with one or more embodiments of the present disclosure.
Figure 5B:
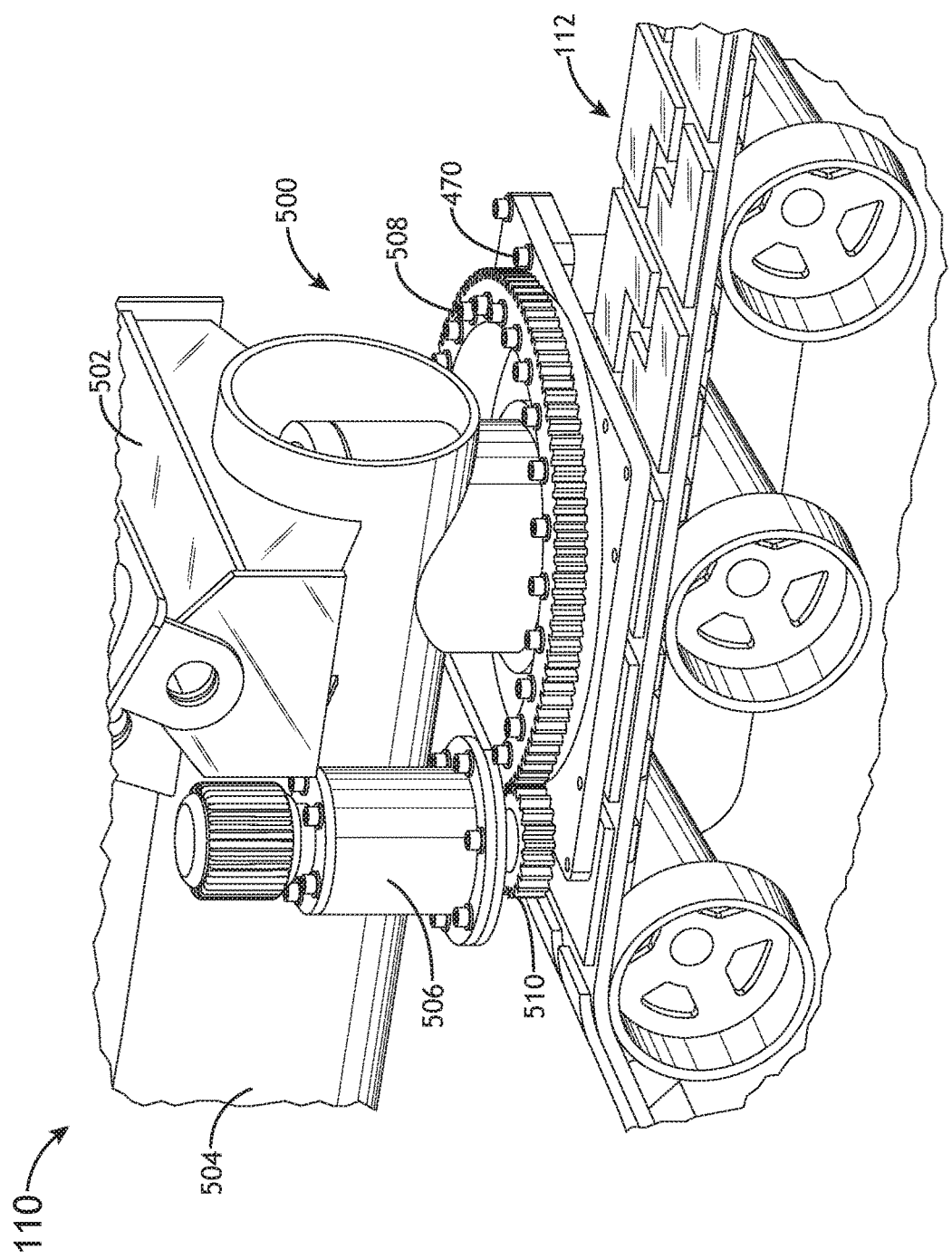
FIG. 5B illustrates a support structure of a field engagement unit, in accordance with one or more embodiments of the present disclosure.

FIGS. 5A and 5B illustrate a steering assembly 500, in accordance with one or more embodiments of the present disclosure. In one embodiment, the steering assembly 500 includes a steering assembly frame 502. In another embodiment, the steering assembly 500 is coupled to a cross member 504. In another embodiment, the steering assembly frame 502 is coupled to the steering assembly platform 470, where the steering assembly platform 470 is coupled to the propulsion unit 112 as described previously herein.

In another embodiment, the steering assembly 500 includes a motor 506. For example, the motor 506 may be actuated by electricity. By way of another example, the motor 506 may actuated by one or more hydraulic components. By way of another example, the motor 506 may actuated by one or more pneumatic components. In another embodiment, the steering assembly 500 includes a pinion gear 508 mechanically coupled to the motor 506. In another embodiment, the steering assembly frame 502 includes a ring gear 510 mechanically coupled to the pinion gear 508. In another embodiment, the ring gear 510 is coupled to the steering assembly platform 470. For example, the propulsion unit 112 is configured to rotate with rotation of the steering assembly platform 470.

In another embodiment, as illustrated in FIG. 5A, the motor 506, pinion gear 508, and ring gear 510 are internally housed within the steering assembly frame 502. In this embodiment, the pinion gear 508 is mechanically coupled to the interior of ring gear 510. In another embodiment, as illustrated in FIG. 5B, the motor 506, pinion gear 508, and ring gear 510 are coupled to the exterior of the steering assembly frame 502. It this embodiment, the pinion gear 508 is mechanically coupled to the exterior of ring gear 510. In another embodiment (although not shown), a shield covers the exposed motor 506, pinion gear 508, and ring gear 510.

It is noted herein the field engagement units 102 include one or more control system components to control one or more electrical steering systems within the steering assembly 500. For example, the one or more electrical steering control system components within the steering assembly 500 may include, but are not limited to, angle sensors that measure the angular position of each propulsion unit 112 (e.g., angular position of the ring gear 510), rotary position of the electric motor 506, and linear position of the one or more electric actuators. It is further noted herein the field engagement unit 102 includes one or more hydraulic system components necessary to control one or more hydraulic steering systems within the steering assembly 500. For example, the one or more hydraulic steering control system components within the steering assembly 500 may include, but are not limited to, linear position of the one or more hydraulic cylinders.

Figures 5C, 5D:
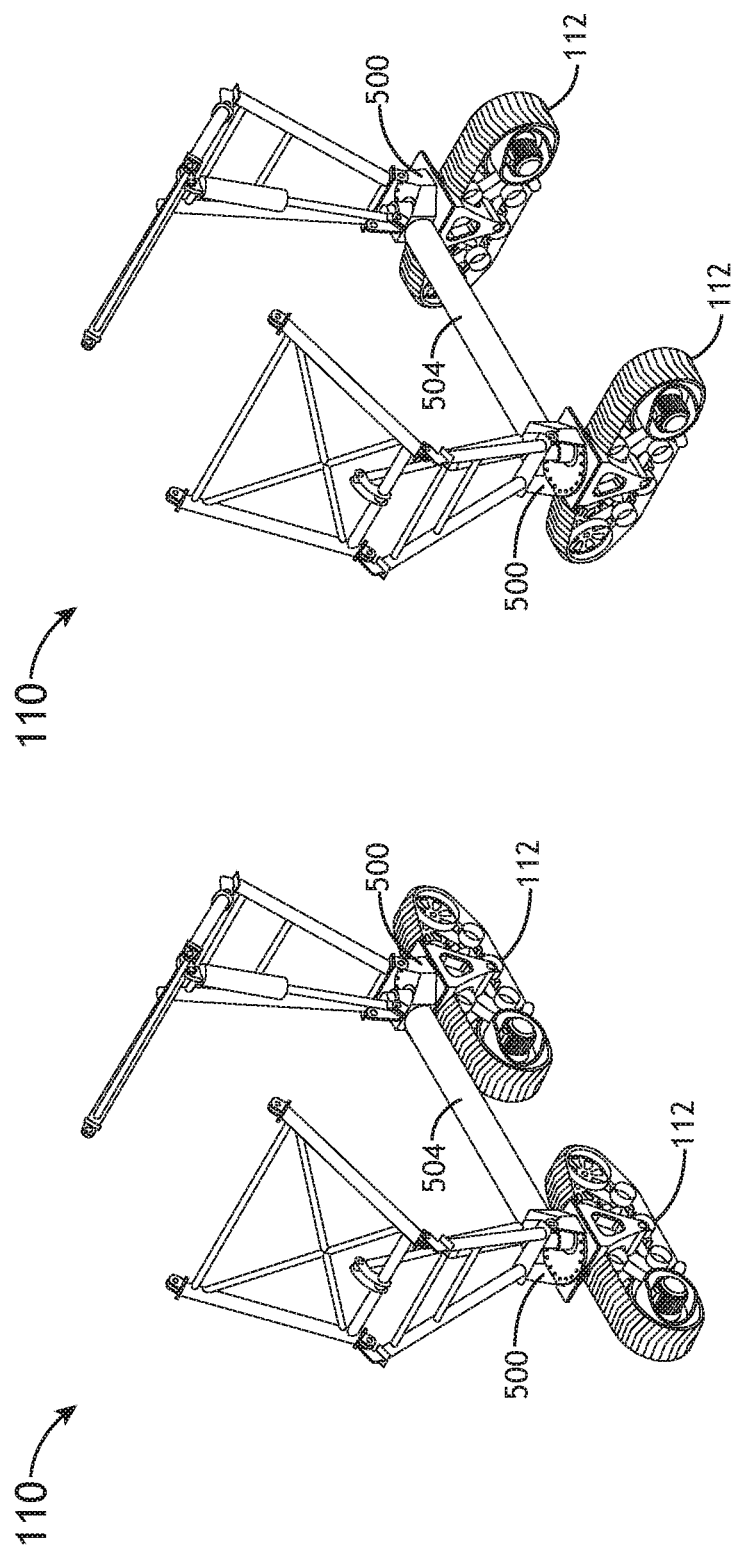
FIG. 5C illustrates a support structure of a field engagement unit, in accordance with one or more embodiments of the present disclosure.
FIG. 5D illustrates a support structure of a field engagement unit, in accordance with one or more embodiments of the present disclosure.

FIGS. 5C and 5D illustrate the support structure 110 for the field engagement unit 102. In one embodiment, the support structure 110 includes one or more propulsion units 112 coupled to the one or more support structures 110. For example, the one or more propulsion units 112 may be coupled to one or more steering assemblies 500. By way of another example, the one or more steering assemblies 500 may be coupled to the one or more support structures 110. In another embodiment, the cross member 504 mechanically couples the one or more support structures 110 together.

For example, the support structure 110 may include two support structures 110, two steering assemblies 500, and two propulsion units 112, where each propulsion unit 112 is coupled to a support structure 110 via a steering assembly 500. In this example, the two propulsion units 112 may be configured to be actuated simultaneously as a single steering unit. It is noted herein that the propulsion units 112 on the same support structure 110 must be actuated as a unified pair to prevent the field engagement unit 102 from breaking.

By way of another example, the propulsion units 112 of the field engagement unit 102 may be configured to actuate in an identical manner, implementing a form of crab steering. For example, crab steering drives all wheels in the same direction and at the same angle. Crab steering allows for a vehicle to proceed in a straight line but under an angle, or when the rear wheels may not follow the front wheel tracks. In this regard, soil compaction may be reduced.

In another embodiment, each propulsion unit 112 may be configured to actuate independently from the other propulsion units 112. However, it is noted herein this may damage the field engagement unit 102.

In another embodiment, as illustrated in FIG. 5C, the support structure 110 is in "field mode", where the one or more propulsion units 112 of the support structure 110 are substantially parallel to the cross member 504. In another embodiment, as illustrated in FIG. 5D, the support structure 110 is in "transport mode", where the one or more propulsion units 112 of the support structure 110 are substantially perpendicular to the cross member 504.

Figure 5G:
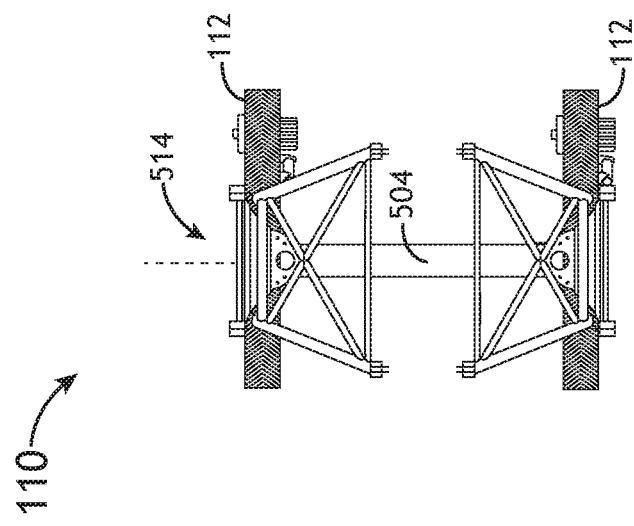
FIG. 5G illustrates a support structure of a field engagement unit, in accordance with one or more embodiments of the present disclosure.
Figure 5F:
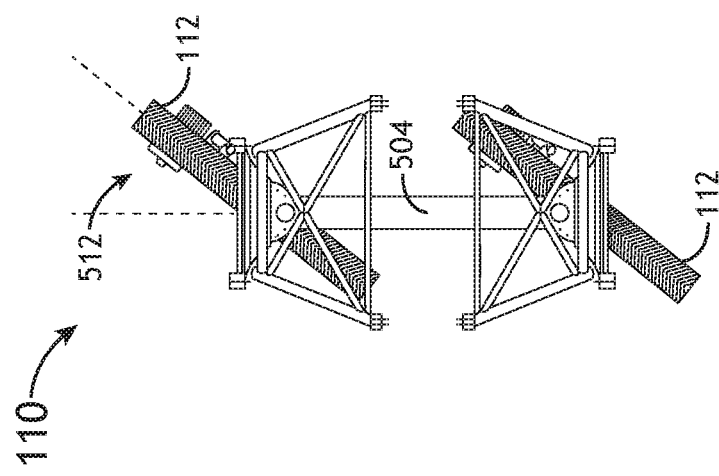
FIG. 5F illustrates a support structure of a field engagement unit, in accordance with one or more embodiments of the present disclosure.
Figure 5E:
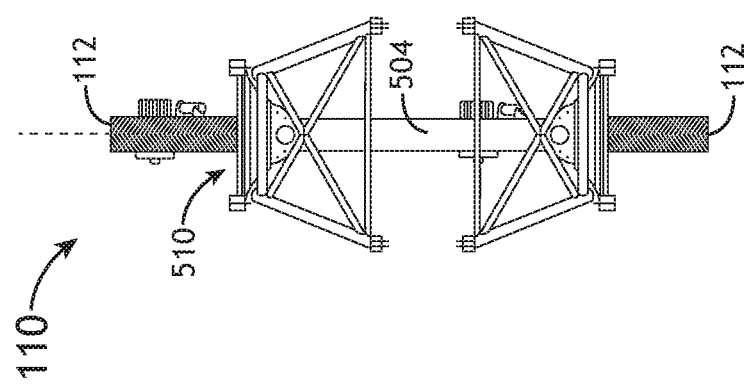
FIG. 5E illustrates a support structure of a field engagement unit, in accordance with one or more embodiments of the present disclosure.

FIGS. 5E-5G illustrate top views of the support structure 110 with various angles of difference between the one or more propulsion units 112 and the cross member 504. For example, the various angles of difference occur while the support structure 110 transitions from "field mode" to "transport mode". In one embodiment, the support structure 110 is in "field mode" with an angle 510. For example, the angle 510 may be zero degrees. In another embodiment, the support structure 110 is partially transitioned from "field mode" to "transport mode", with an angle 512. For example, the angle 512 may range from 0.1-89.9 degrees. For instance, the angle 512 may be 45 degrees. In another embodiment, the support structure 110 is in "transport mode" with an angle 514. For example, the angle 514 may be 90 degrees. By way of another example, the angle 514 may be more or less than 90 degrees.

It is noted herein that "field mode" and "transport mode" is not limited to zero degrees and 90 degrees, respectively, but may include any angle of difference between the one or more propulsion units 112 and the cross member 504. For example, the angle of difference during "field mode" may be 90 degrees when the field engagement unit is shifting from one span length of rows to a second span length of rows. By way of another example, the angle of difference during "field mode" may range from 0-90 degrees depending on the shape of the field and the direction of the rows within the field. In this regard, the propulsion unit 112 is configured to provide omnidirectional functionality when coupled to a steering assembly 500 to the field engagement unit 102. For example, the omnidirectional functionality allows a free-range field engagement unit 102 to travel in any area shape desired (e.g., circular-shaped, square-shaped, rectangular-shaped). By way of another example, the omnidirectional functionality allows a center pivot field engagement unit 102 to travel in any area shape desired (e.g., circular-shaped, square-shaped, rectangular-shaped) within the radius defined by the fully-extended center-pivot docked field engagement unit 102. Therefore, the above description should not be interpreted as a limitation on the present invention but merely an illustration.

It is further noted herein that the angle of rotation of the propulsion unit 112 coupled to a steering assembly 500 is not intended to be limited to the 90 degrees of rotational steering travel that may occur when switching from "field mode" to "transport mode" or reverse. For example, at least another 180 degrees of rotational steering travel is possible with the above embodiments. In this regard, all embodiments above are intended to be configured to allow for at least 270 degrees of rotational steering travel. Additionally, further embodiments include an infinite rotational capability of each propulsion unit 112. Therefore, the above description should not be interpreted as a limitation on the present invention but merely an illustration.

Figure 5H:
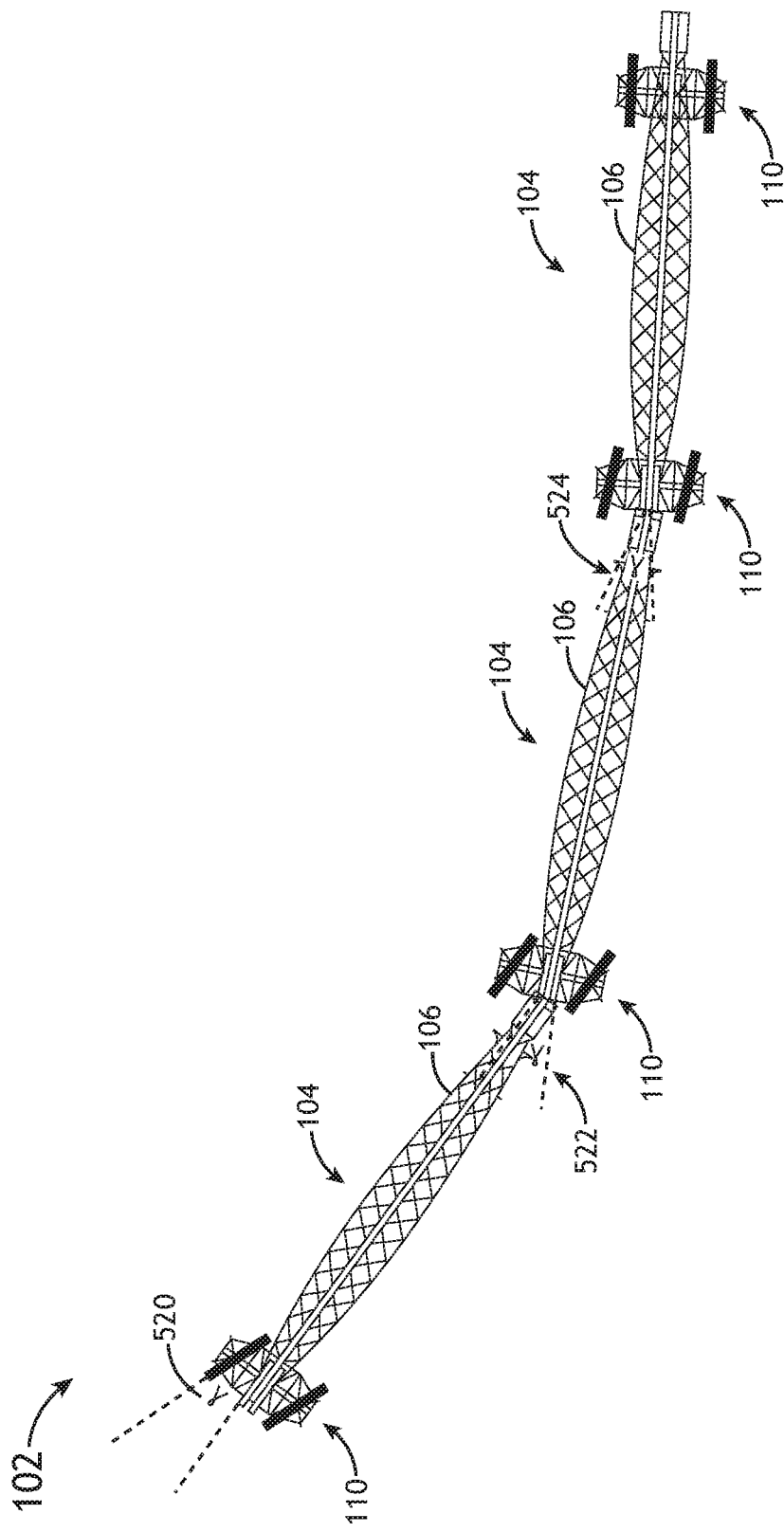
FIG. 5H illustrates a field engagement unit, in accordance with one or more embodiments of the present disclosure.
Figure 51:
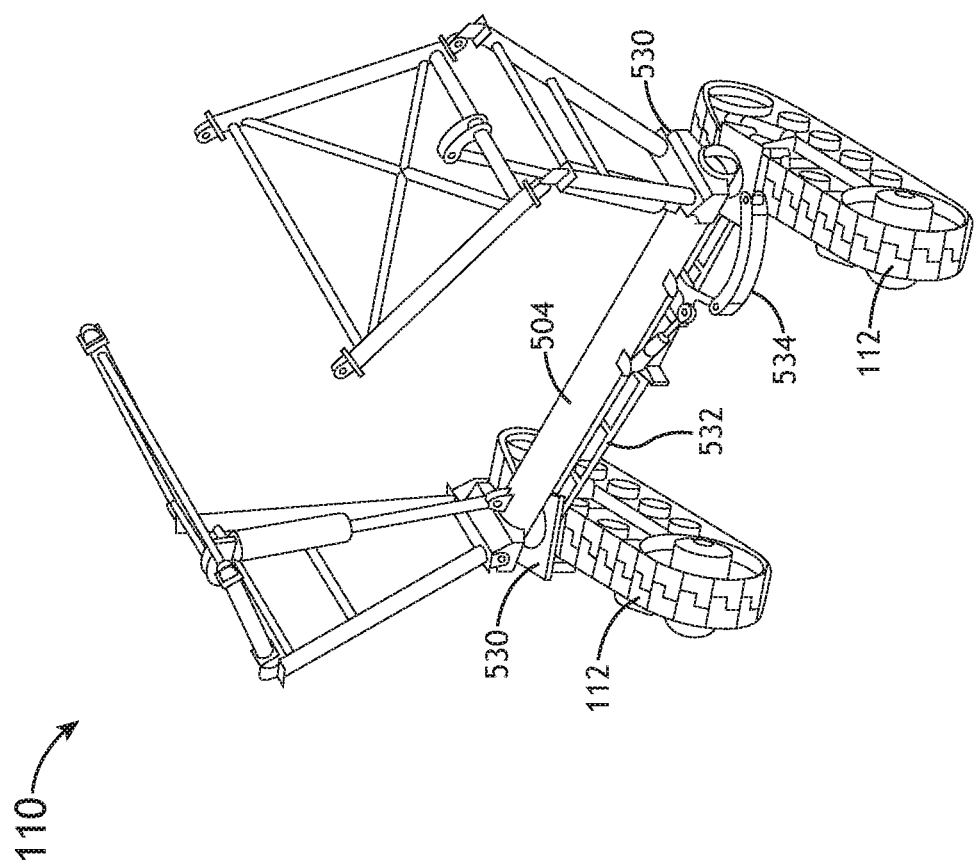

FIG. 5H illustrates the field engagement unit 102, in accordance with one or more embodiments of the present disclosure. In one embodiment, the field engagement unit 102 includes one or more support assemblies 104 coupled to one or more support structures 110. In another embodiment, the support structures 110 are configured to be independently actuatable. For example, a particular support structure 110 may include a steering unit, the steering unit including one or more steering assemblies 500 coupled to one or more propulsion units 112. In this example, the steering unit of the particular support structure 110 may be configured to actuate independently from the steering units of the other support structures 110 in the set 550. For instance, as illustrated in FIG. 5H, the support structures 110 each have a different steering angle 520, 522, and 524.

In another embodiment, as illustrated in FIG. 5I, the steering assembly 530 includes a one or more steering-cylinder and tie-rod assemblies. In one embodiment, the steering assembly 530 includes one or more tie rods 532. In another embodiment, the steering assembly includes one or more steering cylinders 534. In another embodiment, the steering assembly 530 is configured to achieve rotational steering travel greater than 180 degrees with two or more electric actuators or hydraulic cylinders. For a desired target rotational steering travel of at least 270 degrees, coordinated movement of the two hydraulic cylinders or two electric actuators is necessary in order to maintain control of the steering as it goes "over center." It is noted steering position may be determined by measuring the length of the hydraulic cylinders and/or electric actuators.

It is noted the movement of the propulsion units 112 within a particular support structure 110 must be coordinated. For example, coordination between the propulsion units 112 may require, but is not limited to, measuring the angle of a propulsion unit 112, comparing the measured angle to the other propulsion unit 112, and guiding the other propulsion unit 112 within the support structure 110 based on the measured angle. It is noted the coordination between the one or more propulsion units 112 within the support structure 110 may create, but is not limited to, a "master-slave" relationship. For example, the angle of both propulsion unit 112 may be measured and compared, with each angle adjusted to achieve a desired angle.

In another embodiment, the field engagement unit 102 is configured to determine the location of a support structure 110 based on triangulation utilizing signals from near-field Wi-Fi, Bluetooth, RF, LoRa, or other local wireless communications. For example, the field engagement unit 102 may be configured to compare broadcasted signals from devices that are compared relative to one or more known fixed locations in or around the field to calculate location. It is noted the use of local wireless communications for triangulation allows for redundancy in the case the GPS broadcast fails or is obstructed enough to prevent precise position guidance.

In another embodiment, the field engagement unit 102 is configured to determine the location of a support structure 110 based on one or more sensors on the support structure 110 including, but not limited to, on-board vision systems, scanning lasers, and LIDAR. In this embodiment, the field engagement unit 102 is configured to utilize the one or more sensors to follow physical markers including, but not limited to, crop rows, edges of fields, or physical infrastructure.

In another embodiment, the field engagement unit 102 is configured to determine position of the support structure 110 via fiber optic lines. In this embodiment, fiber optics lines are strung between adjacent support structures 110 and the field engagement unit 102, through which light (e.g., sunlight or illumination from a light source coupled to the fiber optic line) passes. When the angle of the fiber optic line changes, the length of time that light travels through the fiber changes. In this regard, it is possible to measure the angle of one support structure 110 relative to an adjacent support structure 110, and is targeted as a replacement of limit switches.

In another embodiment, the field engagement unit 102 is configured to determine the location of a support structure 110 by sensing one or more electric cables buried in a field. In another embodiment, the field engagement unit 102 is configured to determine the location of a support structure 110 via one or more load cells incorporated into the support structure 110. In this embodiment, the load cells are configured to measure draft loads and vertical carrying loads of the particular support structure 110. The field engagement unit 102 is configured to limit the travel of a particular support structure 110 when a pre-defined load rating is measured, preventing the system from unnecessary wear that would occur if the support structure 110 were to continue to travel beyond the point the load rating was measured.

In another embodiment, the independently-actuatable steering units (e.g., one or more steering assemblies 500 and one or more propulsion units 112) in multiple field engagement units 102 allow for the transportation of the multiple field engagement units 102 in a train-like formation to another field. It is noted that the independent actuation of the steering units in each field engagement unit 102 would allow for navigation of tight turning situations, such as 90-degree turns when entering or exiting a roadway. In another embodiment, the field engagement units 102 are configured to compare the Global Positioning System (GPS) location of the other field engagement units 102 so as to monitor, modify, and keep spacing. In another embodiment, the field engagement units 102 are configured to compare the geo-spatial position of each support structure 110 in the one or more field engagement units 102 to a pre-planned route as defined in a proprietary or commercially-available virtual geo-spatial maps like Google Maps, Mapbox, Apple Maps, or the like.

In another embodiment, the field engagement unit 102 is configured to control its direction of travel via geo-spatial position in a given field to control the one or more propulsion units 112. In this embodiment, a control system is configured to utilize the GPS coordinate of the support structures 110 to accurately determine the position the propulsion units 112 under the support structures 110. Accurate positioning information obtained from each GPS receiver per support structure 110 allows the system to be positioned accurately according to a "prescription" or pre-programmed geo-spatial work order. In this regard, coordinated movement may be implemented where one or more field engagement units 102 are used simultaneously, including a range of coordinated movement based on a much greater set of movement angles than possible with center-pivot or lateral-move irrigation systems. In this regard, the field engagement unit 102 is able to steer itself according to where the field engagement unit 102 should be in a defined geo-space with respect to the other field engagement units 102.

In another embodiment, one or more work tool assemblies 114 with one or more imaging or environment-scanning tools are configured to provide the field engagement 102 environment data regarding the upcoming path. In this regard, the field engagement unit 102 may avoid field obstacles.

In one example, the angle of a particular steering assembly 500 may be adjusted. In this example, the local controller 130 may receive one or more sets of information such as, but not limited to, current angle relative to cross member 504, or current angle compared to one or more additional steering assemblies 500, and the like from the steering assembly 500. The local controller 130 may then determine what response is necessary based on the one or more sets of information (e.g., change the steering assembly angle to match the additional steering assemblies 500 angle; change both the steering assembly 500 angle and the additional steering assemblies 500 angle to match a new angle, and the like). The local controller 130 may then transmit the response to the particular steering assembly 500, or both the particular and the additional steering assemblies 500.

FIGS. 6A-13 illustrate the one or more work tool assemblies 114 of the field engagement unit 102 of system 100, in accordance with one or more embodiments of the present disclosure. It is noted herein that the various system embodiments, components and architecture described previously herein should be interpreted to extend to FIGS. 6A-13.

It is noted herein the field engagement unit 102 is configured to operate the one or more work tool assemblies 114 simultaneously. For example, the field engagement unit 102 may be configured to operate the one or more of the multiple work tool assemblies 114 in a synchronized manner. In this regard, traditional row-based management of a field is possible with the field engagement 102. By way of another example, one or more of the multiple work tool assemblies 114 may be configured to operate simultaneously and independently. In this regard, pick-and-place management of a field is possible with the field engagement unit 102. In another embodiment, the one or more work tool assemblies 114 of the field engagement 102 are configured with one or more attachments such that the field engagement unit 102 may continue to operate despite the failure of one or more work tool assemblies 114.

In one embodiment, the work tool assembly 114 includes one or more components. For example, the work tool assembly 114 may include a carrier component. For instance, the carrier component allows the work tool assembly 114 to travel along the work tool rail assembly 108. By way of another example, the work tool assembly 114 may include a work tool attachment. By way of another example, the work tool assembly 114 may include a robot or chassis component coupled to the carrier component and the work tool attachment. For instance, the chassis component positions the work tool attachment.

Figure 6A:
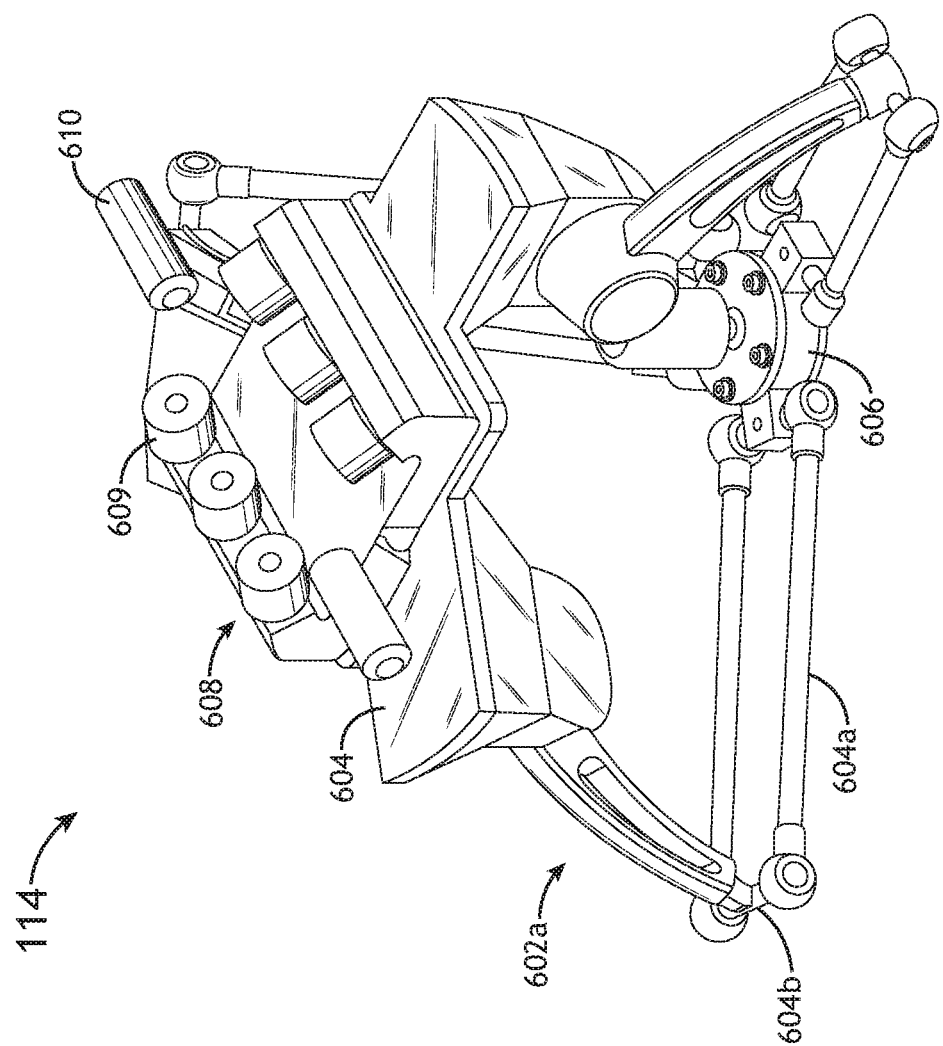
FIG. 6A illustrates a work tool assembly of a field engagement unit, in accordance with one or more embodiments of the present disclosure.
Figure 6B:
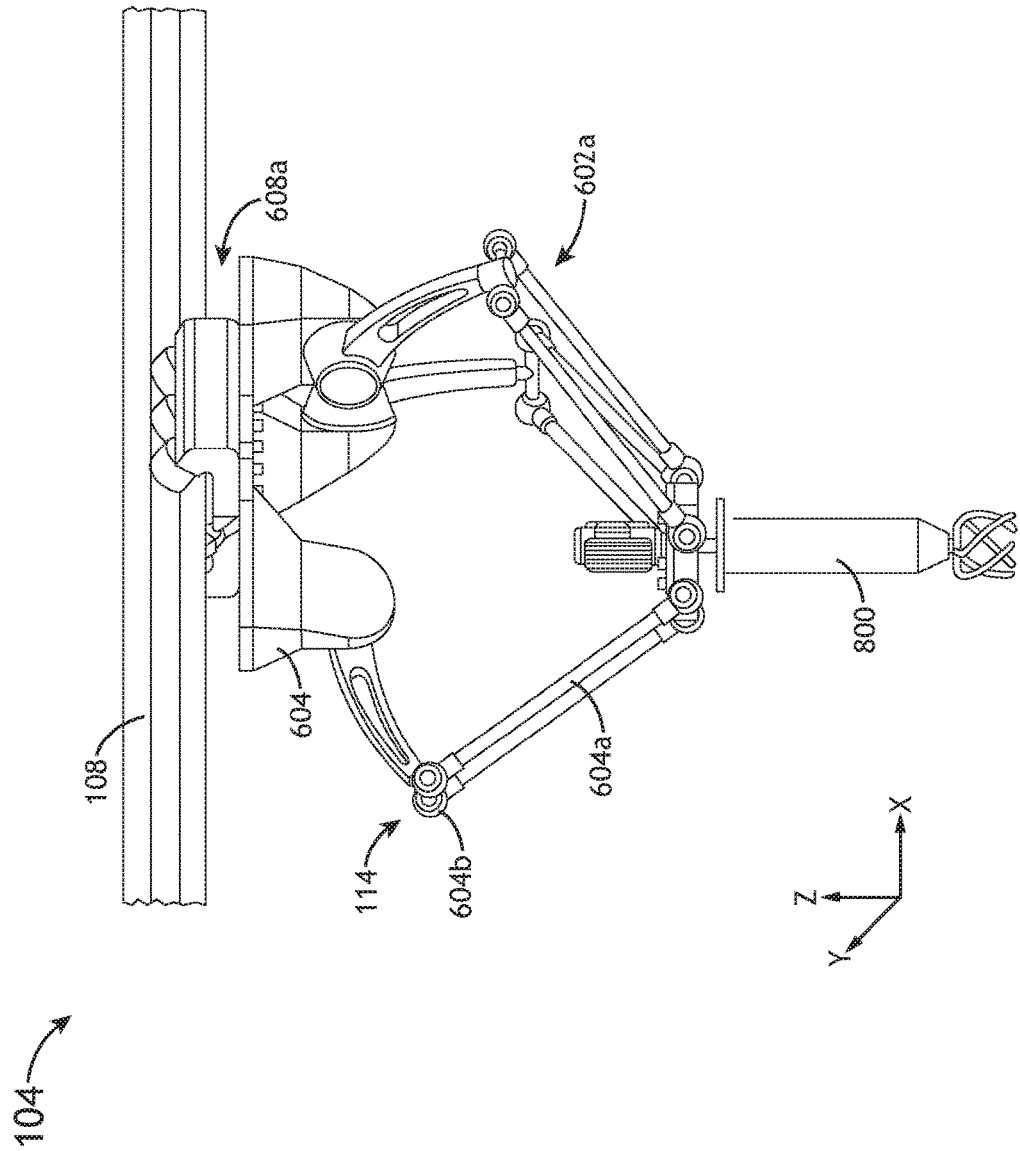
FIG. 6B illustrates a support assembly of a field engagement unit, in accordance with one or more embodiments of the present disclosure.
Figure 6C:
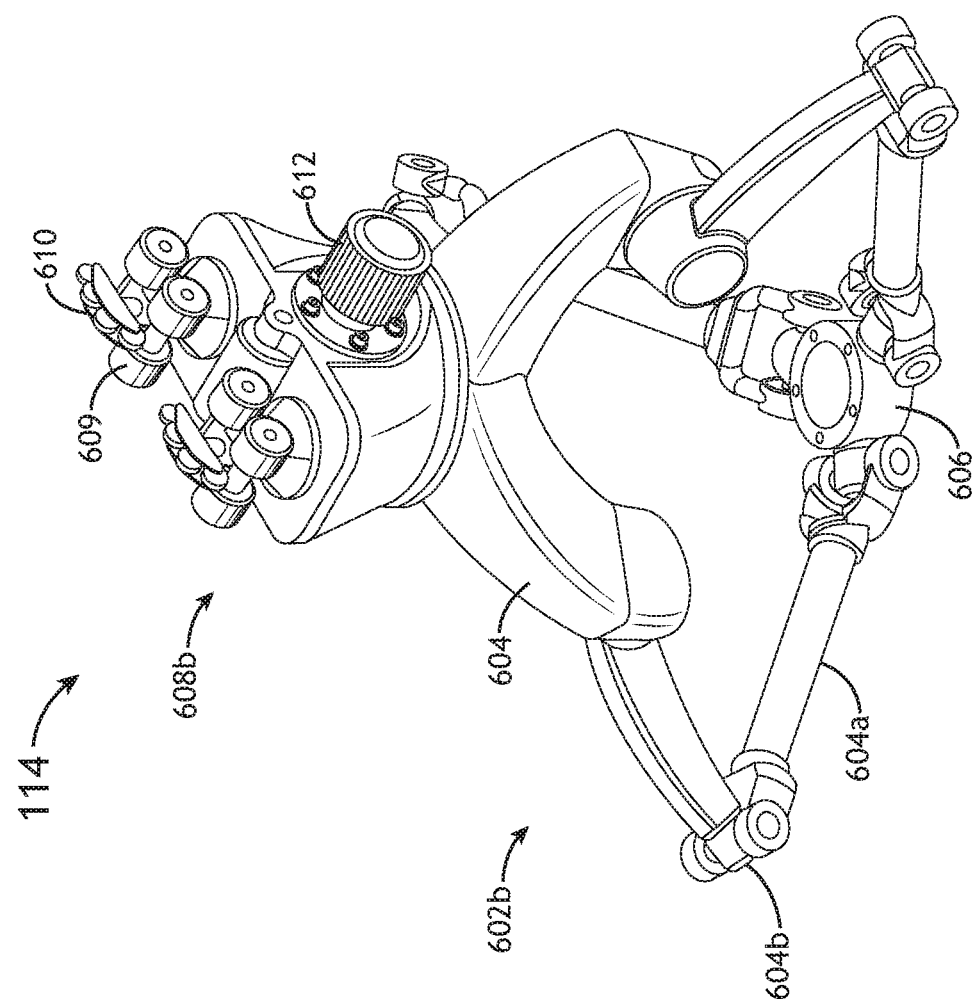
FIG. 6C illustrates a work tool assembly of a field engagement unit, in accordance with one or more embodiments of the present disclosure.

In another embodiment, as illustrated in FIGS. 6A and 6B, the work tool assemblies 114 includes a chassis 602a. In another embodiment, as illustrated in FIGS. 6C-6G, the work tool assemblies 114 include a chassis 602b. In another embodiment, the chassis 602a and 602b include one or more actuatable arms 604. For example, the arms 604 include one or more arm sections 604a. By way of another example, the arms 604 include one or more hinges 604b. By way of another example, the hinges 604b couple together one or more arm sections 604a.

In another embodiment, the chassis 602a and 602b are configured to linearly position a work tool attachment in one or more axes. For example, the work tool attachment may be positioned along a single axis (e.g., along the z-axis when raising and lowering). By way of another example, the work tool attachment may be positioned along a pair of axes (e.g., along the x- and y-axis when positioning on the work tool rail assembly 108). By way of another example, the work tool attachment may be positioned along three axes (e.g., along the x-, y-, and z-axes).

In another embodiment, the arms 604 are coupled to an attachment coupler or end effector 606. For example, the attachment coupler 606 may include a bearing assembly to which a work tool attachment couples, where the work tool attachment includes an electric motor. In this regard, the work tool attachments coupled to the one or more work tool assemblies 114 are configured to rotate around an axis (e.g., the z-axis). By way of another example, the attachment coupler 606 is a component of an electric motor to which the work tool attachment couples including, but not limited to, a motor shaft or a mount plate coupled to a motor shaft.

Figure 6D:
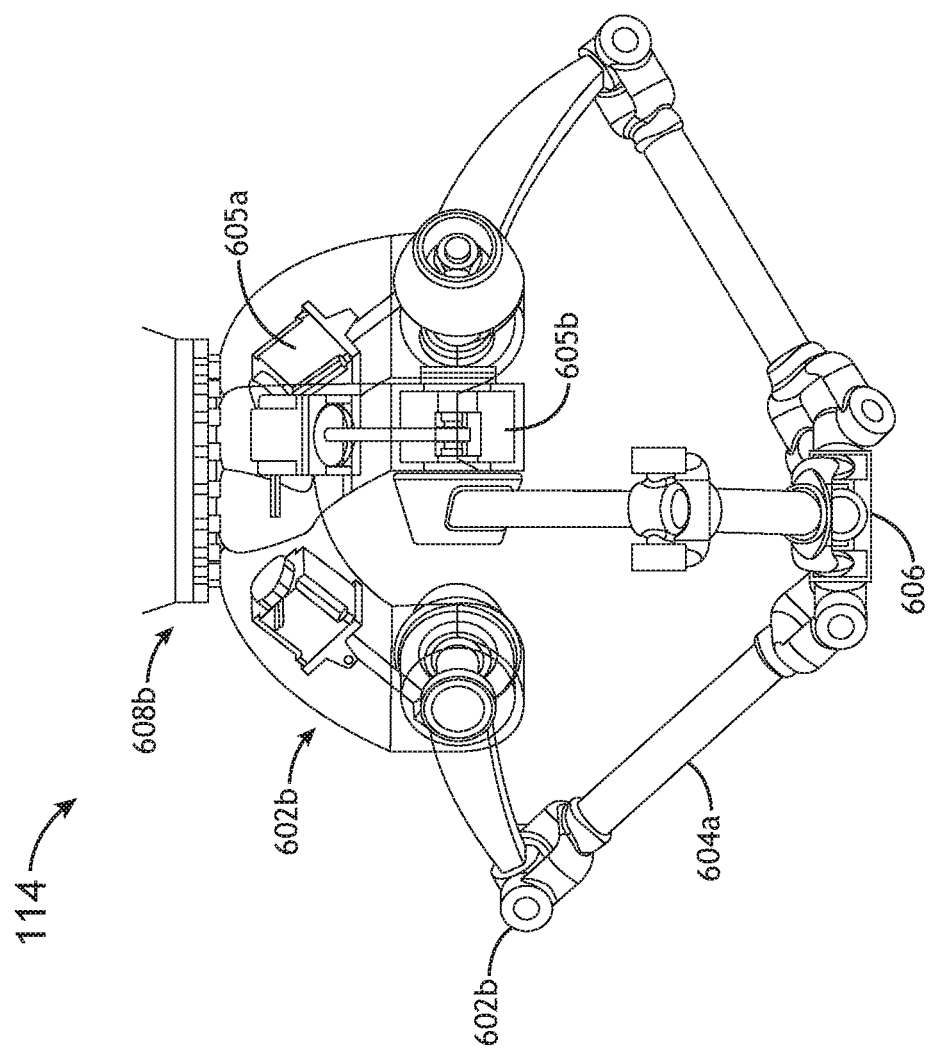
FIG. 6D illustrates a work tool assembly of a field engagement unit, in accordance with one or more embodiments of the present disclosure.

It is noted herein the field engagement unit 102 is configured to take one or more measurements of the one or more control system components of the one or more actuatable arms 604 of the one or more chassis 602. For example, the one or more measurements may include, but are not limited to, linear position of electric actuators 605a, rotary position of the electric actuators 605a and connected electrically-actuated joints 605b, voltage of electric actuators 605b, and amperage of electric actuators and motors 605a. By way of another example, the one or more measurements may include, but are not limited to, linear position of hydraulic lift cylinders, rotary position of hydraulic lift cylinders and connected hydraulically-actuated joints, and pressure of hydraulic lift cylinders and motors. By way of another example, the one or more measurements may include data for any pneumatically-actuated components of the chassis 602a and 602b. It is further noted herein the one or more chassis 602 may include any mechanical system components necessary to mechanically control the one or more actuatable arms 604. It is further noted herein the field engagement unit 102 is configured to take one or more measurements of an electric motor at the attachment coupler 606. For example, the one or more measurements include, but are not limited to, rotary position of the motor, voltage of the motor, and amperage of the motor. It is noted the actuators/motors 605a and joints 605b are illustrated in FIG. 6D. It is further noted herein the actuators/motors 605a may be hydraulically-powered, pneumatically-powered, or mechanically-powered.

In another embodiment, the chassis 602a and 602b are coupled to a carrier 608a or 608b, respectively. In another embodiment, the carriers 608a or 608b include one or more rollers 609. For example, the rollers 609 are actuated. In another embodiment, the carriers 608a or 608b include one or more conductor bars 610. For example, the conductor bars 610 may be a single conducting component. By way of another example, the conductor bars 610 may include one or more conducting plates attached to a conducting block (e.g. see FIG. 15D).

In another embodiment, the conductor bars 610 of a carrier 608a or 608b are configured to collect power to the other components of the work tool assembly 114, the power transferred from one or more power sources through the work tool rail assembly 108. For example, the conductor bars 610 may be configured to provide power to the one or more work tool assemblies 114 coupled to the carrier for operation of the one or more work tool attachments. In another embodiment, as discussed further herein, the conductor bars 610 of a carrier 608a or 608b are configured to transfer power to the other components on the field engagement unit 102, the power transferred to the other components on the field engagement unit 102 by the work tool rail assembly 108. For example, the conductor bars 610 may be configured to provide power generated by one or more power sources in one or more cradles coupled to the carrier.

It is noted the field engagement units 102 may be configured to take one or more measurements of the one or more control system components necessary to determine position of the one or more work tool assemblies 114 on the work tool rail assembly 108. For example, the one or more measurements may include, but are not limited to, one or more measurements from one or more linear readers along the work tool rails of the work tool rails assembly 114.

In another embodiment, the chassis 602b includes a motor 612. In another embodiment, the motor powers the single-drive wheel between the conducting plates, to provide propulsion along the work tool rail assembly 108. In this regard, actuation of the motor 612 moves the one or more work tool assemblies 114 along the work tool rail assembly 108.

Figure 6F:
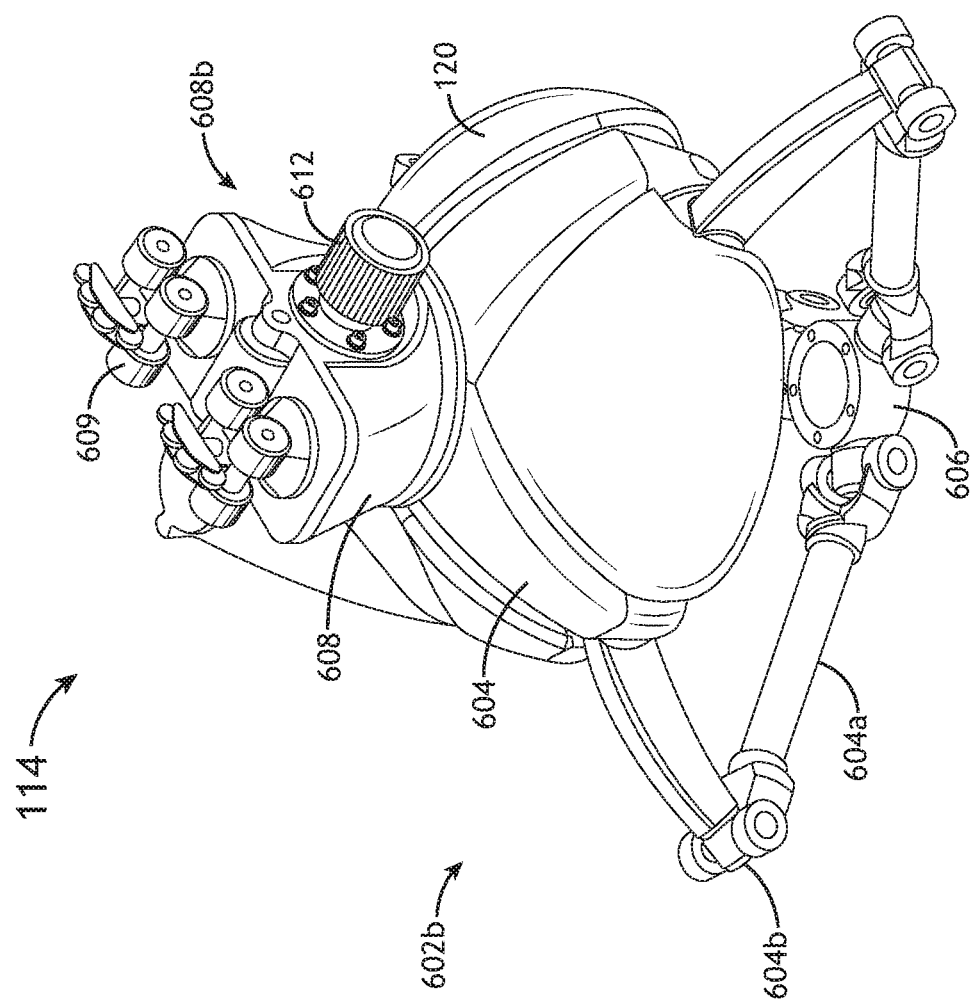
FIG. 6F illustrates a work tool assembly of a field engagement unit, in accordance with one or more embodiments of the present disclosure.
Figure 7B:
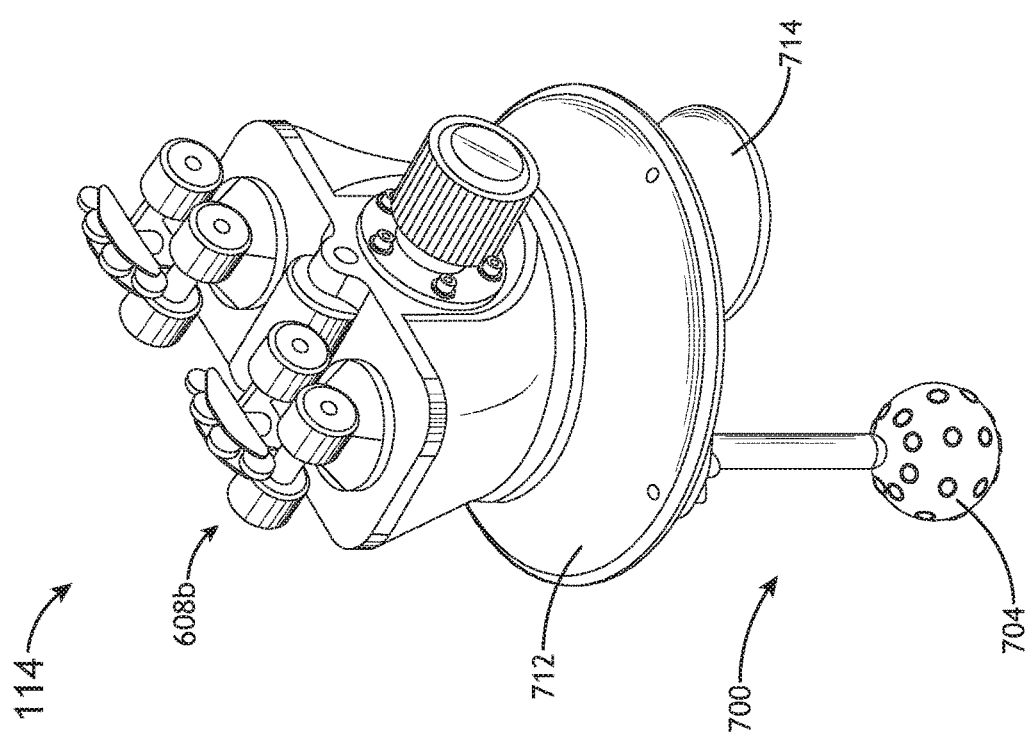
FIG. 7B illustrates a work tool assembly of a field engagement unit, in accordance with one or more embodiments of the present disclosure.
Figure 7C:
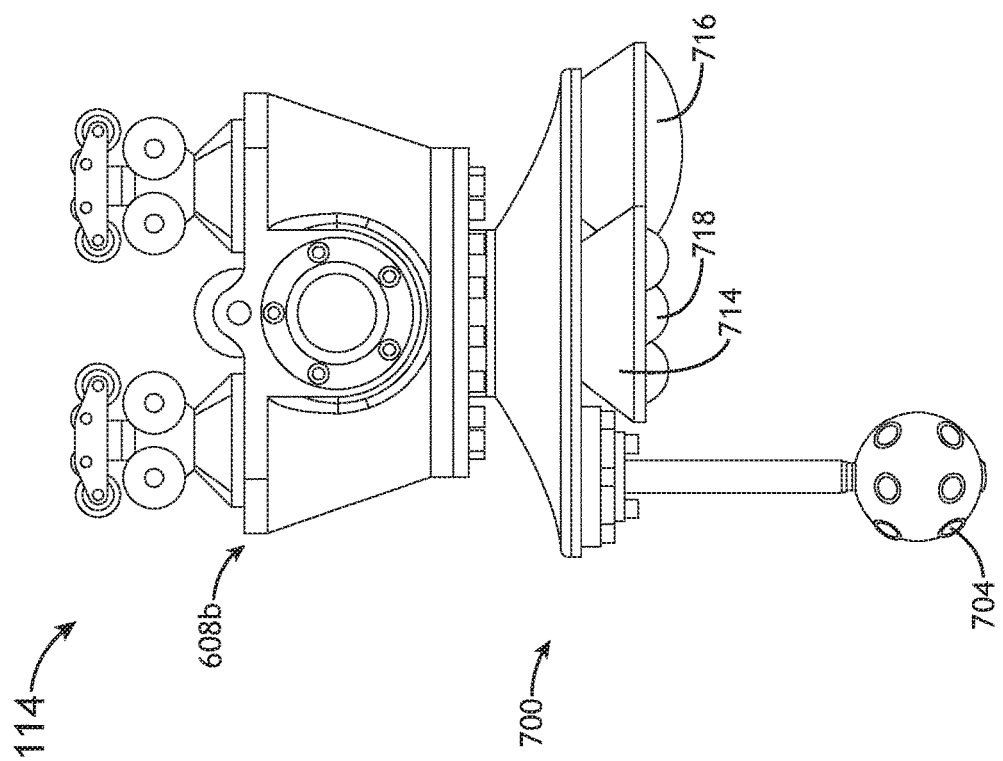
FIG. 7C illustrates a work tool assembly of a field engagement unit, in accordance with one or more embodiments of the present disclosure.
Figure 7D:
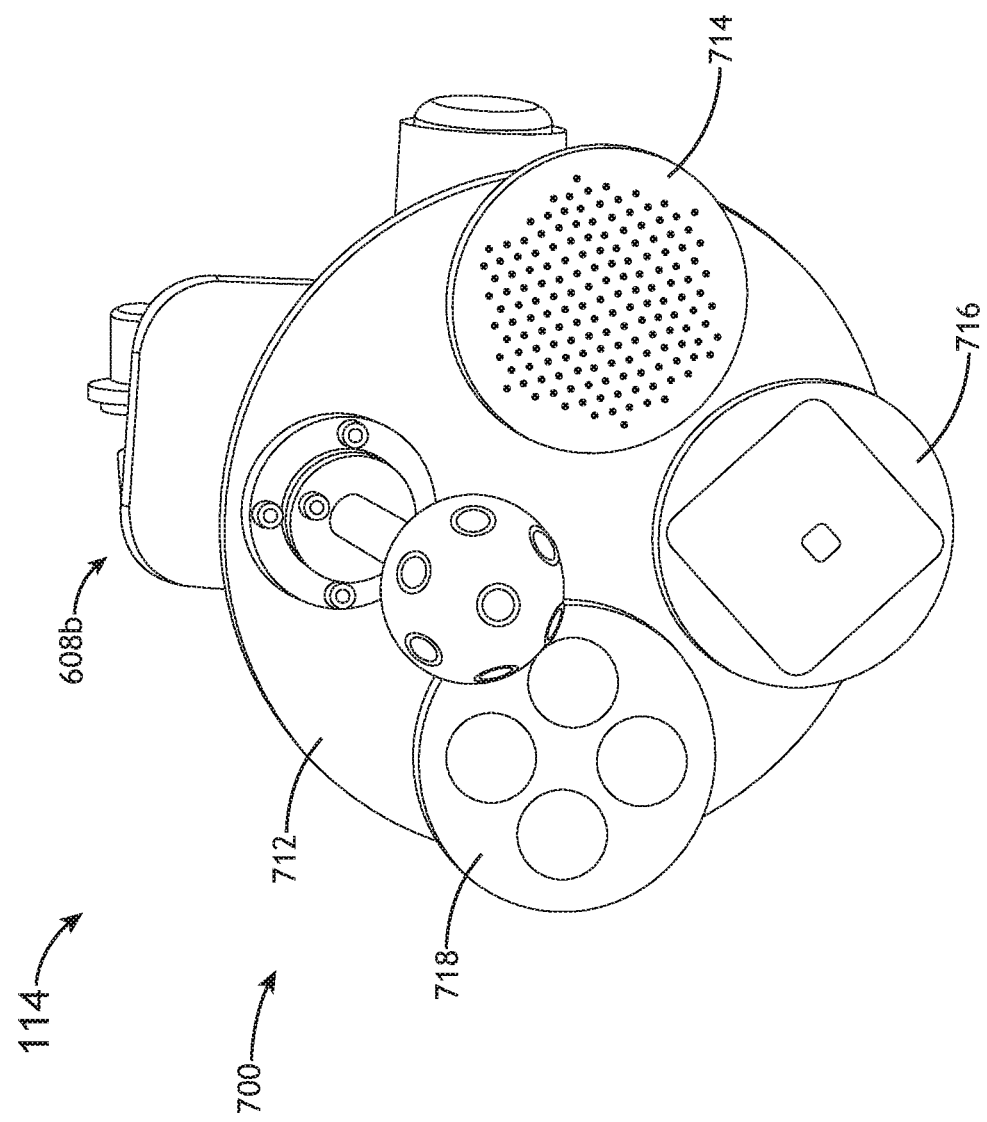
FIG. 7D illustrates a work tool assembly of a field engagement unit, in accordance with one or more embodiments of the present disclosure.

In another embodiment, as illustrated in FIG. 6F, the work tool chassis 602b includes a material storage container 120. In another embodiment, function of the material storage container 120 depends on the function of the respective work tool. The material storage container 120 is described in detail further herein.

In another embodiment, as illustrated in FIG. 6G, the work tool assembly 114 includes a chassis 602c. In another embodiment, either of the carriers 608a or 608b may be coupled to the chassis 602c. In another embodiment, the chassis 602c includes one or more actuatable arms 604. For example, the arms 604 include one or more arm sections 604a. By way of another example, the arms 604 include one or more hinges 604b. By way of another example, the hinges 604b couple together one or more arm sections 604a. In another embodiment, the chassis 602c is coupled to a work tool attachment.

It is noted herein that although embodiments of the present disclosure are directed to chassis 602a and 602b and carriers 608a and 608b being coupled together respectively, that any combination of the chassis and carriers are possible. Therefore, the above embodiments should not be interpreted as a limitation on the present invention but merely an interpretation.

It is further noted herein that although embodiments of the present disclosure are directed to a work tool assembly 114 having carrier, chassis, and attachment components, that one or more components may be missing. For example, the work tool attachments may be coupled directly to the carrier.

In one example, the orientation of the work tool attachment in a work tool assembly 114 may be adjusted. In this example, the local controller 130 may receive one or more sets of information such as orientation of the work tool attachment relative to the x-y-z axes of the field engagement unit 102 from the work tool assembly 114. The local controller 130 may then determine what response is necessary based on the one or more sets of information (e.g. alter one or more of the x-y-z axes positions of the work tool assembly 114 to reach a desired orientation). The local controller 130 may then transmit the response to the work tool assembly 114.

It is noted herein the work tool attachments of the work tool assembly 114 may include attachments 700, 800, 900, 1000, 1020, 1040, 1100, 1120, 1140, 1200, 1300, or any other attachment of the present disclosure.

In one embodiment, as illustrated in FIGS. 7A-7D, the one or more work tool assemblies 114 include one or more plant phenotyping attachments 700. For example, the attachment 700 may be a plant phenotyping attachment. By way of another example, the attachment 700 may be an animal phenotyping attachment. In another embodiment, the phenotyping attachment 700 mechanically couples to the chassis 602 via a mount plate 702. For example, the plant phenotyping attachment 700 may be coupled to the attachment coupler 606 of the chassis 602 via the mount plate 702. For instance, the mount plate 702 may couple to the attachment coupler 606 in such a way so as to prevent rotation of the plant phenotyping attachment 700 about the z-axis. By way of another example, the mount plate 702 may couple to the attachment coupler 606 in such a way so as to allow rotation of the plant phenotyping attachment 700 about the z-axis, the z-axis illustrated in FIGS. 6B and 6E.

In another embodiment, the plant phenotyping attachment 700 includes one or more agronomy imaging attachments 704. In another embodiment, the one or more agronomy imaging attachments 704 includes one or more vision systems 706. For example, the one or more vision systems 706 may include, but are not limited to, visible light, hyperspectral, thermal, color-sensing, or distance-sensing vision systems. In another embodiment, the one or more vision systems 706 are configured to observe a set range of vision. For instance, the one or more vision systems 706 may be configured to observe a spherical 360-degree range. Alternatively, the one or more vision systems 706 may be configured to observe a hemispherical, 180-degree range. Phenotyping measurement and selection is described generally in U.S. Patent Publication No. 2015/0015697, published on Jan. 15, 2015, which is incorporated herein by reference in the entirety.

In another embodiment, the one or more vision systems 706 are configured to automatically capture one or more images of one or more crops. For example, the images may be used independently. By way of another example, the images be stitched together to form a multi-dimensional view of a field. In this regard, an otherwise unreviewable field due to the nature of the field and/or the surrounding environment may allow for a remote walkthrough of the field by a user. In another embodiment, the captured one or more images of the one or more crops include one or more crop features. For example, the one or one crop features captured in the one or more images may include, but are not limited to, crop color for the purpose of proactively applying nutrients; pest locations for the purpose of identifying the pest and proactively applying insecticides; fungus locations for the purpose of identifying the fungus and proactively applying fungicides; and weeds for the purpose of identifying the weed and proactively guiding a mechanical weeding and/or herbicide-spraying attachment. By way of another example, the captured one or more images of the one or more crops include one or more images of harvest product through the unharvested crop canopy for the purpose of predicting crop yield on a nearly real-time basis. It is noted the captured one or more images may be processed in conjunction with specific GPS information to generate variable rate maps for one or more of fertilizer, herbicide, fungicide, insecticide, and irrigation application.

It is noted herein the plant phenotyping attachment 700 has the unique ability to be lowered underneath a crop's canopy for the purpose of obtaining images and/or data that may be used to remotely monitor the field for emerging problems with the crop (e.g. weeds, insect infestations, fungus that can damage crops). Additionally, it is noted herein the plant phenotyping attachment 700 may be used to remotely monitor for the crops' maturity (e.g. comparing plants' size, shape, seeds, root structure, color, etc. to those ideal characteristics that could be exhibited in ideal laboratory conditions).

It is further noted herein the phenotyping attachment 700 has the ability to employ artificial light, in the form of halogen, incandescent, LED, or other light sources, in order to be used in both night and day applications. In the case of day applications, the artificial light can be used to eliminate shadows, while also allowing the unit to be used underneath the crop canopy. In another embodiment, the agronomy imaging tool 704 is coupled to the mount plate 702 via a shaft 708. For example, the shaft 708 may be of a fixed length. By way of another example, the shaft 708 may include one or more extendable and/or retractable portions.

In another embodiment, the plant phenotyping attachment 700 includes one or more cleaning assemblies 710. In another embodiment, the one or more cleaning assemblies 710 are separate components from the agronomy imaging attachment 704. For example, the one or more cleaning assemblies 710 may be configured to clean the one or more vision systems 706. For instance, the one or more vision systems 706 may be configured to rotate in front of a fixed one or more cleaning assemblies 710. Alternatively, the one or more cleaning assemblies 710 may be configured to rotate around a fixed one or more vision systems 706. In another embodiment, the one or more cleaning assemblies 710 are coupled to the agronomy imaging attachment 704. In this embodiment, the agronomy imaging tool is self-cleaning.

In another embodiment, the plant phenotyping attachment 700 includes one or more additional phenotyping devices 714, 716, and 718. For example, the one or more additional phenotyping devices 714, 716, and 718 are configured to gather valuable agronomic data including, but not limited to, NDVI readings (Normalized Difference Vegetation Index), VNIR readings (Visible and Near Infrared), IR readings (Infrared), VIS readings (Visible Intensity Spectrum), PSII readings (Photosystem II, or water-plastoquinone oxidoreductase), laser and/or radar height scanning readings for determining the height of a plant, crop, or measuring the position of ground relative to the work tool and/or platform, $CO_2$ readings, thermal readings, hyperspectral readings. It is noted NDVI is a graphical indicator that can be used to analyze remote sensing measurements for the purpose of determining if the target contains live green vegetation). It is further noted Photosystem II (or water-plastoquinone oxidoreductase) is the first protein complex in the light-dependent reactions of oxygenic photosynthesis, which is located in the thylakoid membrane of plants, algae, and cyanobacteria). It is further noted hyperspectral readings are often used to obtain the spectrum for each pixel in an image, for the purpose of finding objects, identifying materials, or detecting processes.

In another embodiment, the one or more additional phenotyping devices 714, 716, and 718 are coupled directly to the mount plate 702. In another embodiment, the one or more additional phenotyping devices 714, 716, and 718 are coupled to the mount plate 702 via a shaft. For example, the shaft may be of a fixed length. By way of another example, the shaft may include one or more extendable and/or retractable portions.

In one embodiment, the one or more work tools may continually acquire scans of a given field throughout the growing season. In another embodiment, the scans are able to be frequently and with a precision down to the plant level, to proactively impact plant yields in that same growing season. It is noted here that the collected sets of information can be viewed in a number of ways. For example, the collected sets of information may be received and remotely viewed by a user. For instance, the user remotely viewing the sets of information may analyze the sets of information, determine one or more actions, and transmit the one or more actions to the one or more components of the field engagement unit 102. By way of another example, the collected data may be processed on-board by each field engagement unit 102. By way of another example, the collected data may be processed in the cloud and determined responses transmitted to each field engagement unit 102 for implementation of pre-programmed instructions.

In one embodiment, as illustrated in FIGS. 8A-8E, the one or more work tool assemblies 114 include one or more weeding attachments 800. In one embodiment, the weeding attachment 800 mechanically couples to the chassis 602 via the attachment coupler 606. In another embodiment, the weeding attachment 800 includes a motor 802.

Figure 8A:
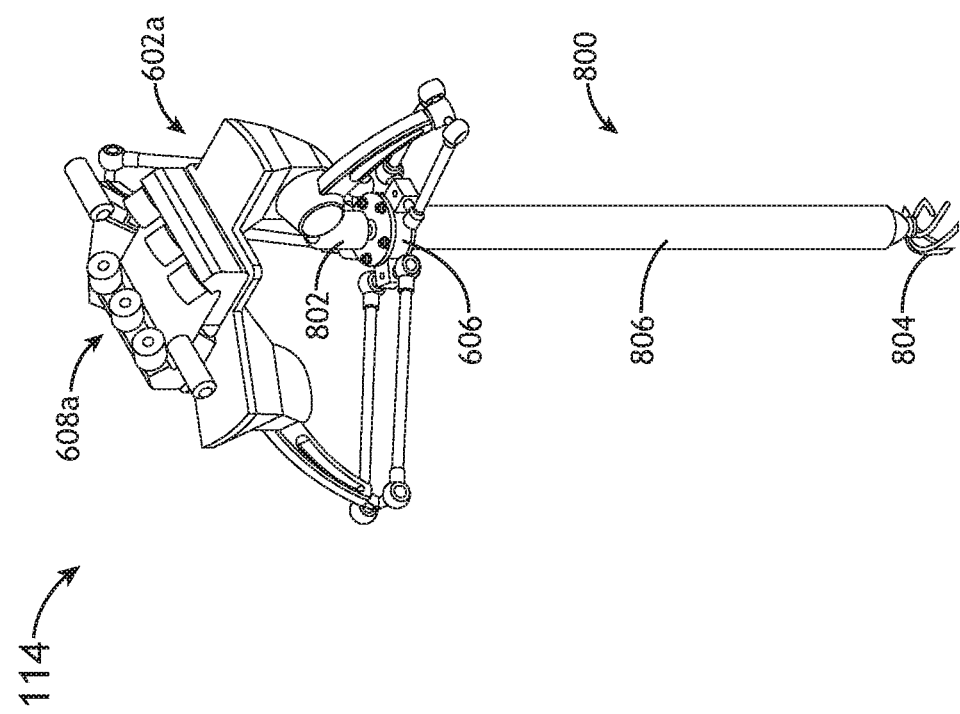
FIG. 8A illustrates a work tool assembly of a field engagement unit, in accordance with one or more embodiments of the present disclosure.
Figure 8B:
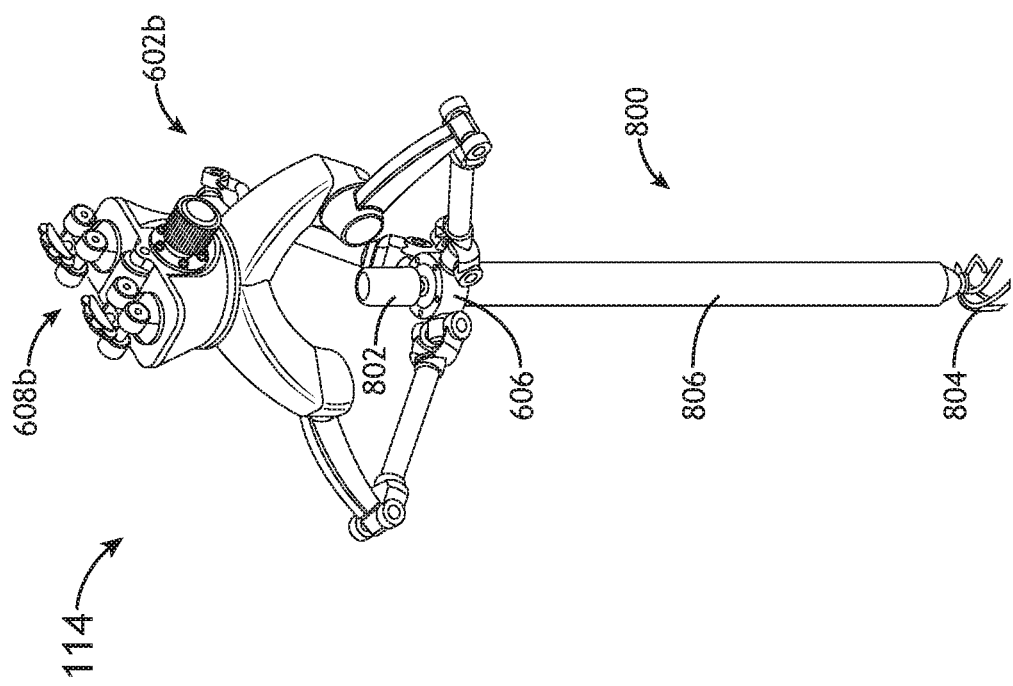
FIG. 8B illustrates a work tool assembly of a field engagement unit, in accordance with one or more embodiments of the present disclosure.
Figure 8C:
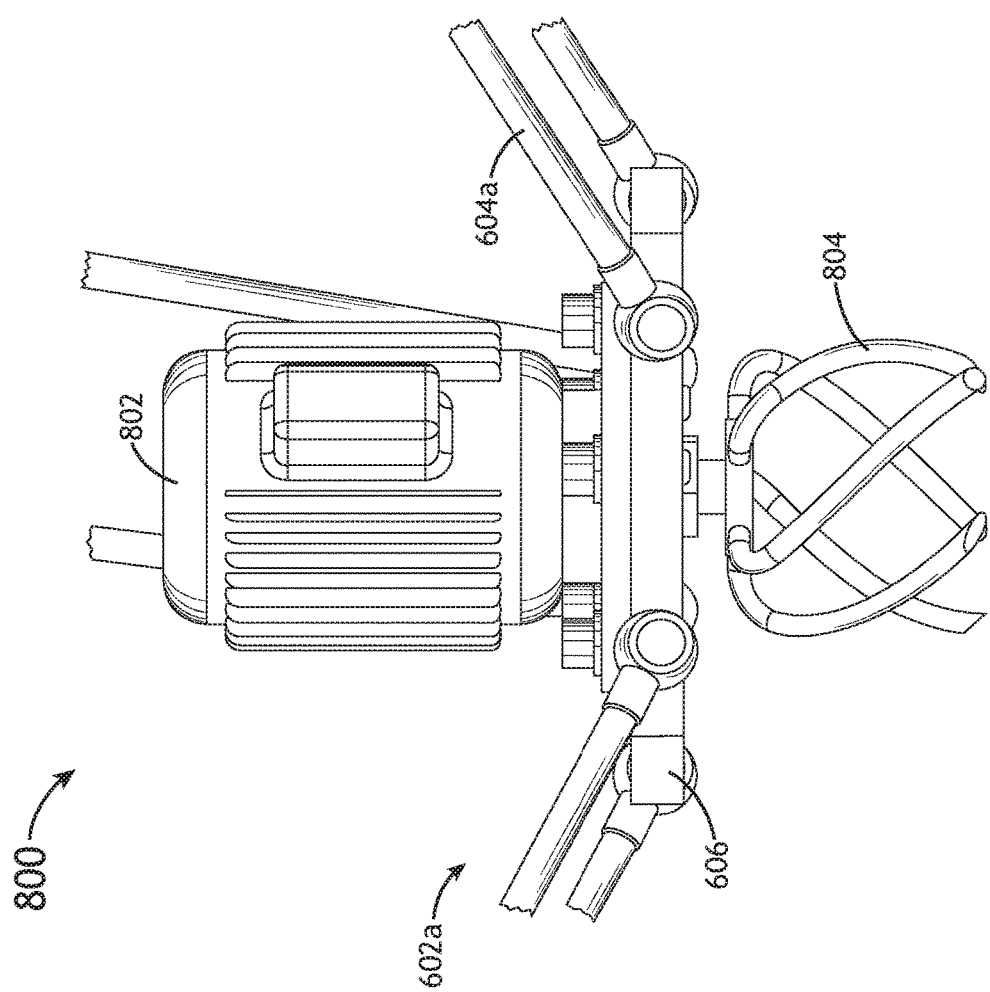
FIG. 8C illustrates a weeding attachment of a field engagement unit, in accordance with one or more embodiments of the present disclosure.
Figure 8E:
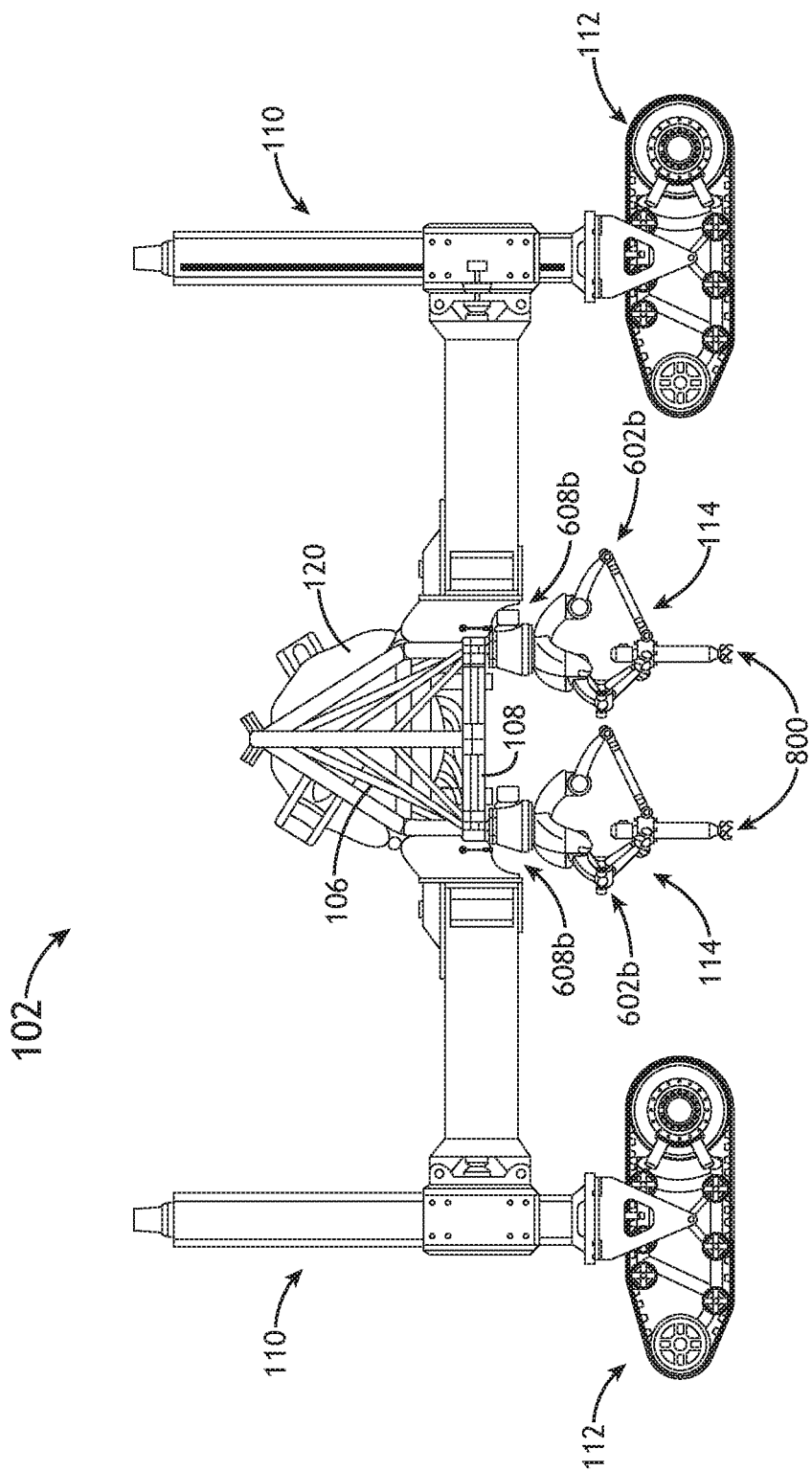
FIG. 8E illustrates a field engagement unit, in accordance with one or more embodiments of the present disclosure.

In another embodiment, as illustrated in FIGS. 8A-8C, the weeding attachment 800 includes a ground-engaging portion 804. For example, the ground-engaging portion 804 may include one or more tines. For instance, the one or more tines may either be curved or straight. Additionally, the one or more tines may be fixed or configured to be independently actuatable (e.g., have one or more joints). In another embodiment, the ground-engaging portion 804 is coupled directly to the motor 802. In another embodiment, the ground-engaging portion 804 is coupled to the motor 802 via a shaft 806. For example, the shaft 806 may be of a fixed length. By way of another example, the shaft 806 may include one or more extendable and/or retractable portions.

In another embodiment, as illustrated in FIG. 8D, the field engagement unit 102 is configured to implement one or more work tool assemblies 114 with a weeding attachment 800 for a number of tilling and cultivation processes. For example, the field engagement unit 102 may be configured to implement the weeding attachment 800 to prepare seed beds prior to seed planting. By way of another example, the field engagement unit 102 may be configured to implement the weeding attachment 800 to remove multiple weeds in a tilling motion, where at least a portion of the field can be tilled. By way of another example, the field engagement unit 102 may be configured to implement the weeding attachment 800 to remove singled-out weeds in a targeted pick-and-pull motion. For instance, the field engagement unit 102 may be configured to observe one or more weeds via the one or more plant phenotyping attachments 700. Additionally, the field engagement unit 102 may be configured to direct the weeding attachment 800 to remove the observed one or more weeds. By way of another example, the field engagement unit 102 may be configured to implement the weeding attachment 800 to remove excess plants, whether intentionally overplanted (e.g., lettuce plants and seed corn) or accidentally (e.g. spilled seed product) planted.

It is further noted herein the weeding attachment 800 is capable of rotating opposite the initially-traveled rotation direction to expel material that may be lodged between the one or more tines of a ground-engaging portion 804.

Although the above embodiments illustrate the weeding attachment 800 with a claw-like device, it is noted the weeding attachment 800 may remove weeds via alternate methods. In one embodiment, as illustrated in FIG. 8D, the weeding attachment 800 is a spade 808 on a shaft 810. For example, the spade is deployed and pulled while underground to cut off weed roots. In another embodiment, the weeding attachment 800 includes one or more components necessary to implement high-pressure water. In another embodiment, the weeding attachment 800 includes one or more components necessary to implement steam.

In another embodiment, the weeding attachment 800 is configured to apply a foam barrier impenetrable to weed growth. For example, the weeding attachment 800 may be configured to apply the foam barrier by applying an impenetrable layer of weed foam to the top of the ground, where the artificial layer of weed foam is impenetrable by weeds but may be infiltrated by water. For instance, the artificial layer of weed-resistant foam may be an organic substance including, but not limited to, a starch and/or protein-based organic foam product. Additionally, the foam product may be mixed with water, either beforehand or at the time of application. By way of another example, the artificial layer of weed-resistant foam is able to break down and be absorbed into the soil over a period of time. It is noted the foam barrier remains intact long enough to ensure the planted crop is able to provide canopy protection against weeds by minimizing levels of sunlight.

In another embodiment, the weeding attachment 800 is configured to spray herbicide or fungicide to remove weeds. For example, the weeding attachment may be configured to apply herbicide or fungicide to the weeds in a targeted manner. For instance, the field engagement unit 102 may be configured to observe one or more locations in the field as having one or more weeds via the one or more plant phenotyping attachments 700. Additionally, the field engagement unit 102 may be configured to direct the weeding attachment 800 to apply herbicide or fungicide to the one or more locations having one or more weeds. Further, the application of herbicide, fungicide, or insecticide may be applied using one or more than one work tools or via a bar with a series of nozzles. In the case of the bar with nozzles, it is possible to utilize segments for which a valve can turn the bar segment on or off together. Further, each nozzle may include with a valve to turn it on or off depending on the feedback from the one or more phenotyping attachments 700. In this regard, continuous and real-time spraying may occur without the need for broadcast application of herbicides and fungicide. It is noted herein the above embodiment may be implemented in the application of pesticides.

In another embodiment, the weeding attachment 800 is configured to remove weeds via laser beams, flames, or concentrated solar beams.

In another embodiment, one or more of herbicide, fungicide, or pesticide is stored on the one tool 114 with weeding attachment 800 in a material storage container 120.

Figure 9B:
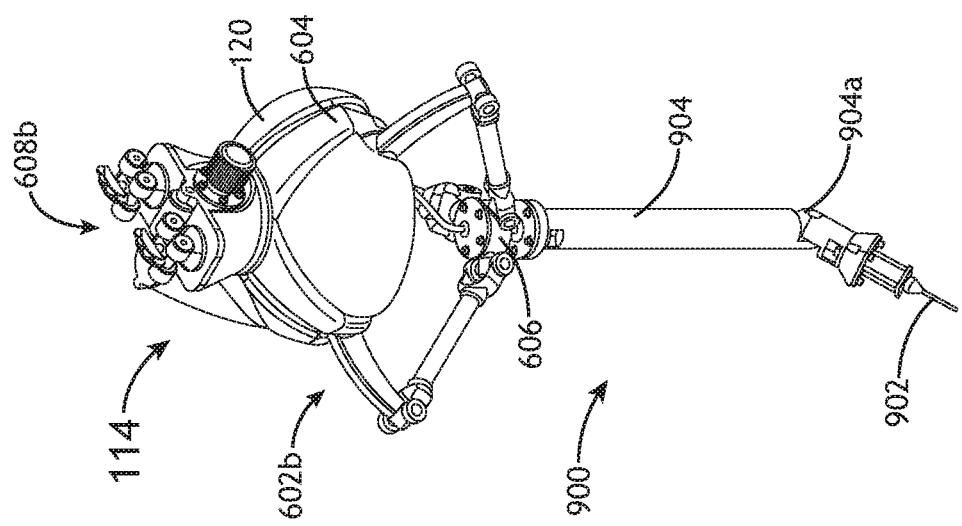
FIG. 9B illustrates a work tool assembly of a field engagement unit, in accordance with one or more embodiments of the present disclosure.
Figure 9A:
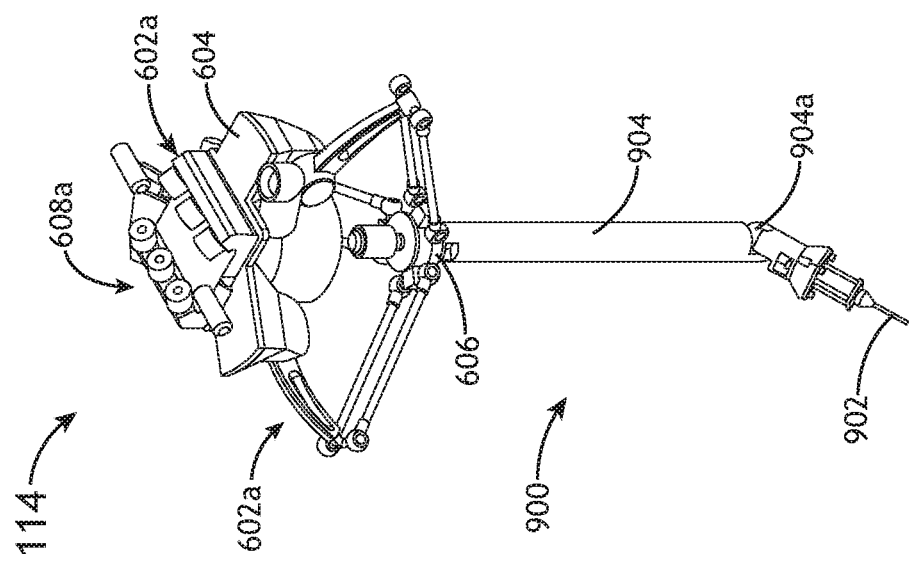
FIG. 9A illustrates a work tool assembly of a field engagement unit, in accordance with one or more embodiments of the present disclosure.

In one embodiment, as illustrated in FIGS. 9A and 9B, the one or more work tool assemblies 114 include one or more nutrient application attachments 900. In one embodiment, the nutrient application attachment 900 is coupled to the chassis 602a. For example, the nutrient application attachment 900 is coupled to the chassis 602a via the attachment coupler 606. In another embodiment, the nutrient application attachment 900 includes a nutrient applicator 902. For example, the nutrient applicator 902 may be an injection nozzle for in-ground applications. By way of another example, the nutrient applicator 902 may be a narrow-width spray nozzle for directed applications. By way of another example, the nutrient applicator 902 may be a wide-mouth spray nozzle for broadcast or variable-rate applications. In another embodiment, the nutrient application attachment 900 includes a shaft 904 coupled to the nutrient applicator 902. For example, the shaft 904 may be of a fixed length. By way of another example, the shaft 904 may include one or more extendable and/or retractable portions. In another embodiment, the shaft 904 is coupled to the nutrient applicator 904 via an actuatable joint 904a.

In another embodiment, the nutrient application attachment 900 is configured to apply plant-specific macro nutrients (e.g., N, P, K, and trace materials such as B and Zn) to the soil based on the determined requirements of the soil. For example, potassium (K) is utilized to assist in the movement of water, carbohydrates, and nutrients in crop tissue. In another embodiment, the nutrient application attachment 900 is configured to apply plant-specific micro nutrients (e.g., Zn, S, and Cu) to the soil. In another embodiment, the nutrient application attachment 900 is configured to apply dry nutrient compounds including, but not limited to, lime and potash. For example, lime is utilized to increase soil pH. By way of another example, potash is utilized to stimulate early growth, increase protein production, improve the efficiency of water use, improve alfalfa growth, and increase crop resistance to disease and insects. In another embodiment, the nutrient application attachment 900 is configured to apply water to the soil. In another embodiment, the nutrient application attachment 900 is configured to apply fertilizer to the soil. For example, the nutrient application attachment 900 may apply liquid fertilizer to the soil. By way of another example, the nutrient application attachment 900 may apply dry fertilizer to the soil.

In one example, the nutrient application attachment 900 is configured to apply fertilizer and/or nutrients to the soil in targeted locations. In this example, the local controller 130 may receive one or more sets of information such as, but not limited to, one or more images and/or an operational parameter (e.g. one or more soil core/measurement tests, discussed in detail further herein from a work tool with a soil coring and measurement attachment 1040). The local controller 130 may then determine what response is necessary based on the one or more sets of information (e.g. apply nutrients in an increased amount to the specific problem sites). The local controller 130 may then transmit the response to nutrient application attachment 900 to apply nutrients and/or fertilizer to the one or more deficient locations. In this regard, continuous and real-time application of nutrients and/or fertilizer may occur without the need for broadcast application of nutrients and/or fertilizer. For instance, applying nutrients to targeted locations may minimize input costs, minimize nutrient run-off, and minimize leaching through a respective soil type.

In another embodiment, one or more of nutrients, fertilizer, or water is stored on the one tool 114 with nutrient application attachment 900 in a material storage container 120.

It is further noted herein the nutrient application attachment 900 may be re-purposed as a high-pressure water sprayer. In this regard, the nutrient application attachment 900 may be implemented to remove weeds.

It is noted herein the nutrient applicator attachment 900 may apply nutrients based on one or more sets of information that have been measured using soil coring attachment(s) 1000 and/or soil measurement attachment(s) 1020, described in detail further herein. For example, the nutrient applicator attachment 900 may be provided with a different mix of nutrients based on the analyzed soil condition when applying nutrients. It is further noted herein the nutrient applicator attachment 900 may be controlled so as to apply nutrients simultaneously with adjacent work tool assemblies 114 including nutrient applicator attachments 900, mechanical weeding attachments 800, and phenotyping scanning attachments 700. It is further noted the nutrient applicator attachment 900 may be controlled so as to apply different nutrient mixes in consecutive applications with the same work tool assembly 114. For example, the nutrient applicator attachment 900 may apply mix A, then mix B, then mix A in consecutive order. By way of another example, any combination, order, or number when applying nutrient mixes is possible.

In one embodiment, as illustrated in FIGS. 10A-10H, the one or more work tool assemblies 114 include one or more attachments for soil coring and soil nutrient measurement. In one embodiment, the one or more attachments for soil coring and nutrient measurement collect samples for later processing by an off-site laboratory or mobile field laboratory. For example, the attachments for soil coring and soil nutrient measurement may store a collected sample within the tool (e.g. a single-capacity chamber). By way of another example, the attachments for soil coring and soil nutrient measurement may store collected samples within the material storage container 120 coupled to the work tool chassis 602*b*. By way of another example, the attachments for soil coring and soil nutrient measurement may store the collected samples within the material storage containers 120 in the support frame 106, or within the material storage containers 120 coupled to the one or more support structures 110. In another embodiment, the attachments for soil coring and nutrient measurement collects one or more samples and analyzes them onboard the work tool assembly 114 (or the field engagement unit 102).

Figure 10B:
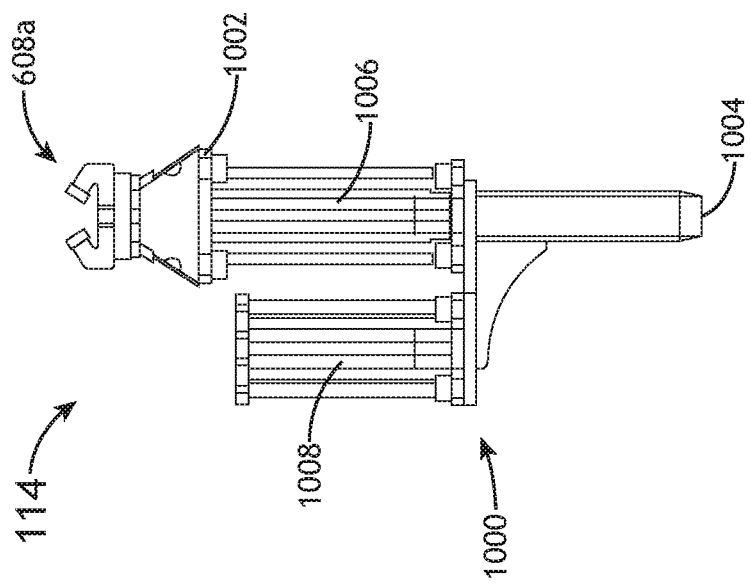
FIG. 10B illustrates a work tool assembly of a field engagement unit, in accordance with one or more embodiments of the present disclosure.
Figure 10A:
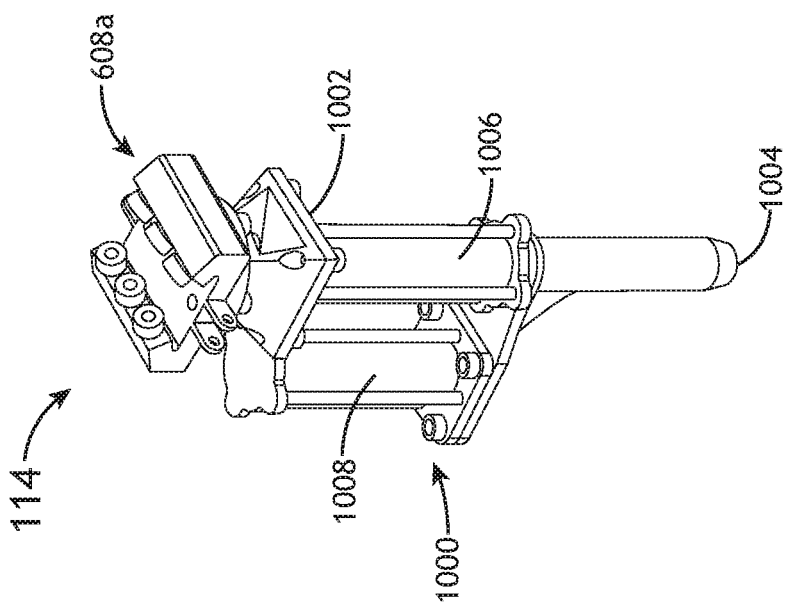
FIG. 10A illustrates a work tool assembly of a field engagement unit, in accordance with one or more embodiments of the present disclosure.
Figure 10D:
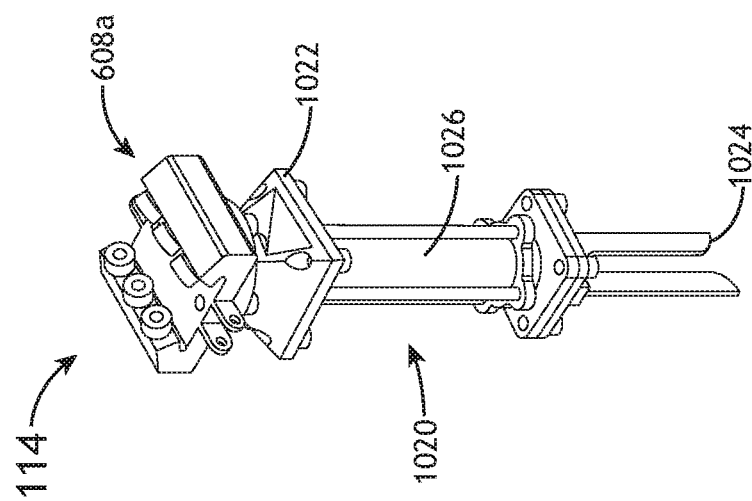
FIG. 10D illustrates a work tool assembly of a field engagement unit, in accordance with one or more embodiments of the present disclosure.
Figure 10C:
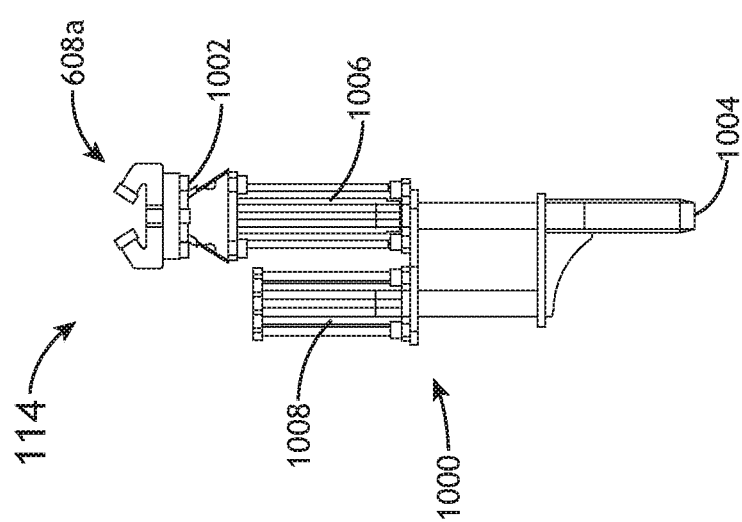
FIG. 10C illustrates a work tool assembly of a field engagement unit, in accordance with one or more embodiments of the present disclosure.

In one embodiment, as illustrated in FIGS. 10A-10C, the work tool assemblies 114 include a soil coring attachment 1000. In another embodiment, the soil coring attachment 1000 is coupled to the work tool chassis 602 via a mount plate 1002. For example, the soil coring attachment 1000 may be coupled to the attachment coupler 606 of the work tool chassis 602 via the mount plate 1002.

In another embodiment, the soil coring attachment 1000 includes a soil-sampling port 1004 at one end of a first cylinder 1006. For example, the first cylinder 1006 may be of a fixed length. By way of another example, the cylinder 1006 may include one or more extendable and/or retractable portions. In another embodiment, the soil coring attachment 1000 includes a second cylinder 1008. For example, the cylinder 1006 may include one or more extendable and/or retractable portions By way of another example, the first cylinder 1006 may be of a fixed length. However, it is noted this would require the support assembly 104 to raise or lower to have the soil coring attachment 1000 make contact with the ground.

In another embodiment, the first cylinder 1006 is configured to cause the sampling port 1004 to penetrate the soil and capture a soil core. For example, cylinder 1008 may extend to open the sampling port 1004. Cylinder 1006 may then extend to cause the sampling port 1004 to penetrate the soil. Cylinder 1006 may then retract to remove the core sample within the cylinder 1008 to be analyzed.

In another embodiment, the second cylinder 1008 is configured to cause the sampling port 1004 to eject the captured soil core. For example, the captured soil core may be ejected into a material storage container 120 separate from or coupled to the field engagement unit 102 for later analysis. By way of another example, the captured soil core may be ejected back into the field after the soil core is analyzed onboard the work tool assembly 114 (or the field engagement unit 102). For instance, the captured soil core may be analyzed for values including, but not limited to, soil type, soil texture, compaction amount plate, organic matter content, and nutrient constituents (e.g., N, P, and K).

It is noted herein the field engagement unit 102 is configured to take one or more measurements of one or more operational parameters of one or more control system components implemented to control one or more of the first cylinder 1006 or the second cylinder 1008, including one or more electrical control system components, one or more hydraulic system components, one or more pneumatic system components, or one or more mechanical control system components.

Figure 10F:
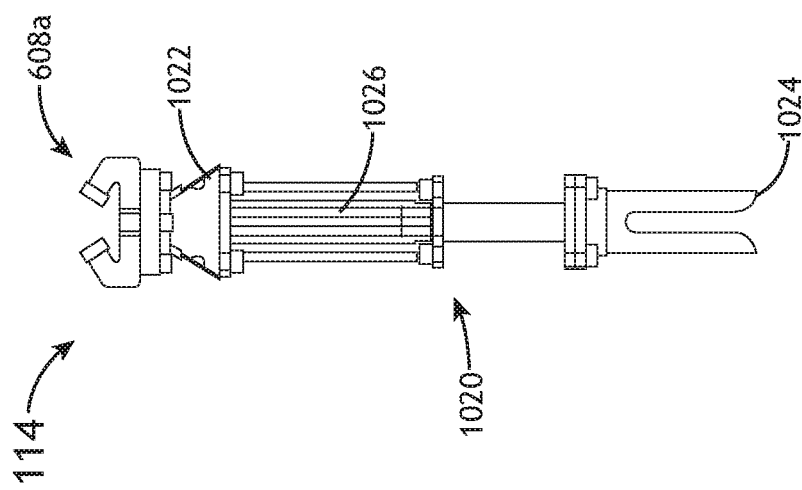
FIG. 10F illustrates a work tool assembly of a field engagement unit, in accordance with one or more embodiments of the present disclosure.
Figure 10E:
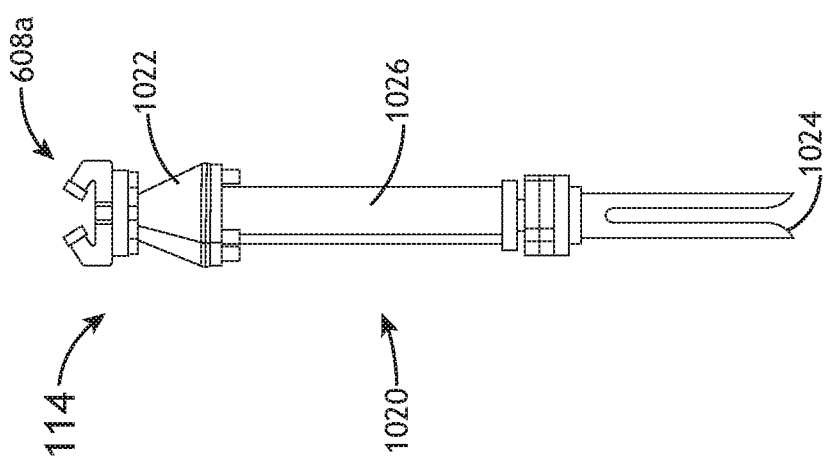
FIG. 10E illustrates a work tool assembly of a field engagement unit, in accordance with one or more embodiments of the present disclosure.

In one embodiment, as illustrated in FIGS. 10D-10F, the work tool assemblies 114 include a soil measurement attachment 1020. In another embodiment, the soil measurement attachment 1020 is coupled to the work tool chassis 602 via a mount plate 1022. For example, the soil measurement attachment 1020 may be coupled to the attachment coupler 606 of the work tool chassis 602 via the mount plate 1022.

In another embodiment, the soil coring attachment 1000 includes a soil probe 1024 at one end of a cylinder 1026. For example, the cylinder 1026 may include one or more extendable and/or retractable portions. By way of another example, the first cylinder 1026 may be of a fixed length. However, it is noted this would require the support assembly 104 to raise or lower to have the soil coring attachment 1020 make contact with the ground.

In another embodiment, the cylinder 1026 is configured to cause the soil probe 1024 to penetrate the soil. In another embodiment, the soil probe 1026 is configured to measure the soil for one or more values. For example, the soil probe 1024 may be configured to measure for one or more values including, but not limited to, soil moisture at one depth, soil moisture at additional depths, soil constituents at one or more multiple depths (e.g., nutrients and organic matter content), or soil salinity at one or multiple depths (e.g., pH levels).

It is noted herein the field engagement unit 102 is configured to take one or more measurements of one or more operational parameters of one or more control system components implemented to control one or more of the cylinder 1026, including one or electrical control system components, one or more hydraulic system components, one or more pneumatic system components, or one or more mechanical control system components. In one embodiment, as illustrated in FIGS. 10G and 10H, the one or more work tool assemblies 114 include a combination soil coring and soil measurement attachment 1040. In another embodiment, the combination soil coring and soil measurement attachment 1040 is coupled to the work tool chassis 602 via a mount plate 1042. For example, the combination soil coring and soil measurement attachment 1040 may be coupled to the attachment coupler 606 of the work tool chassis 602 via the mount plate 1042.

In another embodiment, the combination soil coring and soil measurement attachment 1040 includes one or more soil coring attachments 1000. In another embodiment, the combination soil coring and soil measurement attachment 1040 includes one or more soil measurement attachments 1020. It is noted herein that either the soil coring attachment 1000 and/or the soil measurement attachment 1020 may be implemented to measure soil compaction as a measurement of force required to push the soil coring attachment 1000 and/or the soil measurement attachment 1020 into the soil.

It is noted herein the cleaning components of the plant phenotyping attachment 700 may be extended to the soil coring attachment 1000 and/or the soil measurement attachment 1020. For example, the soil coring attachment 1000 may include a cleaning function to remove stuck soil inside the cylinder 1008 including, but not limited to, water or air. By way of another example, the soil measurement attachment 1020 may include a cleaning function to remove stuck soil from the soil probe 1024 including, but not limited to, water or air. It is further noted herein one or more cleaning components may be coupled to the combination attachment 1040.

In one example, the soil may be measured for any nutrient deficiencies. In this example, the local controller 130 may receive one or more sets of information such as, but not limited to, identification and amount of soil constituents, a measured soil type, a measured soil texture, an amount of soil plate compaction, an amount of organic matter content in the soil, an amount of soil EC (electro-conductivity), and the like from the soil coring attachment 1000 and/or the soil measurement attachment 1020. The local controller 130 may then determine what response is necessary based on the one or more sets of information (e.g. apply nutrients, apply variable rate irrigation, or deep till to break up compaction to the soil and the test point). The local controller 130 may then transmit responses including, but not limited to, a re-positioning response to a work tool assembly 114 including a nutrient applicator 900 and any other work tool assemblies 114 positioned between the nutrient applicator 900 and the test spot requiring nutrients, and a change in operational condition (e.g., turn on, run program) to the work tool assembly 114 including the nutrient applicator 900.

In one embodiment, as illustrated in FIGS. 11A-11G, the one or more work tool assemblies 114 include one or more planting attachments. In another embodiment, the one or more planting attachments are configured to incorporate a series of planting attachments that may plant more than one seed per planting operation. In another embodiment, the one or more planting attachments are configured to incorporate a single row of single seed planting attachments. In another embodiment, the one or more planting attachments are configured to incorporate several single seed planting attachments that may plant multiple seeds in a single operation including, but not limited to, in a single row. For example, several single seeding planting attachments would allow the field engagement unit 102 to be configured to harvest a single row of one crop while leaving an interspersed crop or variety in the field for later harvesting. By way of another example, the single seed planting attachment would allow the field engagement unit 102 to be configured to plant a cover crop before a previous crop is harvested.

Figure 11A:
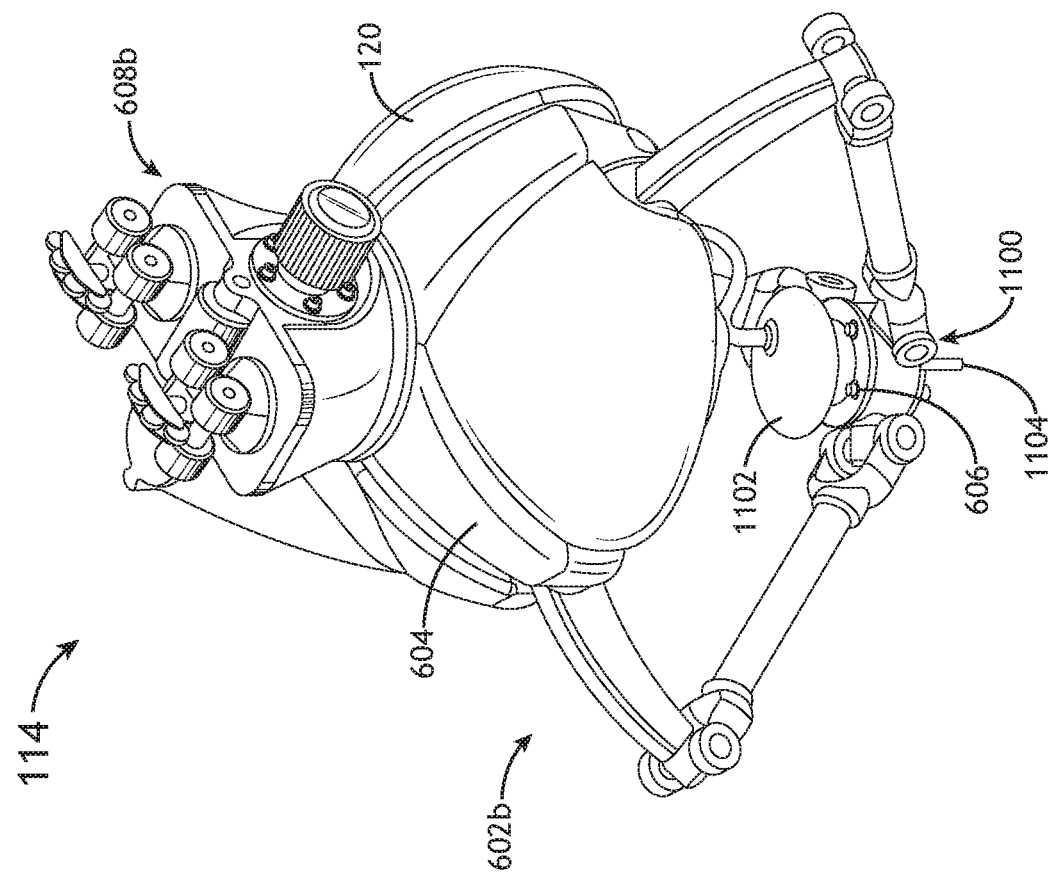
FIG. 11A illustrates a work tool assembly of a field engagement unit, in accordance with one or more embodiments of the present disclosure.
Figure 11B:
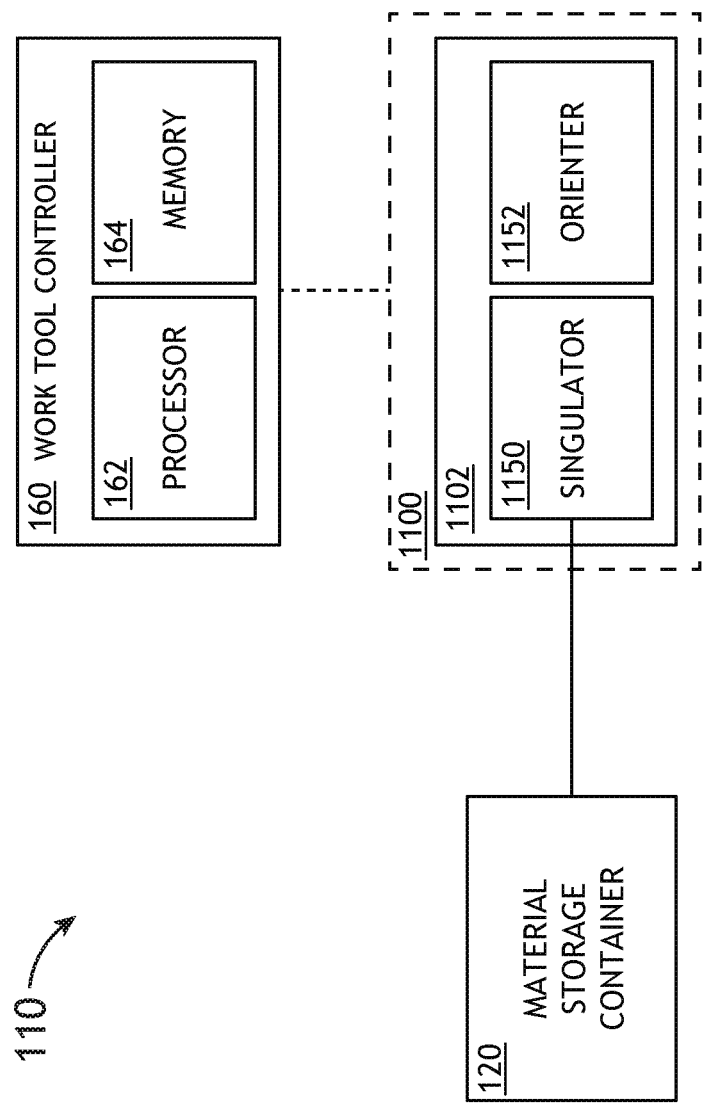
FIG. 11B illustrates a process flow diagram for controlling a planting attachment of a work tool assembly, in accordance with one or more embodiments of the present disclosure.
Figure 11C:
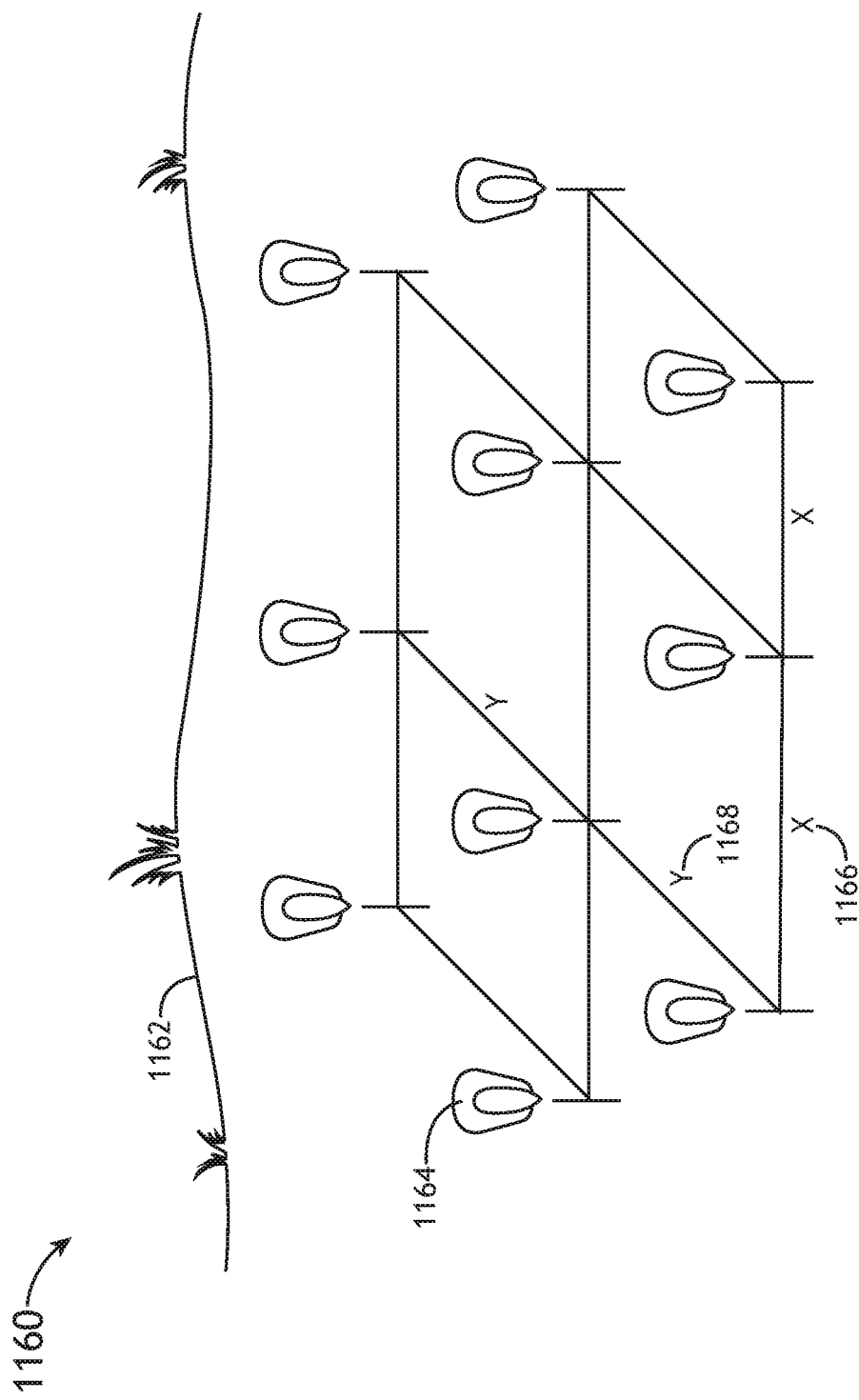
FIG. 11C illustrates a field, in accordance with one or more embodiments of the present disclosure.

In one embodiment, as illustrated in FIGS. 11A-11C, the work tool assemblies 114 include a single seed attachment 1100 for per-plant crop planting. For example, incorporating a single seed attachment 1100 would allow the field engagement unit 102 to be configured to plant one or more seeds with one or more nutrients (e.g., water, N, P, and/or K, trace nutrients, fungicide, or insecticide) necessary to spur plant growth. It is noted herein the single seed attachment 1100 may be configured to take into account environmental data including, but not limited to, rainfall, wind speed, wind direction, soil moisture, available nutrients (even down to the per plant level), soil type, field elevation, latitude, seed hybrid, growing degree units, temperature, and ultraviolet radiation at every seed location in the field. By way of another example, incorporating a single planting attachment would allow the field engagement unit 102 to be configured to re-plant one or more replacement crops in the case of a failed initial planting caused by one or more of standing water, poor seed emergence, adverse weather, etc.

In another embodiment, the single seed attachment 1100 is coupled to the chassis 602b via the attachment coupler 606. In another embodiment, the single seed attachment 1100 includes a seed manager 1102. In another embodiment, as illustrated in FIG. 11B, the seed manager 1102 includes a singulator 1150. In another embodiment, the singulator 1150 separates a single seed from the multiple seeds received by the single seed attachment 1100 from an onboard or detached material storage container 120. For example, the material storage container 120 may be coupled to the chassis 602b above the single seed attachment 1100. By way of another example, the material storage container 120 may be coupled to the support frame 106. By way of another example, the material storage container 120 may be coupled to the support assembly 104, providing seeds via the manifold assembly 122. In another embodiment, the seed manager 1102 includes an orienter 1152. In another embodiment, the orienter 1152 orients the single seed to a desired orientation before the seed is planted to maximize seed emergence and to optimize plant leaves' orientations with the goal for the field's plants to be able to obtain a high amount of sunlight. In another embodiment, the seed manager 1102 and/or the orienter 1152 are communicatively coupled to the work tool controller 160.

Although embodiments of the present disclosure illustrate the singulator 1150 and the orienter 1152 on the same single seed attachment 1100, it is noted herein one or both of the singulator 1150 or the orienter 1152 may be detached (or coupled separately from) the single seed attachment 1100.

In another embodiment, the single seed attachment 1100 includes a soil penetrator 1104. It is noted herein the soil penetrator 1104 may be part of, or a separate component from, the singulator 1150 or the orienter 1152 of the seed manager 1102.

The benefits of controlling of corn kernel orientation during planting is described by Adrian A. Koller in "DESIGN, PERFORMANCE PREDICTION AND VALIDATION OF A SEED ORIENTING CORN PLANTER," Ph.D. Dissertation, Oklahoma State University, May 2013, which is incorporated herein by reference in the entirety.

In another embodiment, as illustrated in FIG. 1C, the single seed attachment 1100 plants single seeds at a defined spacing 1166 and/or 1168, or at a spacing relative to already planted seeds, via movement of the chassis 602*a* or 602*b*. For instance, the defined spacing at which seeds are planted by the single seed attachment 1100 may be fixed. Alternatively, the field engagement unit 102 may be configured to adjust the defined spacing at which seeds are planted by the single seed attachment 1100 to take into account possible obstructions, soil types, nutrient availability, and the like. In another embodiment, the single seed attachment 1100 may plant seeds in a defined orientation as set by the orienter 1152. For example, corn kernels may be oriented with the hull pointed downward into the soil when planted.

It is noted herein the single seed attachment 1100 may be configured to incorporate any additional components necessary to be configured to perform at least one step including, but not limited to, removing biomass from the top of the soil, opening the soil, placing a seed at a proper depth for the seed, adequately compressing the soil around the seed, applying one or more nutrients (i.e. fertilizer) and applying irrigation water next to each seed, and closing the soil.

It is further noted herein the single seed attachment 1100 may plant seeds based on one or more sets of information from the soil coring attachment 1000 and/or soil measurement attachment 1020. For example, the single seed attachment 1100 may change seed type between plantings based on the soil condition as analyzed by the local controller 130 from the one or more sets of information taken by the soil coring attachment 1000 and/or soil measurement attachment 1020. By way of another example, the single seed attachment 1100 may add or remove a determined amount of nutrients, fertilizer, and/or water based on the analyzed soil condition when injecting the seed location during the planting of the seed. In this example, the soil coring operation may have taken place at or prior to the time the seed planting operation takes place.

Figure 11D:
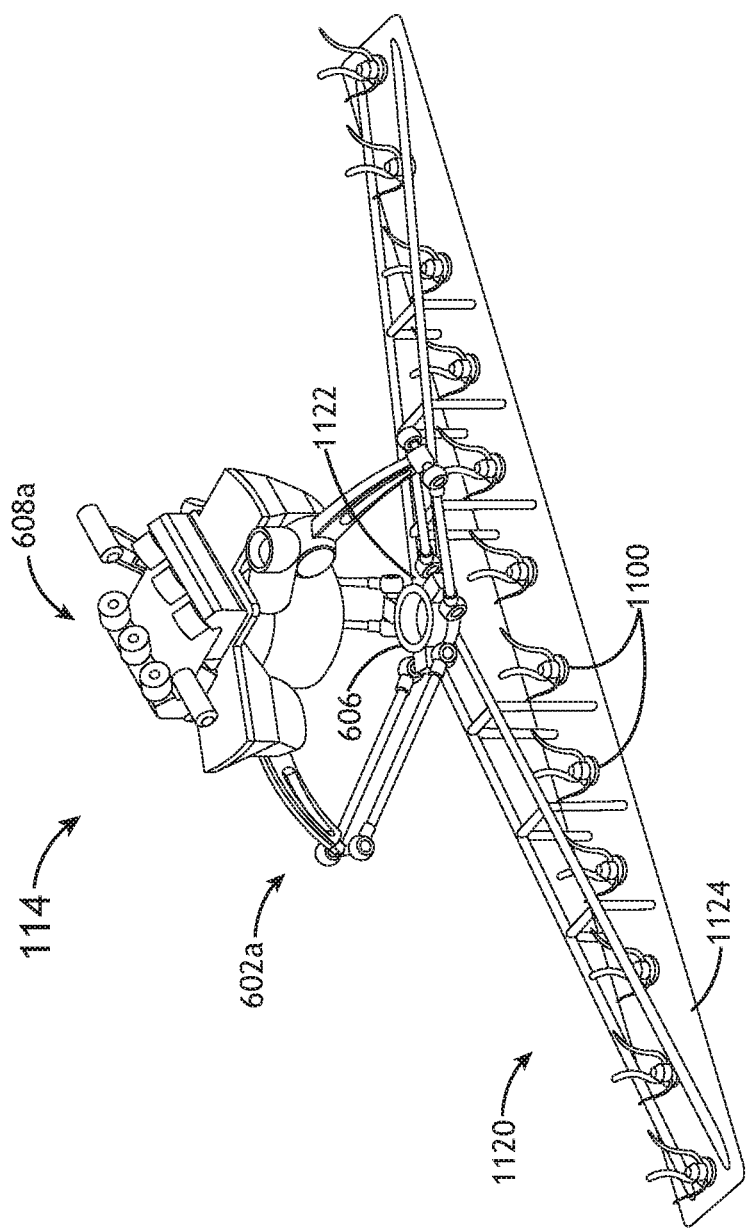
FIG. 11D illustrates a work tool assembly of a field engagement unit, in accordance with one or more embodiments of the present disclosure.
Figure 11E:
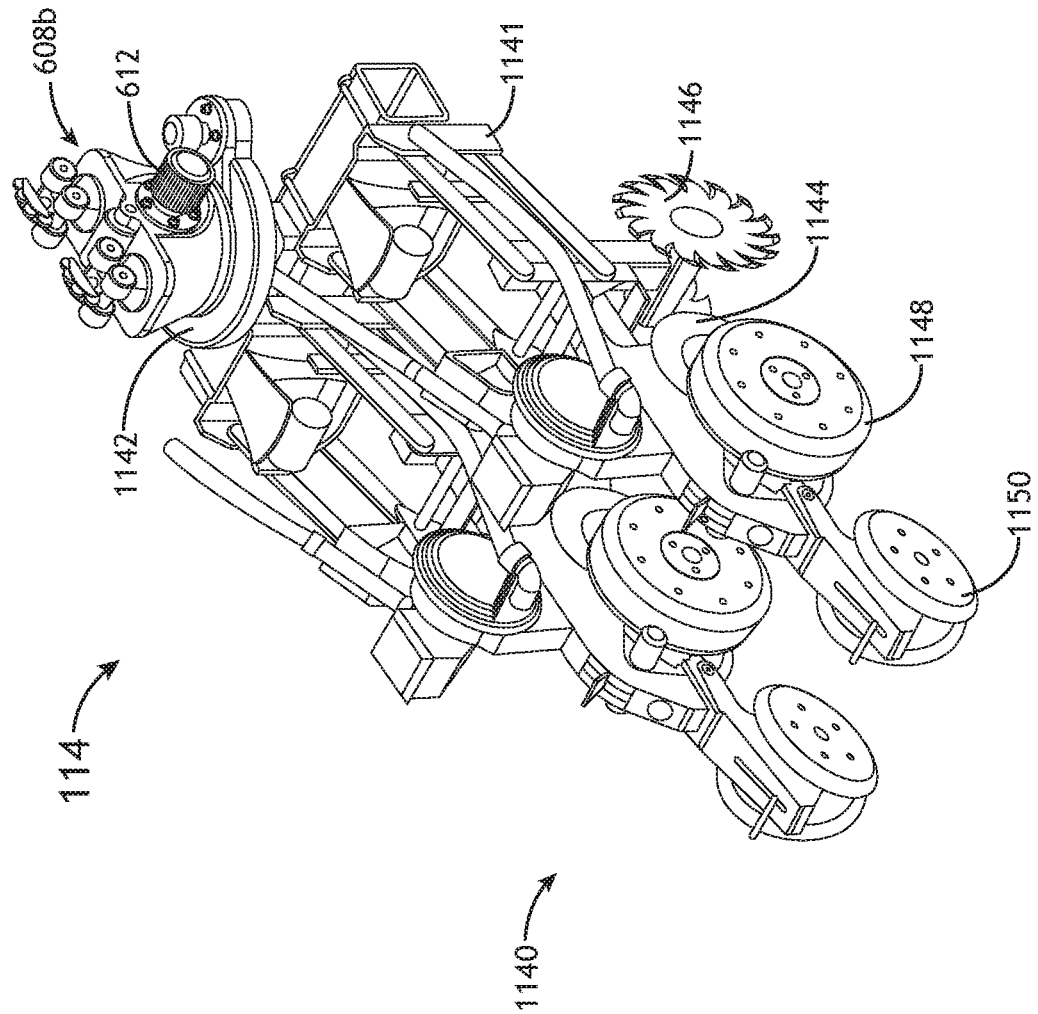
FIG. 11E illustrates a work tool assembly of a field engagement unit, in accordance with one or more embodiments of the present disclosure.
Figure 11F:
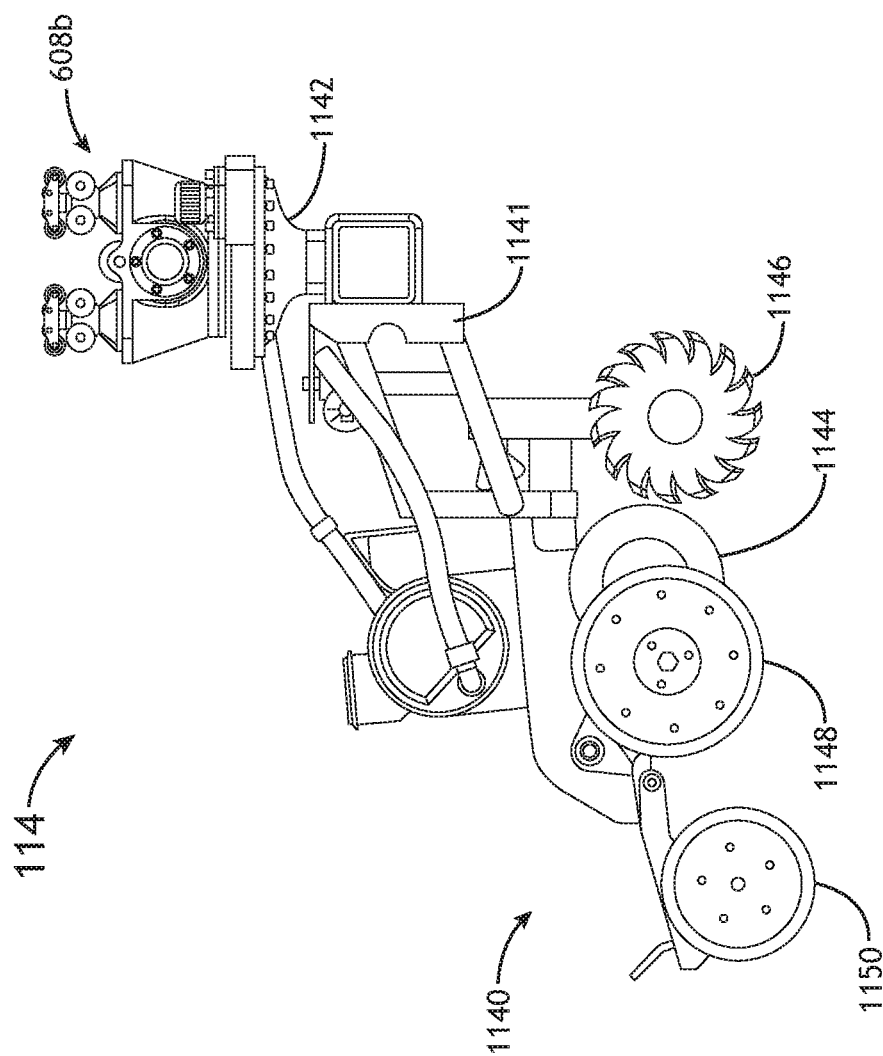
FIG. 11F illustrates a work tool assembly of a field engagement unit, in accordance with one or more embodiments of the present disclosure.
Figure 11G:
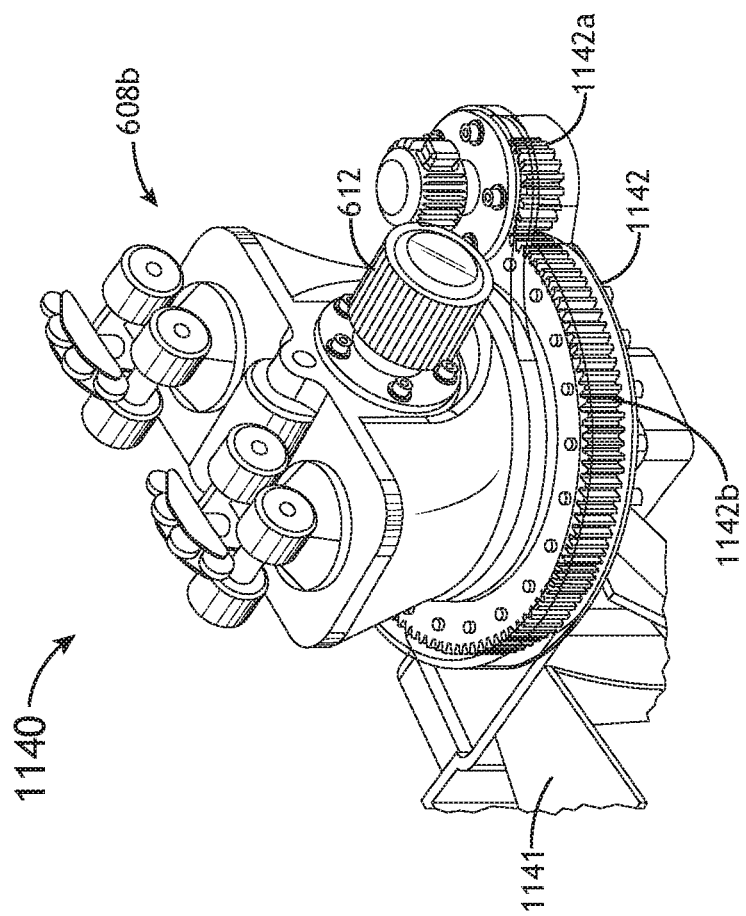
FIG. 11G illustrates a planting attachment of a work tool assembly, in accordance with one or more embodiments of the present disclosure.
Figure 111I:
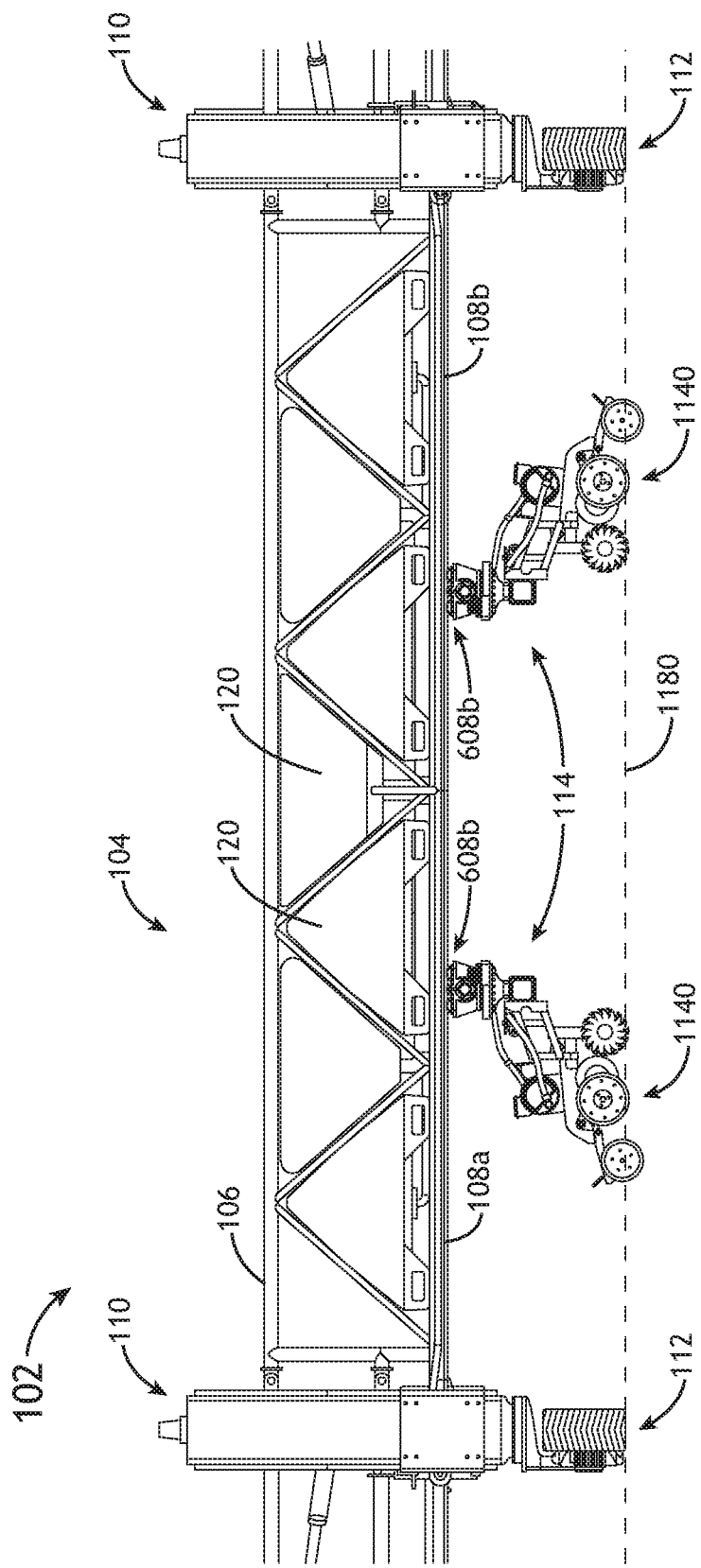

In one embodiment, as illustrated in FIG. 11D, the one or more work tool assemblies 114 include one or more planting array attachments 1120. In another embodiment, the planting array attachment 1120 is coupled to the work tool chassis 602 via a mount plate 1122. For example, the planting array attachment 1120 may be coupled to the attachment coupler 606 of the work tool chassis 602 via the mount plate 1122. In another embodiment, the planting array attachment 1120 includes a planting attachment base 1124. In another embodiment, the planting attachment base 1124 is supported by one or more base cross-members. It is noted herein, however, that the planting attachment base 1124 is not a required component of the planting array attachment 1120.

In another embodiment, the planting attachment base is configured to incorporate one or more single seed planting attachments 1100 in a set arrangement. For example, the planting attachment base 1124 may be configured to incorporate a single row of single seed planting attachments 1100. By way of another example, the planting attachment base 1124 may be configured to incorporate multiple rows of single seed planting attachments 1100. It is noted herein the single or multiple rows of single seed planting attachments 1100 may include the ability to change row spacing on-the-go via control from the local controller 130 using processed data including, but not limited to, soil type, soil nutrients levels, soil topography, soil compaction level (e.g. field road), and availability of sunlight (e.g. trees overshadowing a portion of a field).

In another embodiment, the single seed planting attachments 1100 are coupled to the planting attachment base 1124 by a defined spacing. For instance, the defined spacing for the single seed planting attachments 1100 in the planting attachment base 1124 may be fixed. Alternatively, the field engagement unit 102 may be configured to adjust the defined spacing for the single seed planting attachments 1100 to take into account possible obstructions including rocks, irrigation wells, electric power poles, oil wells, natural gas lines, and the like.

Although embodiments of the present disclosure are directed to a line-based planting array attachment 1120, it is noted herein the planting array attachment 1120 may be arranged so as to plant in a staggered, offset, or random spacing. It is further noted herein the planting array attachment includes a defined spacing, where the defined spacing is adjustable.

In another embodiment, the planting array attachment 1120 feeds the coupled single seed planting attachments 1100 in an input/output fashion (i.e. a seed is planted before the next seed is loaded into the planting chamber. In another embodiment, the planting array attachment 1120 instead implements an assembly with a series of single seed planting attachments 1100, where the attachments 1100 are placed into position, activated to plant a seed, removed from position, and re-loaded with a seed while another single seed planting attachment 1100 is planting before re-starting the cycle. In this regard, the downtime of having to prepare a seed in the single seed planting attachment 1100 may be minimized.

In one embodiment, as illustrated in FIGS. 11E-11H, the one or more work tool assemblies 114 include one or more row unit planting attachments 1140. In another embodiment, the row unit planting attachment 1140 includes a chassis 1141. In another embodiment, the chassis 1141 is coupled to the work tool carrier 608*a* or 608*b* via a mount plate 1142.

In another embodiment, the row unit planting attachment 1140 includes one or more disc units 1144 cutting a furrow in the soil. In another embodiment, the disc units 1144 are configured to plant one or more rows simultaneously. For example, disc units 1144 may be configured to plant one or more rows at a time in a defined row spacing. For instance, the defined spacing for the one or more disc units 1144 may be fixed via a seed singulation wheel. Alternatively, the field engagement unit 102 may be configured to adjust the defined row spacing for the one or more disc units 1144.

In another embodiment, the row unit planting attachment 1140 includes one or more tilling wheels 1146. For example, the one or more tilling wheels 1146 may be configured to overturn the ground prior to the one or more disc units 1144 planting the seeds, including the instance where seeds are planted into existing biomass laying on top of the ground. In another embodiment, the row unit planting attachment 1140 includes one or more packing or gauge wheels 1148 to firm the sides of the seed trench tilled by the tilling wheels 1146. For example, the packing wheels 1148 may be actuated by an electric actuator, hydraulic cylinder, pneumatic cylinder, or ground-powered mechanism. By way of another example, the packing wheels 1148 may be configured to either supplement or replace the propulsion provided to the row unit planting attachment 1140 by the chassis 602. For instance, the packing wheels 1148 may either be configured to supplement or replace the propulsion provided to the row unit planting attachment 1140 by the motor 612 of the chassis 602*b*. In another embodiment, the speed with which the one or more packing wheels 1148 are actuated determines the spacing of the row of seeds being planted. In another embodiment, the row planting unit 1140 includes one or more press or closing wheels 1150 to cover the seed trench with soil.

In another embodiment, the row planting unit attachment 1140 is coupled to the material storage containers 120. For example, as illustrated in FIG. 11I, the row planting unit attachment 1140 may be coupled to a material storage container 120 housed within the support frame 106. By way of another example, seed product is transported pneumatically from one or more material storage containers 120 to the row unit planting attachments 1140 through the manifold assembly 122. It is noted herein it is possible to rotate the row planting unit attachment 1140 through the use of a rotating assembly shown with two mating platforms up to or beyond 360 degrees, depending on how seed is transported to the work tool assembly 114 including the row planting unit attachment 1140.

In another embodiment, as illustrated in FIGS. 11I-11L, the field engagement unit 102 is configured to implement one or more work tool assemblies 114 with row unit planting attachments 1140 to plant one or more rows simultaneously. For example, the field engagement unit 102 may be configured to implement two work tool assemblies 114 with row unit planting attachments 1140 to plant one or more at a time. In this example, the work tool assemblies 114 with row unit planting attachment 1140 are positioned at opposite ends of respective gantry facing each other while the field engagement unit 102 is raised. Next, the field engagement unit 102 lowers to allow the work tool assemblies 114 with row unit planting attachment 1140 to engage the ground. Each of the work tool assembly 114 with row unit planting attachment 1140 propels itself along its work tool rail 108 traveling toward or away from each other until it gets to the end of its work tool rail 108. During the time that each work tool assembly 114 with row unit planting attachment 1140 are being pulled through the ground, seeds are dropped into the ground at a desired spacing, the spacing determined via the singulation wheel in the respective row unit planting attachment 1140.

Once the work tool assemblies 114 with row unit planting attachment 1140 have traversed the length of the work tool rail 108, the field engagement unit 102 raises up and moves forward or backward to the next number of rows to be planted. The field engagement unit 102 rotates each work tool assembly 114 with row unit planting attachment 1140 180 degrees, and lowers the support structure to allow each work tool assembly 114 to return each row unit planting attachment 1140 to planting position in order to engage the ground for the next planting pass. It is noted herein the field engagement unit 102 may repeat this process across each field to be planted until the field is fully planted. It is further noted herein that the field engagement unit 102 may be capable of lowering its work tool assemblies 114 with row unit planting attachment 1140 only for the areas and sections in the field that need to be replanted, should only a partial row be planted.

Figure 12C:
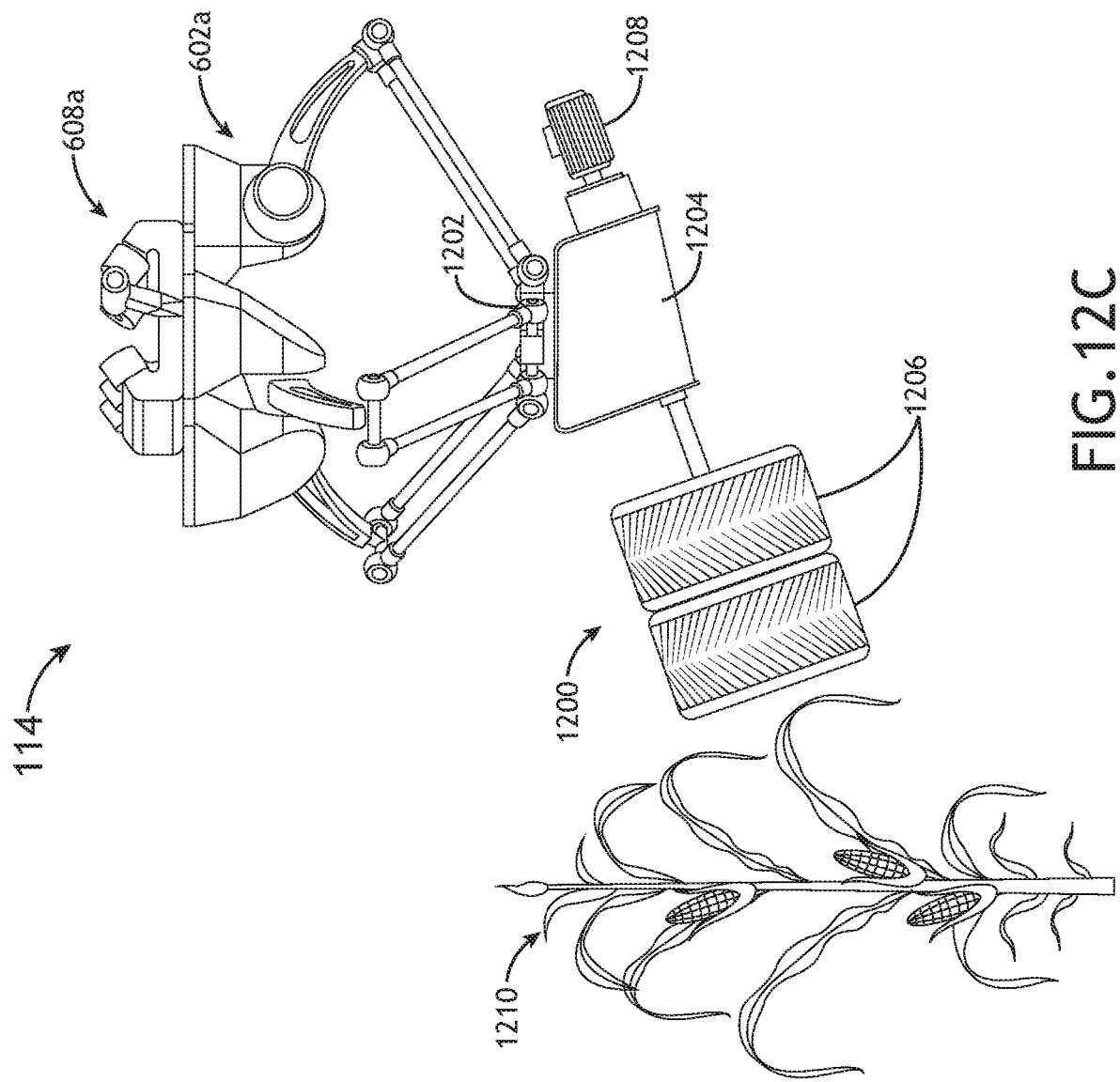
FIG. 12C illustrates a work tool assembly of a field engagement unit, in accordance with one or more embodiments of the present disclosure.

In one embodiment, as illustrated in FIGS. 12A-12C, the one or more work tool assemblies 114 includes one or more detasseling attachments 1200. In one embodiment, the detasseling attachment 1200 mechanically couples to the chassis 602a via a mount plate 1202. For example, the detasseling attachment 1200 may be coupled to the attachment coupler 606 of the chassis 602a via the mount plate 1202. For instance, the mount plate 1202 may couple to the attachment coupler 606 in such as a way so as to prevent rotation of the detasseling attachment 1200 about the z-axis. By way of another example, the mount plate 1202 may couple to the attachment coupler 606 in such a way so as to allow rotation of the detasseling attachment 1200 about the z-axis. For instance, rotation would allow for adjustments to the direction of field rows or to be able to adjust the entrance direction of a plant (e.g., corn stalk 1210) to the leading portion of a set of stripping wheels 1206.

In another embodiment, the detasseling attachment 1200 includes an drivetrain housing 1204. For example, the drivetrain housing 1204 may include one or more motors, gears, chains, or belts. By way of another example, the drivetrain housing 1204 may include electric-powered, hydraulic-powered, pneumatic-powered components. In another embodiment, the set of stripping wheels 1206 are coupled to the drivetrain housing 1204. In another embodiment, the one or more motors of the drivetrain housing 1204 are configured to rotate the set of stripping wheels 1206. For example, the one or more motors may be configured to rotate the one or more stripping wheels 1206 in opposite directions. For instance, the one or more actuators may be configured to rotate the one or more stripping wheels 1206 so as to pull corn tassels up through the one or more stripping wheels 1206, thus removing the tassels (e.g., pollen-producing flowers on corn crop) in an upward vertical motion. By way of another example, the one or more actuators may be configured to actuate the one or more detasseling wheels 1206 in the same rotational direction, though it is noted same-direction rotation may damage the stripping wheels 1206. In another embodiment, the detasseling attachment 1200 includes a cutting assembly to remove any tassels that are missed by the one or more detasseling wheels 1206.

It is noted herein vision systems may be implemented to determine whether all targeted plant tassels have been eliminated by the detasseling attachment 1200. If the vision systems observe tassels have been missed, the field engagement unit 102 may respond by re-activating the detasseling attachment 1200.

Figure 13:
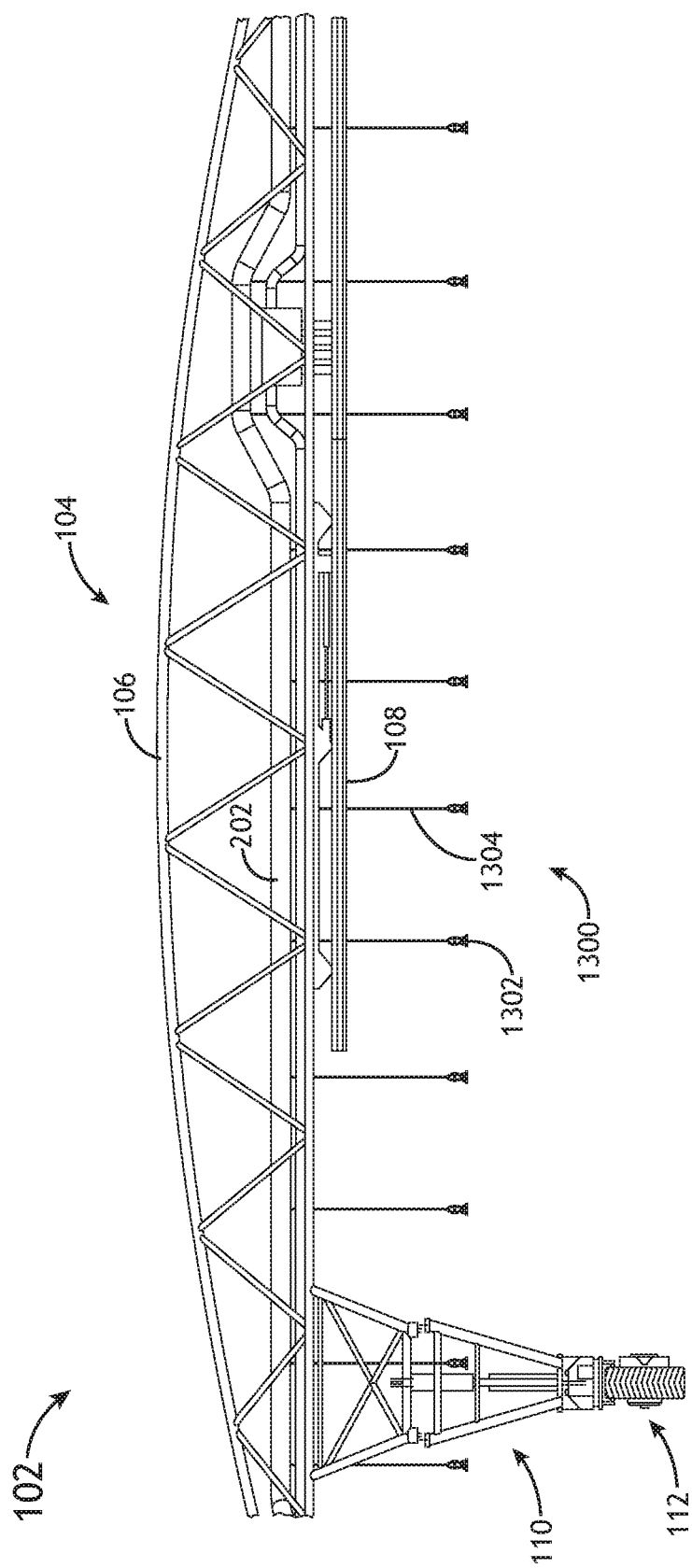
FIG. 13 illustrates a field engagement unit, in accordance with one or more embodiments of the present disclosure.

In one embodiment, as illustrated in FIG. 13, the field engagement unit 102 includes one or more irrigation attachments 1300. In one embodiment, the one or more irrigation attachments 1300 are coupled to the support frame 106 of the support assembly 104. For example, the one or more irrigation attachments may be coupled to the support frame 106 via a drop 1304. For instance, the drop 1304 is of a fixed length. It is noted herein, however, that the drops 1304 across the field engagement unit 102 may be different fixed lengths. Alternatively, the drop 1304 includes one or more extendable and/or retractable sections. In addition, the drop 1304 is flexible. Alternatively, the drop 1304 may be rigid. By way of another example, the one or more irrigation attachments 130 may be directly coupled to the support frame 106. In one embodiment, the main tube 202 may transport water for purposes of irrigation to the irrigation attachments 1300. It is noted herein, however, that an additional pipe may be coupled to the support assembly 104 for purposes of irrigation, freeing the main tube 202 to be used in the delivery of different material and/or product to the other one or more work tool assemblies 114.

In another embodiment, the irrigation attachment 1300 is capable of spraying at a variable rate. For example, the irrigation attachment 1300 may include an adjustable nozzle 1302. It is noted herein that all irrigation attachments 1300 may include the same nozzle 1302. However, it is also possible for one or more irrigation attachments 1300 to include a different nozzle 1302 from the remainder of the irrigation attachments 1300. By way of another example, the irrigation attachment 1300 may include a valve control apparatus.

In another embodiment, one irrigation attachment 1300 is controlled at a time. In another embodiment, multiple irrigation attachments 1300 are controlled simultaneously. For example, the irrigation attachments 1300 in a specific section of the field engagement unit 102 may be controlled simultaneously. By way of another example, select multiple irrigation attachments 1300 may be controlled simultaneously.

In another embodiment, all irrigation attachments 1300 on a field engagement unit 102 feed from the same irrigation tube. In another embodiment, one or more of the irrigation attachments 1300 instead feed from a different irrigation tube than the remainder of the irrigation attachments 1300. In this regard, a set of the irrigation attachments 1300 may be directed to providing irrigation water or chemical fertilizer to a field, while another set of the irrigation attachments may instead be directed to providing herbicide.

It is noted herein the irrigation attachments 1300 may water and/or fertilize based on one or more sets of information from the soil coring attachment 1000 and/or soil measurement attachment 1020. For example, the irrigation system 1300 may add or remove a determined amount of fertilizer and/or water based on the analyzed soil condition when irrigating. It is further noted herein the irrigation attachments 1300 may be controlled so as to irrigate, fertiligate, or chemigate simultaneously with adjacent work tool assemblies 114 with irrigation attachments 1300.

In another embodiment, the irrigation attachments 1302 and 1304 utilizes VRI (variable rate irrigation) technology where a valve controls a single sprinkler or utilizes section control (a section of multiple sprinklers) as well as on/off for the whole system. Shown in 1300 are drops, where sprinklers are attached at the bottom of flexible hoses to reduce the amount of irrigation water that is wasted due the blowing of wind. It is also conceived that irrigation fertiligation, or chemigation can also be injected into the soil, be applied via a series of slow soaker hoses that are drug behind the field engagement unit, or utilize a series of fixed sprinklers that are attached to the upper structure of the field engagement unit.

Although the above embodiments are directed to a support-frame mounted irrigation attachment 1300, it is noted herein that the one or more work tool assemblies 114 may be configured to utilize one or more irrigation attachments 1300. For example, the nutrient application attachment 900 may alternatively be used in low-pressure settings as an irrigation attachment 1300 to inject water into the ground, or to drag a soaker hose on the ground behind the field engagement unit 102 In this regard, irrigation water may be delivered with pinpoint accuracy to field locations observed by the one or more phenotyping tools 700 to be in need of irrigation. Therefore, the above description should not be interpreted as a limitation on the present invention but merely an illustration.

In one embodiment, the one or more work tool assemblies 114 includes one or more tilling attachments. In another embodiment, the one or more tilling attachments till soil in a vertical orientation by implementing one or more tilling procedures. For example, the one or more tilling processes may include, but are not limited to, deep tillage to break up soil compaction, rotary tillage (mixing biomass), and surface tilling (ridge tilling) It is noted herein the one or more tilling procedures may be implemented with a precision down to an individual plant level.

In one embodiment, the one or more work tool assemblies 114 include one or more harvesting attachments. In another embodiment, the harvesting attachments are configured to incorporate multiple rows of harvesters. In another embodiment, the harvesting attachments are configured to incorporate a single row of harvesters. For example, a single row of harvesters would allow the field engagement unit 102 to harvest a single row of one crop while leaving an interspersed crop or variety in the field for later harvesting. In another embodiment, the harvesting attachments are configured to incorporate a single harvesting attachment for per-plant crop management. It is noted herein that the harvesting attachments may harvest in any amount from full field to an individual plant level.

In another embodiment, the harvesting attachments are configured to measure crop harvest yield. It is further noted herein that the harvesting attachments may measure crop harvest in any amount from full field to an individual plant level.

In another embodiment, harvested product is stored on the field engagement unit 102. For example, the harvested product may be stored in the material storage devices 120 on the work tool assembly 114. By way of another example, the harvested product may be stored in the material storage containers 120 in the support frame 106. By way of another example, the harvested product may be transported from the one or more harvesting attachments to the material storage containers 120 coupled to the support assemblies 110 via the manifold assembly 122. By way of another example, the harvested product may be transported from the one or more harvesting attachments to one or more detached material storage containers 120 through the manifold assembly 122. In this example, the harvested product may be transported from the field engagement unit 102 to the one or more separate material storage containers 120 via a center pivot docking station 1702, described in detail further herein. By way of another example, a hose reel utilizing a long flexible hose may be utilized to transfer harvested grain from the field engagement unit 102 to a waiting truck, cart, or other storage container located elsewhere in a field, road, or driveway. For instance, multiple bins on a cart would be able to segregate a certain number of different segregated metric permutations that are desired to keep segregated, Additionally, the hose reel would lay down the tube so that the hose does not negatively affect plants. On a future pass, the hose reel would reel the hose back up for storage until the next pass. It is noted herein the flexible tube may be used for transferring high volumes of irrigation water to each field engagement unit 102 for irrigating crops. By way of another example, bulk grains may be accumulated on the field engagement unit 102 and set on the ground for future pick-up once fully filled.

In another embodiment, the harvesting attachment is configured to harvest fruits and vegetables including, but not limited to, nuts, tomatoes, grapes, strawberries, apples, pears, oranges, or grapefruits. In another embodiment, where corn ears are harvested in complete form to minimize seed damage, the harvesting attachment is configured to transport the corn ears intact to one or more material storage containers 120. For example, the corn ears may be transported intact to one or more material storage containers via a conveyor belt assembly. It is noted herein, however, that the harvesting attachment may be configured to detach the kernels from the corn cobs.

In another embodiment the field engagement unit 102 is configured to convey harvested crop being stored to a central threshing unit. In another embodiment, the harvesting attachments are configured to perform one or more functions including, but not limited to, threshing, separating, and cleaning a crop when harvesting product from the crop. In another embodiment, the harvesting attachments are configured to disperse biomass following the harvest of crops.

It is noted herein that the field engagement unit 102 may determine whether or not to harvest any particular portion of a field. In one embodiment, the field engagement unit 102, in making the determination, takes into consideration the seed moisture, crop maturity, and additional surrounding environment information. For example, the determination may be made by integrating data (real-time and near real-time) from a variety of sources including that of the field, local future forecasted weather, availability of transport logistics, available space at the grain dryer, truck wait times at the local elevator, crop process, fuel prices, grain drying costs, etc.

It another embodiment, seeds are graded and sorted by a work tool assembly attachment or by a field engagement unit 102, such that a user may receive premium prices on his crop because of higher quality and traceability standards. For example, grading metrics may include moisture levels, color, hybrid, size, weight and/or density, blemishes (e.g. apples, pumpkins), etc.

In one embodiment, the one or more work tool assemblies 114 include one or more biomass collection attachments including, but not limited to, a baling attachment. Residue or stover includes the cornstalk, leaves, husks, and tassels left in the field after corn has been harvested. Embodiments of the residue removal attachments are configured to perform one or more functions including, but not limited to, shredding the remaining residue to assist natural decomposition, collecting shredded material into a compact form (e.g., a bale), cutting and collecting individual corn plants into sheaves, and pelleting the biomass or stover to be hauled to a processing facility for potential utilization in the production of bio-based material or ethanol production.

It is noted herein the one or more work tool assemblies 114 may be loaded onto, implemented by, and unloaded from the field engagement unit 102 so as to make room for other work tools. For example, the weeding attachment 800 may be configured to mechanically weed around specific plants and/or regions of the field based on processed imaging recommendations. In this regard, herbicide use may be lessened or removed, in an effort to ensure that late emerging plants do not have the adverse effects of stealing resources away from quickly emerging plants, effectively acting as weeds. By way of another example, the weeding attachment 800 may be configured to cull plants that do not emerge within the projected time window. By way of another example, the weeding attachment 800 may be configured to treat specific plants and/or regions of the field with herbicide and/or fungicide based on processed imaging and other data-based recommendations. In this regard, application of herbicide and/or fungicide is limited to only the areas where necessary, in contrast to a broadcasted spray approach. By way of another example, the one or more nutrient application attachments 900 may be configured to provide plant- or region-specific fertilizer based on imaged plant color. By way of another example, the one or more nutrient application attachments 900 may be configured to provide precise region-specific fertilizer based on frequent or infrequent soil sampling. By way of another example, the irrigation attachment 1300 may be configured to provide region-specific irrigation based on soil moisture sampling. By way of another example, the irrigation attachment 1300 may be configured to provide region-specific irrigation based on the temperature, site-specific ET (evapotranspiration), wind speed, wind direction, and relative humidity of the surrounding environment, soil type, or field topography.

It is noted herein that any of the work tool attachments may be coupled to the common work tool chassis 602a. It is also noted herein that any of the work tool attachments may be coupled to the common work tool chassis 602b. It is further noted herein, however, that any of the work tool attachments may require an attachment-specific chassis. For example, the weeding attachment tool 114 may instead be a weeding tool with a specific chassis. Therefore, the above description should not be interpreted as a limitation on the present invention but merely an illustration.

It is further noted herein that any of the motors attached to the one or more work tool assemblies 114, including motors in the carriers, chassis and the various work tool attachments embodied above, may be driven with an alternative power than electricity. For example, any of the motors attached to the one or more work tool assemblies 114 may be driven hydraulically or pneumatically. By way of another example, the one or more work tool assemblies 114 may include any control systems components necessary to actuate hydraulically- and/or pneumatically-driven motors. Therefore, the above description should not be interpreted as a limitation on the present invention but merely an illustration.

FIGS. 14A-14E illustrate the one or more material storage containers 120 of system 100, in accordance with one or more embodiments of the present disclosure. It is noted herein that the various system embodiments, components and architecture described previously herein should be interpreted to extend to FIGS. 14A-14E.

For purposes of the present disclosure, "material" as defined for material storage containers includes, but is not limited to, water, any solution-based herbicide product, any seed product, any fertilizer product, any nutrient product, soil cores, granular fertilizer, and the like to be used in agricultural applications. For example, the material may include any of liquid fertilizer, herbicide, fungicide, insecticide, and dry fertilizer.

Figure 14A:
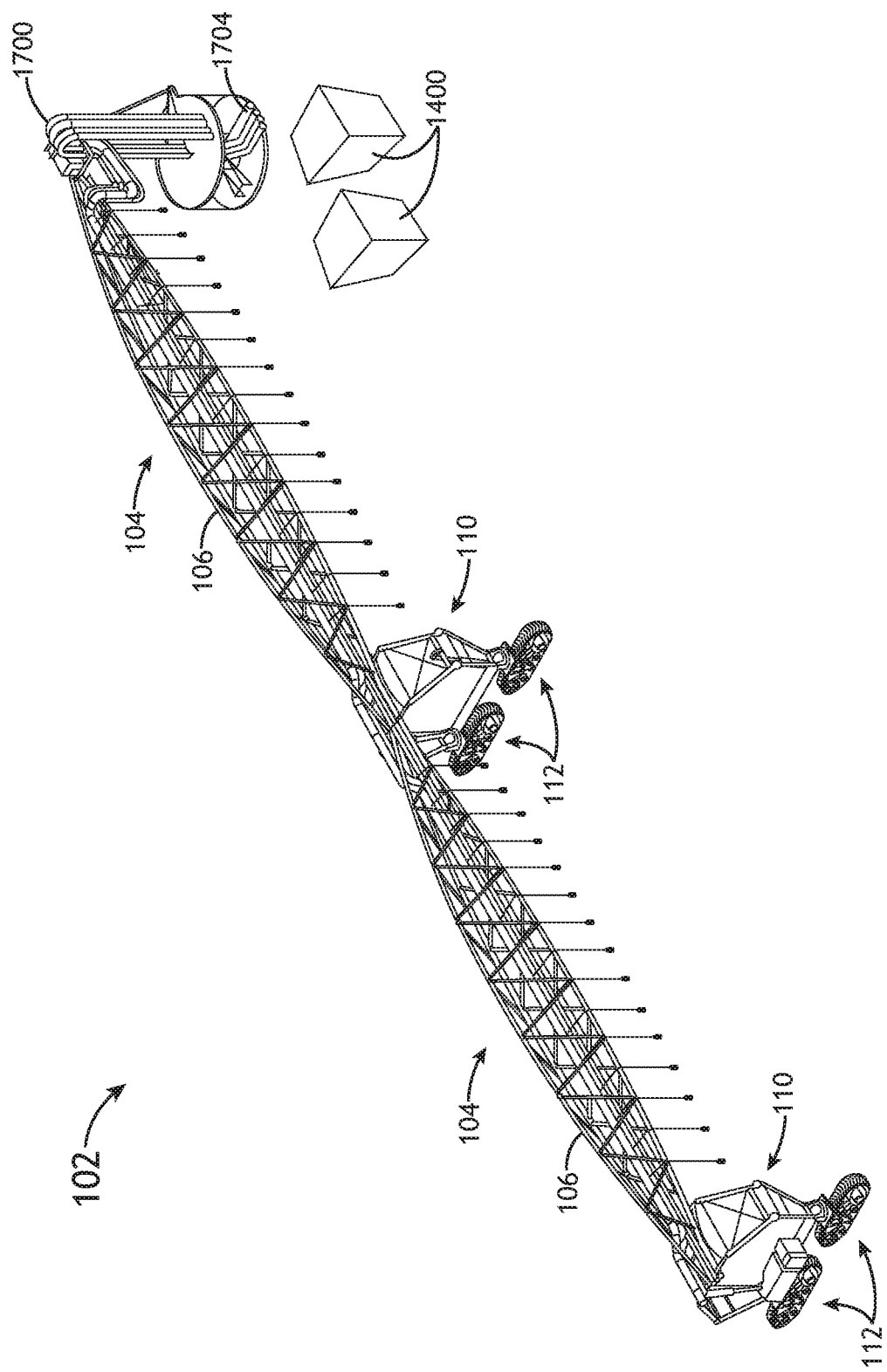
FIG. 14A illustrates a field engagement unit, in accordance with one or more embodiments of the present disclosure.

FIG. 14A illustrates one or more material storage containers 1400, in accordance with one or more embodiments of the present disclosure. In one embodiment, the one or more material storage containers 1400 are separate units from the field engagement unit 102. For example, field engagement unit 102 may be coupled to the center pivot docking station 1702, the center pivot docking station 1702 described in detail further herein. In this regard, material may be retrieved by the field engagement unit 102 via one or more material feed components 1705 on the center pivot docking station 1702 as necessary.

Figure 14B:
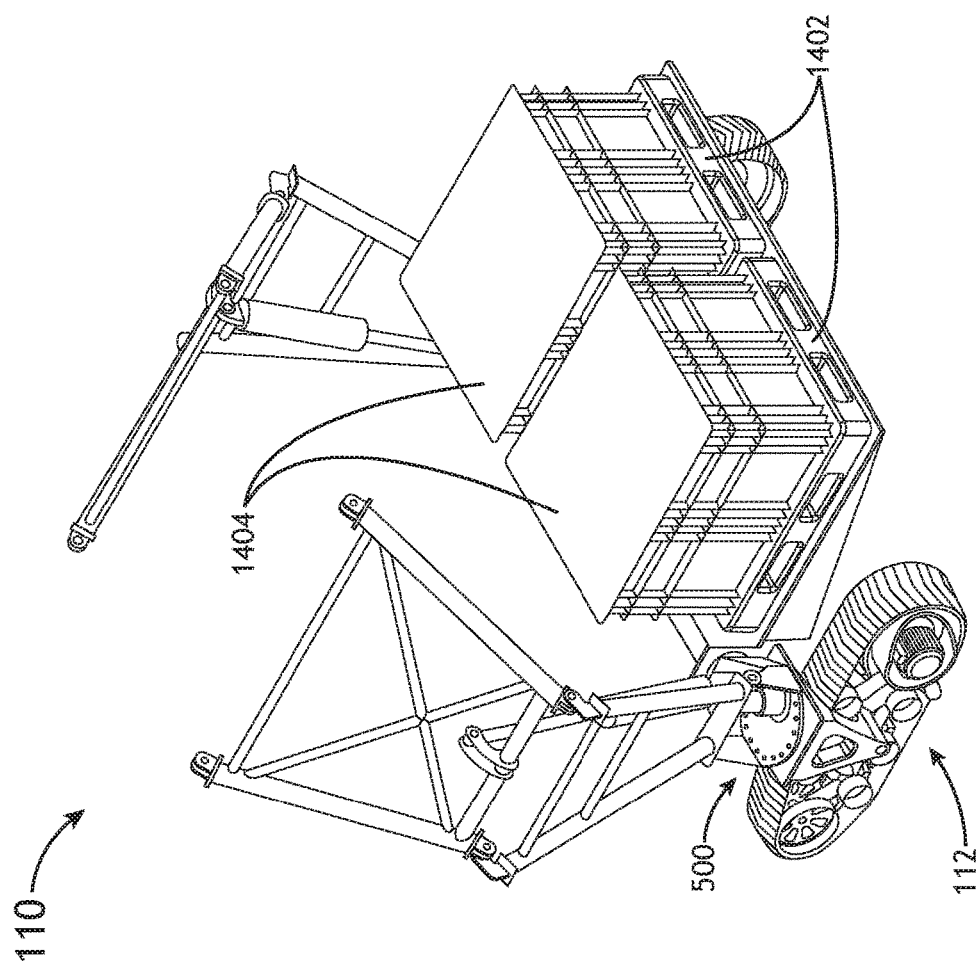
FIG. 14B illustrates a support structure of a field engagement unit, in accordance with one or more embodiments of the present disclosure.

FIG. 14B illustrates a support structure 110, in accordance with one or more embodiments of the present disclosure. In one embodiment, one or more material storage containers platforms 1402 are coupled to the support structure 110. In another embodiment, one or more material storage containers 1404 are coupled to the one or more material storage container platforms 1402. For example, the one or more material storage containers 1404 may be permanently coupled to the one or more platforms 1402 such that material is loaded into the containers 1406 from a secondary source when coupled to the field engagement unit 102. By way of another example, empty material storage containers 1404 may be removed from the one or more platforms 1402 and replaced with filled material storage containers 1404. For instance, the material storage containers 1404 may be moved with a pallet fork.

In another embodiment, the one or more material storage containers 1404 and platforms 1402 are located on a different end from where the one or more work tool assemblies 114 are loaded and/or unloaded onto the work tool rail assembly 108. In this regard, the one or more work tool assemblies 114 may be loaded and/or unloaded while the storage containers are being filled or replaced. However, it is noted herein the storage containers 1406 and the location of where the one or more work tool assemblies 114 are loaded and unloaded may be on the same side of the field engagement unit 102.

Figure 14C:
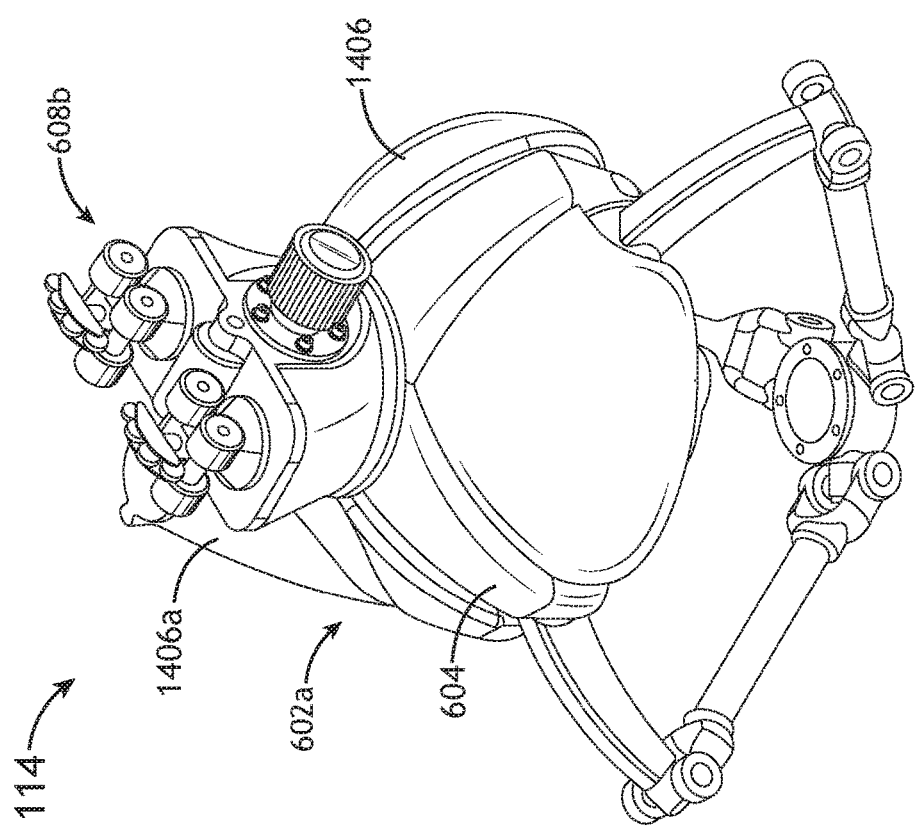
FIG. 14C illustrates a work tool assembly of a field engagement unit, in accordance with one or more embodiments of the present disclosure.

FIG. 14C illustrates a material storage container 1406 housed within the chassis 602a of the work tool 114, in accordance with one or more embodiments of the present disclosure. In one embodiment, the material storage container 1406 houses material for work processes including, but not limited to, planting, fertilizing, spraying, and the like. In another embodiment, the material storage container 1406 includes a spout assembly 1406a. For example, the material storage container 1406 may be re-filled with material via the spout assembly 1406a from the manifold assembly 122, described in detail further herein. For instance, the manifold assembly 122 may have one or more distribution valves to which the spout assembly 1406a may be coupled while being filled. In another embodiment, the material storage container 1406 receives soil core and other soil measurement samples from the soil coring attachment 1000, soil measurement attachment 1020, or the combination soil coring and measurement tool 1040.

In another embodiment, the spout 1406a includes a lid for keeping rain, dust, and wind out of the container. For example, the self-contained and closed nature of the material storage container may allow for the ability of each system to transfer material pneumatically from the storage container 1406 to the end to the work tool assembly 114 using one or more (including a combination of) gravity, suction, vacuum, and the like to transfer materials.

Figure 14D:
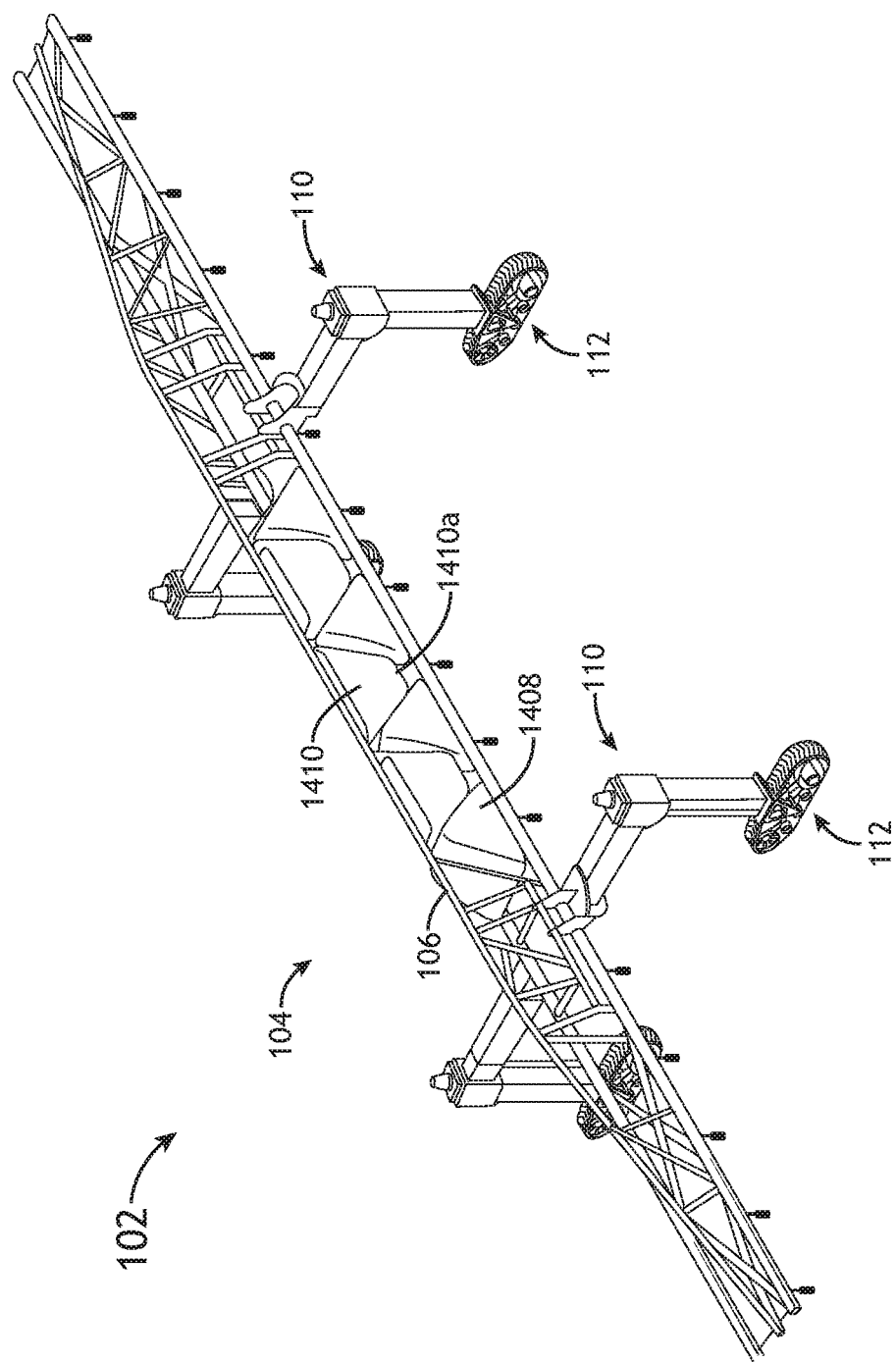
FIG. 14D illustrates a field engagement unit, in accordance with one or more embodiments of the present disclosure.

FIG. 14D illustrates one or more material storage containers within the support frame 106 of a field engagement unit 102. In one embodiment, the one or more material storage containers within the support frame 106 include one or more fluid material storage containers 1408. It is noted herein the material storage containers 1408 store mostly liquid materials. In another embodiment, the one or more material storage containers within the support frame 106 include one or more fluidized solids material storage containers 1410. For example, the material storage containers 1410 store fluidized solids requiring steep slopes so that their high angles of incidence allow them to fully empty even at high moisture levels. In this embodiment, the one or more fluidized solids material storage containers 1410 are configured to drain through a sump 1410a at the bottom of the storage container 1410.

In another embodiment, the material storage containers 1408 and 1410 utilize a method of remotely measuring the level of the material in its tank and viewing of the measured data to optimize each pass. In this regard, the machine knows how much material is needed for a specific pass through the field and does not start a pass without having enough input materials to complete that pass. As such, the field engagement unit autonomously or via manual interaction is able to proactively fill from one or more larger bulk containers.

Figure 14E:
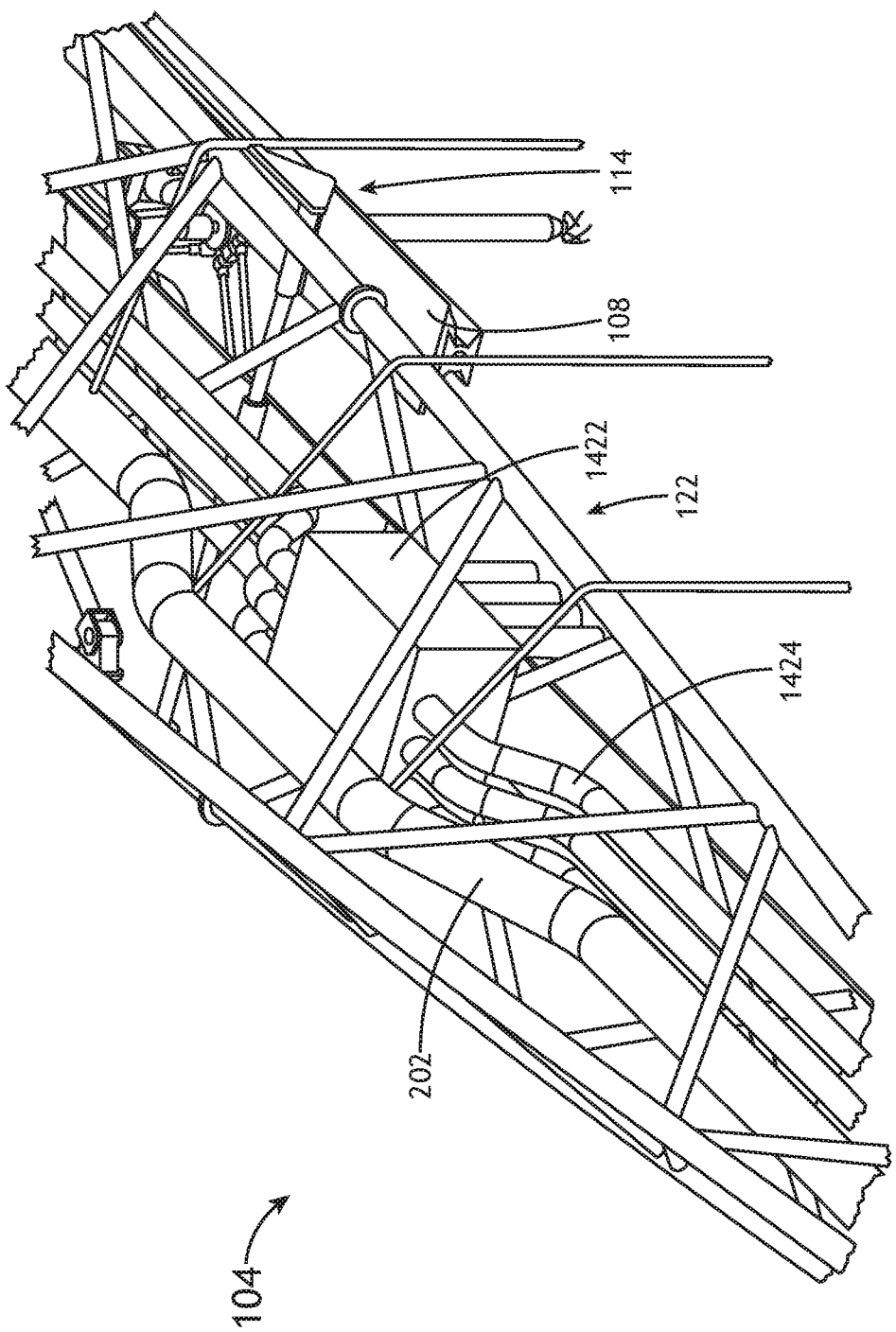
FIG. 14E illustrates a support assembly of a field engagement unit, in accordance with one or more embodiments of the present disclosure.

FIG. 14E illustrates a manifold assembly 122 housed within the support frame 106, in accordance with one or more embodiments of the present disclosure. In one embodiment, the manifold assembly 122 is configured to transport material along the length of the support frame 106. For example, transported material may include, but is not limited to, water, agronomic inputs, sampling outputs, and harvesting outputs. In one embodiment, the manifold assembly 122 includes one or more manifolds 1422. For example, the one or more manifolds 1422 may be separate from the main tube 202. By way of another example, the one or more manifolds 1422 may be coupled to the main tube 202.

In another embodiment, the manifold assembly 122 includes one or more manifold auxiliary pipes 1424 coupled to the one or more manifolds 1422. For example, a portion of the one or more manifold auxiliary pipes 1424 may be pneumatic-driven. For instance, dry material including, but not limited to, seeds and dry fertilizer may require pneumatic-driven pipes. By way of another example, a portion of the one or more manifold auxiliary pipes 1424 may be pressure-driven. By way of another example, a portion of the one or more manifold auxiliary pipes 1424 may utilize a screw conveyor. For instance, liquid material including, but not limited to, water, liquid fertilizer, herbicide, and fungicide may require pressure-driven manifold auxiliary pipes 1424. In another embodiment, the one or more manifold auxiliary pipes 1424 retrieve material from the one or more material storage containers 1404 mounted on the support structure 110. In another embodiment, the one or more manifold auxiliary pipes 1424 extend to the one or more work tool assemblies 114. For example, the manifold assembly 122 may deliver material from the onboard material storage containers to the dispensing valve where it can be mixed and dispensed through the distribution valves to the work tool assemblies 114 via the spouts 1406a. By way of another example, the one or more manifold auxiliary pipes 1424 may extend directly into the attachments on the one or more work tool assemblies 114. By way of another example, the one or more manifold auxiliary pipes 1424 may deposit material into the one or more storage containers 1406 coupled to the work tool chassis 602.

It is noted herein the manifold assembly 122 is for on-board mixing of inputs such as herbicide or fertilizer, as pre-mixed material decreases in effectiveness based on the post-mixed storage time. As such, it is desired to mix only the amount that will be consumed as close to the time it is needed as possible. In this regard, the field engagement unit 102 allows for the possibility to keep all materials separated until a work tool needs that product at which time the manifold is able to receive, measure, and mix those input materials that are needed for a particular prescription. It is further noted herein that more than one manifold mixing assembly could be utilized per field engagement unit, to allow multiple real-time hot-mixing operations for similar or different operations to take place during the same field pass (e.g., herbicide application while applying nutrients).

In another embodiment, as illustrated in FIG. 2G, the work tool assemblies 114 are configured to dock with the one or more manifolds 1422 to be re-loaded. In one example, a work tool 114 is configured to request an additional filling electronic work order from the field engagement unit 102 control system. For example, this data may be exchanged via a wireless or wired connection. Once the work order has been approved, the field engagement unit 102 is configured to rearrange the work tool 114 to the correct position on the one or more rails 108 in order to physically dock with a manifold 1422 or directly to a storage container 1408 or 1410. For example, docking may be accomplished via wireless proximity relationships, through the use of physical switches, and/or position measurement via a linear encoder. Once the control system has verified the correct work tool has docked with the correct manifold 1422, the field engagement unit 102 is configured to open the manifold 1422, dispensing valves, and/or distribution valves and allow a set amount of material into the material storage container 1406 coupled to the work tool 114. Once the re-loading is complete, the work tool 114 is configured to undock from the manifold 1422 and return to operation.

It is noted herein there may be multiple manifold assemblies 122 coupled to the field engagement unit 102. It is further noted herein that one or more material delivery work tools may be used to fill their respective operational work tools in order to allow each respective work tool to have as little filling-time as possible. It is further noted herein that that an operational work tool may never stop working, being automatically filled while it is moving and working on its respective rail by its mating material delivery work tool. For example, once a filling operation has been complete, the material delivery work tool may go to refill from the central fill manifold, directly refill via a material storage container 1408, or continue filling other operational work tools until it is empty and must refill.

Figure 14F:
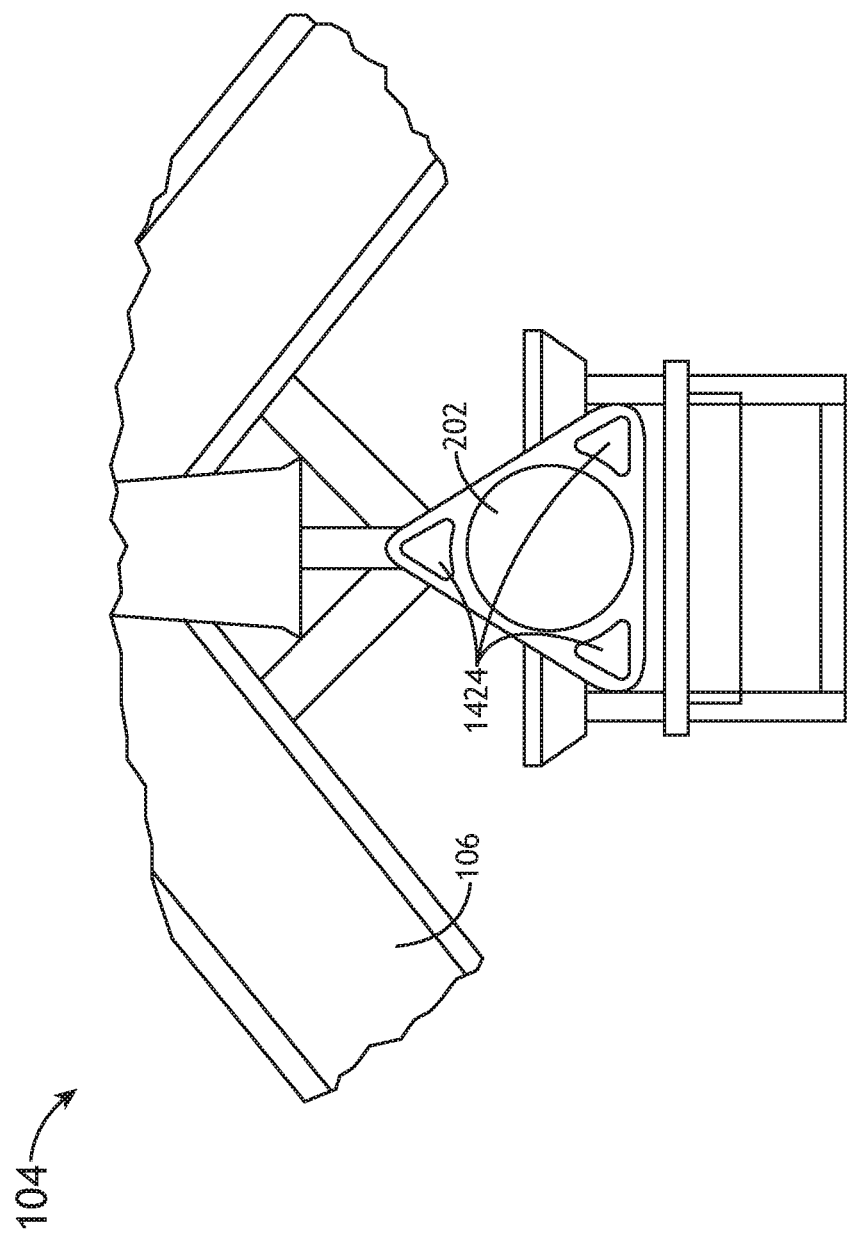
FIG. 14F illustrates a support assembly of a field engagement unit, in accordance with one or more embodiments of the present disclosure.

FIG. 14F illustrates an alternative build of the manifold assembly 122, in accordance with one or more embodiments of the present disclosure. In one embodiment, the main transport tube 202 is surrounded by one or more manifold auxiliary pipes 1424. It is noted this assembly is likely to be implemented where the main tube 202 is coupled to the one or more manifolds 1422 of the manifold assembly 122. It is contemplated that the assembly housing the main tube 202 surrounded by the one or more manifold auxiliary pipes 1424 may be fabricated in sections along the length of the field engagement unit, such that the section containing a main tube 202 or manifold pipe 1424 may be removed instead of having to remove the entire pipe containing the failure.

It is noted herein that such an arrangement allows the work tool assembly 114 to draw off input material at any position along its path by drawing material off the common tube 202. It is envisioned that this works similarly to that of an ink jet printer, where herbicide, fertilizer, etc. is drawing from the common tube 202 by the work tool assembly 114 at whatever position the work tool is located. In this regard, material storage would be less needed on the work tool carrier because input materials are available on-demand.

FIGS. 15A-15H illustrate the one or more power sources for the field engagement unit 102, in accordance with one or more embodiments of the present disclosure. FIGS. 15A-15H also illustrate one or more components with which power is distributed throughout the field engagement unit 102. FIGS. 15A-15H also illustrate one or more methods by which power is distributed throughout the field engagement unit 102. It is noted herein that the various system embodiments, components and architecture described previously herein should be interpreted to extend to the FIGS. 15A-15H.

Figure 15A:
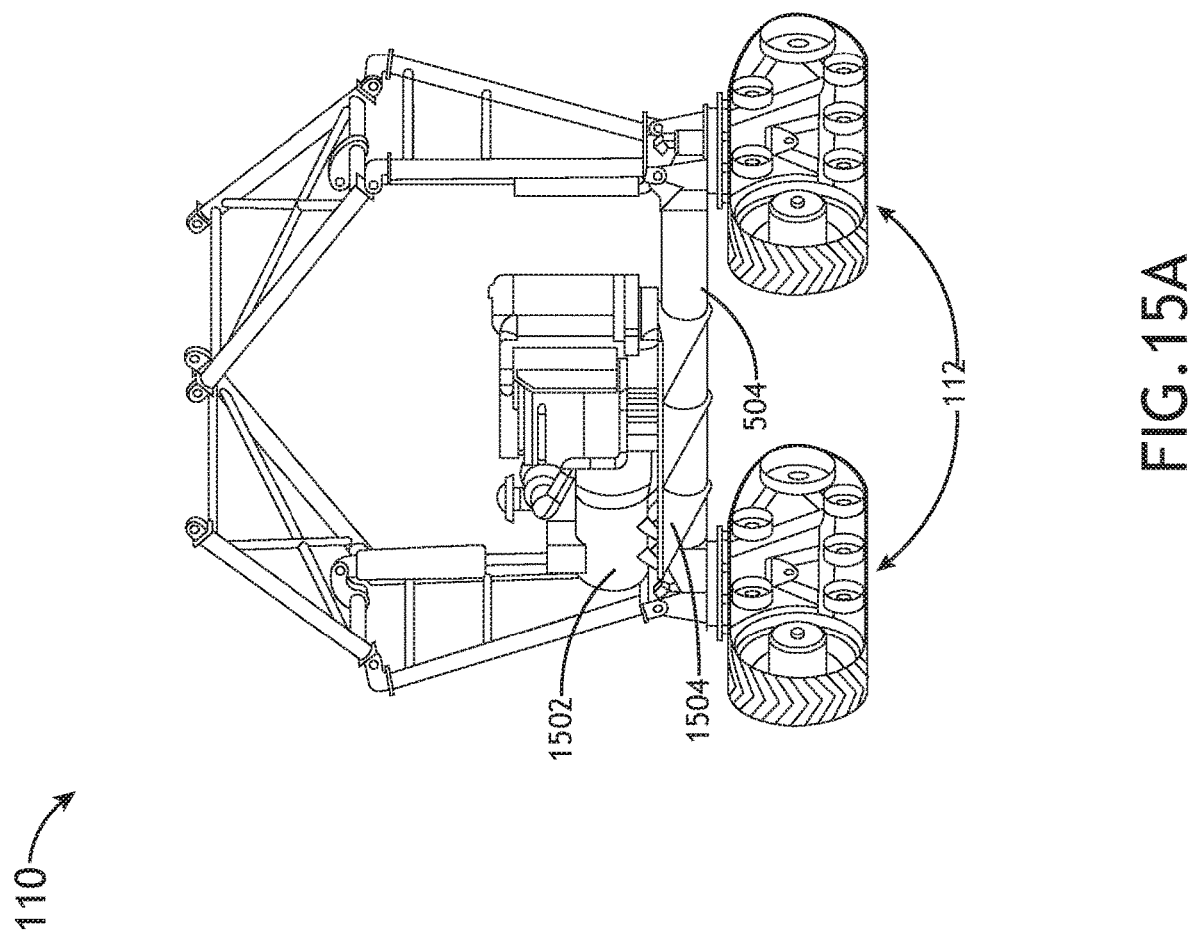
FIG. 15A illustrates a support structure of a field engagement unit, in accordance with one or more embodiments of the present disclosure.
Figure 15B:
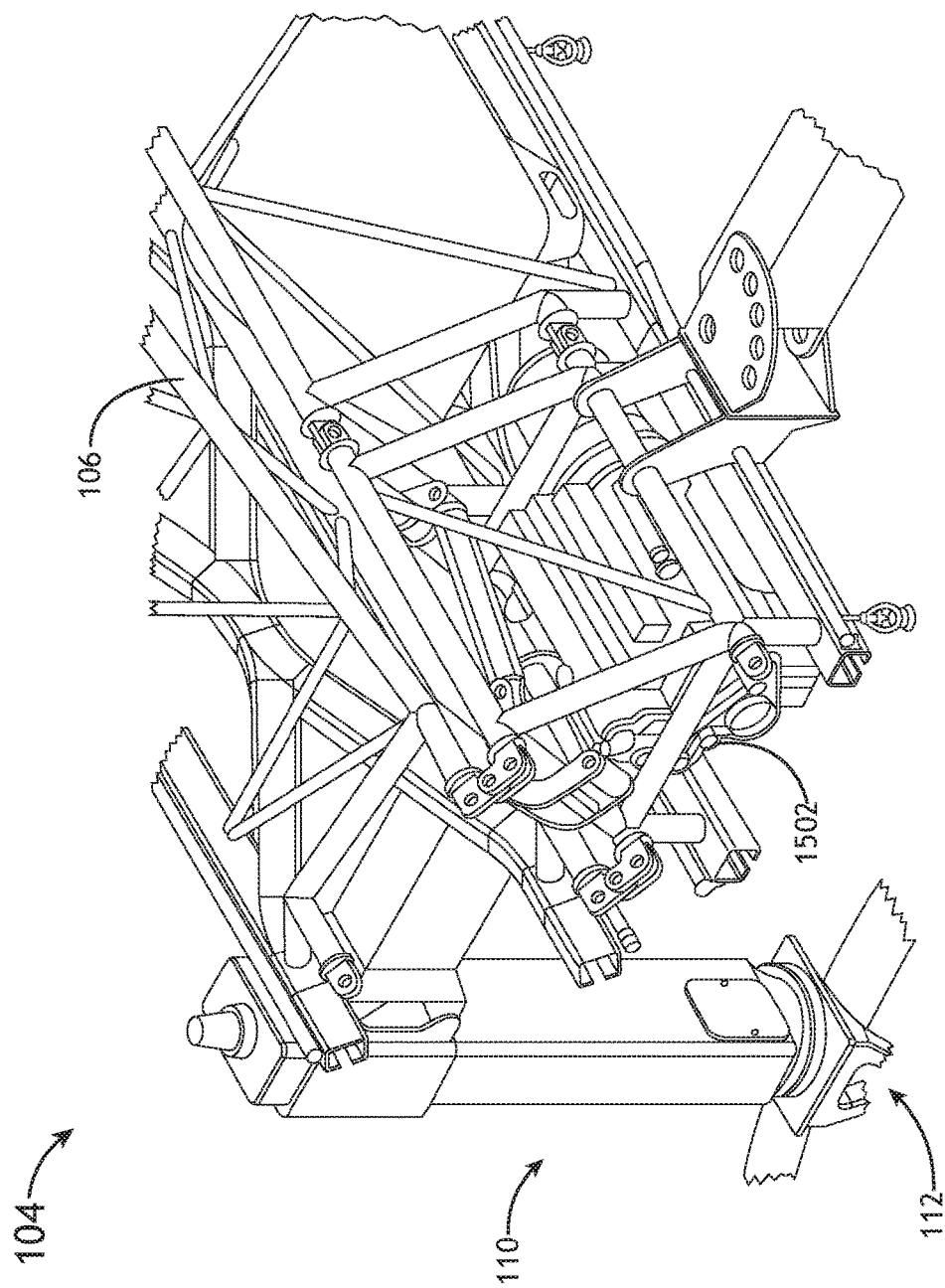
FIG. 15B illustrates a support assembly of a field engagement unit, in accordance with one or more embodiments of the present disclosure.

FIGS. 15A and 15B illustrate a power source 1502. For example, the power source 1502 may be a combustion engine-powered electric generator. For instance, the electric generator may be diesel-powered. By way of another example, the power source 1502 may be configured to run from swappable battery packs. In this example, the field engagement unit 102 is configured to sense when the battery pack is depleted and travel to a docking station to re-charge and/or swap battery packs. By way of another example, the power source 1502 may be configured to run from one or more fuel cells. In another embodiment, as illustrated in FIG. 15A, the power source 1502 is coupled to a platform 1504, where the platform 1504 is coupled on the cross member 504 of the support structure 110. In another embodiment, as illustrated in FIG. 15B, the power source 1502 is coupled to the support frame 106

In another embodiment, the field engagement unit 102 may include any number of one-power sources 1502 disposed on the one or more support structures 110, or within the support frame 106.

For example, the field engagement unit 102 may include a first power source 1502 coupled to the support assembly 110, where the first power source 1502 provides power to one or more propulsion units 122 and one or more steering assemblies 500. By way of another example, the field engagement unit 102 may include a second power source 1502 coupled to the support assembly 104, where the second power source 1502 provides power to the one or more work tool assemblies 114. It is noted that if the field engagement unit 102 is configured to implement a second power source 1502, the second power source 1502 may be mounted opposite the first field engagement unit 102 for purposes of weight distribution.

By way of another example, a power source 1502 may be coupled to each end of the support frame 106. For example, one power source 1502 may provide power for propulsion, steering, and support structure actuation, while a second or auxiliary power source 1502 may power the functionality of the work tools. In this regard, power efficiency is improved as several of the field engagement unit 102 tasks require only propulsion (e.g. crop scouting, imaging, driving from one field to another, traveling to refill). In these cases, the auxiliary power source could shut off to save fuel.

Figure 15C:
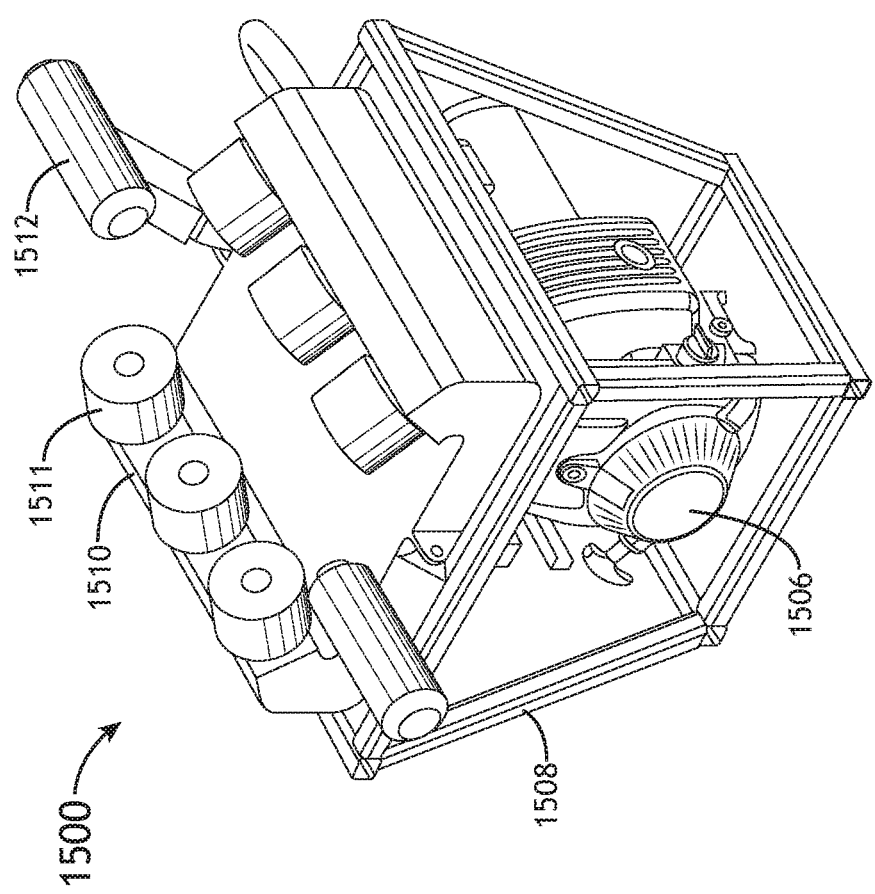
FIG. 15C illustrates a power source work tool assembly of a field engagement unit, in accordance with one or more embodiments of the present disclosure.

FIGS. 15C-15H illustrate a power source work tool assembly 1500 including one or more power sources 1506. In one embodiment, the power source work tool assembly 1500 operates under AC 2-phase, AC 3-phase, or DC power. In another embodiment, the power from the one or more power sources 1506 is distributed throughout the field engagement unit 102. For example, the field engagement unit may include one or more small power sources 1506 shared between the one or more support structures 110 of the support assembly 104. In this regard, the width of the field engagement unit 102 may be reduced, as additional space is not required on the one or more support structures 110 of the support assembly 104 for the power source 1502. In another embodiment, modular power pack work tool assemblies 114 are added as high power needs are required. For example, the output from the power pack may be directly added to the electrical energy available to work tools. In this regard, applications requiring high energy consumption may be supplied with one or more additional power packs. In another embodiment, as illustrated in FIG. 15C, the power source 1506 is housed in a cradle 1508. In another embodiment, the cradle 1508 is coupled to the work tool rail assembly 108 via a cradle 1508. In another embodiment (although not shown), the power sources 1506 are mounted directly to the underside of the carrier 1510.

Figure 15D:
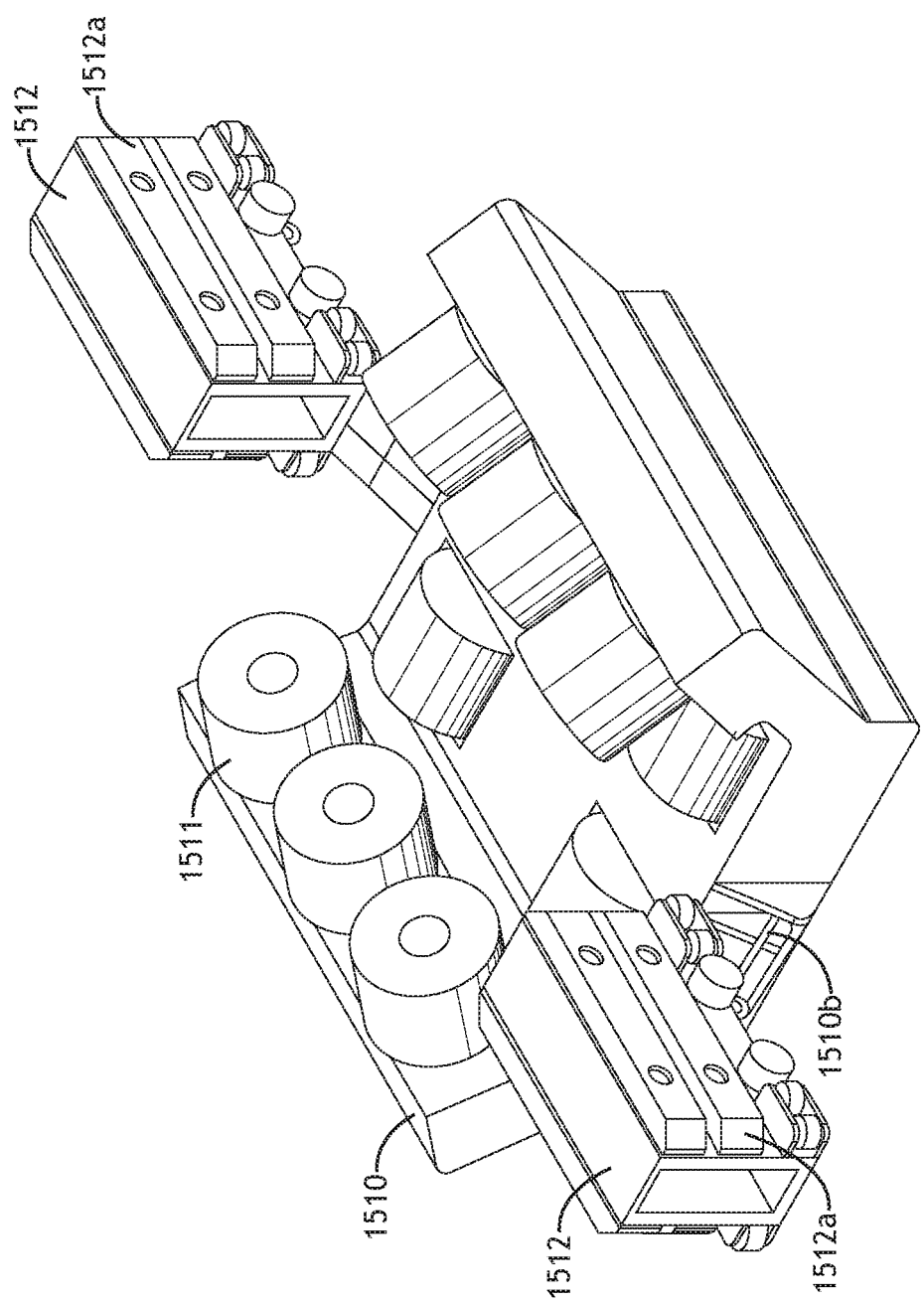
FIG. 15D illustrates a carrier of a power source work tool assembly, in accordance with one or more embodiments of the present disclosure.

In another embodiment, as illustrated in FIG. 15D, the carrier 1510 includes one or more rollers 1511. For example, the rollers 1511 are powered. In another embodiment, the carrier 1510 includes one or more conductor bars 1512. In another embodiment, the one or more conductor bars 1512 include one or more conducting plates 1512a. It is noted the field engagement unit 102 may include one or more control systems components to determine the position of the power source work tool assembly 1500 on the work tool rail assembly 108 including, but not limited to, one or more rotary or linear encoders on the one or more conductor bars 1512, as well as bar codes, UTC codes, etc.

It is noted herein that embodiments of the present disclosure are directed to the carrier 1510 being a modified version of the carrier 608*a*. However, carrier 608*a* may be usable as the carrier 1510 without modification. Additionally, carrier 608*b* may be usable as the carrier 1510 either with or without modification. Therefore, the above description should not be interpreted as a limitation on the present invention but merely an illustration.

Figure 15E:
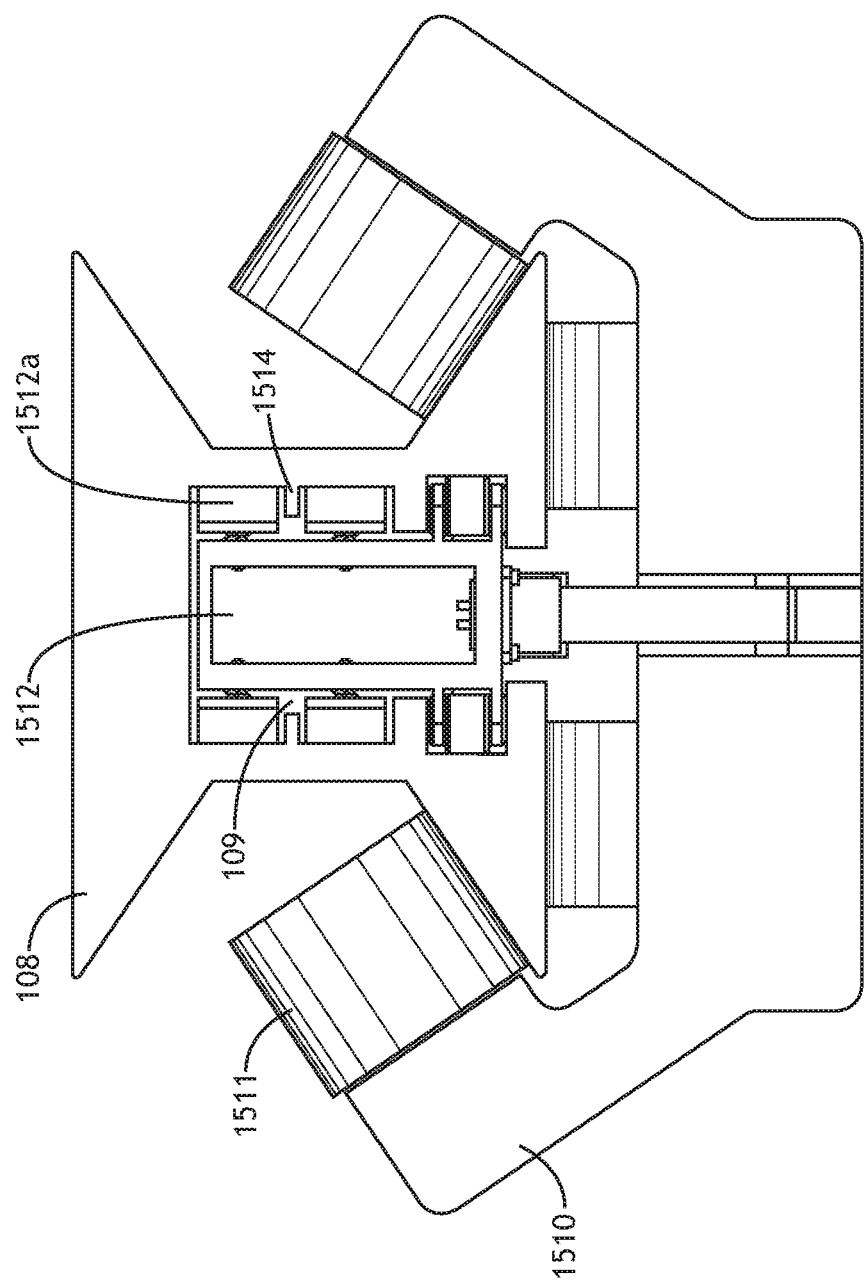
FIG. 15E illustrates a work tool rail assembly of a power source work tool assembly, in accordance with one or more embodiments of the present disclosure.
Figure 15F:
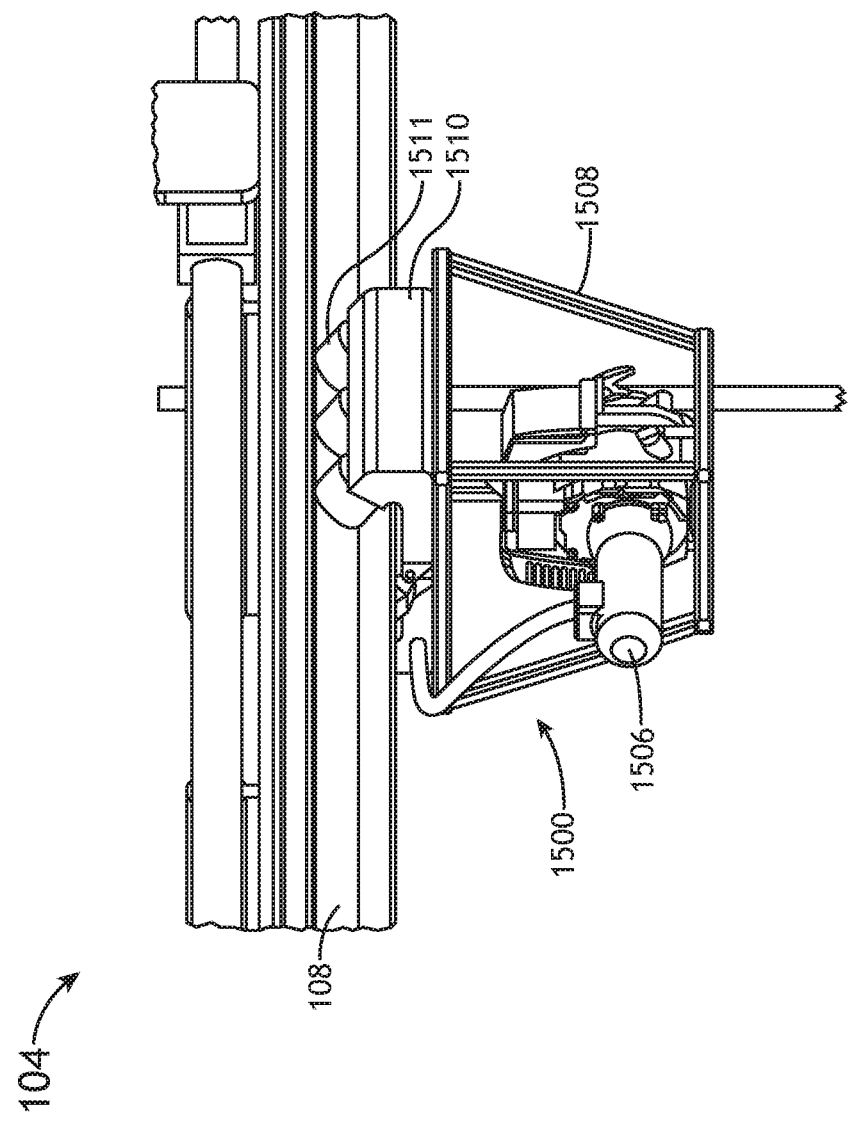
FIG. 15F illustrates a support structure of a field engagement unit, in accordance with one or more embodiments of the present disclosure.

In another embodiment, as illustrated in FIGS. 15E and 15F, the one or more power sources 1506 in the one or more cradles 1508 are coupled to the one or more work rails 108. In another embodiment, the work tool rail assembly 108 includes one or more conductor bar slots 1514. For example, the one or more cradles 1500 may be coupled to the conductor bar slots 1514 via the rail-mount bracket 1510 with one or more conductor bars 1512. By way of another example, the one or more conductor bars 1512 may be spring-loaded with one or more spring assemblies to ensure contact with the conductor bar slot 1514. In another embodiment, the conductor bars 1512 and one or more conductor rails can be made of power-conductive materials such as copper, aluminum, alloys of the two, or other materials conducive to electricity movement. In another embodiment, the one or more power sources 1506 may be configured to distribute power through the one or more conducting plates 1512*a* of the one or more conductor bars 1512. It is noted herein the conductor bar slot 1514 is recessed to prevent contact with conductive material including, but not limited to, water or a person's hand.

In one embodiment (although not shown), the conductor bars 1512 with plates 1512*a* may be formed as a single component conductor bar rail.

Figure 15G:
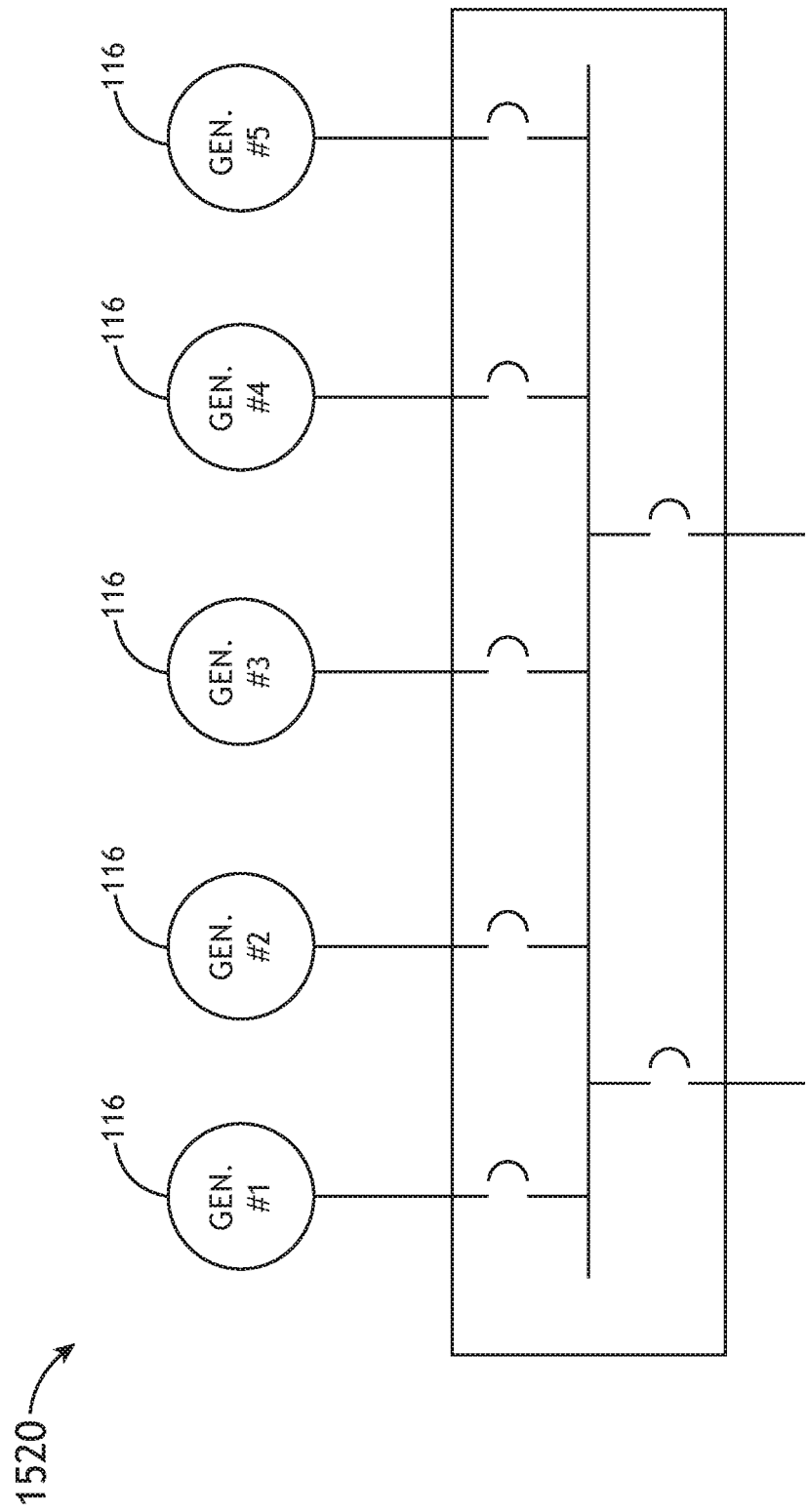
FIG. 15G illustrates a parallel power grid of a field engagement unit, in accordance with one or more embodiments of the present disclosure.

In another embodiment, power from the one or more power sources 1506 is distributed to the field engagement unit 102 through the conductor bars 1512 in contact with the work tool rail assembly 108. In another embodiment, as illustrated in FIG. 15G, power from the one or more power sources 116 is distributed throughout the field engagement unit 102 via a parallel power grid 1520. For example, distributing power through the parallel power grid 1520 may create a fall-over power redundancy, where the field engagement unit 102 is still able to function in a lower state if one or more power sources 116 fail or are turned off due to lower power needs from work tools or the unit in general. For instance, the control systems of the field engagement unit 102 may be configured to adjust to still allow for propulsion and reduced work tool functionality, though at a lower current availability. Additionally, the field engagement unit 102 may be configured to adjust by undocking the one or more non-functioning power sources 116 and docking one or more replacement functioning power sources 116 once loaded.

In another embodiment, the field engagement unit 102 is configured to shut off one or more power sources 116 when power input from them is unnecessary, without powering down the entire field engagement unit 102. For example, the field engagement unit 102 may be configured to implement an "eco-mode" setting to minimize power usage. For instance, utility companies often shut down irrigation systems to conserve available power during peak-times in the summer months. With the eco-mode setting, the field engagement unit 102 may be configured to continue to spray the field, but not irrigate during peak-times.

It is noted herein one or more power sources 1506 operating in parallel at an optimum capacity may provide the equivalent power as a single power source 1502 operating at a maximum capacity. This equivalent power may additionally be provided in a more efficient manner through one or more power sources 1506 operating in parallel at an optimum capacity than by a single power source 1502 operating at a maximum capacity.

It is noted herein the distributed power source work tool assemblies 1500 may be configured to additionally automatically connect to a power distribution system on the field engagement unit 102.

In another embodiment, power is distributed via inductive or near-field energy transfer to one or more batteries, one or more capacitors, or one or more battery/capacitor hybrids on the one or more work tool assemblies 114. It is noted herein that conductor bars 1512 would have contact with mating conductor rails on the gantry structure with inductive or near-field energy transfer. In another embodiment, electrical energy would pass to the work tools via induction. This type of energy transfer, although less efficient, would allow for less wear because of the contactless nature of the components, allowing for higher reliability.

It is noted herein the field engagement unit 102 may be configured to load and/or unload the power source work tool assemblies 1500 in a fashion similar to loading and unloading the one or more work tool assemblies 114. For example, one or more power sources 1506 in one or more cradles 1508 may be added as additional power demands arise, an additional one or more work tool assemblies 114 is added or an additional field engagement unit 102 is added. By way of another example, one or more power sources 1506 in one or more cradles 1508 may be loaded on the field engagement unit 102 to replace one or more currently-loaded, non-functioning power sources 1506 in one or more cradles 1508. By way of another example, an unloaded power source work tool assembly 1500 may be stored and maintained at a central location instead of in a field.

In another embodiment, the field engagement unit 102 includes one or more components to absorb solar radiation (i.e. generate solar power). In another embodiment, the field engagement unit 102 includes one or more components to store the absorbed radiation (i.e. one or more batteries).

Figure 15H:
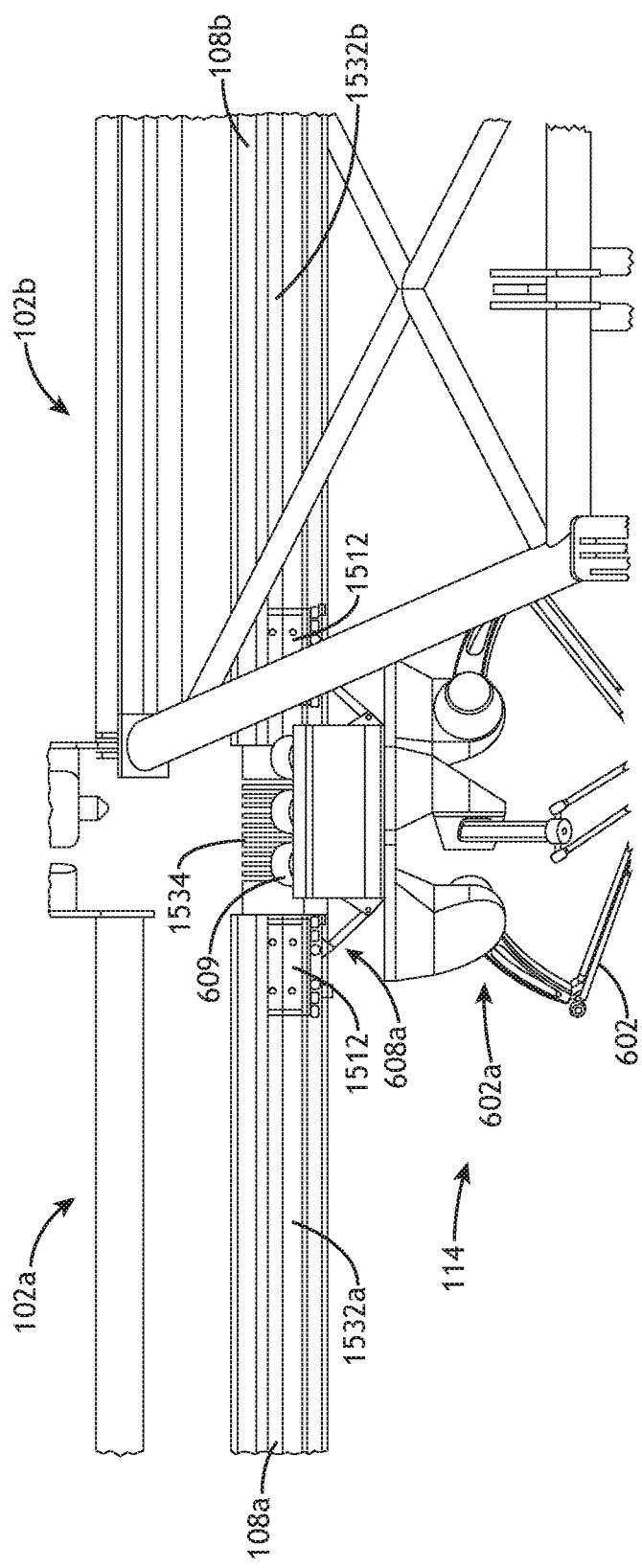
FIG. 15H illustrates a work tool assembly of a field engagement unit, in accordance with one or more embodiments of the present disclosure.

In another embodiment, as illustrated in FIG. 15H, a work tool 114 includes the rail-mount bracket 608. In another embodiment, the rail-mount bracket 608 includes two or more conductor bars 1512. It is noted the two or more conductor bars 1512 are necessary to cross the joint between two field engagement units and have access to power for the entirety of the transfer period. For example, two conductor bars 1512 of the rail-mount bracket 608 may initially be in contact with a conductor bar slot 1532*a* of a work tool rail 108*a* of a first field engagement unit 102*a*. As the work tool 114 travels along the work tool rail 108*a*, one of the two conductor bars 1512 of the work tool 114 is transferred to a conductor bar slot 1532*b* of a work tool rail 108*b* of a second field engagement unit 102*b*. In this regard, the work tool 114 may receive power from both the first field engagement unit 102*a* and the second engagement unit 102*b* simultaneously. Eventually, both conductor bars 1512 of the work tool 114 are transferred to the conductor bar slot 1532*b* of the work tool rail 108*b*. In this example, the space between the two field engagement units 102*a* and 102*b* may be covered with a flexible, non-conductive shield 1534 including, but not limited to, rubber. However, as the shield 1534 is non-conductive, it may also be necessary for the space between the two field engagement units 102*a* and 102*b* to include flexible electric leads that connect the field engagement units 102a and 102b together underneath the flexible, non-conductive shield 1534.

It is noted herein the one or more rail-mount brackets 1510 of the one or more cradles 1508 may be alternatively constructed to couple to the support frame 106 of the support assembly 104. It is further noted herein one or more power distribution components may alternatively or in addition be included in the support frame 106 of the support assembly 104. For example, one or more conductor bars may be embedded in the support frame 106.

In another embodiment, the one or more power sources may include the components for a solar-powered, wind-powered, or hydrogen-powered system. In the case of a solar-powered system, the components may include one or more mounted photovoltaic components, or photovoltaic paint, electrically coupled to one or more conversion components and one or more batteries, where the batteries store the electric power converted from the absorbed solar energy.

In another embodiment, the power sources may be coupled to the electricity grid, through the use of an in-field electric power network including overhead or buried power cables as well as through the use of permanent rails on which the field engagement unit might run.

In additional embodiments, the one or more field engagement units 102 include one or more local weather stations. These weather stations provide information to the one or more field engagement units 102 including, but not limited to, wind speed, wind direction, rainfall, relative humidity, ambient temperature, rainfall, and barometric pressure. In this regard, the control systems of the one or more field engagement units 102 may adjust the operating parameters of the one or more components of the support assembly 104, the one or more propulsion units 112, and the one or more work tool assemblies 114. For example, a herbicide spraying function may be stopped when wind speed exceeds a set value until wind speed is reduced under a threshold value. As such, herbicide drift with the wind to an unintended field may be prevented. By way of another example, the support assembly gantry may lower to a safe lower position to protect the field engagement system from being tipped over/damaged from damaging wind speeds when wind speed exceeds a set value. By way of another example, ET (evapotranspiration) may be calculated from other measured weather data. It is noted herein the calculated ET values, ambient temperature, and forecasted rainfall may be compared to soil moisture measurements at one or multiple depths to provide a high-resolution irrigation prescription map.

FIGS. 16A-16H illustrate the transportation of one or more field engagement units 102, in accordance with one or more embodiments of the present disclosure. FIGS. 16A-16H also illustrate the docking of two or more field engagement units 102 together, in accordance with one or more embodiments of the present disclosure. It is noted herein that the various system embodiments, components and architecture described previously herein should be interpreted to extend to the embodiments of FIGS. 16A-16H.

In one embodiment, the field engagement unit 102 may be transported by a truck 1602 with cab 1604. For example, the truck may pull an enclosed trailer 1606. By way of another example, the truck may pull a flatbed trailer 1608. By way of another example, the truck may pull a drop deck trailer. In another embodiment, the field engagement unit 102 may include a hitch attachment (e.g., three-point hitch attachment, ball hitch attachment, slot and tab attachment, bolted joint attachment, and the like) coupled to the support assembly 104. In the case of a hitch attachment, the hitch attachment may allow existing agricultural implements to be installed. In the case of a ball hitch attachment, the field engagement unit 102 may be moved via a third-party device such as a tractor or a truck instead of with self-propulsion or a semi-trailer 1602. In another embodiment, the field engagement unit 102 may be transported in a shipping container.

Figure 16A:
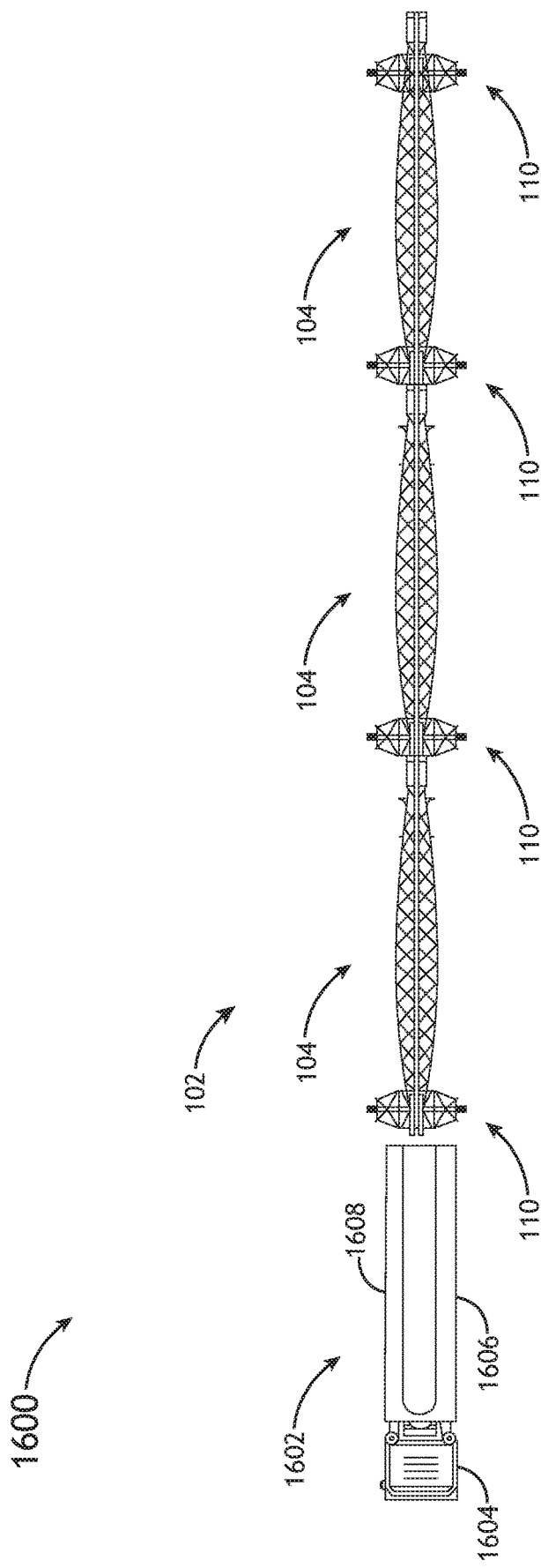
FIG. 16A illustrates a hauling unit and a field engagement unit, in accordance with one or more embodiments of the present disclosure.
Figure 16B:
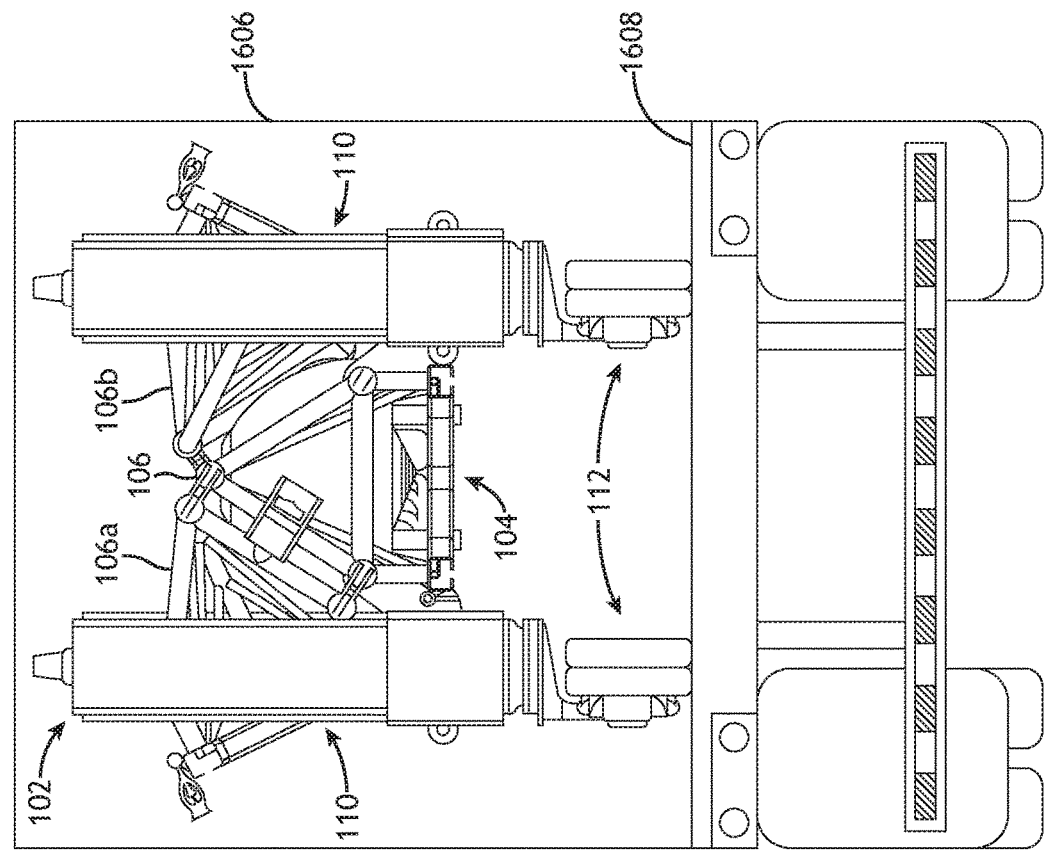
FIG. 16B illustrates a hauling unit and a field engagement unit, in accordance with one or more embodiments of the present disclosure.
Figure 16C:
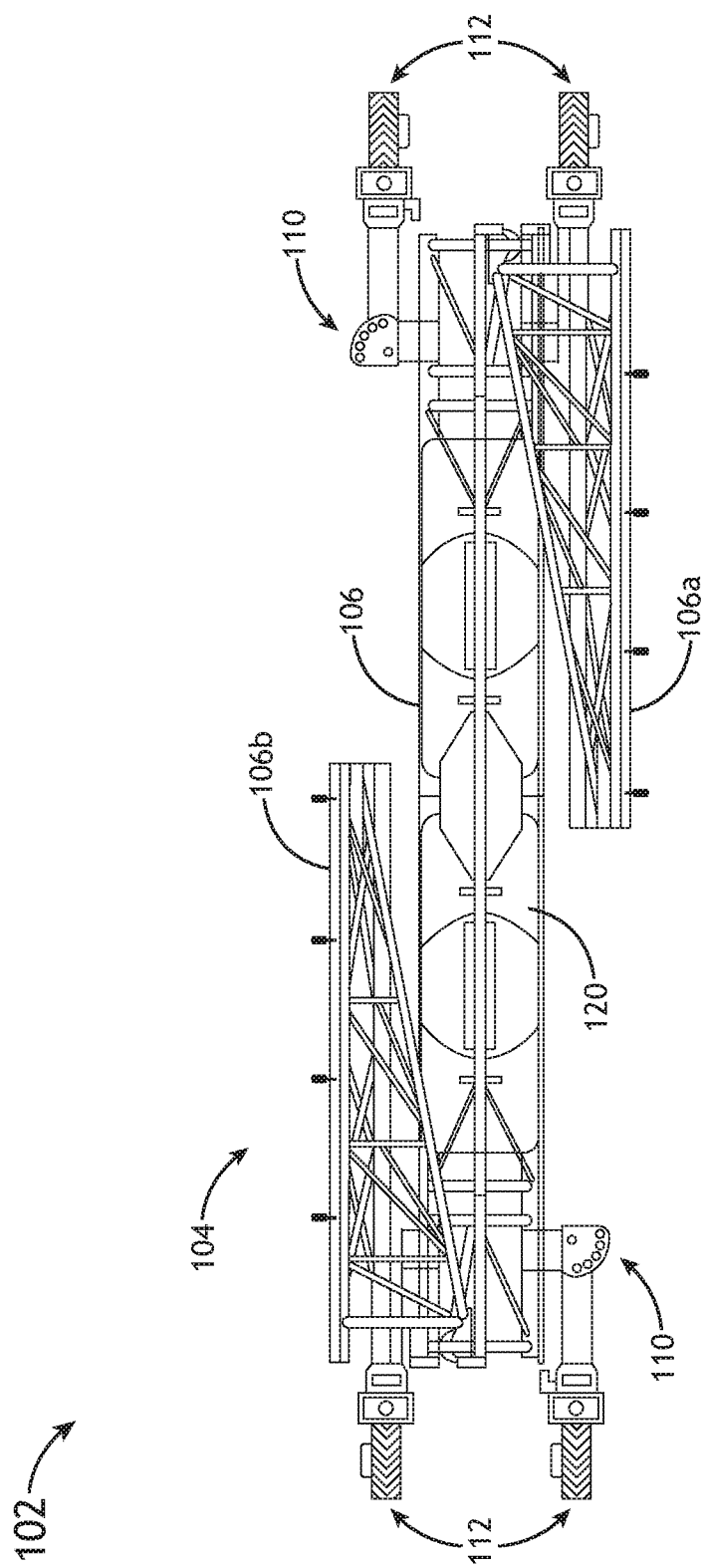
FIG. 16C illustrates a field engagement unit, in accordance with one or more embodiments of the present disclosure.

In another embodiment, as illustrated in FIG. 16B, the field engagement unit 102 may be configured so as to allow transportation to a location (e.g., field) by a truck 1600 via an enclosed trailer 1606, flatbed trailer 1608, or drop deck trailer in a compact form. In another embodiment, as illustrated in FIG. 16C, support frame arms 106a and 106b may be folded against the main section of the support frame 106. In another embodiment, the support structures 110 may be folded inward to minimize the width of the field engagement unit 102 footprint. In another embodiment, the propulsion units 112 are aligned so as to drive the field engagement unit 102 in a line parallel to the length of the unit 102. In another embodiment (although not shown), the support structure 106 is collapsible.

Figure 16D:
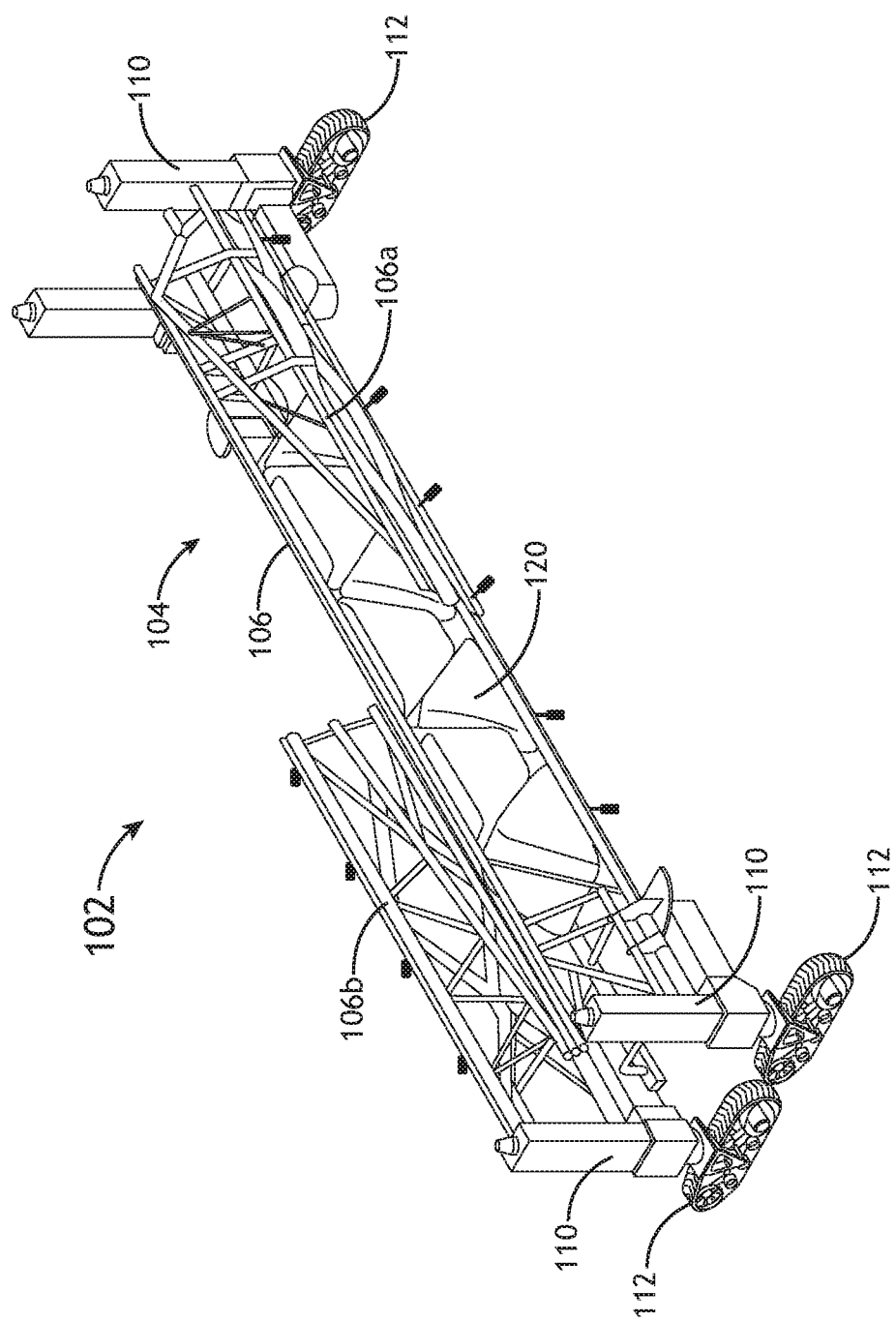
FIG. 16D illustrates a field engagement unit, in accordance with one or more embodiments of the present disclosure.
Figure 16E:
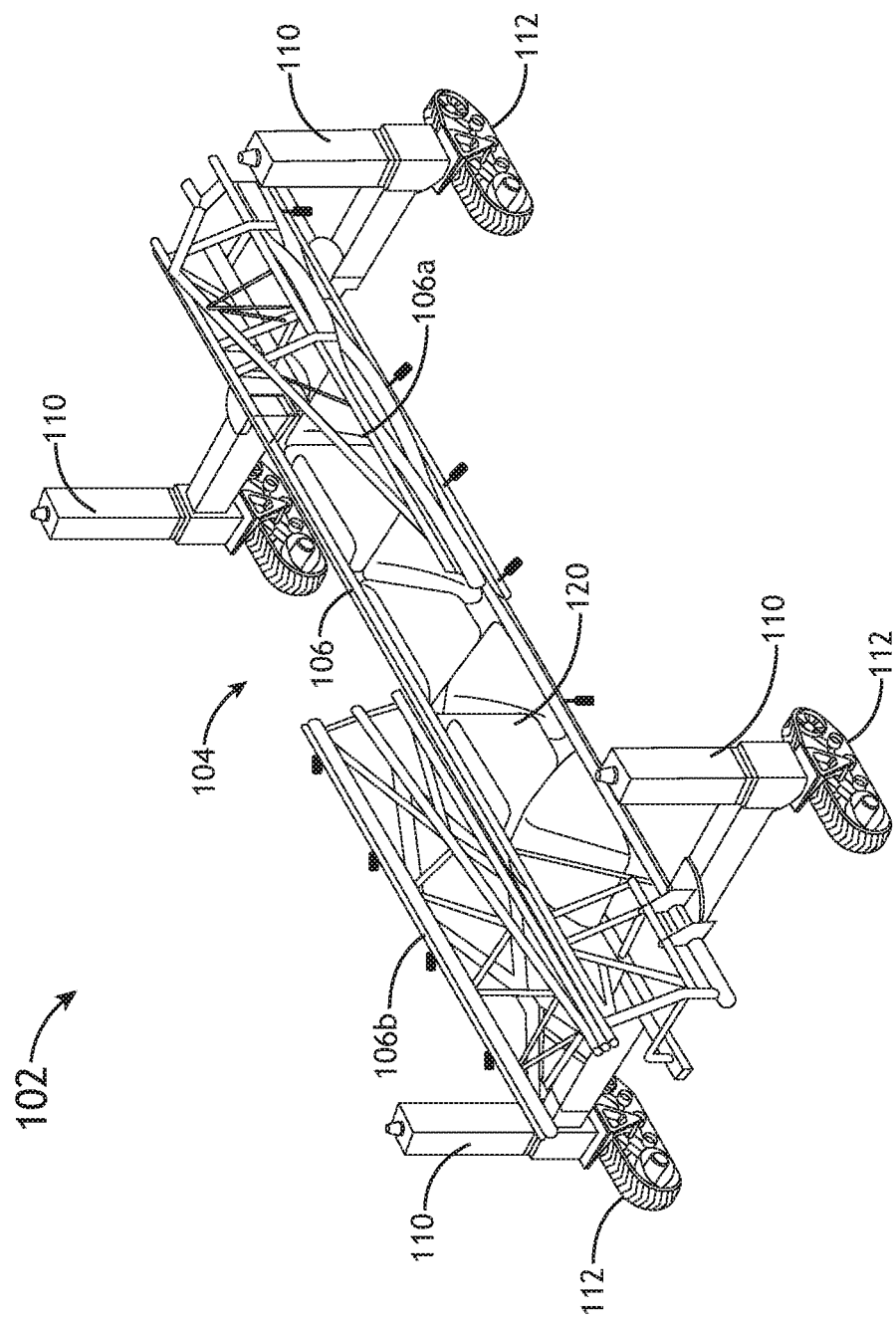
FIG. 16E illustrates a field engagement unit, in accordance with one or more embodiments of the present disclosure.
Figure 16F:
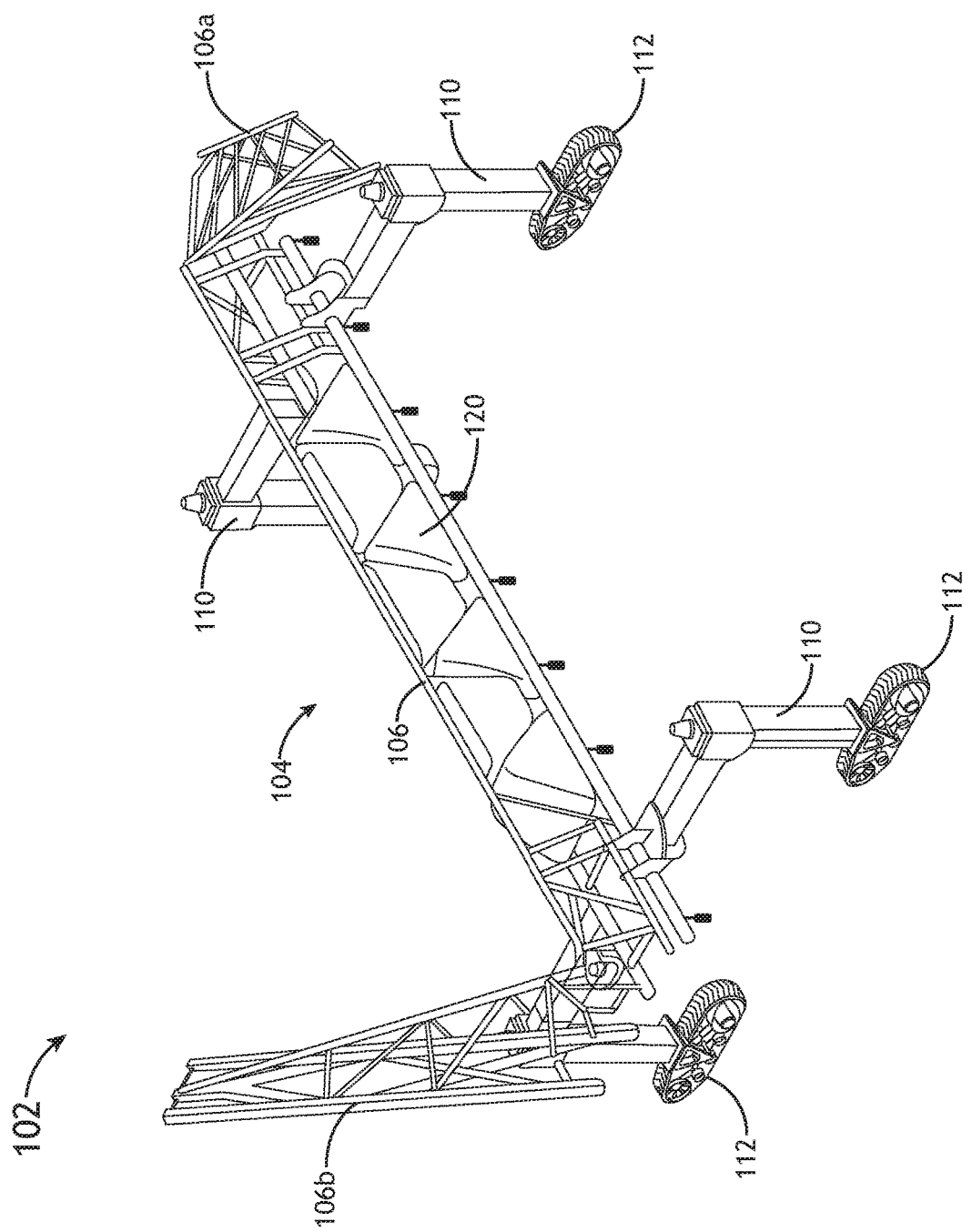
FIG. 16F illustrates a field engagement unit, in accordance with one or more embodiments of the present disclosure.

FIGS. 16D-FIG. 16G illustrate an unfolding routine following the transport of the field engagement unit 102 by truck 1600, in accordance with one or more embodiments of the present disclosure. In one embodiment, the support structure 106 is raised. In another embodiment, the propulsion units 112 are aligned with a line parallel to the length of the support structure 106. In another embodiment, the propulsion units 116 are actuated to propel the field engagement unit 102. In another embodiment, the ability for the field engagement unit 102 to load and unload itself includes driving itself down a ramp at the rear of the enclosed trailer 1606, flatbed 1608, or drop deck trailer. In another embodiment, as illustrated in FIG. 16D, the propulsion units 112 are rotated to be aligned with a line perpendicular to the length of the unit 102. In another embodiment, as illustrated in FIG. 16E, the propulsion units 112 are actuated so as to unfold the support structures 110 from a position substantially parallel to the support structure 106 length to a position substantially perpendicular to the support structure 106 length. In another embodiment, as illustrated in FIGS. 16F and 16G, the support frame arms 106a and 106b are unfolded from a folded position against the main section of the support frame 106.

Figure 16H:
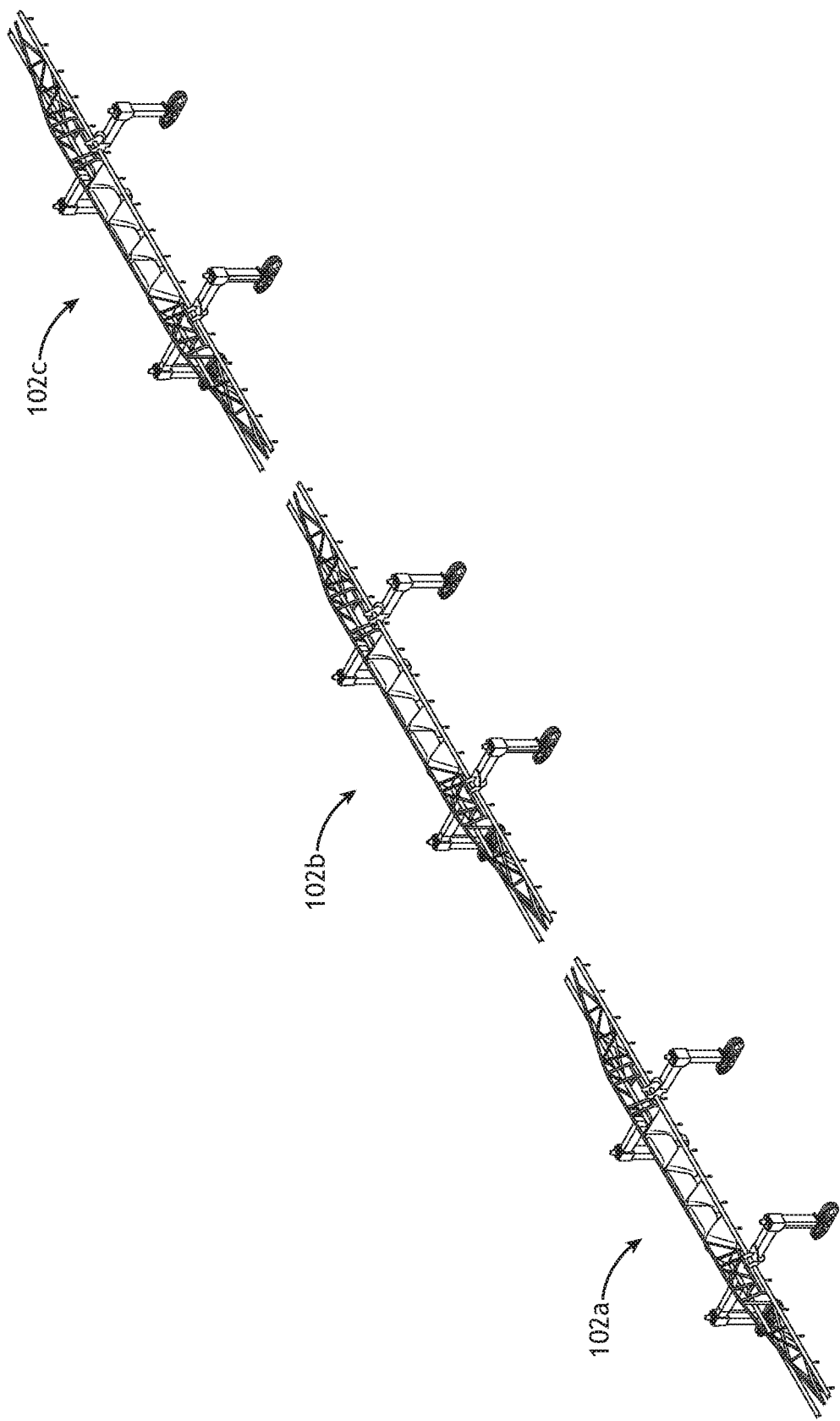
FIG. 16H illustrates field engagement units, in accordance with one or more embodiments of the present disclosure.
Figure 16J:
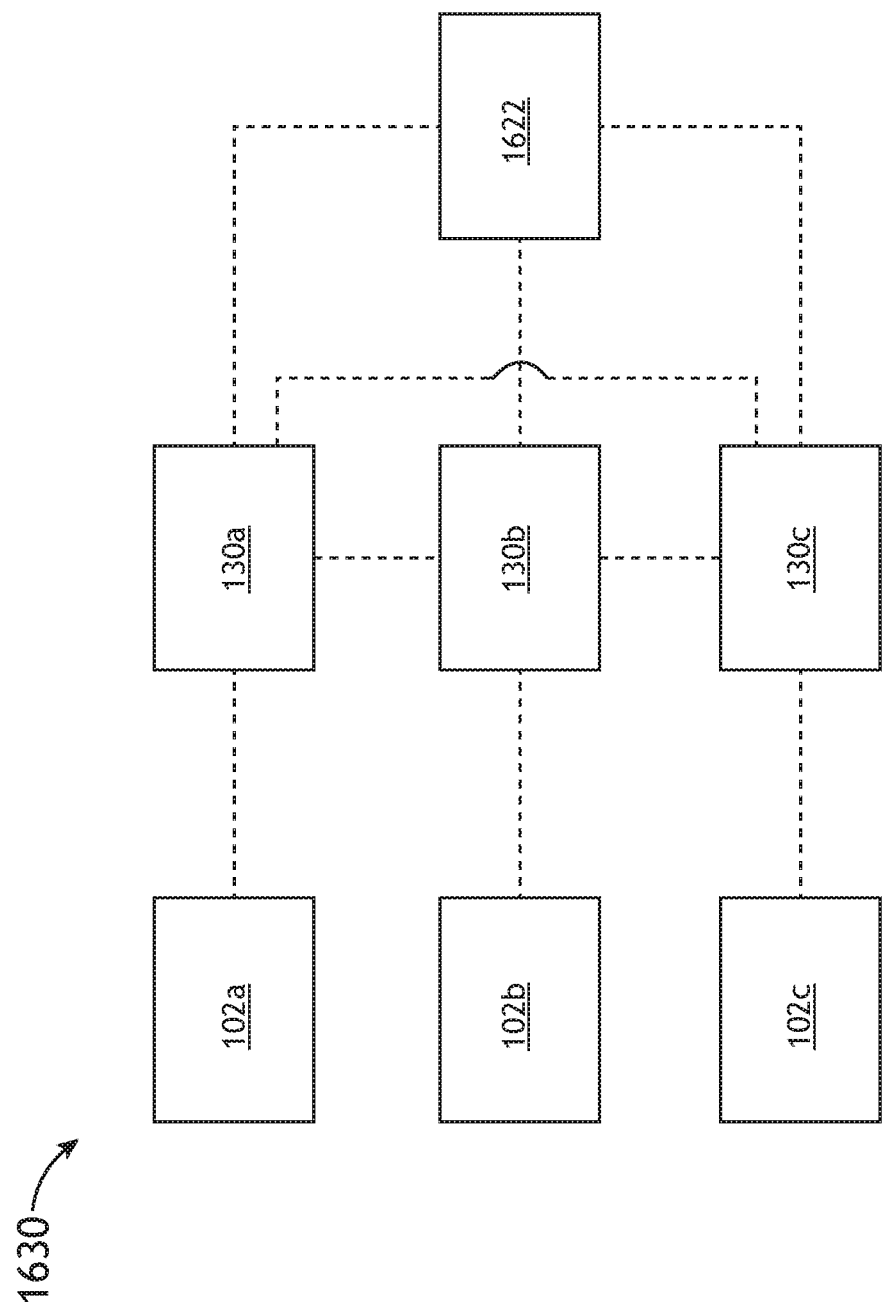
FIG. 16J illustrates a block diagram for controlling one or more field engagement units, in accordance with one or more embodiments of the present disclosure.

FIGS. 16H-16J illustrate implementing multiple field engagement units 102a, 102b, 120c simultaneously in a field, in accordance with one or more embodiments of the present disclosure. It is noted herein that any number of field engagement units may be implemented simultaneously.

In some cases, a single field engagement unit 102 may not be able to perform one or more field operations in an allotted period of time, or the one or more field operations may be too complex for a single field engagement unit 102 to complete. In one embodiment, the multiple field engagement units 102a, 102b, 102c are operated simultaneously in a field in a way so as to not duplicate or interfere with the work orders of the multiple field engagement units 102a, 102b, 102c. In this regard, work may be completed in a faster, more efficient manner.

In another embodiment, the multiple field engagement units 102a, 102b, 102c are coupled to one another. For example, the units 102a, 102b, 102c may be flexibly coupled together via one or more mechanical couplings. It is noted herein this flexible mechanical coupling allows the movement of work tools from one field engagement unit to another, while still allowing each unit to flex over undulating ground terrain. It is noted herein, however, that mechanical couplings may be restrictive. By way of another example, the units 102a, 102b, 102c may be coupled together via one or more wireline communication couplings. By way of another example, the units 102a, 102b, 102c may be coupled together via one or more wireless communication couplings. It is noted herein that the wireline and wireless communication couplings allow the multiple units 102a, 102b, 102c to operate with a distance between them or staggered, with one unit following in front or behind another unit (i.e., the support assemblies 104 are shown not contacting one another).

In another embodiment, the multiple field engagement units 102a, 102b, 102c are communicatively coupled to one or more central controllers 1622 via local controllers 130a, 130b, 130c, respectively. For example, the one or more central controllers 1622 may be a cloud-based architecture. In another embodiment (although not shown), the one or more central controllers 1622 are communicatively coupled to one or more controllers including, but not limited to, user controller 140. In another embodiment, the one or more central controllers 1622 and any communicatively coupled controllers 130a, 130b, 130c, 140 constantly receive and transmit sets of information to each other simultaneously, the sets of information providing operational conditions and operational parameters specific to a receiving or a transmitting field engagement unit. In this regard, the one or more central controllers 1622 and any communicatively coupled controllers 130a, 130b, 130c, 140 may be constantly monitoring the operative status of the multiple units 102a, 102b, 102c, the operative status including, but not limited to, the functioning of the components of a particular field engagement unit and the functioning of the particular field engagement unit relative to adjacent field engagement units. It is noted herein that this embodiment requires all sets of information to pass through the one or more central controllers 1622.

In another embodiment, the multiple field engagement units 102a, 102b, 102c are also communicatively coupled via the local controllers 130a, 130b, 130c, respectively. It is noted the inter-unit communicative coupling may be simultaneously or separately implemented with the communicative coupling of the multiple units 102a, 102b, 102c to the one or more central controllers 1622. In another embodiment, the one or more central controllers 1622 and any communicatively coupled controllers 130a, 130b, 130c, 140 constantly receive and transmit sets of information to each other simultaneously, the sets of information providing operational conditions and operational parameters specific to a receiving or a transmitting field engagement unit. In this regard, the one or more central controllers 1622 and communicatively coupled local controllers 130a, 130b, 130c, may be constantly monitoring the operative status of the multiple units 102a, 102b, 102c, the operative status including, but not limited to, the functioning of the components of a particular field engagement unit and the overall functioning of the particular field engagement unit relative to adjacent field engagement units. It is noted herein that this embodiment does not require all sets of information to pass through the one or more central controllers 1622.

It is noted herein the central controllers 1622 may be one or more servers 1622. It is further noted herein the central controllers 1622 may be a user controller.

In one embodiment, the local controllers 130a, 130b, 130c work together collectively as the central controller 1622 to coordinate the various functions of the field engagement units 102a, 102b, 102c as a collective controller, removing the need for a separate central controller 1622. In another embodiment, the local controllers 130a, 130b, 130c coordinate the function of the support structures 110, propulsion units 112, steering assemblies 500, and work tool assemblies 114 on the respective field engagement units 102a, 102b, 102c. In another embodiment, the field engagement units 102a, 102b, 102c are configured to compare the Global Positioning System (GPS) locations of each field engagement unit 102a, 102b, 102c so as to monitor, modify, or keep spacing between the units 102a, 102b, 102c. In another embodiment, the field engagement units 102a, 102b, 102c are configured to compare the locations of each field engagement unit 102a, 102b, 102c via positional or proximity sensing so as to monitor, modify, or keep spacing between the units 102a, 102b, 102c. In another embodiment, the field engagement units 102a, 102b, 102c are configured to compare the locations of each field engagement unit 102a, 102b, 102c via in-field wireless communications. In this regard, the field engagement units 102a, 102b, 102c may accurately pin-point the position of each unit 102a, 102b, 102c relative to one or more known geo-location points.

Figure 16K:
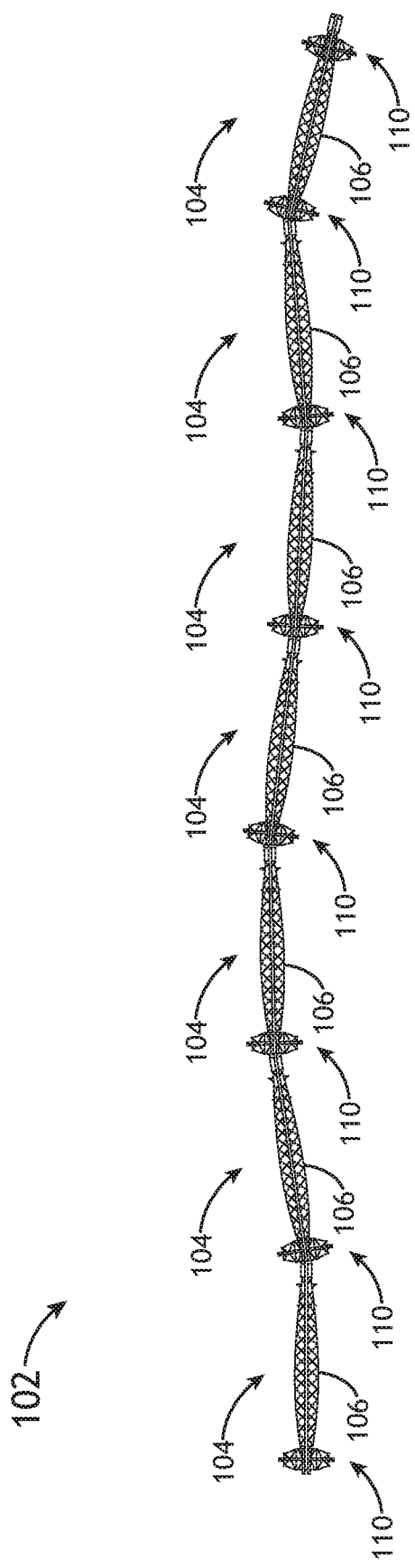
FIG. 16K illustrates a field engagement unit, in accordance with one or more embodiments of the present disclosure.

In another embodiment, as illustrated in FIG. 16K, a single field engagement unit 102 includes multiple support assemblies 104 with multiple support frames 106 and multiple support structures 110. In another embodiment, the local controller 130 constantly receives and transmits sets of information to and from the multiple support assemblies 104 simultaneously, the sets of information providing operational conditions and operational parameters specific to a receiving or transmitting support assembly 104. In this regard, the field engagement unit 102 simultaneously monitors the operative status of the multiple support assemblies 104, the operative status including, but not limited to, the functioning of the components of a particular support assembly 104 and the overall functioning of the particular support assembly 104 relative to other support assemblies 104.

It is noted herein that communications between the multiple field engagement units 102a, 102b, 102c in FIGS. 16H-1J (or the multiple support assemblies 104 in FIG. 16K) may include maintaining geo-spatial positioning of the extreme support structure 106 ends of the support assemblies 104 in each field engagement unit 102 to a selected tolerance level. It is further noted herein the extreme support structure 106 ends may include GPS on each support structure 110 and/or proximity sensing devices to precisely measure and control the position of the field engagement unit 102 relative to the other field engagement units 102.

While much of the present disclosure has been focused on the omnidirectional capable field engagement unit 102, it is noted herein that such a configuration is not a limitation on the scope of the present disclosure. Rather, much of the present disclosure may be extended to the context of an improved center pivot irrigation system. FIGS. 17A-17E illustrates a center pivot irrigation system 1700, in accordance with one or more embodiments of the present disclosure. It is noted herein that the various system embodiments, components and architecture described previously herein should be interpreted to extend to the center pivot docking system of FIGS. 17A-17E, unless otherwise noted.

It is further noted that one or more of the various components or sub-systems of the present disclosure may be extended to any center pivot operational environment. For example, any center pivot irrigation system known in the art may be retrofitted with one or more of the capabilities (e.g., work tools, sensors, etc.) of the present disclosure. A center pivot irrigation system is described in U.S. Patent Publication No. 2007/0188605, published on Aug. 16, 2007; and U.S. Patent Publication No. 2008/0046130, published on Feb. 21, 2008, which are each incorporated herein by reference in their entirety.

Figure 17A:
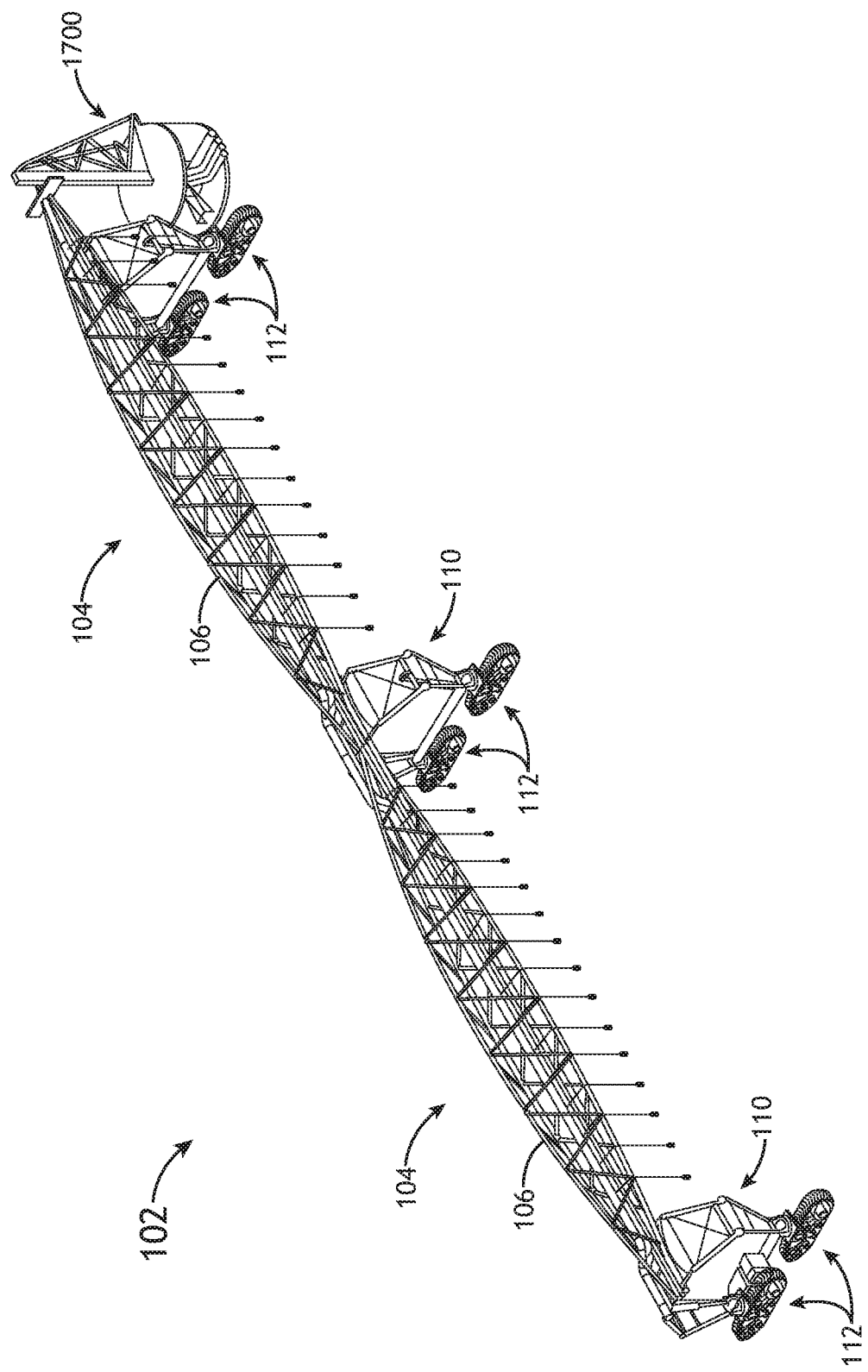
FIG. 17A illustrates a field engagement unit, in accordance with one or more embodiments of the present disclosure.

In one embodiment, as illustrated in FIG. 17A, the center pivot docking station 1702 is coupled to one or more support assembly 104 spans. In another embodiment, each support structure 110 propels its particular assembly 104 span around the docking station 1702. It is noted herein that each propulsion unit 112 is steered at a different angle depending on its proximity to the central docking station 1702. For example, the propulsion units 112 closest to the docking station 1702 will be steered to a sharp angle relative to those that are at the outermost portion furthest from the central pivot 1700.

In another embodiment, one or more material storage containers 120 may be located near the center pivot docking station 1702. It is noted herein that the center pivot docking station 1702 may be implemented with field engagement units 102 including the propulsion unit 112 as illustrated in FIG. 4I.

In another embodiment, the center pivot system 1700 includes a center pivot drive system configured to drive the one or more propulsion units of the center pivot field engagement unit, where the one or more propulsion units provide rotational control of the center pivot field engagement unit.

Figure 17B:
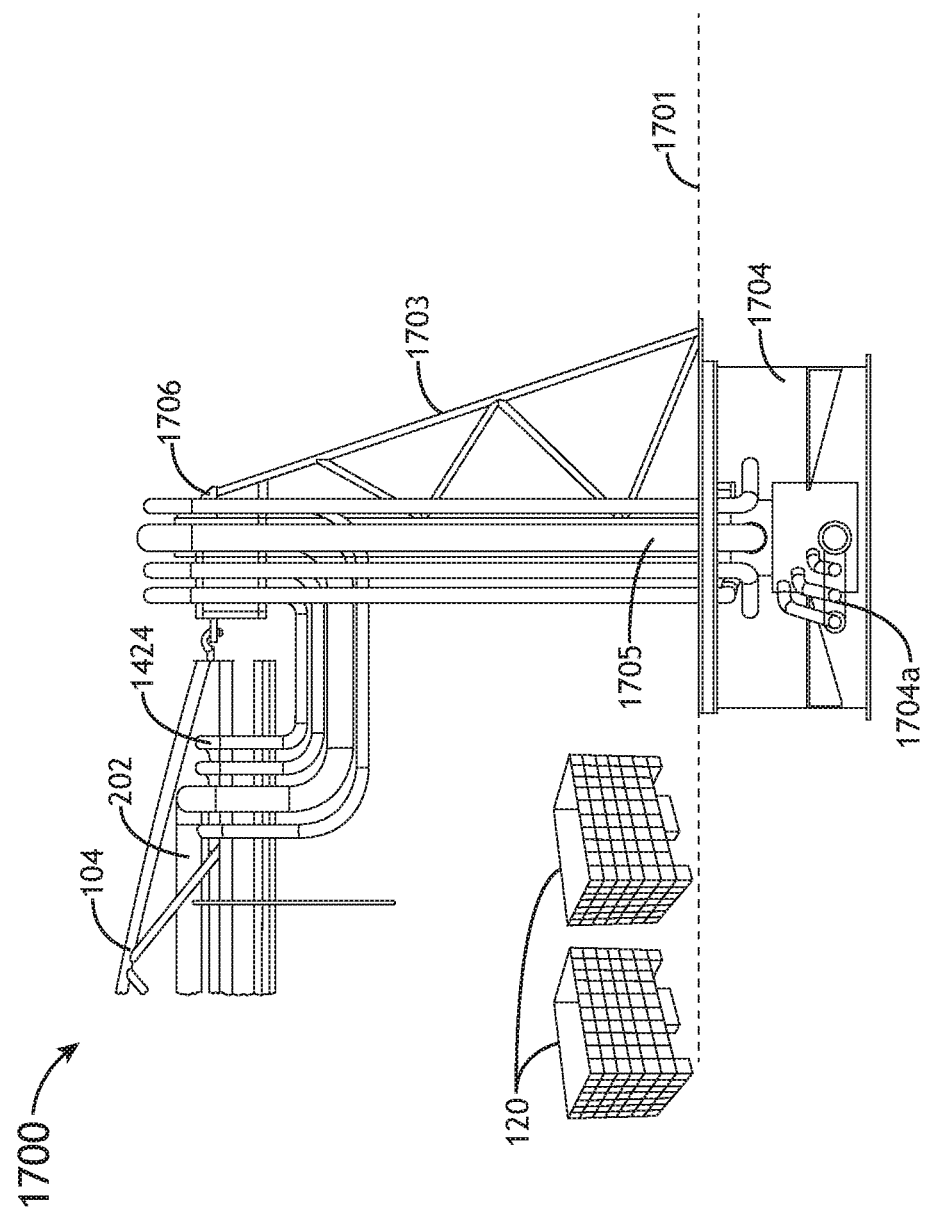
Figure 17C:
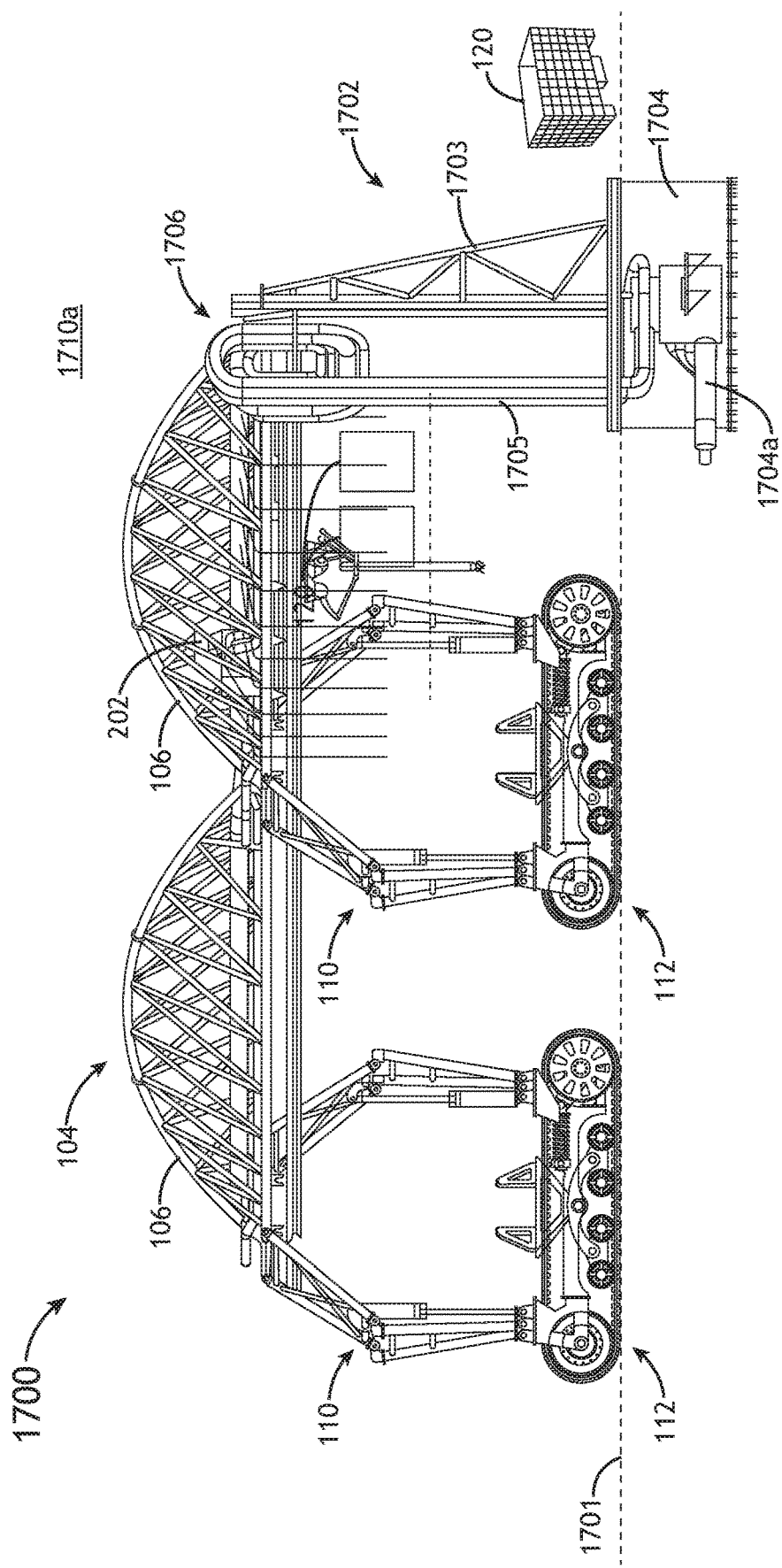
Figure 17D:
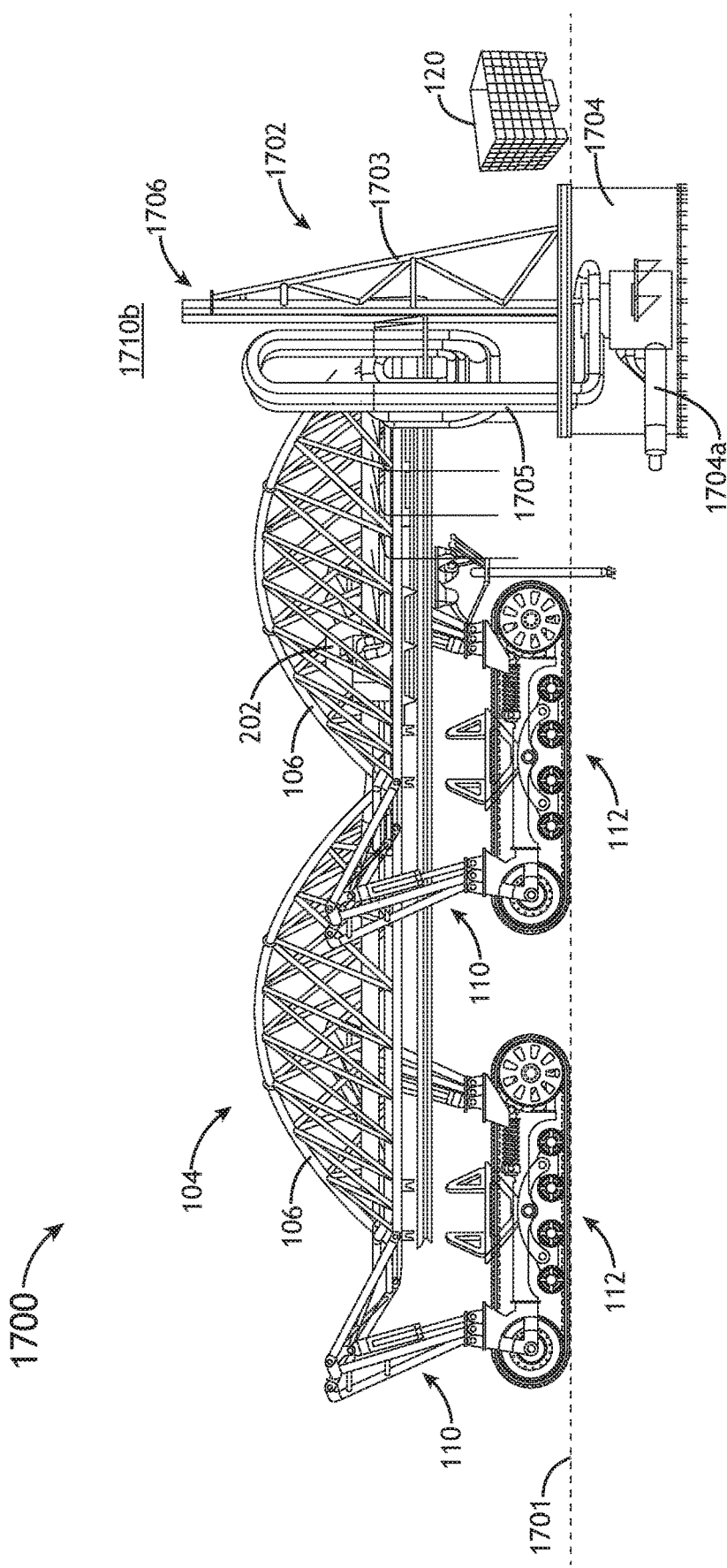

In another embodiment, as illustrated in FIG. 17B, the center pivot docking station 1702 includes a support frame 1703. In another embodiment, the docking station 1702 includes a base 1704 buried under the ground 1701. In another embodiment, the base 1704 includes one or more feed tubes 1704a. For example, the feed tubes 1704a may mate with tender containers, like seed, herbicide, fertilizer, harvested grain, water from an irrigation well, transporting material/product and irrigation water underground. By way of another example, one or more feed tubes 1704a may have an exposed end with which the docking station 1702 may receive material and/or product from nearby material storage containers 120. In another embodiment, the base 1704 is able to rotate while allowing the continuous transfer of inputs from storage containers 120 that are located near the docking station 1702. It is noted herein the base 1704 could instead be above or only partially buried, depending on the full range of vertical motion required by the respective field engagement unit 102.

In another embodiment, the docking station 1702 includes material feed components 1705. For example, the material feed components 1705 may include one or more flexible tubes. For instance, the material feed components 1705 may include at least the main tube 202 and the auxiliary tubes 1424. In another embodiment, a bracket 1706 is coupled to the field engagement units 102. In another embodiment, the bracket 1706 is raised or lowered via an electric, hydraulic, pneumatic, telescopic section, or mechanical drive assembly. In another embodiment, the docking station 1702 includes a series of rollers and bearings throughout the support frame 1703 to assist is raising or lowering the bracket 1706. In another embodiment, as illustrated in position 1710a in FIG. 17C and position 1710b in 17D, both the center pivot docking station 1702 and each support structure 110 work in conjunction to raise or lower the support assemblies 104. In this regard, the work tool assemblies 114 on the support assemblies 104 may operate at a desired distance from the ground.

It is noted herein the circumference is largest at the outermost portion of the unit. As such, the area of the field at the extremity of the unit is also greatest and will need more work tools to balance out the total amount of available time per revolution of the complete unit. In another embodiment, where a center pivot docking station 1702 is implemented, the field engagement unit 102 is constructed and/or operated such that the one or more work tool assemblies 114 on the field engagement unit 102 are predominantly used at the outermost portions of the center pivot field engagement unit so as to avoid the center pivot docking point.

In another embodiment, the field engagement unit 102 is permanently coupled to the center pivot docking station 1702. In another embodiment, the field engagement units 102 are controllable via the local controller 130 such that they may self-transport themselves from one location to another (e.g., one field to a second field). In this case, the local controllers 130 may direct the field engagement units 102 to dismount from a first center pivot docking station 1702, transport themselves to a second center pivot docking station 1702, and attach to the second center pivot docking station 1702. In this embodiment, necessary connections including, but not limited to, electrical power, irrigation water, automatic controls, seed product, and chemical lines would be automatically disconnected from the first center pivot docking station 1702 and re-connected to the second center pivot docking station 1702. Alternatively and/or additionally, one or more of the dismounting process, attachment process, disconnection process and/or reconnection process may be carried out manually. This embodiment is particularly advantageous in the case where an individual does not require a permanent structure for on-demand irrigation, but instead requires irrigation in different fields at different times. This embodiment would allow such a user to implement fewer systems and system components, sharing a single unit across multiple fields.

In another embodiment, the field engagement unit 102 implements current start/stop or variable speed electro-mechanical or hydro-electric propulsion technology.

FIG. 18 illustrates one or more field engagement units 102 being used in livestock applications, in accordance with one or more embodiments of the present disclosure. It is noted herein that the various system embodiments, components and architecture described previously herein should be interpreted to extend to the livestock applications of the field engagement unit 102 in FIG. 18.

Figure 18A:
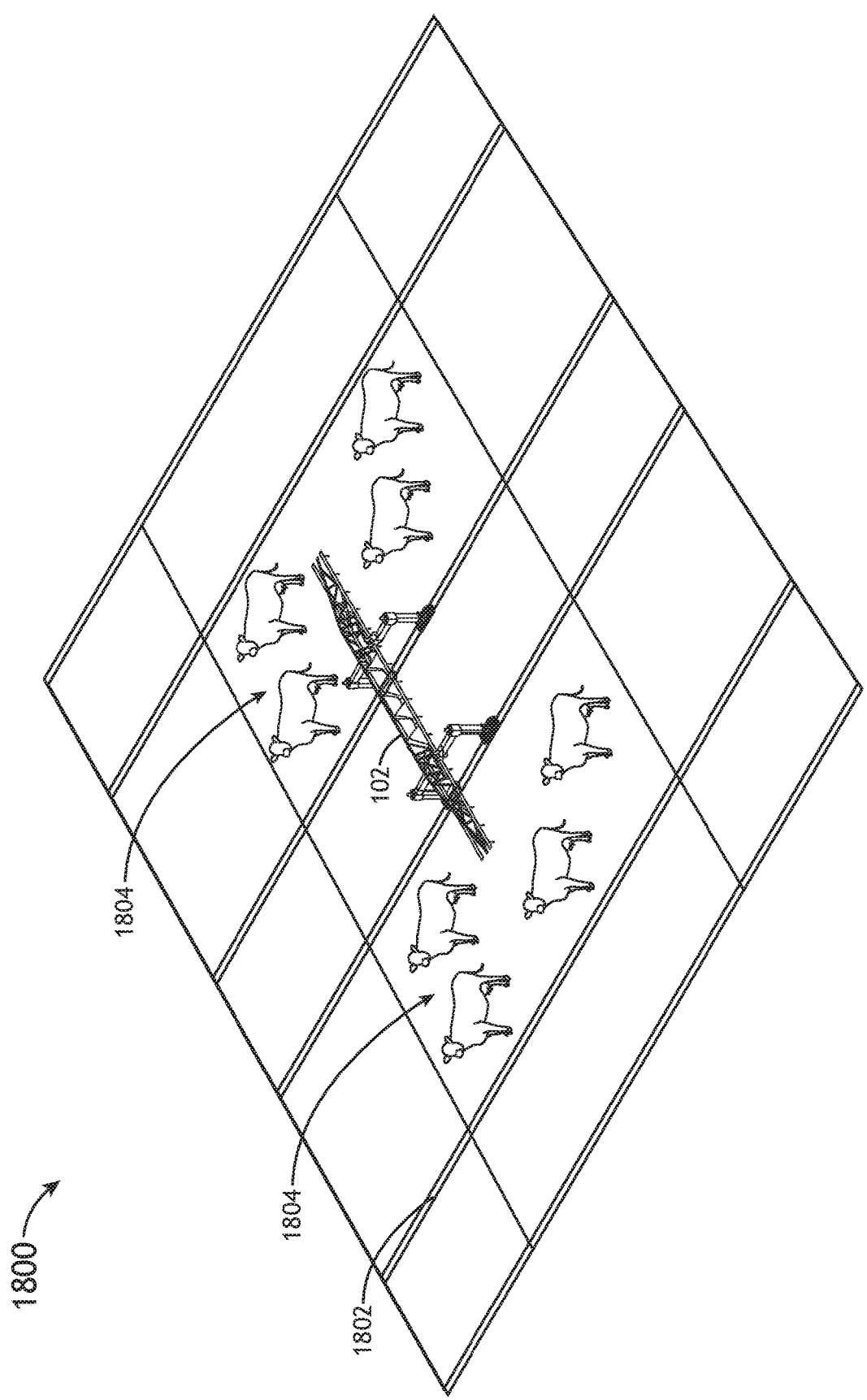
Figure 18B:
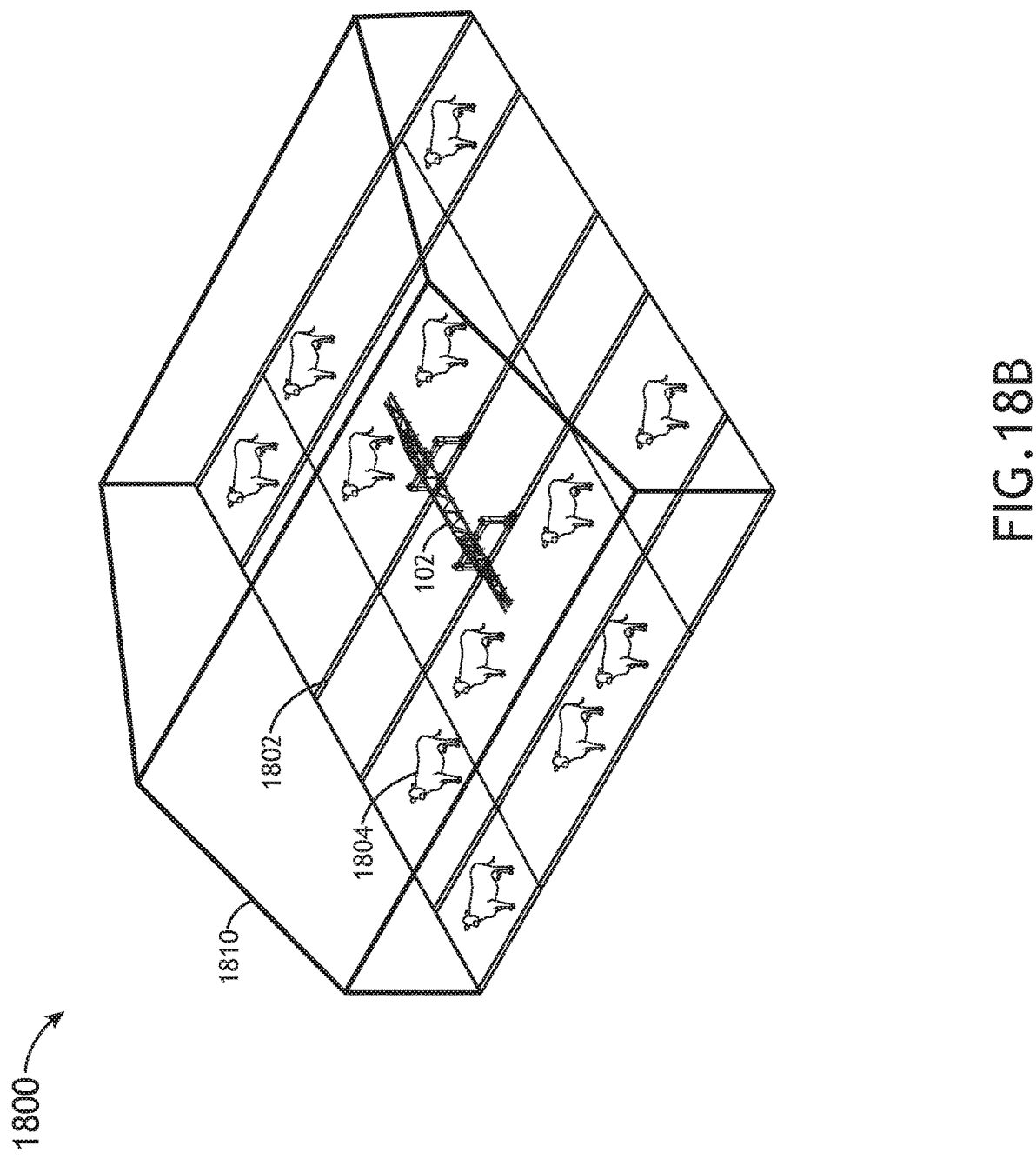

FIGS. 18A and 18B illustrate an agricultural processing system 1800, in accordance with one or more embodiments of the present disclosure. In one embodiment, the field engagement unit 102 is implemented in a livestock yard 1800 to manage livestock 1804, where the field engagement unit 102 is configured to move along one or more paths 1802. In another embodiment, the field engagement unit 102 is implemented in a livestock enclosure 1810 to manage livestock 1804, where the field engagement unit 102 is configured to move along one or more paths 1802. For example, the livestock enclosure 1810 may be a livestock containment building.

Examples of livestock include cattle, swine, poultry, and the like. However, it is noted herein that the field engagement unit 102 may be expanded to animals other than livestock.

In one embodiment, one or more livestock-specific work tool assemblies 114 are attached to the support assembly 104 of field engagement unit 102. For example, the livestock-specific work tool assemblies 114 may include one or more identification tracking sensors to track livestock via ID or DNA or monitor livestock's social behaviors and environments, or one or more identification sensors to transmit livestock's ID information.

By way of another example, the livestock-specific work tool assemblies 114 may include one or more autonomous feed bunk fillers; manure removers including, but not limited to, one or more manure scrapers, grapplers, scoopers, liquid flushing device, or a vacuum device; water sprayers to cool livestock in hot weather and/or wash out animal pens; or one or more insecticide sprayers to apply insecticide to the livestock and pens.

By way of another example, the livestock-specific work tool assemblies 114 may include one or more cattle prods, one or more livestock leading nooses, behavioral incentive distributors (e.g., a corral or treat-provider), or one or more livestock relocating devices including one or more of a corral, a claw, a basket, or a platform to herd or pick up to re-locate livestock to a designated location.

By way of another example, the livestock-specific work tool assemblies 114 may include one or more animal health work tools (e.g. thermal cameras) to scan for livestock with high temperatures or one or more vision systems in one or more pens to scan livestock to capture and measure for predicting unhealthy behaviors. By way of another example, the livestock-specific work tool assemblies 114 may include one or more robotic arms coupled to one or more check-up devices, where the one or more robotic arms coupled to one or more check-up devices are configured to perform one or more veterinary services such as completing a health check on livestock, one or more medicine applicators, or one or more robotic arms coupled to one or more robotic arms coupled to one or more surgery tools, where the one or more robotic arms coupled to one or more surgeon tools are configured to perform surgical procedures (e.g. assisting mother cow giving birth by pulling baby calf(s).

In another embodiment, pen manure scrapers may involve scooping up manure form the pen, pushing the manure out of the pen, or sucking up the manure and transporting it to another location. In another embodiment, the field engagement unit 102 is configured to process and reapply the manure scrapings as plant fertilizer.

It is noted herein the field engagement unit 102 includes one or more system components to control the one or more components of the field engagement unit 102. In one embodiment, the local controller 130 is configured to measure one or more operational parameters of the one or more control system components. For example, the operational parameters may include, but are not limited to, linear position of electric actuators, rotary position of electric actuators, voltage of electric actuators, and amperage of electric actuators. By way of another example, the operational parameters may include, but are not limited to, linear position of hydraulic lift cylinders, rotary position of hydraulic lift cylinders, and pressure of hydraulic lift cylinders. By way of another example, the operational parameters may include, but are not limited to, any operational parameters related to pneumatic system components.

While embodiments of the present disclosure are directed to autonomous, nearly autonomous, or semi-autonomous functionality, it is noted herein that the one or more embodiments of the present disclosure may instead be user-operated. Additionally, it is noted herein that any of the one or more embodiments of the present disclosure may instead be operated by a self-propelled machine.

It is noted herein that one or more components of the field engagement unit 102 such as, but not limited to, the support frame 106, the work tool rail assembly 108, the support structures 110, the propulsion units 112, the steering assemblies 500, the work tool assemblies 114 and any components of the work tools assemblies 114, the material storage containers 120, and the manifold assemblies 122 may be implemented on any lateral-move irrigation system known in the art. It is further noted herein that one or more components of the support frame 106, the work tool rail assembly 108, the support structures 110, the propulsion units 112, the steering assemblies 500, the work tool assemblies 114 and any components of the work tools assemblies 114, the material storage containers 120, and the manifold assemblies 122 may be implemented on any center-pivot irrigation system known in the art.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively, or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C, C++, python, Ruby on Rails, Java, PHP, .NET, or Node.js programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is described herein as a single figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B".

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed:

1. A farming system comprising:
   a field engagement unit comprising:
   a support assembly comprising: a support frame; one or more work tool rail assemblies; and one or more support structures;
   one or more propulsion units, wherein the one or more propulsion units are configured to provide omnidirectional control of the field engagement unit;
   one or more work tool assemblies, wherein the one or more work tool rail assemblies are positioned such that the one or more work tool assemblies are actuatable along the one or more work tool rail assemblies so to provide one or more work tool attachments of the one or more work tool assemblies selective access to one or more regions located beneath the support frame; and
   a controller, wherein the controller includes one or more processors configured to execute a set of program instructions stored in memory, wherein the program instructions are configured to cause the one or more processors to control a position of the one or more work tool assemblies along the one or more work tool rail assemblies.

2. The system in claim 1, wherein the program instructions are configured to cause the one or more processors to autonomously control the one or more propulsion units of the field engagement unit to provide omnidirectional and autonomous positioning control of the field engagement unit based on one or more measured characteristics.

3. The system in claim 1, further comprising:
   one or more material storage containers.

4. The system in claim 3, wherein the one or more material storage containers are disposed onboard of the support assembly.

5. The system in claim 4, wherein the one or more material storage containers are coupled to at least one of the one or more support structures, the support frame, or the one or more work tool assemblies.

6. The system in claim 3, further comprising:
   one or more assemblies configured to distribute one or more materials stored in the one or more material storage containers to one or more components of the field engagement unit.

7. The system in claim 1, wherein the support frame comprises:
   a truss.

8. The system in claim 1, wherein the support assembly comprises an adjustable support assembly.

9. The system in claim 1, wherein the one or more support structures are actuatable to adjust the elevation of the support assembly.

10. The system in claim 1, wherein the one or more propulsion units include one or more drive wheels.

11. The system in claim 1, wherein the one or more propulsion units include one or more tracks.

12. The system in claim 1, wherein the one or more propulsion units are mechanically coupled to the support assembly via one or more steering assemblies.

13. The system in claim 1, wherein at least a first propulsion unit of the one or more propulsion units is configured for actuation independently from at least a second propulsion unit of the one or more propulsion units.

14. The system in claim 1, wherein two propulsion units are configured for simultaneous actuation.

15. The system in claim 1, wherein the one or more work tool attachments comprise:
   at least one of a plant phenotyping attachment, an agronomy imaging attachment, a weeding attachment, a nutrient application attachment, a fertilizer application attachment, a combination nutrient and fertilizer application attachment, a spraying attachment, a soil coring attachment, a soil measurement attachment, a combination soil coring and soil measurement attachment, a planting attachment, a detasseling attachment, an irrigation attachment, a harvesting attachment, or a biomass collection attachment.

16. The system in claim 1, further comprising:
   one or more power sources.

17. The system in claim 1, further comprising:
   a server, wherein the server is communicatively coupled to the controller and is accessible by a user controller.

18. The system in claim 17, wherein the program instructions are configured to cause the one or more processors to:
   receive one or more sets of information;
   analyze the one or more sets of information;
   select one or more responses based on the analyzed one or more sets of information; and
   transmit the one or more responses to one or more components of the field engagement unit.

19. The system in claim 18, wherein the one or more sets of information are received from at least one of one or more in-field sensors, one or more sensors on the one or more components of the field engagement unit, the server, or the user controller.

20. The system in claim 18, wherein the one or more sets of information include one or more operational parameters for the one or more components of the field engagement unit.

21. The system in claim 18, wherein the one or more responses include one or more operational parameters for the controlled one or more components of the field engagement unit.

22. The system in claim 1, wherein the field engagement unit is configured for self-transportation from a first field to a second field.

23. The system in claim 1, wherein the field engagement unit is configured for transportation via at least one of a flatbed trailer, a drop deck trailer, an enclosed trailer, or a shipping container.

24. The system in claim 1, further comprising:
   a docking station, wherein the field engagement unit is reversibly couplable to the docking station, wherein the docking station is configured to perform at least one of a transfer of one or more materials from the docking station to the one or more material storage containers of the field engagement unit or a charge of one or more energy storage devices on-board the field engagement unit.

25. A farming system comprising:

a field engagement unit;

a docking station, wherein the field engagement unit is reversibly couplable to the docking station, wherein the docking station is configured to perform at least one of a transfer of one or more materials from the docking station to one or more material storage containers of the field engagement unit or a charge of one or more energy storage devices on-board the field engagement unit; and a controller, wherein the controller includes one or more processors configured to execute a set of program instructions stored in memory, wherein the program instructions are configured to cause the one or more processors to cause the field engagement unit to travel to the docking station for docking with the docking station.

26. A farming system comprising:

a plurality of field engagement units, wherein the plurality of field engagement units each comprise a local controller, wherein a particular local controller includes one or more local processors configured to execute a set of program instructions stored in local memory, wherein the program instructions are configured to cause the one or more local processors to control one or more components of a particular field engagement unit of the plurality of field engagement units; and a central controller, wherein the central controller includes one or more processors configured to execute a set of program instructions stored in memory, wherein the central controller is communicatively coupled to each of the local controllers of the plurality of field engagement units, wherein the program instructions are configured to cause the one or more processors to coordinate one or more actions of two or more of the plurality of field engagement units.

27. A livestock processing system comprising:

an engagement unit comprising:

a support assembly, wherein the support assembly includes one or more work tool rail assemblies, one or more support structures, and a support frame;

one or more propulsion units;

one or more work tool assemblies, wherein the one or more work tool rail assemblies are positioned parallel to the support frame such that the one or more work tool assemblies are actuatable along the one or more work tool rail assemblies so to provide one or more work tool attachments of the one or more work tool assemblies selective access to one or more regions of a livestock enclosure located beneath the support frame; and a controller, wherein the controller includes one or more processors configured to execute a set of program instructions stored in memory, wherein the program instructions are configured to cause the one or more processors to control a position of the one or more work tool assemblies along the one or more work tool rail assemblies so to actuate the one or more work tool assemblies to a selected position within the livestock enclosure.

* * * * *